(12) United States Patent
Babaei

(10) Patent No.: US 12,041,683 B2
(45) Date of Patent: *Jul. 16, 2024

(54) DOWNLINK CONTROL CHANNEL MONITORING SKIPPING

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,916

(22) Filed: Feb. 6, 2023

(65) Prior Publication Data

US 2023/0189392 A1 Jun. 15, 2023

Related U.S. Application Data

(63) Continuation of application No. 17/838,322, filed on Jun. 13, 2022, now Pat. No. 11,606,837, which is a continuation of application No. 17/216,668, filed on Mar. 29, 2021, now Pat. No. 11,438,960.

(60) Provisional application No. 63/001,447, filed on Mar. 29, 2020.

(51) Int. Cl.

| | |
|---|---|
| *H04W 76/18* | (2018.01) |
| *H04L 1/1812* | (2023.01) |
| *H04L 1/1867* | (2023.01) |
| *H04L 5/00* | (2006.01) |
| *H04L 43/0864* | (2022.01) |
| *H04W 72/23* | (2023.01) |
| *H04W 76/28* | (2018.01) |

(52) U.S. Cl.
CPC .......... *H04W 76/28* (2018.02); *H04L 1/1816* (2013.01); *H04L 1/1887* (2013.01); *H04L 5/0055* (2013.01); *H04L 43/0864* (2013.01); *H04W 72/23* (2023.01); *H04W 76/18* (2018.02)

(58) Field of Classification Search
CPC ..... H04W 76/28; H04W 72/23; H04W 76/18; H04W 72/0453; H04L 1/1816; H04L 1/1887; H04L 5/0055; H04L 43/0864
See application file for complete search history.

(56) References Cited

U.S. PATENT DOCUMENTS

| | | |
|---|---|---|
| 2011/0205928 A1 | 8/2011 | Pelletier et al. |
| 2018/0048498 A1 | 2/2018 | Stern-Berkowitz et al. |
| 2020/0177315 A1 | 6/2020 | Lou et al. |

(Continued)

OTHER PUBLICATIONS

3GPP TS 38.211 V16.0.0 (Dec. 2019); Technical Specification; 3rd Generation Partnership Project; Technical Specification Group Radio Access Network; NR; Physical channels and modulation; (Release 16).

(Continued)

*Primary Examiner* — John D Blanton
(74) *Attorney, Agent, or Firm* — Alireza Babaei

(57) ABSTRACT

A wireless device receives configuration parameters indicating PDCCH skipping durations comprising a first duration. The wireless device may receive a DCI comprising a field with a value indicating the first duration and indicating skipping PDCCH monitoring for the first duration. The wireless device may transmit a SR and may ignore the PDCCH skipping in response to transmitting the SR.

20 Claims, 77 Drawing Sheets

(56) References Cited

U.S. PATENT DOCUMENTS

| | | | |
|---|---|---|---|
| 2020/0195410 A1 | 6/2020 | Li et al. | |
| 2020/0229100 A1 | 7/2020 | He et al. | |
| 2020/0314811 A1 | 10/2020 | Lin et al. | |
| 2020/0396684 A1 | 12/2020 | Lin et al. | |
| 2021/0022080 A1 | 1/2021 | Chang et al. | |
| 2021/0029641 A1 | 1/2021 | Khoshnevisan et al. | |
| 2021/0076361 A1 | 3/2021 | Takeda et al. | |
| 2021/0126741 A1 | 4/2021 | Cao et al. | |
| 2022/0132584 A1 | 4/2022 | He et al. | |
| 2022/0140943 A1* | 5/2022 | Zhang | H04W 72/0446 370/329 |
| 2022/0191793 A1* | 6/2022 | Murray | H04W 72/23 |
| 2022/0201516 A1 | 6/2022 | Guo et al. | |
| 2022/0201747 A1 | 6/2022 | Tooher et al. | |

OTHER PUBLICATIONS

3GPP TS 38.212 V16.0.0 (Dec. 2019); Technical Specification; 3rd Generation Partnership Project; Technical Specification Group Radio Access Network; NR; Multiplexing and channel coding; (Release 16).
3GPP TS 38.213 V16.0.0 (Dec. 2019); Technical Specification; 3rd Generation Partnership Project; Technical Specification Group Radio Access Network; NR; Physical layer procedures for control; (Release 16).
3GPP TS 38.214 V16.0.0 (Dec. 2019); Technical Specification; 3rd Generation Partnership Project; Technical Specification Group Radio Access Network; NR; Physical layer procedures for data; (Release 16).
3GPP TS 38.300 V16.0.0 (Dec. 2019); Technical Specification; 3rd Generation Partnership Project; Technical Specification Group Radio Access Network; NR; NR and NG-RAN Overall Description; Stage 2; (Release 16).
3GPP TS 38.321 V15.8.0 (Dec. 2019); Technical Specification; 3rd Generation Partnership Project; Technical Specification Group Radio Access Network; NR; Medium Access Control (MAC) protocol specification; (Release 15).
3GPP TS 38.331 V15.8.0 (Dec. 2019); Technical Specification; 3rd Generation Partnership Project; Technical Specification Group Radio Access Network; NR; Radio Resource Control (RRC); Protocol specification; (Release 15 ).
RP-193239; (revision of RP-193173); 3GPP TSG RAN Meeting #86; Sitges, Spain, Dec. 9-12, 2019; Source MediaTek Inc.; Title: New WID: UE Power Saving Enhancements; Document for: Approval; Agenda Item: 9.1.2.
R1-1912799; 3GPP TSG RAN WG1 #99; Reno, USA, Nov. 18-22, 2019; Source: vivo; Title: UE power evaluation for RLM/BFD; Agenda Item: 7.2.15; Document for: Discussion and Decision.
RP-192540; 3GPP TSG-RAN WG Meeting #86; Sitges, Spain, Dec. 9-12, 2019; vivo; Views on NR UE power saving in Rel-17.
RP-192569; 3GPP TSG RAN Meeting #86; Sitges, Spain, Dec. 9-12, 2019; Source: ZTE, Sanechips; Title: Discussion on UE power saving for Rel-17; Agenda item: 9.1.1; Document for: Discussion.
RP-192699; 3GPP TSG RAN Meeting #86; Sitges, Spain, Dec. 9-12, 2019; Agenda Item: 9.1.1; Source: Apple Inc.; Title: Views on R17 UE Power Saving; Document for: Discussion, Decision.
RP-192856; 3GPP TSG RAN Meeting #86; Sitges, Spain, Dec. 9-12, 2019; China Academy of Telecommunications Technology (CATT); Views on Power Saving in Rel-17.
R2-1903048; 3GPP TSG-RAN WG2 Meeting #105bis; Xi'an, China, Apr. 8-Apr. 12, 2019; Agenda item: 11.11.4.2; Source: Qualcomm Inc; Title: Discussion on signaling for skipping PDCCH occasions; WID/SID: FS_NR_UE_pow_sav; Document for: Discussion and Decision.
R2-1903126; 3GPP TSG RAN WG2 #105bis; Xi'an, China, Apr. 8-Apr. 12, 2019; Source: CATT; Title: PDCCH skipping and switching of PDCCH monitoring periodicity; Agenda Item: 11.11.4.2; Document for: Discussion and Decision.

R2-1903200; 3GPP TSG-RAN WG2 Meeting #105bis; Xi'an, China, Apr. 8-Apr. 12, 2019; Source: vivo; Title: DCI-based mechanism in skipping PDCCH monitoring or switching PDCCH monitoring periodicity; Agenda Item: 11.11.4.2; Document for: Discussion and Decision.
R2-1903297; 3GPP TSG-RAN WG2 Meeting #105bis; Xi'an, China, Apr. 6-Apr. 12, 2019; Agenda Item: 11.11.4.2; Source: OPPO; Title: DCI based power saving adaptation; Document for: Discussion, Decision.
R2-1903607; 3GPP TSG-RAN WG2 Meeting #105bis; Xi'an, China, Apr. 8-Apr. 12, 2019; Agenda Item: 11.11.4.2; Source: Apple; Title: DCI based Power Saving Adaption; Document for: Discussion and Decision.
R2-1904143; 3GPP TSG-RAN2 Meeting #105bis; Xi'an, China, Apr. 8-12, 2019; Agenda Item: 11.11.4.2 DCI-based power saving adaptation; Source: Ericsson; Title: Considerations about DCI-based PDCCH-skip; Document for: Discussion and Decision.
R2-1904209; 3GPP TSG RAN WG2 Meeting#105bis; Xian, China, Apr. 8-12, 2019; Agenda Item: 11.11.4; Source: Sony; Title: Power Consumption Adaptation for NR RRC Connected; Document for: Discussion / decision.
R2-1904304; 3GPP TSG-RAN WG2 Meeting #105bis; Xian, China, Apr. 8-12, 2019; Agenda item: 11.11.4.1; Source: Nokia, Nokia Shanghai Bell; Title: On additional power saving channel based adaptation schemes; WID/SID: FS_NR_UE_pow_sav; Document for: Discussion and Decision.
R2-1904442; 3GPP TSG RAN WG2 Meeting #105bis; Xi'an, China, Apr. 8-12, 2019; Agenda item: 11.11.4.2; Source: Intel Corporation; Title: RAN2 impacts when introducing RAN1 go-to-sleep mechanism; Document for: Discussion and decision.
R2-1904968; 3GPP TSG-RAN2 Meeting#105bis; Xian, China, Apr. 8-12, 2019; Agenda Item: 11.11.4.2; Source: Huawei, HiSilicon; Title: Discussion on the impact of DCI-based power saving adaptation; Document for: Discussion and decision.
R2-1905022; 3GPP TSG-RAN WG2#105bis; Xi'an, China, Apr. 8-12, 2019; Agenda Item: 11.11.4.2; Souce: Samsung; Title: Introduction of DCI-based Power Saving Adaptation; Document for: Discussion.
R2-1905604; 3GPP TSG-RAN WG2 Meeting #106; Reno, USA, May 13-May 17, 2019; Agenda Item: 11.11.4.2; Source: OPPO; Title: Impacts of DCI-based PDCCH skipping; Document for: Discussion, Decision.
R2-1905956; 3GPP TSG-RAN WG2 Meeting #106; Reno, USA, May 13-17, 2019; (Revision of R2-1903200); Source: vivo; Title: DCI-based mechanism in skipping PDCCH monitoring and switching PDCCH monitoring periodicity; Agenda Item: 11.11.4.2; Document for: Discussion and Decision.
R2-1906493; 3GPP TSG-RAN2# 106; Reno, Nevada, USA, May 13-17, 2019; Agenda Item: 11.11.4.2; Source: Xiaomi Communications, Nokia, Nokia Shanghai Bell; Title: Is PDCCH skipping really needed?; Document for: Discussion and Decision.
R2-1906602; 3GPP TSG-RAN2 Meeting #106; Reno, USA, May 13-17, 2019; Revision of R2-1904143; Agenda Item: 11.11.4.2 DCI-based power saving adaptation; Source: Ericsson; Title: Considerations about DCI-based PDCCH-skip; Document for: Discussion and Decision.
R2-1906859; 3GPP TSG-RAN WG2 Meeting #106; Reno, US, Apr. 12-17, 2019; Agenda item: 11.11.4.1; Source: Nokia, Nokia Shanghai Bell; Title: On PDCCH monitoring adaptation schemes; WID/SID: FS_NR_UE_pow_sav; Document for: Discussion and Decision.
R2-1906904; 3GPP TSG-RAN2 Meeting#106; Reno, USA, May 13-May 17, 2019; Agenda Item: 11.11.4.2; Source: Huawei, HiSilicon; Title: Further discussion on the impact of DCI-based PDCCH skipping; Document for: Discussion and decision.
R2-1907045; 3GPP TSG-RAN WG2 Meeting #106; Reno, US, May 13-17, 2019; Agenda item: 11.11.4; Source: Sony; Title: Power Consumption Adaptation for NR RRC Connected; Document for: Discussion and Decision.
R2-1907115; 3GPP TSG-RAN WG2 #106; Reno, U.S.A, May 13-May 17, 2019; Agenda Item: 11.11.4.2; Source: MediaTek Inc.; Title: On the short-DRX cycle operation; Document for: Discussion and decision.

(56) References Cited

OTHER PUBLICATIONS

R2-1907168; 3GPP TSG-RAN WG2 Meeting #106; Reno, USA, May 13-17, 2019; Agenda Item: 11.11.4.2; Source: Apple; Title: DCI-based PDCCH Skipping; Document for: Discussion and Decision.
R2-1907383; 3GPP TSG RAN WG2 Meeting #106; Reno, Nevada, USA, May 13-17, 2019; Agenda item: 11.11.4.2; Source: Intel Corporation; Title: RAN2 impacts when introducing a DCI-based mechanism to skip the PDCCH monitoring; Document for: Discussion and decision.
R2-1907662; 3GPP TSG-RAN2#106; Reno, U.S.A, May 13-17, 2019; Agenda item: 11.11.4.2 (FS_NR_UE_pow_sav); Source: LG Electronics Inc.; Title: DCI-based PDCCH skipping impacts on MAC; Document for: Discussion and Decision.
R2-1907836; 3GPP TSG-RAN WG2#106; Reno, USA, May 13-17, 2019; (Resubmission of R2-1905022); Agenda Item: 11.11.4.2; Souce: Samsung; Title: Introduction of DCI-based Power Saving Adaptation; Document for: Discussion.
R2-1907851; 3GPP RAN WG2 Meeting #106; Reno, USA, May 13-15, 2019; Agenda Item: 11.11.4.2; Source: InterDigital Inc.; Title: PDCCH-based power saving signals/channel for NR; Document for: Discussion, Decision.
R2-1908127; 3GPP TSG RAN WG2 Meeting #106; Reno, Nevada, USA, May 13-17, 2019; (Revision of R2-1907383); Agenda item: 11.11.4.2; Source: Intel Corporation; Title: RAN2 impacts when introducing a DCI-based mechanism to skip the PDCCH monitoring; Document for: Discussion and decision.
R2-1903120; 3GPP TSG-RAN WG2 Meeting #105bis; Xi'an, China, Apr. 8-19, 2019; Source: CATT; Title: DRX procedure with Power Saving Signal/Channel; Agenda Item: 11.11.4.1; Document for: Discussion and Decision.
R2-1903199; 3GPP TSG-RAN WG2 Meeting #105bis; Xi'an, China, Apr. 8-12, 2019; Source: vivo; Title: C-DRX enhancement for power saving with WUS; Agenda Item: 11.11.4.1; Document for: Discussion and Decision.
R2-1903869; 3GPP TSG-RAN2# 105bis; Xi'an, China, Apr. 8-Apr. 12, 2019; Agenda Item: 11.11.4.4; Source: Xiaomi Communications; Title: Considerations on UE power saving for C-DRX; Document for: Discussion and Decision.
R2-1904149; 3GPP TSG-RAN2 Meeting #105bis; Xi'an, China, Apr. 8-12, 2019; Agenda Item: 11.11.4.1 PDCCH-based power saving signals/channel; Source: Ericsson; Title: Impact of WUS on cDRX; Document for: Discussion and Decision.
R2-1904418; 3GPP TSG-RAN WG2 #105-bis; Xi'an, China, Apr. 8-Apr. 12, 2019; Revision of R2-1901077; Agenda Item: 11.11.4.1; Source: MediaTek Inc.; Title: DRX enhancements for power saving; Document for: Discussion and decision.
R2-1904663; 3GPP TSG-RAN2#105bis; Xian, China, Apr. 8-12, 2019 ; Agenda item: 11.11.4.1 (FS_NR_UE_pow_sav); Source: LG Electronics Inc.; Title: Wake-up signal related to DRX; Document for: Discussion and Decision.
R2-1904966; 3GPP TSG-RAN2 Meeting#105bis; Xian, China, Apr. 8-12, 2019; Agenda Item: 11.11.4.1; Source: Huawei, HiSilicon; Title: Impact of PDCCH-based power saving signal/channel to the C-DRX; Document for: Discussion and decision.
R2-1904967; 3GPP TSG-RAN WG2 # 105bis; Xi'an, China, Apr. 8-12, 2019; Agenda Item: 11.11.4.1; Source: Huawei, HiSilicon; Title: Enabling of power saving signal related schemes; Document for: Discussion and decision.

* cited by examiner

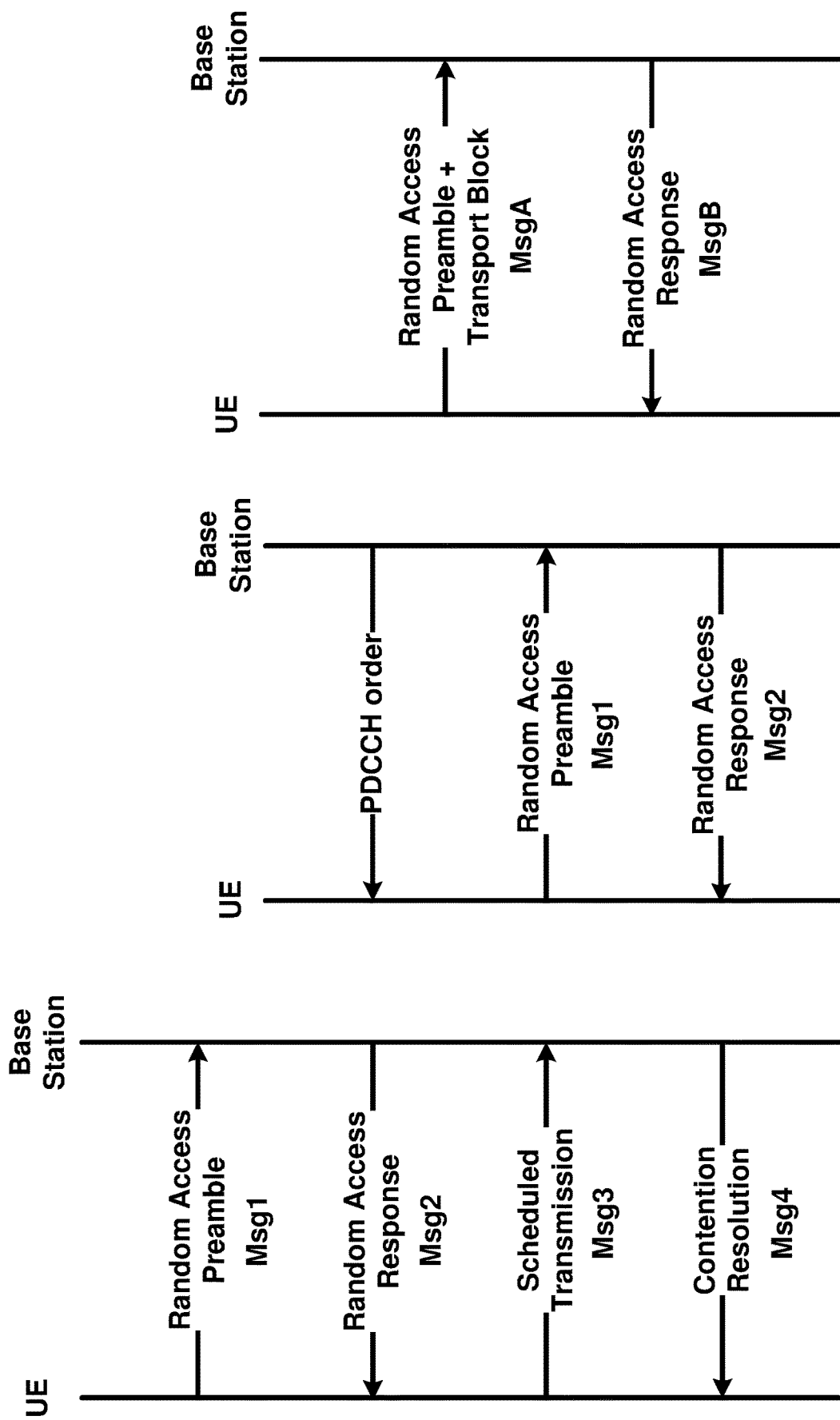

```
┌─────────────────────────────────────────────────────────────┐
│ Receive DRX configuration parameters comprising a 1st       │
│ parameter indicating a 1st value of a DL DRX retransmission │
│                         timer                               │
│                         5010                                │
└─────────────────────────────────────────────────────────────┘
                              │
                              ▼
┌─────────────────────────────────────────────────────────────┐
│ in response to receiving a 1st TB, start the DL DRX         │
│ retransmission timer with the 1st value                     │
│                         5020                                │
└─────────────────────────────────────────────────────────────┘
                              │
                              ▼
┌─────────────────────────────────────────────────────────────┐
│ switch a DL control channel monitoring periodicity from     │
│ a 1st monitoring periodicity to a 2nd monitoring            │
│ periodicity based on receiving 1st control information      │
│                         5030                                │
└─────────────────────────────────────────────────────────────┘
                              │
                              ▼
┌─────────────────────────────────────────────────────────────┐
│ in response to receiving a 2nd TB and based on the          │
│ switching the DL control channel monitoring periodicity,    │
│ start the DL DRX retransmission timer with a 2nd value      │
│                         5040                                │
└─────────────────────────────────────────────────────────────┘
                              │
                              ▼
┌─────────────────────────────────────────────────────────────┐
│ receive, while the DL DRX retransmission timer is running,  │
│ a DL control information comprising a DL assignment for     │
│ retransmission of the 2nd TB                                │
│                         5050                                │
└─────────────────────────────────────────────────────────────┘
```

FIG. 50

```
┌─────────────────────────────────────────────────────────┐
│ receive DRX configuration parameters comprising a 1st   │
│ parameter indicating a 1st value of an UL DRX           │
│ retransmission timer                                    │
│                                                         │
│                          5110                           │
└─────────────────────────────────────────────────────────┘
                             │
                             ▼
┌─────────────────────────────────────────────────────────┐
│ in response to transmitting a 1st TB, start the UL DRX  │
│ retransmission timer with the 1st value                 │
│                                                         │
│                          5120                           │
└─────────────────────────────────────────────────────────┘
                             │
                             ▼
┌─────────────────────────────────────────────────────────┐
│ switch a DL control channel monitoring periodicity from │
│ a 1st monitoring periodicity to a 2nd monitoring        │
│ periodicity based on receiving 1st control information  │
│                                                         │
│                          5130                           │
└─────────────────────────────────────────────────────────┘
                             │
                             ▼
┌─────────────────────────────────────────────────────────┐
│ in response to transmitting a 2nd TB and based on the   │
│ switching the DL control channel monitoring periodicity,│
│ start the UL DRX retransmission timer with a 2nd value  │
│                                                         │
│                          5140                           │
└─────────────────────────────────────────────────────────┘
                             │
                             ▼
┌─────────────────────────────────────────────────────────┐
│ receive, while the UL DRX retransmission timer is       │
│ running, a DL control information comprising an UL      │
│ grant for retransmission of the 2nd TB                  │
│                                                         │
│                          5150                           │
└─────────────────────────────────────────────────────────┘
```

FIG. 51 receive: 1st configuration parameters, of 1st search space set(s), comprising a 1st parameter indicating a 1st value of a 1st monitoring periodicity; and 2nd configuration parameters, of 2nd search space set(s), comprising a 2nd parameter indicating a 2nd value of a 2nd monitoring periodicity

6210 receive control information indicating switching a DL control channel monitoring periodicity

6220 based on the receiving the control information: switch the 1st monitoring periodicity from the 1st value to a 3rd value; and keep the 2nd value for the 2nd monitoring periodicity

6230

FIG. 62 receive: 1st configuration parameters, of a BWP of a cell; and a 2nd configuration parameter indicating a 1st value of a monitoring periodicity for monitoring a control channel on a search space of the BWP

6310 receive control information indicating switching a DL control channel monitoring periodicity

6320 in response to the receiving the control information, switch or not switch the 1st value of the monitoring periodicity based on the BWP, wherein the BWP is an active BWP of the cell

DOWNLINK CONTROL CHANNEL MONITORING SKIPPING

CROSS-REFERENCE TO RELATED APPLICATIONS

This application is a continuation of U.S. patent application Ser. No. 17/838,322, filed Jun. 13, 2022, which is a continuation of U.S. patent application Ser. No. 17/216,668, filed Mar. 29, 2021, which claims the benefit of U.S. Provisional Application No. 63/001,447, filed Mar. 29, 2020, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 50 shows an example flow diagram in accordance with several of various embodiments of the present disclosure.

FIG. 51 shows an example flow diagram in accordance with several of various embodiments of the present disclosure.

FIG. 62 shows an example flow diagram in accordance with several of various embodiments of the present disclosure.

FIG. 63 shows an example flow diagram in accordance with several of various embodiments of the present disclosure.

DETAILED DESCRIPTION

The exemplary embodiments of the disclosed technology enable processes for a wireless device and/or one or more base stations for power saving. The exemplary disclosed embodiments may be implemented in the technical field of wireless communication systems. More particularly, the embodiment of the disclosed technology may relate to power saving by control channel monitoring reduction by wireless devices.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
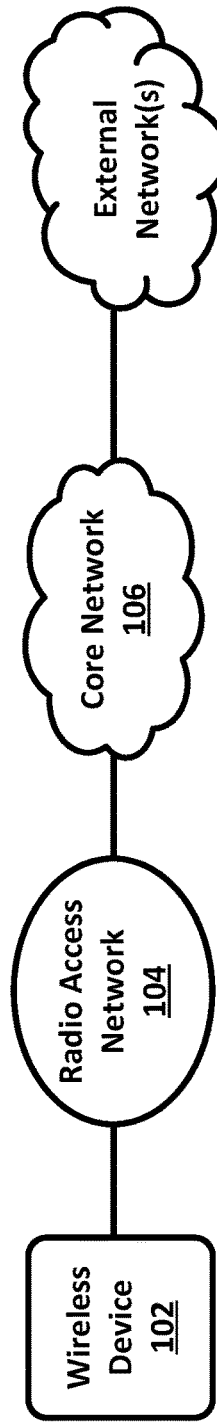
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
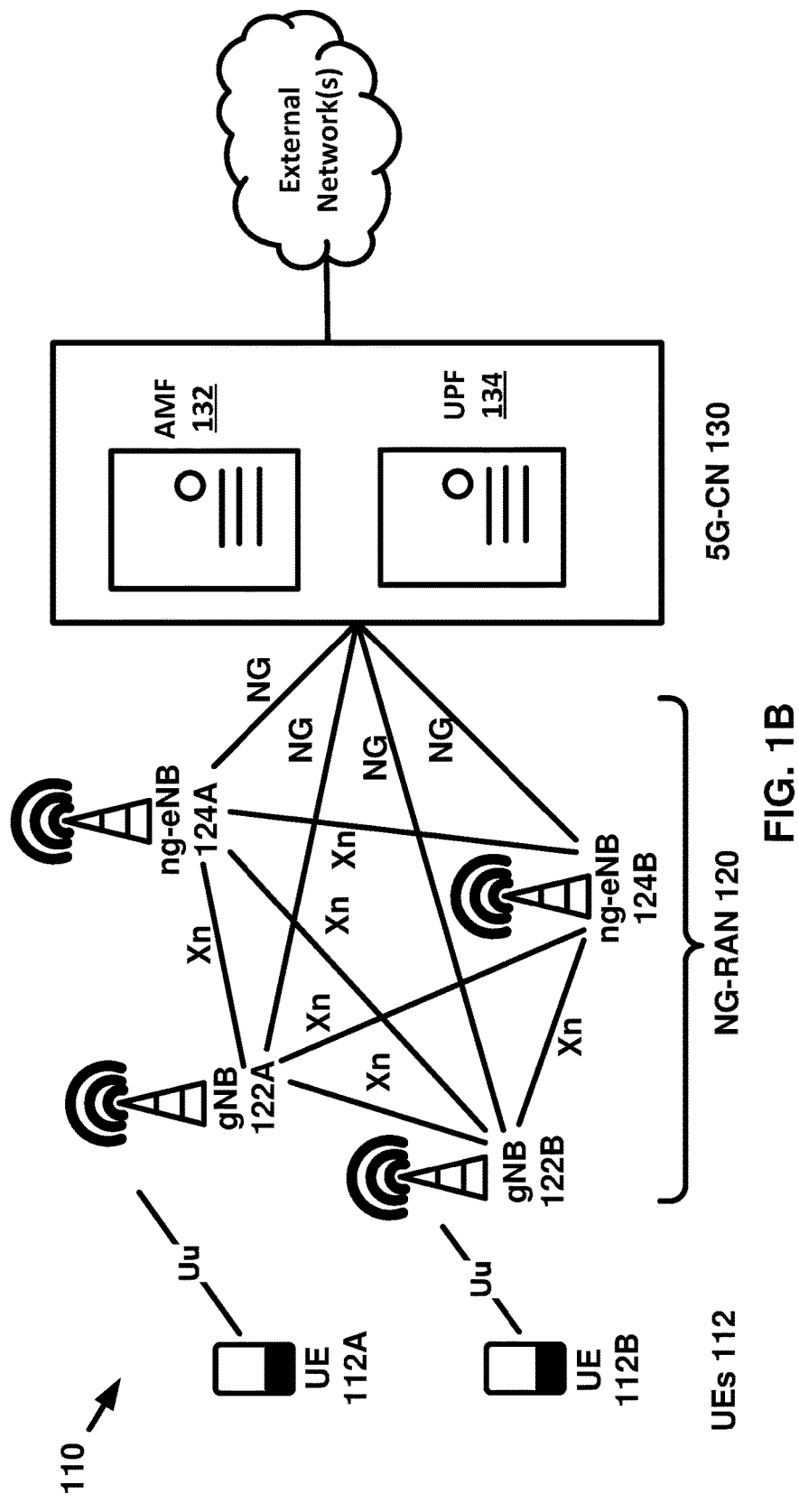

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
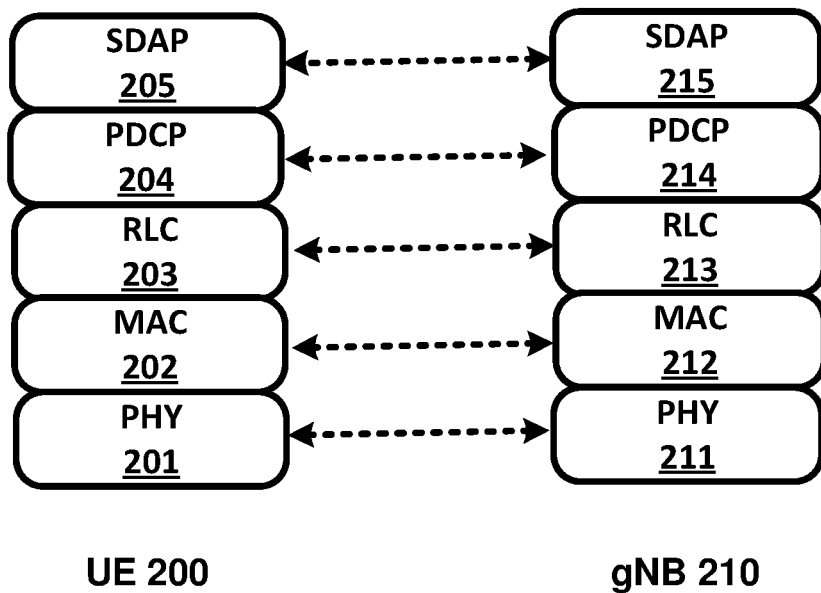
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
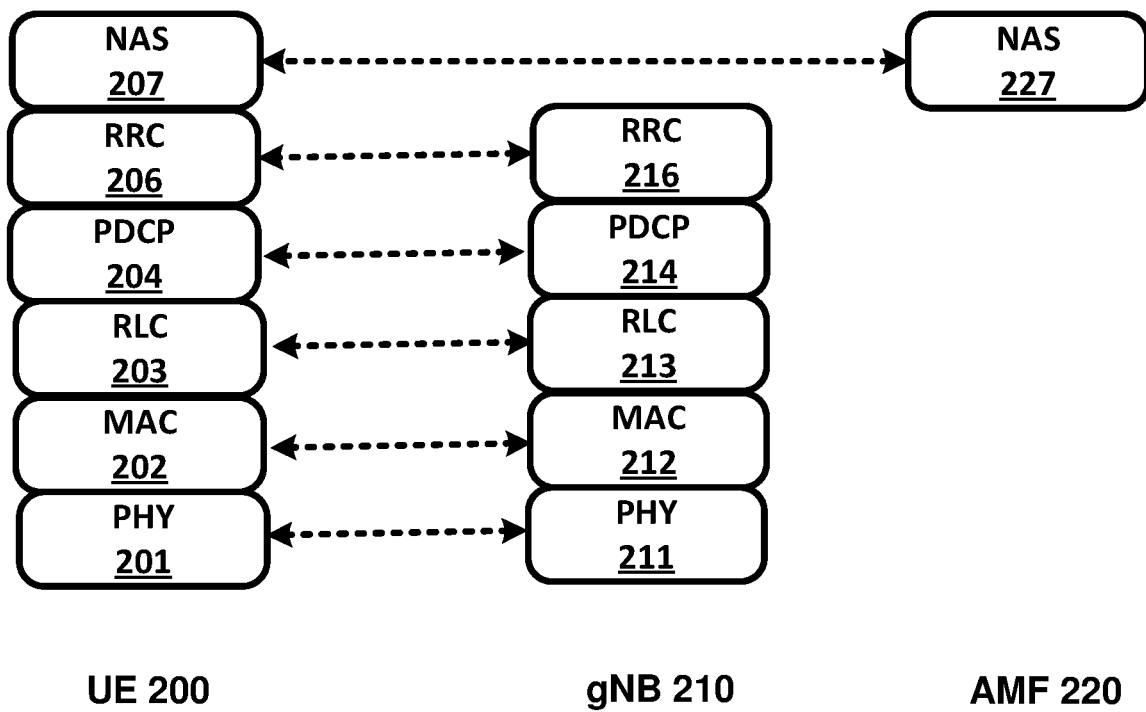

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
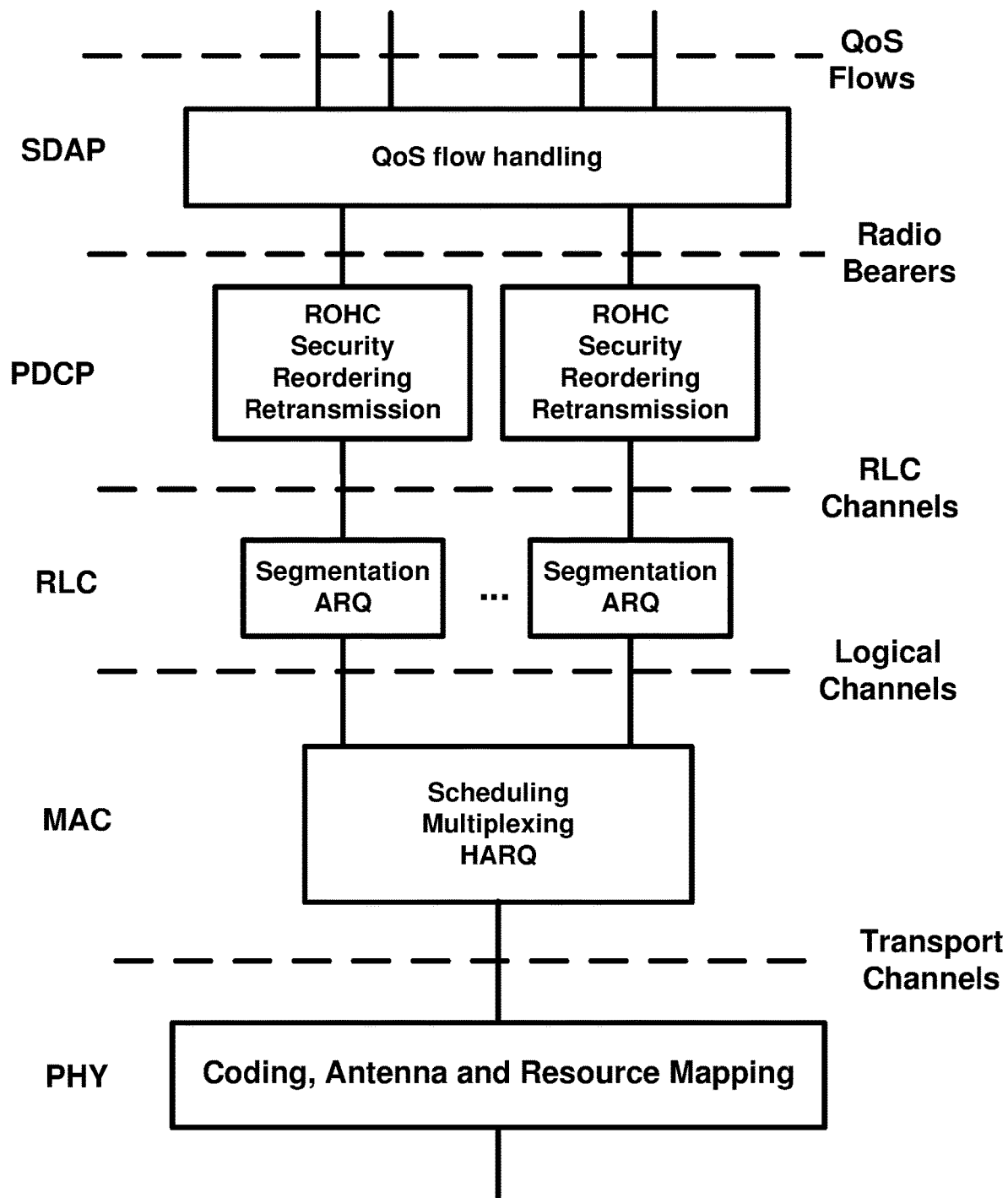
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
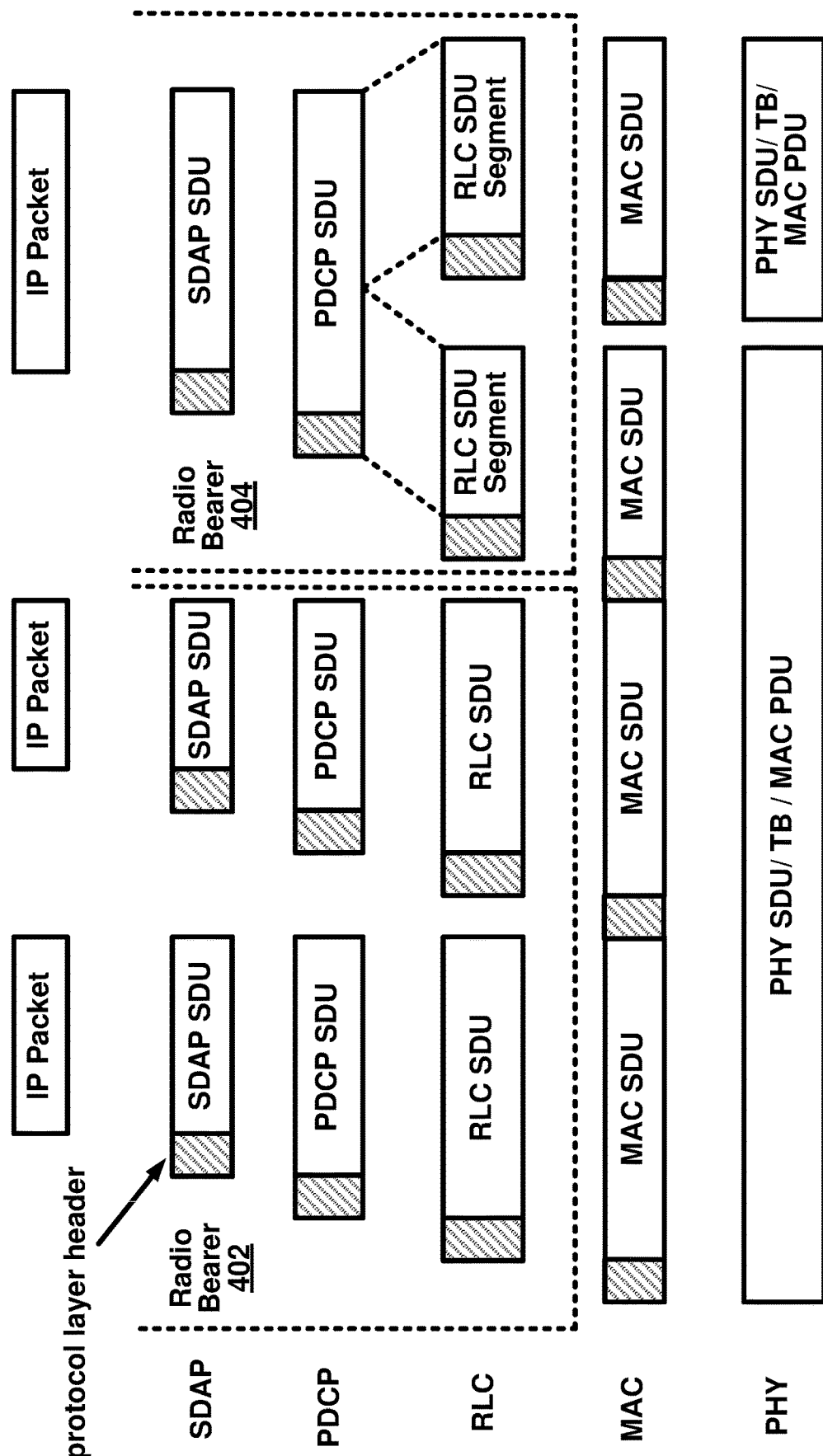
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
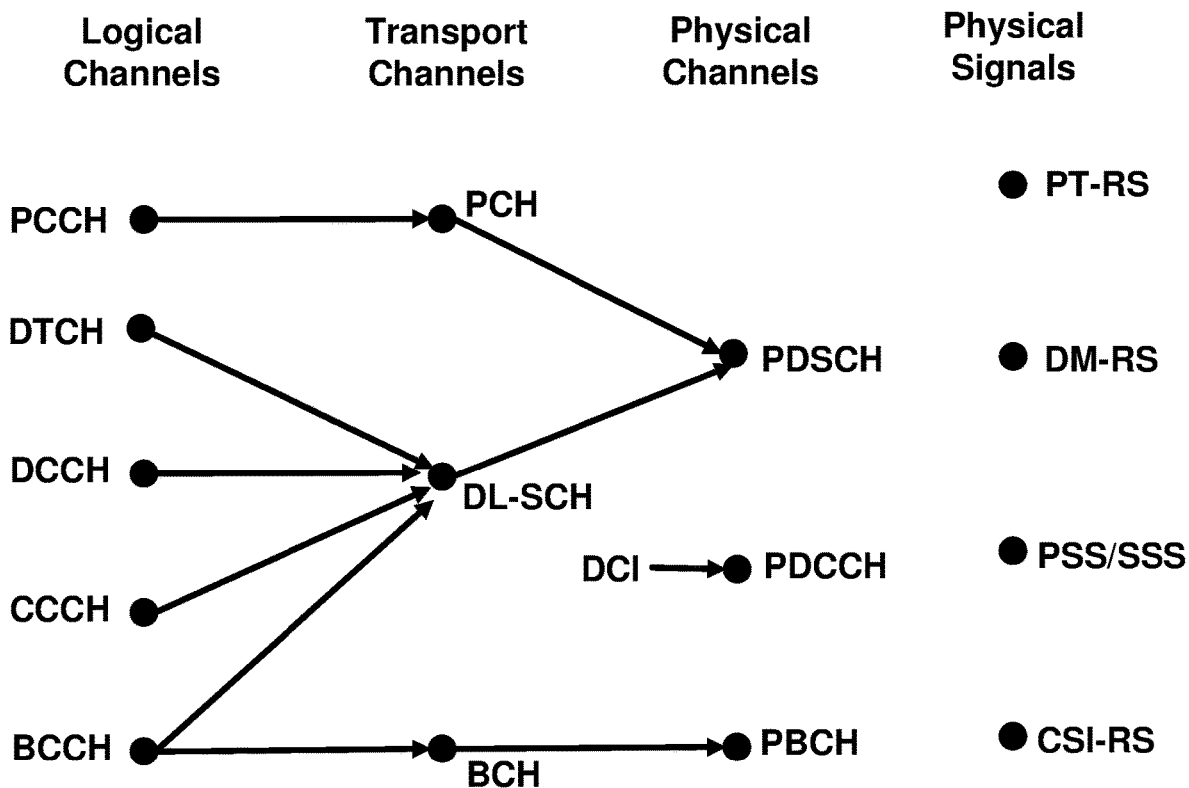
FIG. 5A shows example mapping of channels between layers of the protocol stack and different physical signals in downlink in accordance with several of various embodiments of the present disclosure.
Figure 5B:
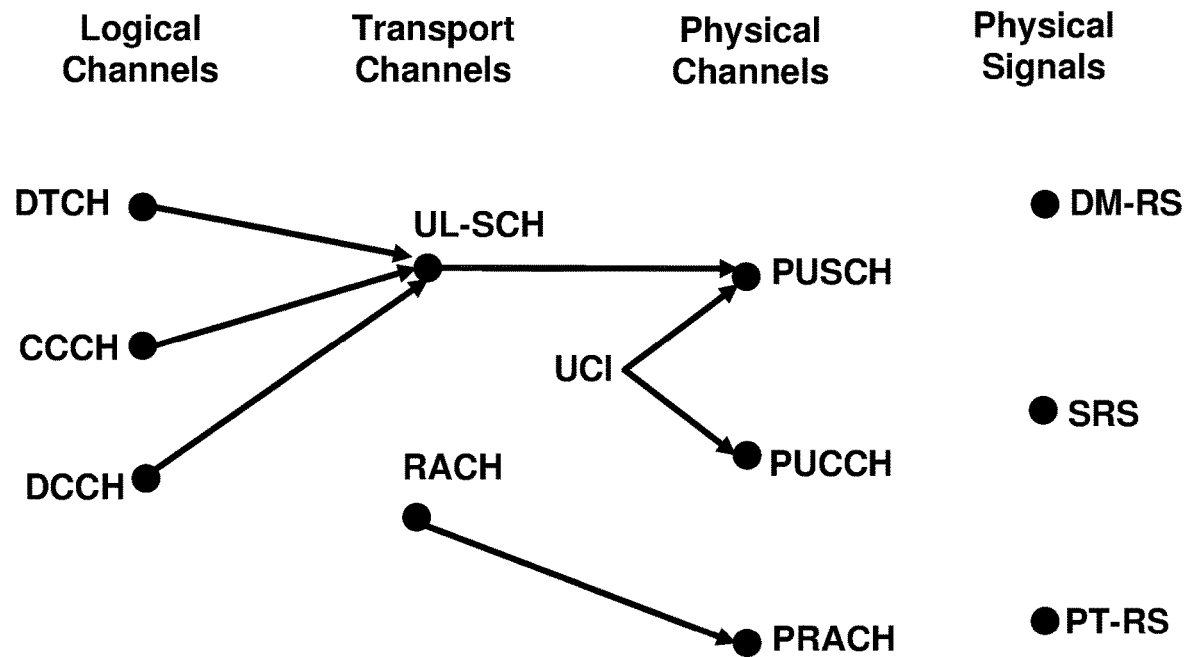
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
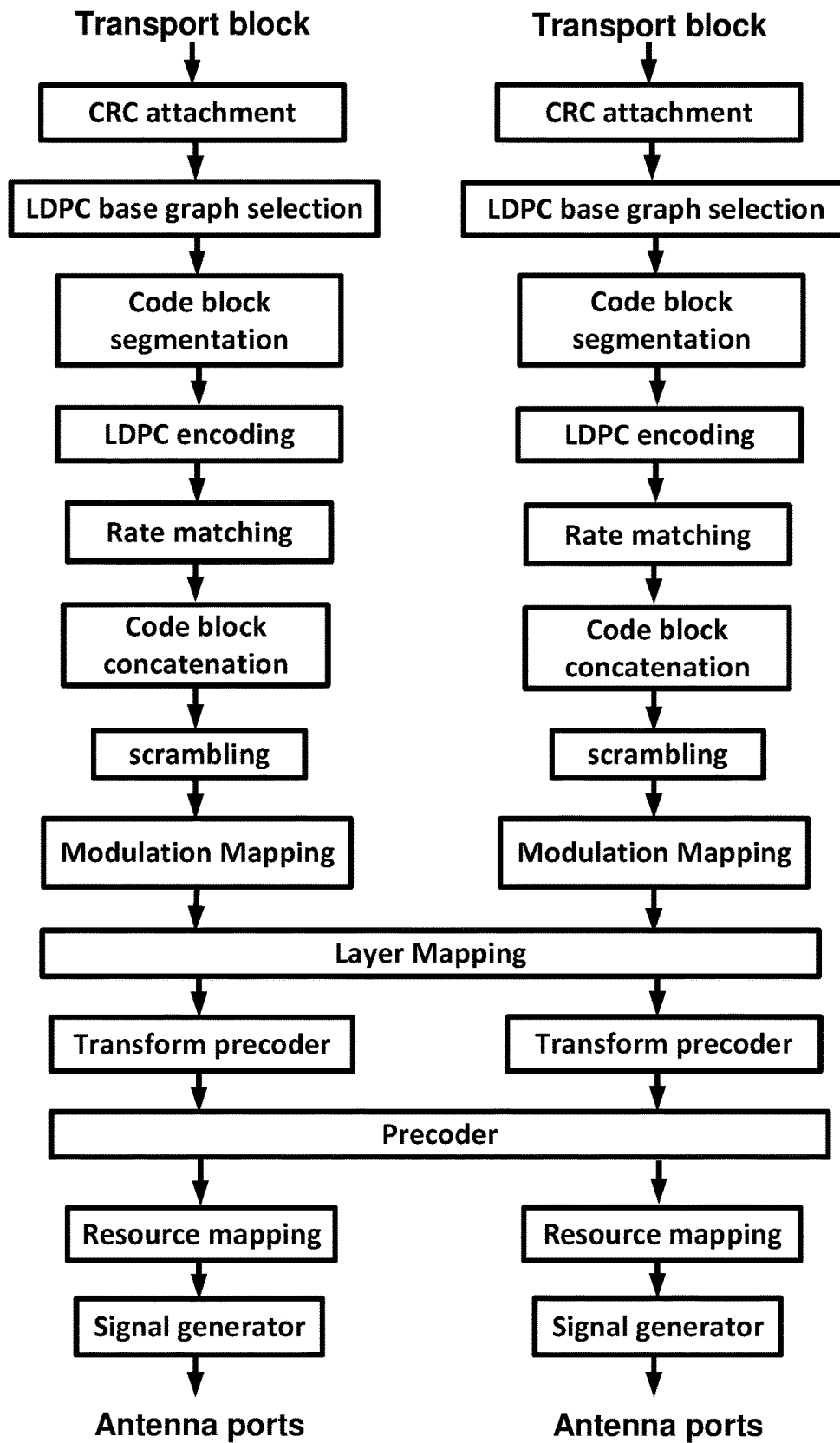
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
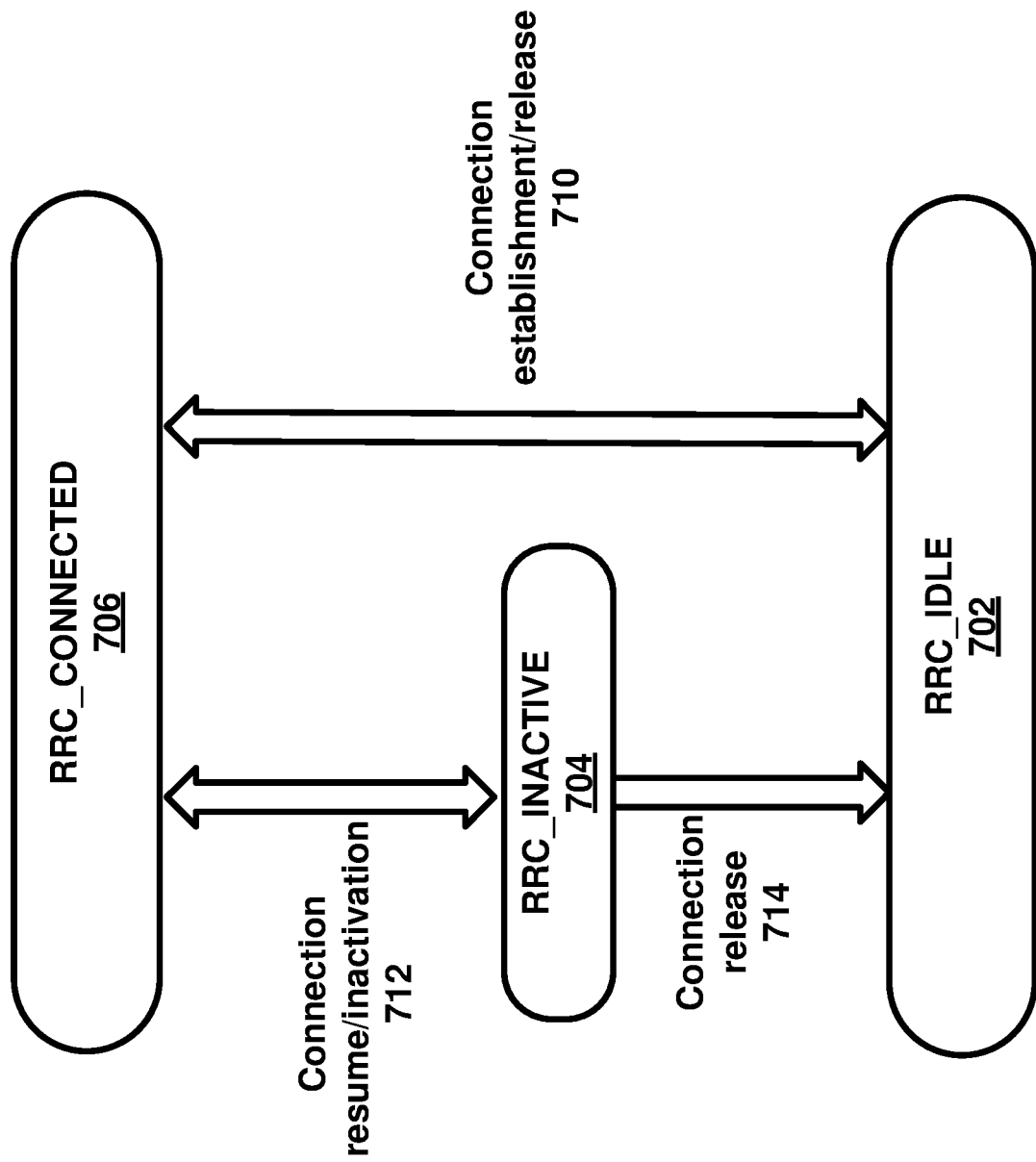
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
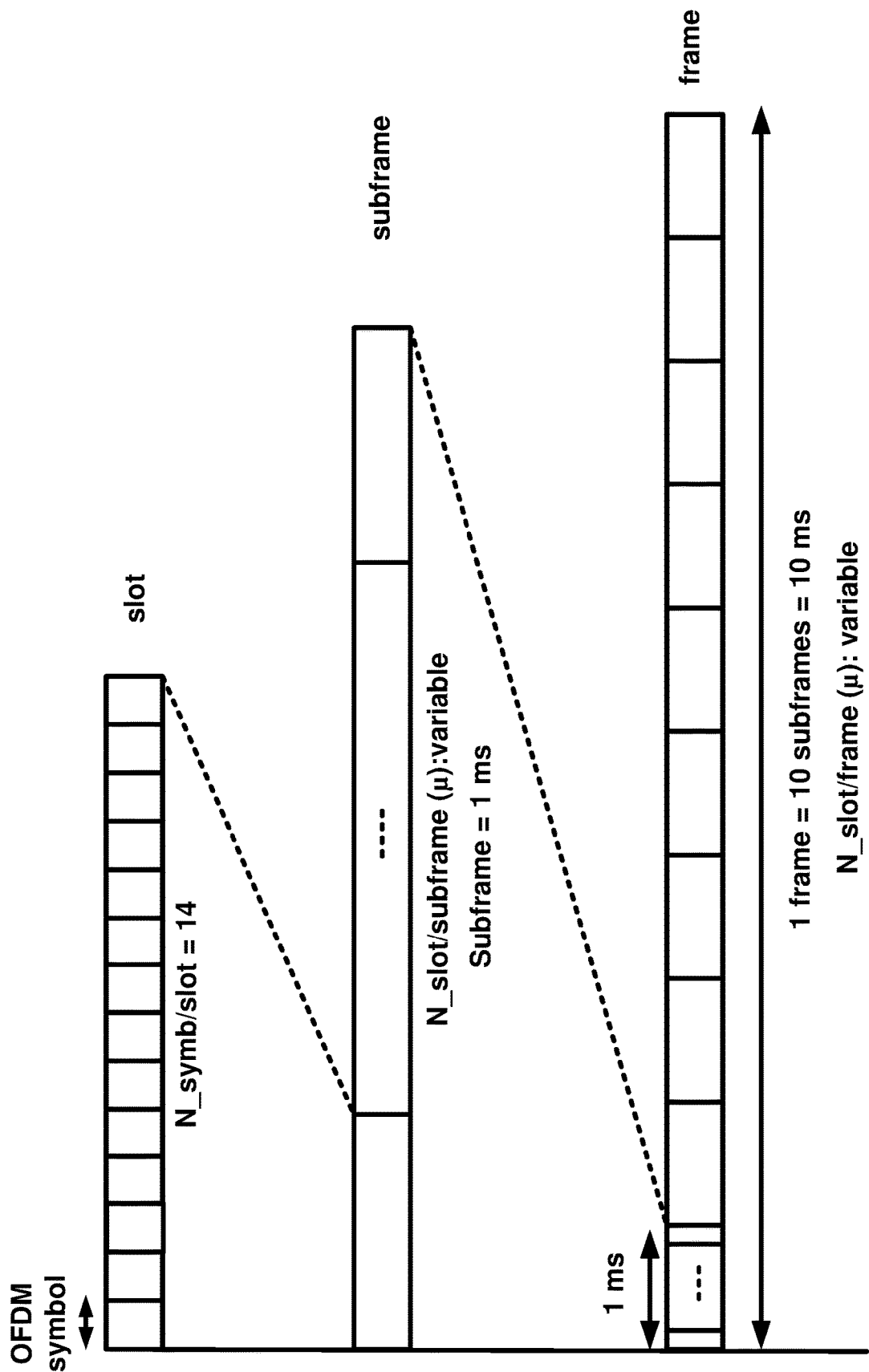
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{slot}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
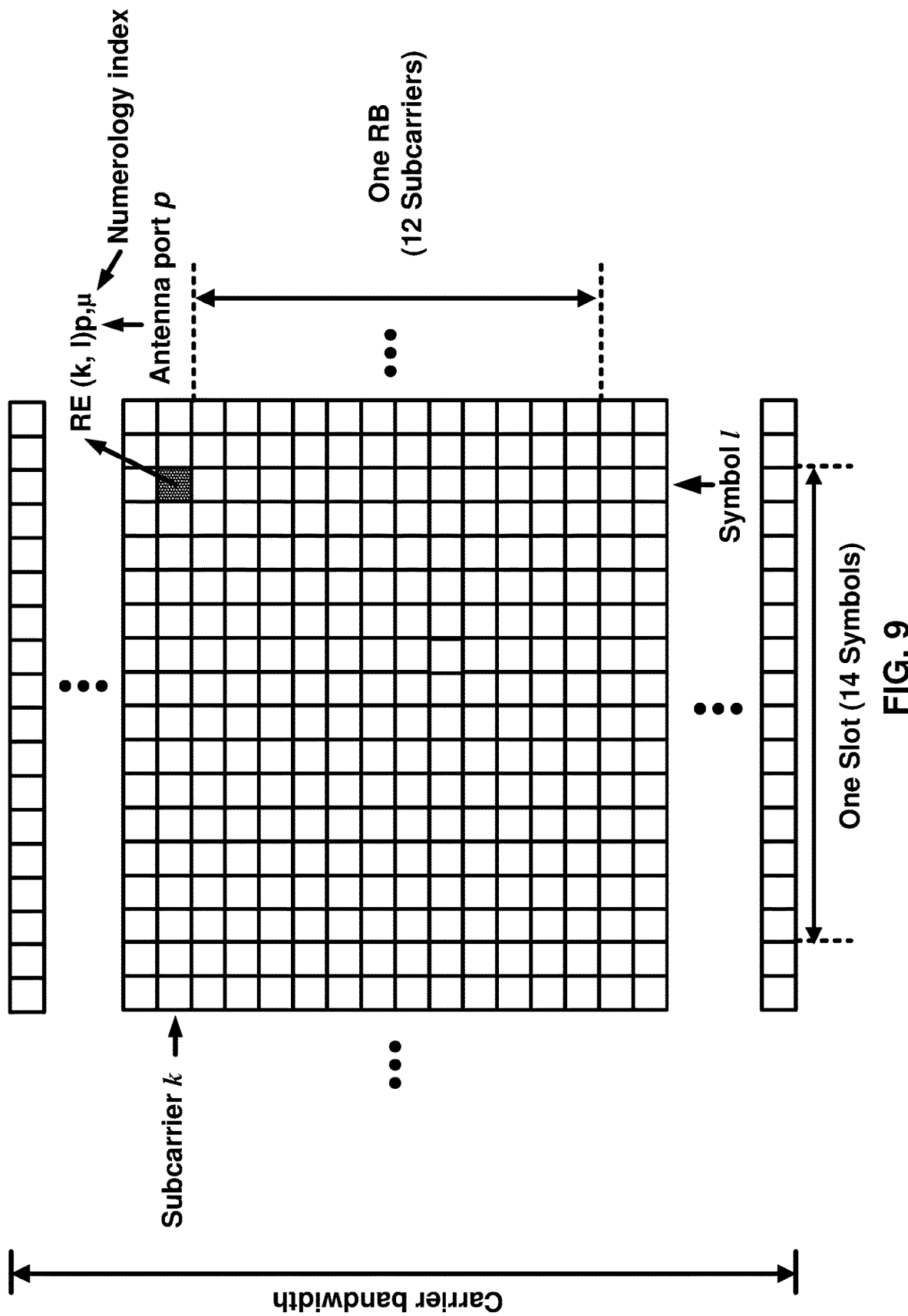
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{sc}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
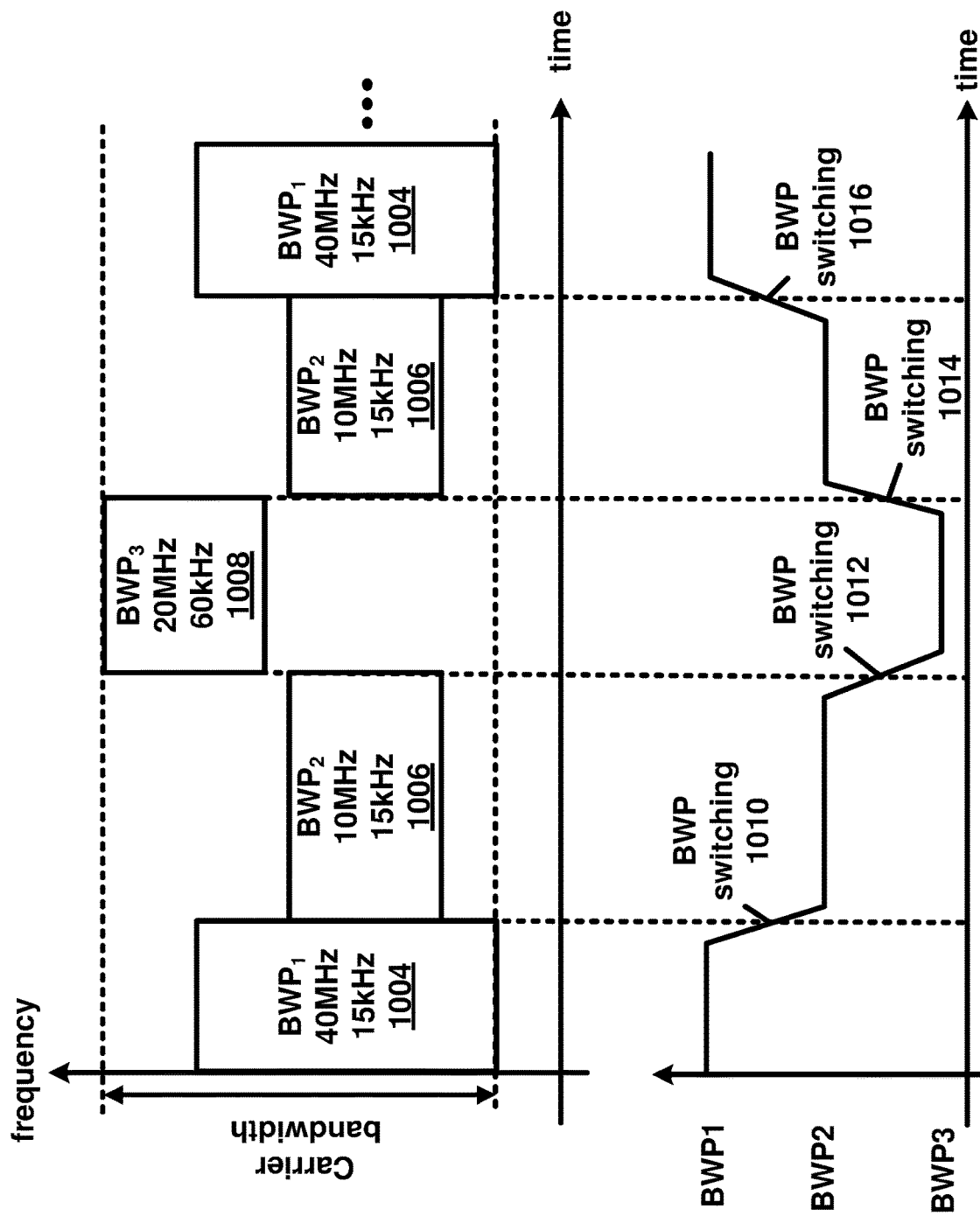
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
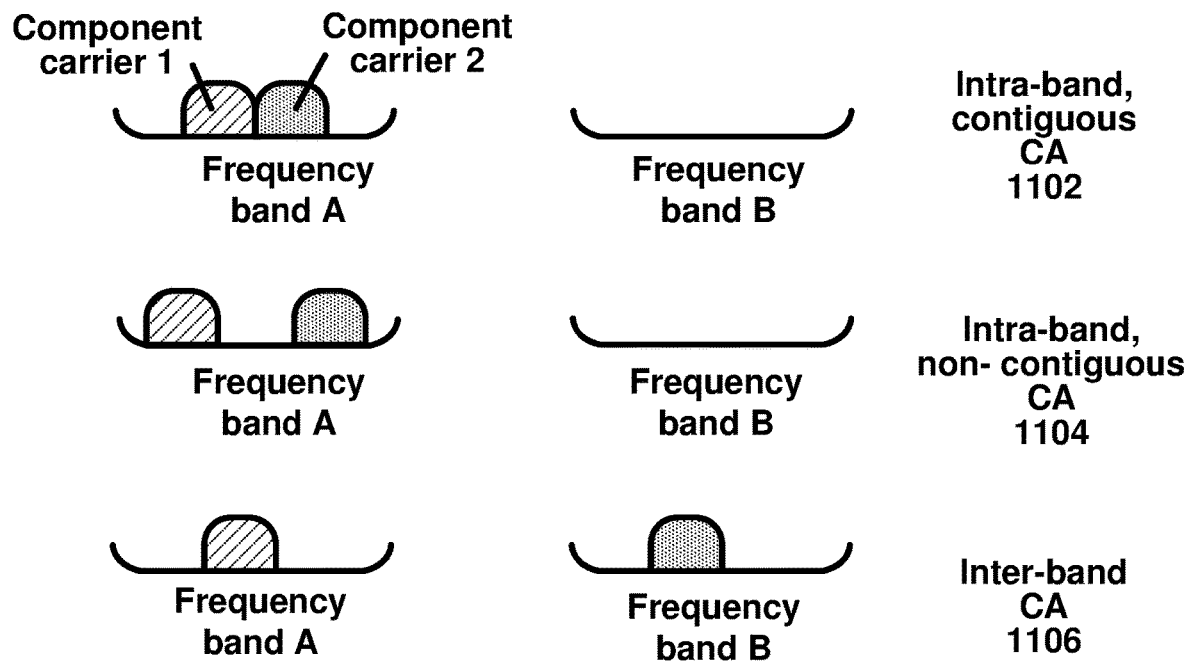
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
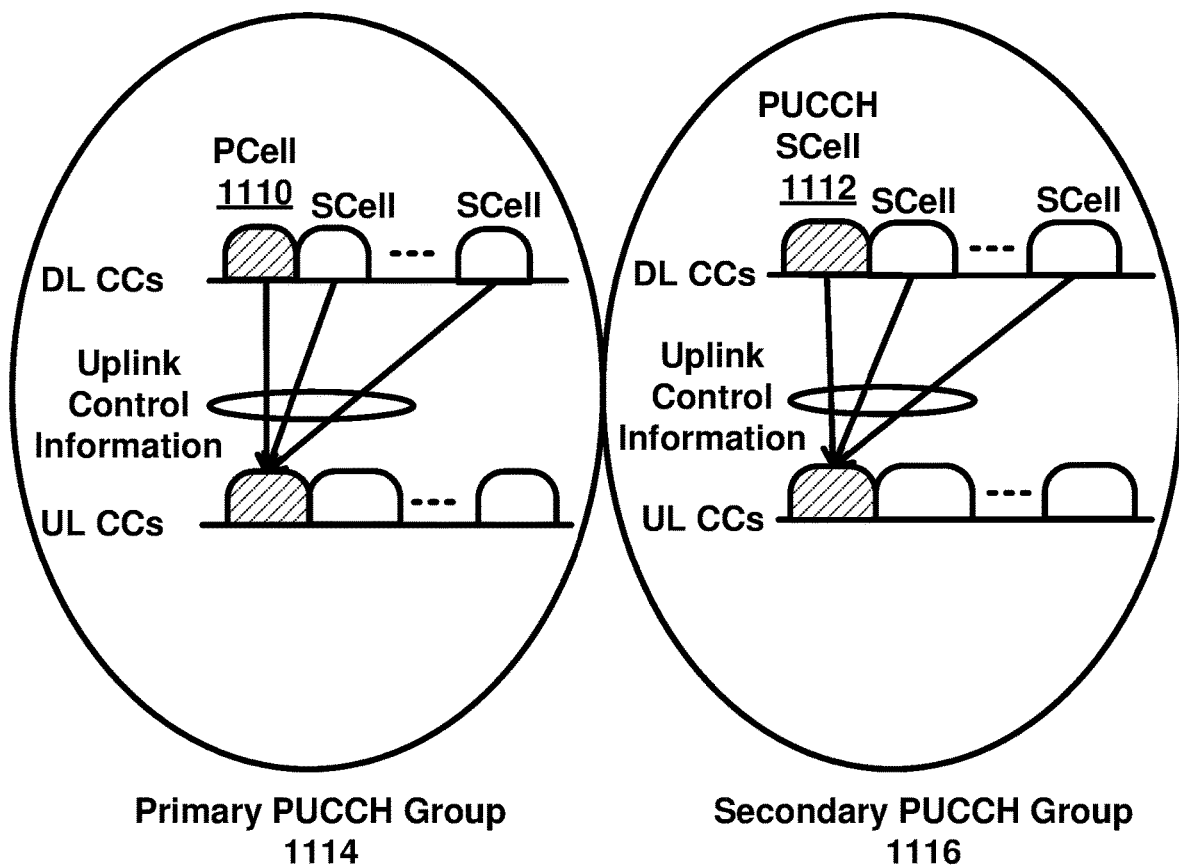
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
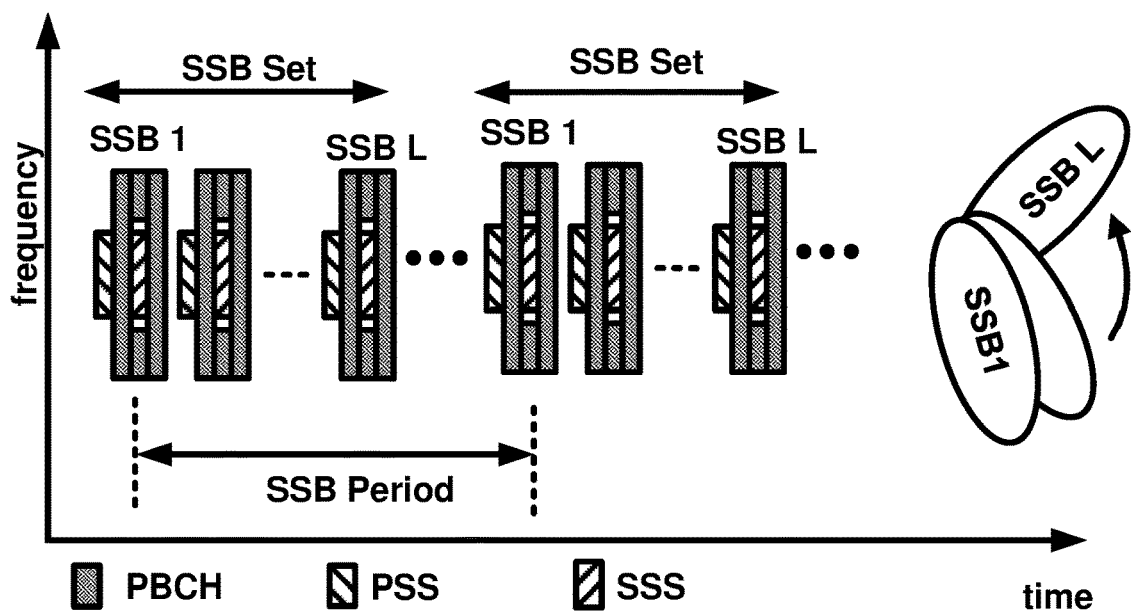
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
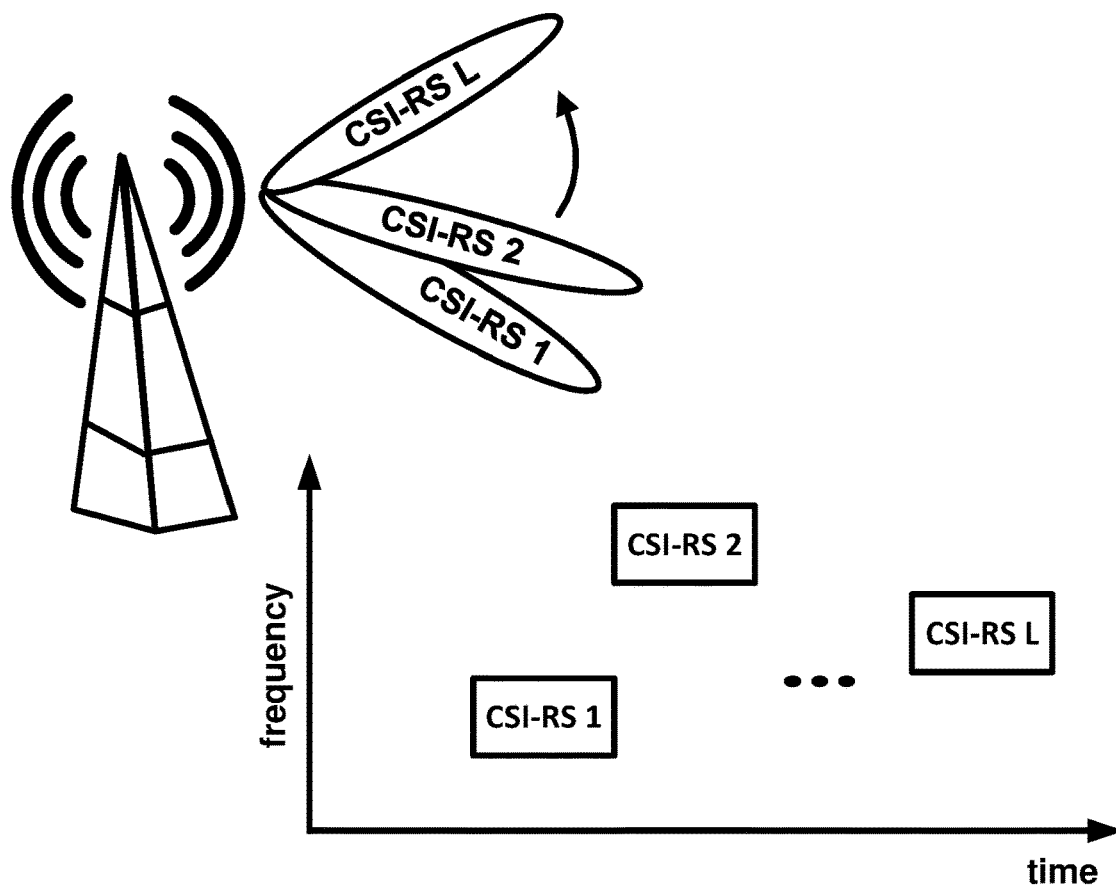
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
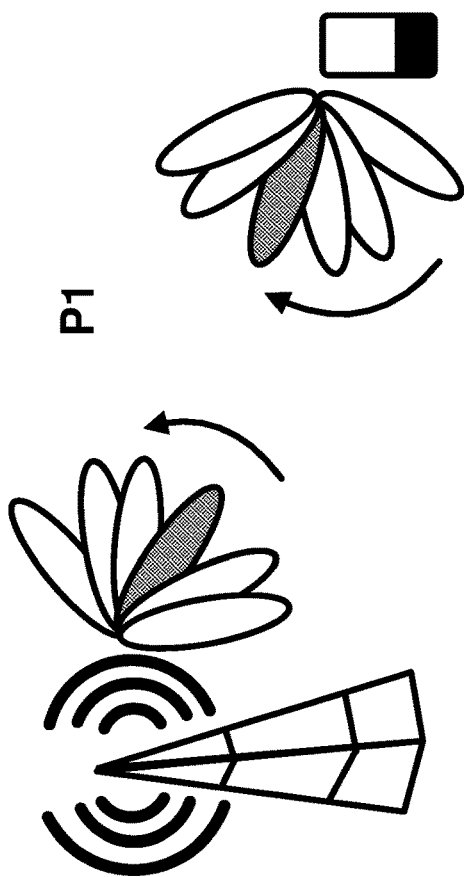
FIG. 14A, FIG. 14B and FIG. 14C show example beam management processes in accordance with several of various embodiments of the present disclosure.
Figure 14C:
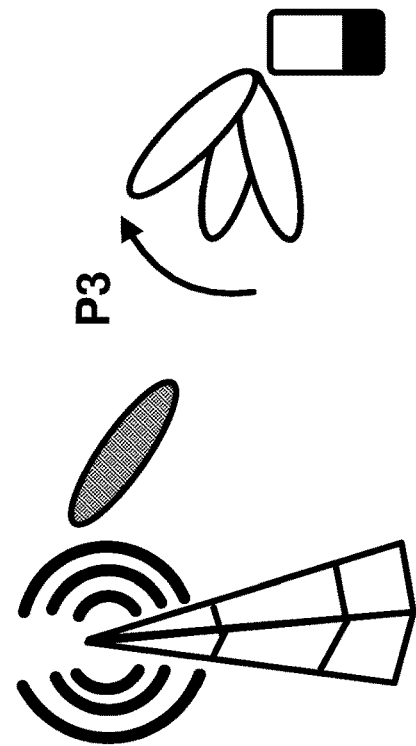
Figure 14B:
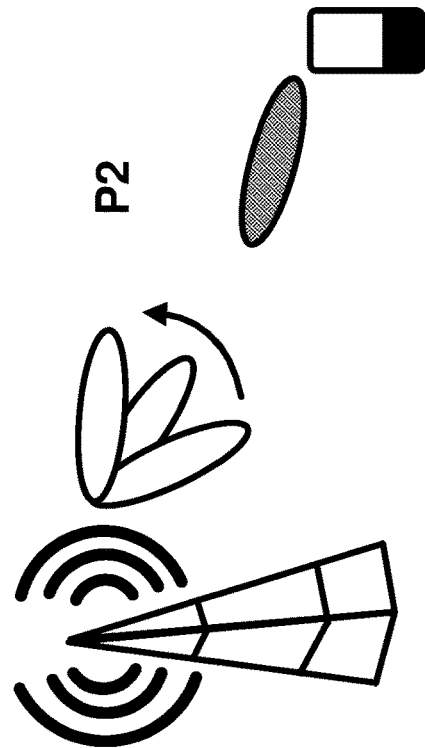

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
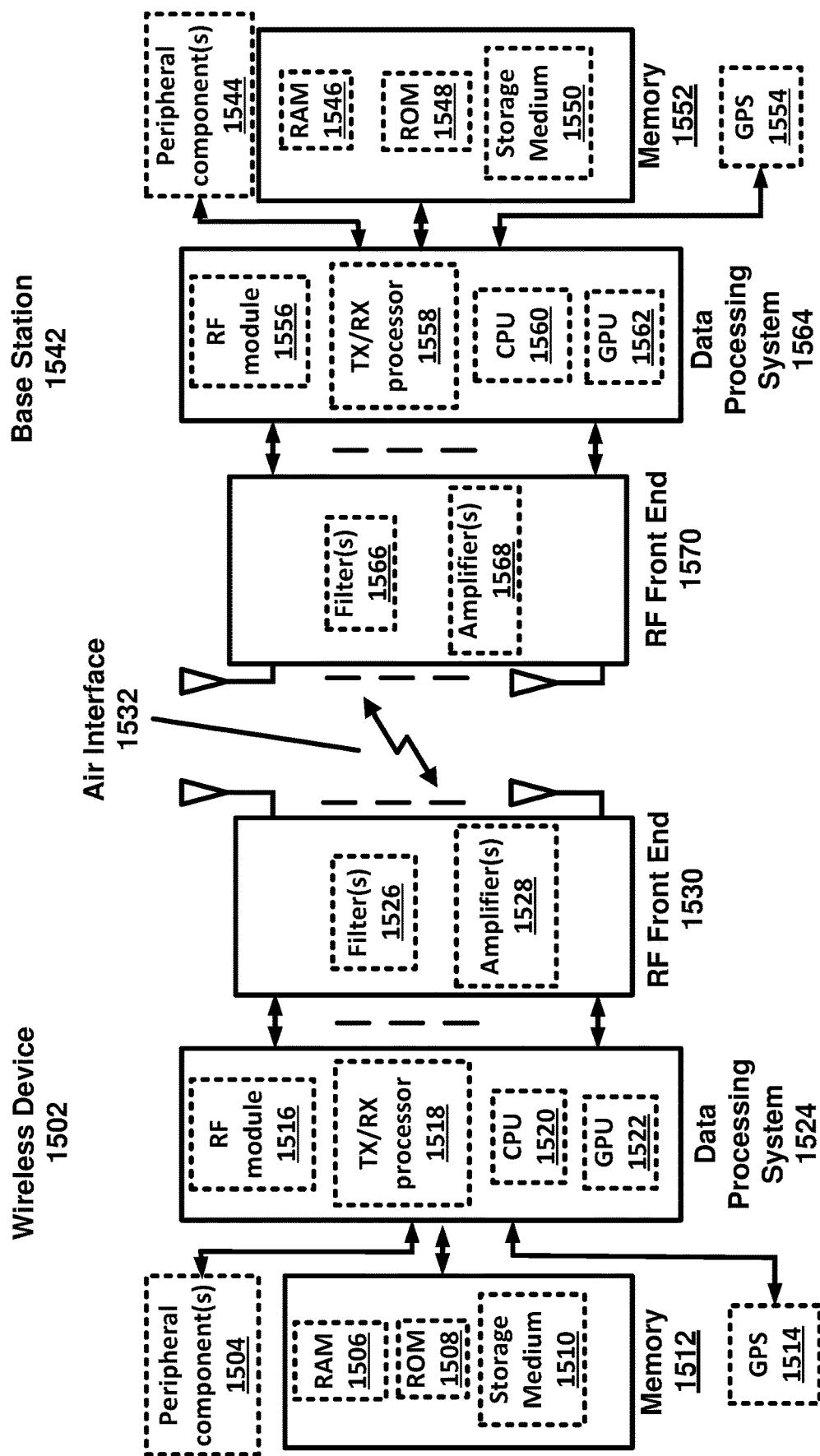
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier (s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a wireless device may be indicated to skip PDCCH monitoring. The wireless device may be indicated to skip PDCCH monitoring using physical layer signaling (e.g., using DCI transmitted via PDCCH) or using MAC layer signaling (e.g., using MAC CE). The wireless device may be indicated to skip PDCCH monitoring while remaining in DRX Active time. For example, a wireless device may be indicated to skip a number of PDCCH monitoring occasions while remaining in DRX Active time. For example, the wireless device may be indicated to skip monitoring PDCCH for a duration while remaining in DRX Active time.

In an example, DCI-based PDCCH monitoring skipping may operate on a short scale (e.g., shorter time scale than the L2 DRX).

In an example, for different traffic types, the fixed monitoring periodicity (e.g., as configured semi-statically by RRC signaling) may not be power efficient. The dynamic switching of the PDCCH monitoring periodicity through DCI may accommodate different traffic types.

In an example, DCI may indicate the PDCCH monitoring periodicity. In an example, different PDCCH monitoring periodicities may be configured by RRC and DCI may trigger which PDCCH monitoring periodicity to be used. In an example, PDCCH monitoring periodicity, duration and offset may be configured per search space by RRC signaling.

In an example, in carrier aggregation (CA) scenario, it may not be power efficient if SCell is always kept activated with fixed short PDCCH monitoring periodicity. The PDCCH monitoring periodicity may be dynamically changed based on the DCI indication from the PCell. The PDCCH monitoring in SCell may be switched to a short periodicity to make sure data is transmitted with low latency and when the arrival of data is less frequent, the PDCCH monitoring in SCell may be switched to long periodicity to save power (e.g., dormant BWP). The PDCCH monitoring periodicity in SCell may be dynamically switched based on DCI based signaling in PCell.

In an example, a duration for skipping PDCCH monitoring occasions, e.g., number of slots, may be indicated by the PDCCH monitoring skipping signaling. In an example, the PDCCH monitoring skipping signaling may comprise an indication of a carrier group, where UE skips PDCCH monitoring. In an example, RRC may configure a plurality of carrier groups and the PDCCH monitoring skipping signaling may indicate a first carrier group in the plurality of carrier groups.

In an example, the PDCCH monitoring skipping signaling may be based on a common (e.g., group-common) DCI.

In an example, configuration parameters of search space set s and/or CORESET p may be dynamically adapted. Example configuration parameters that may be adapted include: PDCCH monitoring periodicity ks, PDCCH candidates, duration Ts, activated CCE ALs, L, a number of consecutive symbols for CORESET p.

In an example, PDCCH-based control channel monitoring adaptation signaling may be used to trigger UE adaptation on the potential adaptive parameters.

In one example, a scaling factor α may be carried by control channel monitoring adaptation signaling to indicate dynamic scaling on adaptive parameter, such as PDCCH monitoring periodicity ks, number of PDCCH candidates, duration Ts. The scaling factor may be applied to all (or some parts) of the configured search space sets to minimize the signaling overhead.

In an example, a list of candidates for associated adaptive parameters may be preconfigured by higher layer, and the PDCCH based control channel monitoring adaptation signaling may indicate one of the pre-configured candidates.

In an example, even if UE has received a DCI-based indication for PDCCH skipping, the UE may keep monitoring the PDCCH while drx-RetransmissionTimerDL or drx-RetransmissionTimerUL or ra-ContentionResolutionTimer are running; a scheduling request is sent on PUCCH and is pending; a PDCCH indicating a new transmission addressed to the C-RNTI of the MAC entity has not been received after successful reception of a Random Access Response for the Random Access Preamble not selected by the MAC entity among the contention-based Random Access Preamble.

In an example, if the UE receives the DCI which indicates the UE to skip the PDCCH monitoring for some specified time period shorter than the remaining time of the running on duration timer or Inactivity timer, the UE may stop the drx-onDurationTimer and the drx-InactivityTimer and may restart the corresponding timers after the specified time period ends.

In an example, if the UE received the DCI-based indication for PDCCH skipping when the ra-ContentionResolutionTimer is running, the UE may keep the timer running and the PDCCH monitoring during the period indicated by the DCI.

In an example, if the UE received the DCI-based indication for PDCCH skipping after the UE has sent the SR and the SR is pending, the UE may keep the PDCCH monitoring during the period indicated by the DCI.

In an example, if the UE sends the SR and the SR is pending when the UE is applying the PDCCH skipping by following the DCI-based indication which was received before sending the SR, the UE may ignore the DCI-based indication and keep the PDCCH monitoring.

In an example, if the UE initiates the random access procedure when the UE is applying the PDCCH skipping by following the DCI-based indication which was received before initiating RA procedure, the UE may ignore the DCI-based indication and keep the PDCCH monitoring.

In an example, a MAC entity may be configured by RRC with a DRX functionality that may control the UE's PDCCH monitoring activity for one or more radio access network temporary identifiers (RNTIs), for example the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When in RRC_CONNECTED, if DRX is configured, for the activated Serving Cells, the MAC entity may monitor the PDCCH discontinuously using the DRX operation.

In an example, RRC may control DRX operation by configuring the following parameters: drx-onDurationTimer: the duration at the beginning of a DRX Cycle; drx-SlotOffset: the delay before starting the drx-onDurationTimer; drx-InactivityTimer: the duration after the PDCCH occasion in which a PDCCH indicates a new UL or DL transmission for the MAC entity; drx-RetransmissionTimerDL (per DL HARQ process except for the broadcast process): the maximum duration until a DL retransmission is received; drx-RetransmissionTimerUL (per UL HARQ process): the maximum duration until a grant for UL retransmission is received; drx-LongCycleStartOffset: the Long DRX cycle and drx-StartOffset which may define the subframe where the Long and Short DRX Cycle starts; drx-ShortCycle: the Short DRX cycle; drx-ShortCycleTimer: the duration the UE may follow the Short DRX cycle; drx-HARQ-RTT-TimerDL (per DL HARQ process except for the broadcast process): the minimum duration before a DL assignment for HARQ retransmission is expected by the MAC entity; drx-HARQ-RTT-TimerUL (per UL HARQ process): the minimum duration before a UL HARQ retransmission grant is expected by the MAC entity.

In an example, when a DRX cycle is configured, the Active Time may include the time while: drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In an example, when DRX is configured, if a MAC PDU is received in a configured downlink assignment: the MAC entity may start the drx-HARQ-RTT-TimerDL for the corresponding HARQ process in the first symbol after the end of the corresponding transmission carrying the DL HARQ feedback; the MAC entity may stop the drx-RetransmissionTimerDL for the corresponding HARQ process.

In an example, when DRX is configured, if a MAC PDU is transmitted in a configured uplink grant: the MAC entity may start the drx-HARQ-RTT-TimerUL for the corresponding HARQ process in the first symbol after the end of the first repetition of the corresponding PUSCH transmission; the MAC entity may stop the drx-RetransmissionTimerUL for the corresponding HARQ process.

In an example, when DRX is configured, if a drx-HARQ-RTT-TimerDL expires: if the data of the corresponding HARQ process was not successfully decoded: the MAC entity may start the drx-RetransmissionTimerDL for the corresponding HARQ process in the first symbol after the expiry of drx-HARQ-RTT-TimerDL.

In an example, when DRX is configured, if a drx-HARQ-RTT-TimerUL expires: the MAC entity may start the drx-RetransmissionTimerUL for the corresponding HARQ process in the first symbol after the expiry of drx-HARQ-RTT-TimerUL.

In an example, when DRX is configured, if a DRX Command MAC CE or a Long DRX Command MAC CE is received: the MAC entity may stop drx-onDurationTimer; and stop drx-InactivityTimer.

In an example, when DRX is configured, drx-Inactivity-Timer may expire or a DRX Command MAC CE may be received. If the Short DRX cycle is configured, the MAC entity may start or restart drx-ShortCycleTimer in the first symbol after the expiry of drx-InactivityTimer or in the first symbol after the end of DRX Command MAC CE reception; and the MAC entity may use the Short DRX Cycle. Otherwise, the MAC entity may use the Long DRX cycle.

In an example, when DRX is configured, if drx-ShortCycleTimer expires: the MAC entity may use the Long DRX cycle.

In an example, when DRX is configured, if a Long DRX Command MAC CE is received: the MAC entity may stop drx-ShortCycleTimer; and the MAC entity may use the Long DRX cycle.

In an example, when DRX is configured, if the Short DRX Cycle is used, and [(SFN×10)+subframe number] modulo (drx-ShortCycle)=(drx-StartOffset) modulo (drx-ShortCycle); or if the Long DRX Cycle is used, and [(SFN×10)+subframe number] modulo (drx-LongCycle)=drx-StartOffset: the MAC entity may start drx-onDurationTimer after drx-SlotOffset from the beginning of the subframe.

In an example, when DRX is configured, if the MAC entity is in Active Time: the MAC entity may monitor the PDCCH. If the PDCCH indicates a DL transmission: the MAC entity may start the drx-HARQ-RTT-TimerDL for the corresponding HARQ process in the first symbol after the end of the corresponding transmission carrying the DL HARQ feedback; the MAC entity may stop the drx-RetransmissionTimerDL for the corresponding HARQ process. If the PDCCH indicates a UL transmission: the MAC entity may start the drx-HARQ-RTT-TimerUL for the corresponding HARQ process in the first symbol after the end of the first repetition of the corresponding PUSCH transmission; the MAC entity may stop the drx-RetransmissionTimerUL for the corresponding HARQ process. If the PDCCH indicates a new transmission (DL or UL): the MAC entity may start or restart drx-InactivityTimer in the first symbol after the end of the PDCCH reception.

In an example, when DRX is configured, in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions: the MAC entity may not transmit periodic SRS and semi-persistent SRS; and the MAC entity may not report CSI on PUCCH and semi-persistent CSI on PUSCH.

In an example, when DRX is configured, if CSI masking (csi-Mask) is setup by upper layers: in current symbol n, if drx-onDurationTimer would not be running considering grants/assignments/DRX Command MAC CE/Long DRX Command MAC CE received until 4 ms prior to symbol n when evaluating all DRX Active Time conditions: the wireless device may not report CSI on PUCCH.

In an example, regardless of whether the MAC entity is monitoring PDCCH or not, the MAC entity may transmit HARQ feedback, aperiodic CSI on PUSCH, and aperiodic SRS when such is expected.

The MAC entity needs not to monitor the PDCCH if it is not a complete PDCCH occasion (e.g., the Active Time starts or ends in the middle of a PDCCH occasion).

In an example, an IE SearchSpace may define how/where to search for PDCCH candidates.

Each search space may be associated with one ControlResourceSet.

In an example, a parameter common may configure the search space as common search space (CSS) and may configure DCI formats to monitor.

In an example, a parameter controlResourceSetId may indicate the CORESET applicable for the SearchSpace. Value 0 may identify the common CORESET #0 configured in MIB and in ServingCellConfigCommon. Values 1 . . . maxNrofControlResourceSets-1 may identify CORESETs configured in System Information or by dedicated signaling. The CORESETs with non-zero controlResourceSetId may be configured in the same BWP as this SearchSpace.

In an example, if a parameter dci-Format0-0-AndFormat1-0 is configured, the wireless device may monitor the DCI formats 0_0 and 1_0.

In an example, if a parameter dci-Format2-0 is configured, the wireless device may monitor the DCI formats 2_0.

In an example, if a parameter dci-Format2-1 is configured, the wireless device may monitor the DCI formats 2_1.

In an example, if a parameter dci-Format2-2 is configured, the wireless device may monitor the DCI formats 2_2.

In an example, if a parameter dci-Format2-3 is configured, the wireless device may monitor the DCI formats 2_3.

In an example, a parameter dci-Formats indicates whether the UE monitors in this USS for DCI formats 0-0 and 1-0 or for formats 0-1 and 1-1.

In an example, a parameter duration may indicate a number of consecutive slots that a SearchSpace lasts in every occasion, i.e., upon every period as given in the periodicityAndOffset. If the field is absent, the UE may apply the value 1 slot, except for DCI format 2_0. The UE may ignore this field for DCI format 2_0. The maximum valid duration maybe periodicity-1 (periodicity as given in the monitoringSlotPeriodicityAndOffset).

In an example, a parameter monitoringSlotPeriodicityAndOffset may indicate slots for PDCCH Monitoring configured as periodicity and offset. If the UE is configured to monitor DCI format 2_1, the values 's11', 's12' or 's14' may be applicable. If the UE is configured to monitor DCI format 2_0, the values 's11', 's12', 's14', 's15', 's18', 's110', 's116', and 's120' may be applicable.

In an example, a parameter monitoringSymbolsWithinSlot may indicate the first symbol(s) for PDCCH monitoring in the slots configured for PDCCH monitoring (see monitoringSlotPeriodicityAndOffset and duration). The most significant (left) bit represents the first OFDM in a slot, and the second most significant (left) bit represents the second OFDM symbol in a slot and so on. The bit(s) set to one identify the first OFDM symbol(s) of the control resource set within a slot. If the cyclic prefix of the BWP is set to extended CP, the last two bits within the bit string shall be ignored by the UE.

For DCI format 2_0, the first one symbol applies if the duration of CORESET (in the IE ControlResourceSet) identified by controlResourceSetId indicates 3 symbols, the first two symbols apply if the duration of CORESET identified by controlResourceSetId indicates 2 symbols, and the first three symbols apply if the duration of CORESET identified by controlResourceSetId indicates 1 symbol.

In an example, a parameter nrofCandidates-SFI may indicate a number of PDCCH candidates for format 2-0 for the configured aggregation level. If an aggregation level is absent, the UE may not search for candidates with that aggregation level. The network may configure one aggregationLevel and the corresponding number of candidates.

In an example, a parameter nrofCandidates may indicate a number of PDCCH candidates per aggregation level. The number of candidates and aggregation levels configured here may apply to all formats unless a particular value is specified or a format-specific value is provided. If configured in the SearchSpace of a cross carrier scheduled cell, this field may determine the number of candidates and aggregation levels to be used on the linked scheduling cell.

In an example, a parameter searchSpaceId may indicate identity of the search space. SearchSpaceId=0 may identify the searchSpaceZero configured via PBCH (MIB) or ServingCellConfigCommon and may hence not be used in the SearchSpace IE. The searchSpaceId may be unique among the BWPs of a Serving Cell. In case of cross carrier scheduling, search spaces with the same searchSpaceId in scheduled cell and scheduling cell may be linked to each other. The UE may apply the search space for the scheduled cell only if the DL BWPs in which the linked search spaces are configured in scheduling cell and scheduled cell are both active.

In an example, a parameter searchSpaceType may indicate whether this is a common search space (present) or a UE specific search space as well as DCI formats to monitor for.

In an example, a parameter ue-Specific may configure a search space as UE specific search space (USS). The UE may monitor the DCI format with CRC scrambled by C-RNTI, CS-RNTI (if configured), and SP-CSI-RNTI (if configured).

In an example, an IE SearchSpaceId may be used to identify Search Spaces. The ID space may be used across the BWPs of a Serving Cell. The search space with the SearchSpaceId=0 may identify the search space configured via PBCH (MIB) and in ServingCellConfigCommon (searchSpaceZero). The number of Search Spaces per BWP may be limited to 10 including the common and UE specific Search Spaces.

In an example, the IE SearchSpaceZero may be used to configure SearchSpace #0 of the initial BWP.

In an example, for a DL BWP configured to a UE in a serving cell, the UE may be provided by higher layers with S≤M (e.g., M=10) search space sets where, for a search space set from the S search space sets, the UE may be provided the following by SearchSpace: a search space set index s, 0≤s<40, by searchSpaceId; an association between the search space set s and a CORESET p by controlResourceSetId; a PDCCH monitoring periodicity of $k_s$ slots and a PDCCH monitoring offset of $o_s$ slots, by monitoringSlotPeriodicityAndOffset; a PDCCH monitoring pattern within a slot, indicating first symbol(s) of the CORESET within a slot for PDCCH monitoring, by monitoringSymbolsWithinSlot; a duration of $T_s<k_s$ slots indicating a number of slots that the search space set s exists by duration; a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively; an indication that search space set s is either a CSS set or a USS set by searchSpaceType; if search space set s is a CSS set: an indication by dci-Format0-0-AndFormat1-0 to monitor PDCCH candidates for DCI format 0_0 and DCI format 1_0, an indication by dci-Format2-0 to monitor one or two PDCCH candidates for DCI format 2_0 and a corresponding CCE aggregation level, an indication by dci-Format2-1 to monitor PDCCH candidates for DCI format 2_1, an indication by dci-Format2-2 to monitor PDCCH candidates for DCI format 2_2, an indication by dci-Format2-3 to monitor PDCCH candidates for DCI format 2_3; if search space set s is a USS set: an indication by dci-Formats to monitor PDCCH candidates either for DCI format 0_0 and DCI format 1_0, or for DCI format 0_1 and DCI format 1_1.

In an example, an IE LogicalChannelConfig may be used to configure the logical channel parameters. A parameter allowedSCS-List if present, may indicate that UL MAC SDUs from this logical channel may be mapped to the indicated numerology. Otherwise, UL MAC SDUs from this logical channel may be mapped to any configured numerology. A parameter allowedServingCells, if present, may indicate that UL MAC SDUs from this logical channel may be mapped to the serving cells indicated in this list. Otherwise, UL MAC SDUs from this logical channel may be mapped to any configured serving cell of this cell group. In an example, a parameter bitRateQueryProhibitTimer may be used for bit rate recommendation query. A parameter bucketSizeDuration may indicate a bucket size duration for logical channel multiplexing. A parameter configuredGrantType1Allowed, if present, may indicate that UL MAC SDUs from this logical channel may be transmitted on a configured grant type 1. A parameter logicalChannelGroup may indicate ID of the logical channel group which the logical channel belongs to. In an example, a parameter logicalChannelSR-Mask may control SR triggering when a configured uplink grant of type1 or type2 is configured. true may indicate that SR masking is configured for this logical channel. In an example, a parameter logicalChannelSR-DelayTimerApplied may indicate whether to apply the delay timer for SR transmission for this logical channel. In an example, a parameter maxPUSCH-Duration, if present, may indicate that UL MAC SDUs from this logical channel may be transmitted using uplink grants that result in a PUSCH duration shorter than or equal to the duration indicated by this field. Otherwise, UL MAC SDUs from this logical channel may be transmitted using an uplink grant resulting in any PUSCH duration. In an example, a parameter priority may indicate a logical channel priority (e.g., for a logical channel multiplexing procedure). In an example, a parameter prioritisedBitRate may indicate a prioritized bit rate parameter for a logical channel multiplexing procedure. In an example, a parameter schedulingRequestId if present, may indicate the scheduling request configuration applicable for this logical channel.

In an example, an IE LogicalChannelIdentity may be used to identify one logical channel (LogicalChannelConfig) and the corresponding RLC bearer (RLC-BearerConfig).

In an example, a Buffer Status reporting (BSR) procedure may be used to provide the serving gNB with information about UL data volume in the MAC entity. The RRC may configure the following parameters to control the BSR: periodicBSR-Timer; retxBSR-Timer; logicalChannelSR-DelayTimerApplied; logicalChannelSR-DelayTimer; logicalChannelSR-Mask; logicalChannelGroup.

In an example, a logical channel may be allocated to an LCG using the logicalChannelGroup. The maximum number of LCGs may be eight.

In an example, a MAC entity may determine the amount of UL data available for a logical channel according to a data volume calculation procedure.

In an example, a BSR may be triggered if any of the following events occur: UL data, for a logical channel which belongs to an LCG, becomes available to the MAC entity, and either this UL data belongs to a logical channel with higher priority than the priority of any logical channel containing available UL data which belong to any LCG or none of the logical channels which belong to an LCG contains any available UL data, in which case the BSR may be referred below to as 'Regular BSR'; UL resources are allocated and number of padding bits is equal to or larger than the size of the Buffer Status Report MAC CE plus its subheader, in which case the BSR may be referred below to as 'Padding BSR'; retxBSR-Timer expires, and at least one of the logical channels which belong to an LCG contains UL data, in which case the BSR may referred below to as 'Regular BSR'; periodicBSR-Timer expires, in which case the BSR may be referred below to as 'Periodic BSR'.

In an example, when Regular BSR triggering events occur for multiple logical channels simultaneously, each logical channel may trigger one separate Regular BSR.

In an example, for Regular BSR, if the BSR is triggered for a logical channel for which logicalChannelSR-DelayTimerApplied with value true is configured by upper layers, the MAC entity may start or restart the logicalChannelSR-DelayTimer. Otherwise, the MAC entity may stop the logicalChannelSR-DelayTimer if running.

In an example, for Regular and Periodic BSR, if more than one LCG has data available for transmission when the MAC PDU containing the BSR is to be built, the MAC entity may report Long BSR for all LCGs which have data available for transmission. Otherwise, the MAC entity may report Short BSR.

In an example, the number of padding bits may be equal to or larger than the size of the Short BSR plus its subheader but smaller than the size of the Long BSR plus its subheader. In an example, more than one LCG may have data available for transmission when the BSR is to be built. For padding BSR, if the number of padding bits is equal to the size of the Short BSR plus its subheader, the MAC entity may report Short Truncated BSR of the LCG with the highest priority logical channel with data available for transmission. Otherwise, the MAC entity may report Long Truncated BSR of the LCG(s) with the logical channels having data available for transmission following a decreasing order of the highest priority logical channel (with or without data available for transmission) in each of these LCG(s), and in case of equal priority, in increasing order of LCGID.

In an example, for padding BSR, the number of padding bits may be equal to or larger than the size of the Short BSR plus its subheader but smaller than the size of the Long BSR plus its subheader. In an example, one LCG may have data available for transmission when the BSR is to be built.

In an example, if the number of padding bits is equal to or larger than the size of the Long BSR plus its subheader, the MAC entity may report Long BSR for LCGs which have data available for transmission.

In an example, for BSR triggered by retxBSR-Timer expiry, the MAC entity may consider that the logical channel that triggered the BSR is the highest priority logical channel that has data available for transmission at the time the BSR is triggered.

In an example, the Buffer Status reporting procedure may determine that at least one BSR has been triggered and not cancelled. The UL-SCH resources may be available for a new transmission and the UL-SCH resources may accommodate the BSR MAC CE plus its subheader as a result of logical channel prioritization. The MAC entity may instruct the Multiplexing and Assembly procedure to generate the BSR MAC CE(s). The MAC entity may start or restart periodicBSR-Timer except when the generated BSRs are long or short Truncated BSRs. The MAC entity may start or restart retxBSR-Timer.

In an example, the Buffer Status reporting procedure may determine that at least one BSR has been triggered and not cancelled. A Regular BSR may have been triggered and logicalChannelSR-DelayTimer may not be running. If there is no UL-SCH resource available for a new transmission; or if the MAC entity is configured with configured uplink grant(s) and the Regular BSR was triggered for a logical channel for which logicalChannelSR-Mask is set to false; or if the UL-SCH resources available for a new transmission do not meet the LCP mapping restrictions configured for the logical channel that triggered the BSR: the MAC entity may trigger a Scheduling Request.

In an example, UL-SCH resources may be considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

In an example, a MAC PDU may contain at most one BSR MAC CE, even when multiple events have triggered a BSR. The Regular BSR and the Periodic BSR may have precedence over the padding BSR.

In an example, the MAC entity may restart retxBSR-Timer upon reception of a grant for transmission of new data on any UL-SCH.

In an example, triggered BSRs may be cancelled when the UL grant(s) may accommodate pending data available for transmission but is not sufficient to additionally accommodate the BSR MAC CE plus its subheader. The BSRs triggered prior to MAC PDU assembly may be cancelled when a MAC PDU is transmitted and this PDU includes a Long or Short BSR MAC CE which contains buffer status up to (and including) the last event that triggered a BSR prior to the MAC PDU assembly.

In an example, MAC PDU assembly may happen at any point in time between uplink grant reception and actual transmission of the corresponding MAC PDU. BSR and SR may be triggered after the assembly of a MAC PDU which contains a BSR MAC CE, but before the transmission of this MAC PDU. The BSR and SR may be triggered during MAC PDU assembly.

In an example, the Scheduling Request (SR) may be used for requesting UL-SCH resources for new transmission. The MAC entity may be configured with zero, one, or more SR configurations. An SR configuration may comprise a set of PUCCH resources for SR across different BWPs and cells. For a logical channel, at most one PUCCH resource for SR may be configured per BWP.

In an example, an SR configuration may correspond to one or more logical channels. A logical channel may be mapped to zero or one SR configuration, which may be configured by RRC. The SR configuration of the logical channel that triggered the BSR (if such a configuration exists) may be considered as corresponding SR configuration for the triggered SR.

In an example, RRC may configure the following parameters for the scheduling request procedure: sr-ProhibitTimer (per SR configuration); sr-TransMax (per SR configuration).

In an example, the following UE variables may be used for the scheduling request procedure: SR_COUNTER (per SR configuration).

In an example, if an SR is triggered and there are no other SRs pending corresponding to the same SR configuration, the MAC entity may set the SR_COUNTER of the corresponding SR configuration to 0.

In an example, when an SR is triggered, it may be considered as pending until it is cancelled. The pending SR(s) triggered prior to the MAC PDU assembly may be cancelled and each respective sr-ProhibitTimer may be stopped when the MAC PDU is transmitted and this PDU may include a Long or Short BSR MAC CE which may contain buffer status up to (and including) the last event that triggered a BSR prior to the MAC PDU assembly. The pending SR(s) may be cancelled and each respective sr-ProhibitTimer may be stopped when the UL grant(s) may accommodate pending data available for transmission.

In an example, PUCCH resources on a BWP which is active at the time of SR transmission occasion may be considered valid.

In an example, as long as at least one SR is pending, for each pending SR, if the MAC entity has no valid PUCCH resource configured for the pending SR, the MAC entity may initiate a Random Access procedure on the SpCell and cancel the pending SR.

In an example, as long as at least one SR is pending, for each pending SR, if the MAC entity has valid PUCCH resource configured for the pending SR, for the SR configuration corresponding to the pending SR: when the MAC entity has an SR transmission occasion on the valid PUCCH resource for SR configured; and if sr-ProhibitTimer is not running at the time of the SR transmission occasion; and if the PUCCH resource for the SR transmission occasion does not overlap with a measurement gap; and if the PUCCH resource for the SR transmission occasion does not overlap with a UL-SCH resource: if SR_COUNTER<sr-TransMax: the MAC entity may increment SR_COUNTER by 1; instruct the physical layer to signal the SR on one valid PUCCH resource for SR; start the sr-ProhibitTimer.

In an example, as long as at least one SR is pending, for each pending SR, if the MAC entity has valid PUCCH resource configured for the pending SR, for the SR configuration corresponding to the pending SR: when the MAC entity has an SR transmission occasion on the valid PUCCH resource for SR configured; and if sr-ProhibitTimer is not running at the time of the SR transmission occasion; and if the PUCCH resource for the SR transmission occasion does not overlap with a measurement gap; and if the PUCCH resource for the SR transmission occasion does not overlap with a UL-SCH resource: if SR_COUNTER is not smaller than sr-TransMax: the MAC entity may notify RRC to release PUCCH for Serving Cells; notify RRC to release SRS for Serving Cells; clear configured downlink assignments and uplink grants; clear PUSCH resources for semi-persistent CSI reporting; initiate a Random Access procedure on the SpCell and cancel pending SRs.

In an example, the selection of which valid PUCCH resource for SR to signal SR on when the MAC entity has more than one overlapping valid PUCCH resource for the SR transmission occasion may be based on UE implementation.

In an example, if more than one individual SR triggers an instruction from the MAC entity to the PHY layer to signal the SR on the same valid PUCCH resource, the SR_COUNTER for the relevant SR configuration may be incremented once.

In an example, the MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU may include a BSR MAC CE which may contain buffer status up to (and including) the last event that triggered a BSR prior to the MAC PDU assembly, or when the UL grant(s) can accommodate pending data available for transmission.

In an example, an IE RACH-ConfigCommon may be used to specify the cell specific random-access parameters. A parameter messagePowerOffsetGroupB may indicate a threshold for preamble selection. A parameter msg1-SubcarrierSpacing may indicate subcarrier spacing of PRACH. A parameter msg3-transformPrecoder may enable the transform precoder for Msg3 transmission. A parameter numberOfRA-PreamblesGroupA may indicate the number of CB preambles per SSB in group A. This may determine implicitly the number of CB preambles per SSB available in group B. A parameter prach-RootSequenceIndex may indicate PRACH root sequence index. In an example, a parameter ra-ContentionResolutionTimer may indicate the initial value for the contention resolution timer. A parameter ra-Msg3SizeGroupA may indicate transport blocks size threshold in bits below which the UE may use a contention-based RA preamble of group A. A parameter rach-ConfigGeneric may indicate RACH parameters for regular random access and beam failure recovery. A parameter restrictedSetConfig may indicate configuration of an unrestricted set or one of two types of restricted sets. A parameter rsrp-ThresholdSSB may indicate that UE may select the SS block and corresponding PRACH resource for path-loss estimation and (re)transmission based on SS blocks that satisfy the threshold. A parameter rsrp-ThresholdSSB-SUL may indicate that the UE may select SUL carrier to perform random access based on this threshold. A parameter totalNumberOfRA-Preambles may indicate total number of preambles used for contention based and contention free random access in the RACH resources defined in RACH-ConfigCommon, excluding preambles used for other purposes (e.g., for SI request). If the field is absent, all 64 preambles may be available for RA.

In an example, an IE RACH-ConfigDedicated may be used to specify the dedicated random access parameters. A parameter csi-RS may indicate an ID of a CSI-RS resource defined in the measurement object associated with this serving cell. A parameter ra-OccasionList may indicate RA occasions that the UE may use when performing CF-RA upon selecting the candidate beam identified by this CSI-RS. The network may ensure that the RA occasion indexes provided herein may also be configured by prach-ConfigurationIndex and msg1-FDM. A RACH occasion may be sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots. A parameter ra-PreambleIndex may indicate the RA preamble index to use in the RA occasions associated with this CSI-RS. A parameter occasions may indicate RA occasions for contention free random access. If the field is absent, the UE may use the RA occasions configured in RACH-ConfigCommon in the first active UL BWP. A parameter ra-ssb-OccasionMaskIndex may indicate explicitly signalled PRACH Mask Index for RA Resource selection. The mask may be valid for SSB resources signalled in ssb-ResourceList. A parameter ssb-perRACH-Occasion may indicate a number of SSBs per RACH occasion. A parameter totalNumberOfRA-Preambles may indicate a total number of preambles used for contention free random access in the RACH resources defined in CFRA, excluding preambles used for other purposes (e.g., for SI request). If the field is absent but the field occasions is present, the UE may assume the 64 preambles are for RA. The setting may be consistent with the setting of ssb-perRACH-Occasion, if present, e.g., it may be a multiple of the number of SSBs per RACH occasion. A parameter ra-PreambleIndex may indicate the preamble index that the UE may use when performing CF-RA upon selecting the candidate beams identified by this SSB. A parameter ssb may indicate the ID of an SSB transmitted by the serving cell.

In an example, the IE RACH-ConfigGeneric may be used to specify the random-access parameters for regular random access as well as for beam failure recovery. A parameter msg1-FDM may indicate a number of PRACH transmission occasions FDMed in one time instance. A parameter msg1-FrequencyStart may indicate an offset of lowest PRACH transmission occasion in frequency domain with respective to PRB 0. The value may be configured so that the corresponding RACH resource is within the bandwidth of the UL BWP. A parameter powerRampingStep may indicate power ramping steps for PRACH. A parameter prach-ConfigurationIndex may indicate PRACH configuration index. For prach-ConfigurationIndex configured under beamFailureRecovery-Config, the prach-ConfigurationIndex may correspond to the short preamble format. A parameter preambleReceivedTargetPower may indicate target power level at the network receiver side. A parameter preambleTransMax may indicate max number of RA preamble transmission performed before declaring a failure. A parameter ra-ResponseWindow may indicate Msg2 (RAR) window length in number of slots.

In an example, an IE RA-Prioritization may be used to configure prioritized random access. In an example, a parameter powerRampingStepHighPrioritiy may indicate power ramping step applied for prioritized random access procedure. A parameter scalingFactorBI may indicate scaling factor for the backoff indicator (BI) for the prioritized random access procedure.

In an example, a MAC entity of a wireless device may be configured by RRC with a beam failure recovery (BFR) procedure and with parameters for a beam failure recovery procedure. The beam failure recovery procedure may be used for indicating to a serving base station of a new SSB or CSI-RS based on beam failure being detected on the serving SSB(s)/CSI-RS(s). Beam failure may be detected by counting beam failure instance indications from the lower layers to the MAC entity.

In an example, if IE beamFailureRecoveryConfig is reconfigured by upper layers during an ongoing Random Access procedure for beam failure recovery, the MAC entity may stop the ongoing Random Access procedure and may initiate a Random Access procedure using the new configuration.

In an example, the following RRC configuration parameters may be received in one or more IEs such as BeamFailureRecoveryConfig and the RadioLinkMonitoringConfig for the Beam Failure Detection and Recovery procedure: beamFailureInstanceMaxCount for the beam failure detection; beamFailureDetectionTimer for the beam failure detection; beamFailureRecoveryTimer for the beam failure recovery procedure; rsrp-ThresholdSSB: an RSRP threshold for the beam failure recovery; powerRampingStep: powerRampingStep for the beam failure recovery; powerRampingStepHighPriority: powerRampingStepHighPriority for the beam failure recovery; preambleReceivedTargetPower: preambleReceivedTargetPower for the beam failure recovery; preambleTransMax: preambleTransMax for the beam failure recovery; scalingFactorBI: scalingFactorBI for the beam failure recovery; ssb-perRACH-Occasion: ssb-perRACH-Occasion for the beam failure recovery; ra-ResponseWindow: the time window to monitor response(s) for the beam failure recovery using contention-free Random Access Preamble; prach-ConfigurationIndex: prach-ConfigurationIndex for the beam failure recovery; ra-ssb-OccasionMaskIndex: ra-ssb-OccasionMaskIndex for the beam failure recovery; ra-OccasionList: ra-OccasionList for the beam failure recovery. In an example, the UE variable BFI_COUNTER may indicate a counter for beam failure instance indication which may be initially set to 0.

In an example, beam failure instance indication may be received from lower layers. The MAC entity may start or restart the beamFailureDetectionTimer based on the receiving the beam failure instance indication. The MAC entity may increment BFI_COUNTER by 1 based on the receiving the beam failure instance indication. The MAC entity may initiate a Random Access procedure on the SpCell if BFI_COUNTER>=beamFailureInstanceMaxCount.

In an example, if the beamFailureDetectionTimer expires, the MAC entity may set BFI_COUNTER to 0. In an example, if beamFailureDetectionTimer, beamFailureInstanceMaxCount, or the reference signals used for beam failure detection is reconfigured by upper layers, the MAC entity may set BFI_COUNTER to 0.

In an example, if the Random Access procedure for beam failure recovery is successfully completed: the MAC entity may set BFI_COUNTER to 0; the MAC entity may stop the beamFailureRecoveryTimer, if configured; and the MAC entity may consider the Beam Failure Recovery procedure successfully completed.

In an example, an IE BeamFailureRecoveryConfig may be used to configure a wireless device with RACH resources and candidate beams for beam failure recovery in case of beam failure detection. In an example, a beamFailureRecoveryTimer parameter may indicate a timer for beam failure recovery timer. In an example, upon expiration of the timer the wireless may not use CFRA for BFR. The value of beamFailureRecoveryTimer may be in ms. For example, value ms10 may correspond to 10 ms, value ms20 may correspond to 20 ms, and so on. In an example, candidateBeamRSList may indicate a list of reference signals (e.g., CSI-RS and/or SSB) identifying the candidate beams for recovery and the associated RA parameters. In an example, the network may configure these reference signals to be within the linked DL BWP (e.g., within the DL BWP with the same bwp-Id) of the UL BWP in which the BeamFailureRecoveryConfig may be provided. In an example, a msg1-SubcarrierSpacing parameter may indicate subcarrier spacing for contention free beam failure recovery. Example values may include 15 kHz or 30 kHz (e.g., FR1), and 60 kHz or 120 kHz (e.g., FR2).

In an example, a rsrp-ThresholdSSB parameter may indicate L1-RSRP threshold used for determining whether a candidate beam may be used by the wireless device to attempt contention free random access to recover from beam failure. In an example, ra-prioritization may indicate parameters which may apply for prioritized random access procedure for BFR. In an example, a ra-ssb-OccasionMaskIndex parameter may indicate explicitly signalled PRACH Mask Index for RA Resource selection. The mask may be valid for SSB resources. In an example, a rach-ConfigBFR parameter may indicate configuration of contention free random access occasions for BFR. In an example, a recoverySearchSpaceId parameter may indicate search space to use for BFR RAR. The network may configure this search space to be within the linked DL BWP (e.g., within the DL BWP with the same bwp-Id) of the UL BWP in which the BeamFailureRecoveryConfig is provided. In an example, the CORESET associated with the recovery search space may not be associated with another search space. Network may configure the wireless device with a value for this field when contention free random access resources for BFR are configured.

In an example, the IE RadioLinkMonitoringConfig may be used to configure radio link monitoring for detection of beam- and/or cell radio link failure. In an example, a beamFailureDetectionTimer parameter may indicate a timer for beam failure detection. The value of timer may be in number of "$Q_{out,LR}$ reporting periods of Beam Failure Detection" Reference Signal. Value pbfd1 may correspond to 1 $Q_{out,LR}$ reporting period of Beam Failure Detection Reference Signal, value pbfd2 may correspond to 2 $Q_{out,LR}$ reporting periods of Beam Failure Detection Reference Signal and so on. In an example, a beamFailureInstanceMaxCount parameter may determine after how many beam failure events the wireless device may trigger beam failure recovery. Value n1 may correspond to 1 beam failure instance, value n2 may correspond to 2 beam failure instances and so on. In an example, a failureDetectionResourcesToAddModList parameter may indicate a list of reference signals for detecting beam failure and/or cell level radio link failure (RLF). In an example, the network may configure at most two detectionResources per BWP for the purpose beamFailure or both. If no RSs are provided for the purpose of beam failure detection, the wireless device may perform beam monitoring based on the activated TCI-State for PDCCH. If no RSs are provided in this list for the purpose of RLF detection, the wireless device may perform Cell-RLM based on the activated TCI-State of PDCCH. The network may ensure that the wireless device has a suitable set of reference signals for performing cell-RLM.

In an example, SCell beam failure detection may be per cell. In an example, DL BWPs of a SCell may be configured with independent SCell BFR configurations. In an example, a SR ID may be configured for BFR within a same cell group (e.g., a PUCCH group). In an example, a SCell BFRQ MAC CE may trigger a SCell BFRQ SR if there is no valid uplink grant which can accommodate the SCell BFRQ MAC CE. In an example, the transmission of the SCell BFRQ MAC CE may cancel a pending BFRQ SR of the failed SCell(s). In an example, when based on the number of the BFRQ SR transmission reaching the sr-TransMax, the wireless device may trigger a RACH procedure.

In an example, beamFailureDetectionTimer and beamFailureInstanceMaxCount may be configured cell specifically per DL BWP configured. In an example, based on reconfiguration of beamFailureDetectionTimer, beamFailureInstanceMaxCount, or any of the reference signals used for beam failure detection by upper layers, BFI_COUNTER may be set to 0 for the given Serving Cell. In an example, when SCell BFR SR resource is not configured and SCell BFR MAC CE transmission triggers SCell BFR SR, Random Access procedure on SpCell may be triggered to request UL resources to transmit the SCell BFR MAC CE.

In an example, when SCell BFR SR is triggered and the wireless device has an overlapping SR PUCCH resource with the SCell BFR SR PUCCH resource, the wireless device may all select the SCell BFR SR PUCCH resource for transmission. In an example, a pending SR for SCell beam failure recovery triggered prior to the MAC PDU assembly may be cancelled when the MAC PDU is transmitted and this PDU includes a SCell BFR MAC CE. In an example, SCell BFR MAC CE may carry information of multiple failed SCells, e.g., a multiple entry format for SCell BFR MAC CE may be used.

In an example, for a SCell, the SCell BFR MAC CE may indicate the following information: information about the failed SCell index, indication if new candidate beam RS is detected or not, and new candidate beam RS index (if available). In an example, SCell BFR MAC CE may have higher priority than data from logical channels except UL-CCCH and/or LBT failure indication MAC CE.

In an example, Semi-Persistent Scheduling (SPS) may be configured by RRC per Serving Cell and per BWP. Activation and deactivation of the DL SPS may be independent among the Serving Cells.

In an example, for the DL SPS, a DL assignment may be provided by PDCCH, and stored or cleared based on L1 signaling indicating SPS activation or deactivation.

In an example, RRC may configure the following parameters when SPS is configured: cs-RNTI: CS-RNTI for activation, deactivation, and retransmission; nrofHARQ-Processes: the number of configured HARQ processes for SPS; periodicity: periodicity of configured downlink assignment for SPS.

In an example, when SPS is released by upper layers, the corresponding configurations may be released.

In an example, after a downlink assignment is configured for SPS, the MAC entity may consider sequentially that the Nth downlink assignment occurs in the slot for which:

$$(\text{numberOfSlotsPerFrame} \times \text{SFN} + \text{slot number in the frame}) = [(\text{numberOfSlotsPerFrame} \times \text{SFNstart time} + \text{slotstart time}) + N \times \text{periodicity} \times \text{numberOfSlotsPerFrame}/10] \, \text{modulo} \, (1024 \times \text{numberOfSlotsPerFrame})$$

where SFNstart time and slotstart time may be the SFN and slot, respectively, of the first transmission of PDSCH where the configured downlink assignment was (re-)initialized.

In an example, there may be two types of transmission without dynamic grant: configured grant Type 1 where an uplink grant may be provided by RRC and stored as configured uplink grant; configured grant Type 2 where an uplink grant may be provided by PDCCH and stored or cleared as configured uplink grant based on L1 signaling indicating configured uplink grant activation or deactivation.

In an example, Type 1 and Type 2 may be configured by RRC per Serving Cell and per BWP. Multiple configurations may be active simultaneously (e.g., on different Serving Cells). For Type 2, activation and deactivation may be independent among the Serving Cells. For the same Serving Cell, the MAC entity may be configured with either Type 1 or Type 2.

In an example, RRC may configure the following parameters when the configured grant Type 1 is configured: cs-RNTI: CS-RNTI for retransmission; periodicity: periodicity of the configured grant Type 1; timeDomainOffset: Offset of a resource with respect to SFN=0 in time domain; timeDomainAllocation: Allocation of configured uplink grant in time domain which may contain startSymbolAnd- Length (e.g., SLIV); nrofHARQ-Processes: the number of HARQ processes for configured grant.

In an example, RRC may configure the following parameters when the configured grant Type 2 is configured: cs-RNTI: CS-RNTI for activation, deactivation, and retransmission; periodicity: periodicity of the configured grant Type 2; nrofHARQ-Processes: the number of HARQ processes for configured grant.

In an example, upon configuration of a configured grant Type 1 for a Serving Cell by upper layers, the MAC entity may: store the uplink grant provided by upper layers as a configured uplink grant for the indicated Serving Cell; initialize or re-initialize the configured uplink grant to start in the symbol according to timeDomainOffset and S (derived from SLIV), and to reoccur with periodicity.

In an example, after an uplink grant is configured for a configured grant Type 1, the MAC entity may consider that the uplink grant recurs associated with each symbol for which:

[(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity)modulo(1024×numberOfSlotsPerFrame×numberOfSymbolsPerSlot), for all N>=0.

In an example, after an uplink grant is configured for a configured grant Type 2, the MAC entity may consider that the uplink grant recurs associated with each symbol for which:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity]modulo(1024×numberOfSlotsPerFrame×numberOfSymbolsPerSlot), for all N>=0.

where SFNstart time, slotstart time, and symbolstart time may be the SFN, slot, and symbol, respectively, of the first transmission opportunity of PUSCH where the configured uplink grant was (re-)initialized.

In an example, when a configured uplink grant is released by upper layers, the corresponding configurations may be released, and corresponding uplink grants may be cleared.

In an example, if the configured uplink grant confirmation has been triggered and not cancelled; and if the MAC entity has UL resources allocated for new transmission: the MAC entity may instruct the Multiplexing and Assembly procedure to generate a Configured Grant Confirmation MAC CE and may cancel the triggered configured uplink grant confirmation.

In an example, for a configured grant Type 2, the MAC entity may clear the configured uplink grant immediately after first transmission of Configured Grant Confirmation MAC CE triggered by the configured uplink grant deactivation.

In an example, retransmissions except for repetition of configured uplink grants may use uplink grants addressed to CS-RNTI.

In an example, if a wireless device receives an uplink grant for MAC entity's C-RNTI, and the identified HARQ process is configured for a configured uplink grant, the wireless device may start or restart the configuredGrantTimer for the corresponding HARQ process, if configured.

In an example, if a wireless device receives an uplink grant on the PDCCH for the MAC entity's CS-RNTI, and if the NDI in the received HARQ information is 1, the wireless device may consider the NDI for the corresponding HARQ process not to have been toggled and may start or restart the configuredGrantTimer for the corresponding HARQ process, if configured.

In an example, if a wireless device receives an uplink grant on the PDCCH for the MAC entity's CS-RNTI, and if the NDI in the received HARQ information is 0, the wireless device may stop the configuredGrantTimer for the corresponding HARQ process, if running.

In an example, for each Serving Cell and each configured uplink grant, if configured and activated, if the PUSCH duration of the configured uplink grant does not overlap with the PUSCH duration of an uplink grant received on the PDCCH or in a Random Access Response for this Serving Cell, the MAC entity may set the HARQ Process ID to the HARQ Process ID associated with this PUSCH duration. If the configuredGrantTimer for the corresponding HARQ process is not running: the MAC entity may consider the NDI bit for the corresponding HARQ process to have been toggled. The MAC entity may deliver the configured uplink grant and the associated HARQ information to the HARQ entity.

In an example, if an uplink grant is addressed to CS-RNTI or if the uplink grant is addressed to C-RNTI, and the identified HARQ process is configured for a configured uplink grant: the wireless device may start or restart the configuredGrantTimer, if configured, for the corresponding HARQ process when the transmission is performed.

In an example, an IE SearchSpace may define how/where to search for PDCCH candidates. A search space may be associated with a ControlResourceSet. In an example, a parameter common may indicate that a search space is common search space (CSS) and may indicate DCI formats to monitor. A parameter controlResourceSetId may indicate the CORESET applicable for the SearchSpace. A parameter duration may indicate a number of consecutive slots that a SearchSpace may last in an occasion, e.g., upon a period as given in the periodicityAndOffset. If the field is absent, the wireless device may apply the value 1 slot, except for DCI format 2_0. The wireless device may ignore this field for DCI format 2_0. The maximum valid duration may be periodicity-1 (periodicity as given in the monitoringSlotPeriodicityAndOffset). The parameter monitoringSlotPeriodicityAndOffset may indicate slots for PDCCH Monitoring configured as periodicity and offset. The parameter monitoringSymbolsWithinSlot may indicate the first symbol(s) for PDCCH monitoring in the slots configured for PDCCH monitoring. The most significant (left) bit may represent the first OFDM in a slot, and the second most significant (left) bit represents the second OFDM symbol in a slot and so on. The bit(s) set to one may identify the first OFDM symbol(s) of the control resource set within a slot. If the cyclic prefix of the BWP is set to extended CP, the last two bits within the bit string may be ignored by the wireless device. The parameter nrofCandidates-SFI may indicate the number of PDCCH candidates specifically for format 2-0 for the configured aggregation level. The parameter searchSpaceId may identity the search space. SearchSpaceId=0 may identify a searchSpaceZero configured via PBCH (MIB) or ServingCellConfigCommon and may not be used in the SearchSpace IE. The searchSpaceId may be unique among the BWPs of a Serving Cell. In case of cross carrier scheduling, search spaces with the same searchSpaceId in scheduled cell and scheduling cell may be linked to each other. The wireless device may apply the search space for the scheduled cell if the DL BWPs in which the linked search spaces are configured in scheduling cell and scheduled cell are both active. The parameter searchSpaceType may indicate whether this is a common search space (present) or a UE specific search space as well as DCI formats to monitor for. The parameter ue-Specific may configure this search space as UE specific search space (USS). The UE may monitor the DCI format with CRC scrambled by C-RNTI, CS-RNTI (if configured), and SP-CSI-RNTI (if configured).

In an example, an IE SearchSpaceId may be used to identify Search Spaces. The ID space may be used across the BWPs of a Serving Cell. The search space with the SearchSpaceId=0 may identify the search space configured via PBCH (MIB) and in ServingCellConfigCommon (searchSpaceZero).

In an example, an IE SearchSpaceZero may be used to configure SearchSpace #0 of the initial BWP. The IE PDCCH-Config may be used to configure UE specific PDCCH parameters such as control resource sets (CORESET), search spaces and additional parameters for acquiring the PDCCH. In an example, a parameter controlResourceSetToAddModList may indicate a list of UE specifically configured Control Resource Sets (CORESETs) to be used by the wireless device. In an example, an IE PDCCH-ConfigCommon may be used to configure cell specific PDCCH parameters provided in SIB as well as in dedicated signaling. In an example, an IE ControlResourceSet may be used to configure a time/frequency control resource set (CORESET) in which to search for downlink control information. In an example, a ControlResourceSetId IE may indicate a short identity, used to identify a control resource set within a serving cell. The IE ControlResourceSetZero may be used to configure CORESET #0 of the initial BWP.

In an example, a set of PDCCH candidates for a wireless device to monitor may be defined in terms of PDCCH search space sets. A search space set may be a common search space (CSS) set or a UE-specific search space (USS) set. A wireless device may monitor PDCCH candidates in one or more of the following example types of search spaces sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

In an example, an IE PDCCH-ConfigCommon may be used to configure cell specific PDCCH parameters provided in SIB as well as in dedicated signaling. The parameter ra-SearchSpace may indicate ID of the Search space for random access procedure. If the field is absent, the UE may not receive RAR in this BWP.

In an example, an IE BeamFailureRecoveryConfig may be used to configure the UE with RACH resources and candidate beams for beam failure recovery in case of beam failure detection. The parameter recoverySearchSpaceId may indicate search space to use for BFR RAR. The network configures this search space to be within the linked DL BWP (i.e., within the DL BWP with the same bwp-Id) of the UL BWP in which the BeamFailureRecoveryConfig is provided. The CORESET associated with the recovery search space cannot be associated with another search space. Network always configures the UE with a value for this field when contention free random access resources for BFR are configured. The parameter ra-OccasionList may indicate RA occasions that the UE may use when performing BFR upon selecting the candidate beam identified by a CSI-RS. The network may ensure that the RA occasion indexes provided herein are also configured by prach-ConfigurationIndex and msg1-FDM. A RACH occasion may be sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots. If the field is absent the UE may use the RA occasion associated with the SSB that is QCLed with CSI-RS.

In an example, an IE BWP may be used to configure generic parameters of a bandwidth part.

For a serving cell, the network may configure at least an initial downlink bandwidth part and one (if the serving cell is configured with an uplink) or two (if using supplementary uplink (SUL)) initial uplink bandwidth parts. Furthermore, the network may configure additional uplink and downlink bandwidth parts for a serving cell. The uplink and downlink bandwidth part configurations are divided into common and dedicated parameters.

In an example, a parameter cyclicPrefix may indicate whether to use the extended cyclic prefix for this bandwidth part. If not set, the UE may use the normal cyclic prefix. Normal CP may be supported for all subcarrier spacings and slot formats. A parameter locationAndBandwidth may indicate a frequency domain location and bandwidth of the bandwidth part. A parameter subcarrierSpacing may indicate subcarrier spacing to be used in this BWP for all channels and reference signals unless explicitly configured elsewhere.

In an example, an IE BWP-Downlink may be used to configure an additional downlink bandwidth part (not for the initial BWP). A parameter bwp-Id may indicate an identifier for the bandwidth part. Other parts of the RRC configuration may use the BWP-Id to associate themselves with a particular bandwidth part.

In an example, an IE BWP-DownlinkCommon may be used to configure the common parameters of a downlink BWP. The common parameters may be "cell specific" and the network may ensure the necessary alignment with corresponding parameters of other UEs. The common parameters of the initial bandwidth part of the PCell may be provided via system information. For other serving cells, the network may provide the common parameters via dedicated signaling.

In an example, an IE BWP-DownlinkDedicated may be used to configure the dedicated (UE specific) parameters of a downlink BWP.

In an example, an IE BWP-Id may be used to refer to Bandwidth Parts (BWP). The initial BWP may be referred to by BWP-Id 0. The other BWPs may be referred to by BWP-Id 1 to maxNrofBWPs.

In an example, an IE BWP-Uplink may be used to configure an additional uplink bandwidth part (not for the initial BWP). A parameter bwp-Id may indicate an identifier for this bandwidth part. Other parts of the RRC configuration may use the BWP-Id to associate themselves with a particular bandwidth part.

In an example, an IE BWP-UplinkCommon may be used to configure the common parameters of an uplink BWP. The common parameters may be cell specific and the network may ensure the necessary alignment with corresponding parameters of other UEs. The common parameters of the initial bandwidth part of the PCell may be provided via system information. For all other serving cells, the network provides the common parameters via dedicated signaling.

In an example, an IE BWP-UplinkDedicated may be used to configure the dedicated (UE specific) parameters of an uplink BWP.

In an example, a MAC PDU may be a bit string that is byte aligned (e.g., multiple of 8 bits) in length. The bit strings may be represented by tables in which the most significant bit may be the leftmost bit of the first line of the table, the least significant bit may be the rightmost bit on the last line of the table, and more generally the bit string may be to be read from left to right and then in the reading order of the lines. The bit order of each parameter field within a MAC PDU may be represented with the first and most significant bit in the leftmost bit and the last and least significant bit in the rightmost bit.

In an example, a MAC SDU may be a bit string that may be byte aligned (e.g., multiple of 8 bits) in length. A MAC SDU may be included into a MAC PDU from the first bit onward. A MAC CE may be a bit string that is byte aligned (e.g., multiple of 8 bits) in length. A MAC subheader may be a bit string that may be byte aligned (e.g., multiple of 8 bits) in length. Each MAC subheader may be placed immediately in front of the corresponding MAC SDU, MAC CE, or padding.

In an example, the MAC entity may ignore the value of the Reserved bits in downlink MAC PDUs. A MAC PDU may comprise one or more MAC subPDUs. Each MAC subPDU may comprise one of the following: a MAC subheader (including padding); a MAC subheader and a MAC SDU; a MAC subheader and a MAC CE; a MAC subheader and padding. The MAC SDUs may be of variable sizes. A MAC subheader may correspond to either a MAC SDU, a MAC CE, or padding.

In an example, a MAC subheader except for fixed sized MAC CE, padding, and a MAC SDU containing UL CCCH may comprise the four header fields R/F/LCID/L. A MAC subheader for fixed sized MAC CE, padding, and a MAC SDU containing UL CCCH may comprise the two header fields R/LCID.

In an example, MAC CEs may be placed together. DL MAC subPDU(s) with MAC CE(s) may be placed before any MAC subPDU with MAC SDU and MAC subPDU with padding. UL MAC subPDU(s) with MAC CE(s) may be placed after the MAC subPDU(s) with MAC SDU and before the MAC subPDU with padding in the MAC PDU. The size of padding may be zero.

In an example, a maximum of one MAC PDU may be transmitted per TB per MAC entity.

Power saving processes may enable reduction of power consumption for a wireless, for example, by enabling reduced control channel monitoring (e.g., by enabling skipping control channel monitoring or adapting control channel monitoring periodicity). The reduced control channel monitoring may be enabled and/or disabled dynamically (e.g., using physical layer signaling). With power saving mechanisms, existing wireless device processes (e.g., physical layer and/or MAC layer processes) may not perform efficiently and/or may degrade the wireless device and/or network performance. There is a need to enhance the existing wireless device processes when the wireless device uses power saving processes. Example embodiments enhance the wireless device processes when the wireless device uses power saving processes.

In an example, a wireless device may receive one or more messages comprising configuration parameters. The one or more messages may comprise one or more RRC messages. The configuration parameters may comprise configuration parameters of one or more cells. The one or more cells may comprise a primary cell. The one or more cells may comprise a primary cell and one or more secondary cells. The one or more cells may comprise one or more licensed cells. The one or more cells may comprise one or more unlicensed cells. In an example, the one or more cells may be provided by a base station. In an example, the one or more cells may be provided by a plurality of base stations (e.g., a master base station and one or more secondary base stations).

In an example, a wireless device may receive a command/signaling indicating reducing monitoring a control channel (e.g., PDCCH). In an example, the reducing the monitoring the control channel may comprise skipping monitoring the control (e.g., for a plurality of (e.g., a number of) monitoring occasions and/or a first duration). In an example, the reducing the monitoring the control channel may comprise switching from a first monitoring periodicity to a second monitoring periodicity, wherein the second monitoring periodicity may indicate monitoring the control channel less frequently, for example with monitoring occasions that are spaced apart with a larger separation. For example, switching the monitoring periodicity may comprise determining the control channel monitoring occasions using a different (e.g., larger value) for a monitoring periodicity parameter or a monitoring periodicity and offset parameter. While some example embodiments in this disclosure are described with respect to processes involving skipping monitoring the control channel and some are described with respect to processes involving reducing the control channel monitoring periodicity, the example embodiments may be equally used for both processes of skipping the monitoring the control channel or reducing the control channel monitoring periodicity or other processes involving reducing the monitoring the control channel.

In an example, the signaling/command for reducing the monitoring the control channel may be received via a downlink control channel (e.g., PDCCH). The signaling/command may be based on a downlink control information of a first format. In an example, the signaling/command may be associated with a first RNTI (e.g., a power saving RNTI (e.g., PS-RNTI) or C-RNTI). In an example, the signaling/command may be a group-common DCI. The signaling/command may be based on a DCI format for group-common DCI. In an example, the signaling/command for reducing the monitoring the control channel may be received via a downlink control channel, wherein the downlink control information may be a scheduling DCI (e.g., indicating an uplink grant or a downlink assignment).

In an example, the signaling/command for reducing monitoring the control channel may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example, the wireless device may transmit a control channel monitoring reduction confirmation signaling based on the receiving the signaling/command for reducing monitoring the control. For example, the control channel monitoring reduction confirmation signaling may be based on a MAC CE. The control channel monitoring reduction confirmation MAC CE may have zero payload and an LCID associated with the MAC CE may indicate that the MAC CE is for control channel monitoring reduction confirmation. In an example, the signaling/command for reducing monitoring control channel may indicate an uplink grant. The wireless device may transmit the control channel monitoring reduction confirmation MAC CE via the uplink grant indicated by the resume signaling/command for reducing monitoring control channel. In an example, the control channel monitoring reduction confirmation signaling may be via uplink control information. The uplink control information indicating the control channel monitoring reduction confirmation signaling may be transmitted via an uplink control channel. In an example, the uplink control information may be a positive acknowledgement.

In an example, the signaling/command for reducing monitoring the control channel may be cell-specific and/or BWP-specific. The signaling/command may indicate one or more cells and/or one or more BWPs for reducing monitoring the control channel on the one or more cells and/or the one or more BWPs. For example, the command/signaling may comprise a field indicating the one or more cells and/or the one or more BWPs. For example, the configuration parameters may indicate a plurality of cell combinations and/or BWP combinations, wherein the command/signaling may indicate a first cell combination or a first BWP combination in the plurality of cell combinations or BWP combinations.

In an example, the reducing the monitoring the control channel via the command/signaling (e.g., the skipping the monitoring the control channel or the switching the control channel monitoring periodicity) may be for a duration and/or a time window. The duration and/or the time window may be preconfigured and/or indicated by the command/signaling and/or configured via RRC configuration. The duration and/or time window may be in terms of a number of symbols/slots/subframes (e.g., k symbols/slots/subframes). For example, the RRC configuration parameters may indicate a plurality of durations and/or time windows and the command/signaling may indicate a first duration and/or time window in the plurality of the durations and/or time windows. In an example, a value of a field in the command/signaling may indicate and/or provide an index to a duration and/or time window (e.g., a value of the k) in the plurality of durations and/or time windows.

In an example, the command/signaling indicating the reducing the monitoring the control channel may indicate to start the reducing the monitoring the control channel after an offset from the receiving the command/signaling. The wireless device may start the reducing the monitoring the control channel after an offset from the receiving the command/signaling. For example, the command/signaling may comprise a field, a value of the field indicating the offset. The offset may be in terms of a number of symbols and/or slots. For example, the configuration parameters may comprise/indicate a plurality of offset values and the command/signaling may indicate a first offset value in the plurality of the offset values. In an example, the offset may be a pre-configured/pre-determined value (for example n symbols/sots wherein n is pre-configured/pre-determined).

In an example, the wireless device may receive a resume command/signaling indicating resuming to normal control channel monitoring (e.g., stopping the skipping the control channel monitoring or resuming the control channel monitoring periodicity to a default value). In an example, the wireless device may receive the resume command/signaling via a downlink control channel (e.g., PDCCH). The command/signaling may be based on a downlink control information of a first format. In an example, the resume command/signaling may be associated with a first RNTI (e.g., a power saving RNTI (e.g., PS-RNTI) or C-RNTI). In an example, the resume command/signaling may be a group-common DCI. The command/signaling may be based on a DCI format for group-common DCI. In an example, the resume command/signaling may be received via a downlink control channel, wherein the downlink control information may be a scheduling DCI (e.g., indicating an uplink grant or a downlink assignment).

In an example, the wireless device may transmit a resume confirmation signaling based on the receiving the resume command/signaling. For example, the resume confirmation signaling may be based on a MAC CE. The resume confirmation MAC CE may have zero payload and an LCID associated with the MAC CE may indicate that the MAC CE is for resume confirmation. In an example, the resume command/signaling may indicate an uplink grant. The wireless device may transmit the resume confirmation MAC CE via the uplink grant indicated by the resume command/signaling. In an example, the resume confirmation signaling may be via uplink control information. The uplink control information indicating the resume confirmation signaling may be transmitted via an uplink control channel. In an example, the uplink control information may be a positive acknowledgement.

In an example, the resume command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example, the resume command/signaling may be cell-specific and/or BWP-specific. The signaling/command may indicate one or more cells and/or one or more BWPs for reducing monitoring the control channel on the one or more cells and/or the one or more BWPs. For example, the command/signaling may comprise a field indicating the one or more cells and/or the one or more BWPs. For example, the configuration parameters may indicate a plurality of cell combinations and/or a plurality of BWP combinations, wherein the command/signaling may indicate a first cell combination or a first BWP combination in the plurality of cell combinations or BWP combinations.

In an example, the resume signaling/command indicating the resuming to the normal control channel monitoring may indicate to start the resuming the normal control channel monitoring after an offset from the receiving the signaling/command. The wireless device may start the resuming the control channel monitoring after an offset from the receiving the signaling/command. For example, the signaling/command may comprise a field, a value of the field indicating the offset. The offset may be in terms of a number of symbols and/or slots. For example, the configuration parameters may comprise/indicate a plurality of offset values and the signaling/command may indicate a first offset value in the plurality of the offset values. In an example, the offset may be a pre-configured/pre-determined value (for example n symbols/sots wherein n is pre-configured/pre-determined).

In an example embodiment, a wireless device may receive a first power saving signaling and a second power saving signaling. The first power saving signaling may be received before a DRX on duration (e.g., duration at the beginning of a DRX cycle) indicating whether the wireless device may start or not start the DRX ON duration timer. The second power saving signaling may be received during the DRX ON duration indicating reducing monitoring the control channel (e.g., indicating skipping monitoring the control channel for a duration and/or a number of monitoring occasions or indicating switching a monitoring periodicity). In an example, the first power saving signaling may be received via a DCI of a first format and the second power saving signaling may be received via a DCI of a second format. In an example, the first DCI format may be a non-scheduling DCI format and the second DCI format may be a scheduling DCI format. In an example, the first power saving signaling may be associated with a first RNTI (e.g., power saving RNTI (PS-RNTI)) and the second power saving signaling may be associated with a second RNTI (e.g., a C-RNTI). In an example, the first power saving signaling may be via a group-common DCI and the second power saving signaling may be via a UE-specific DCI.

Figure 16:
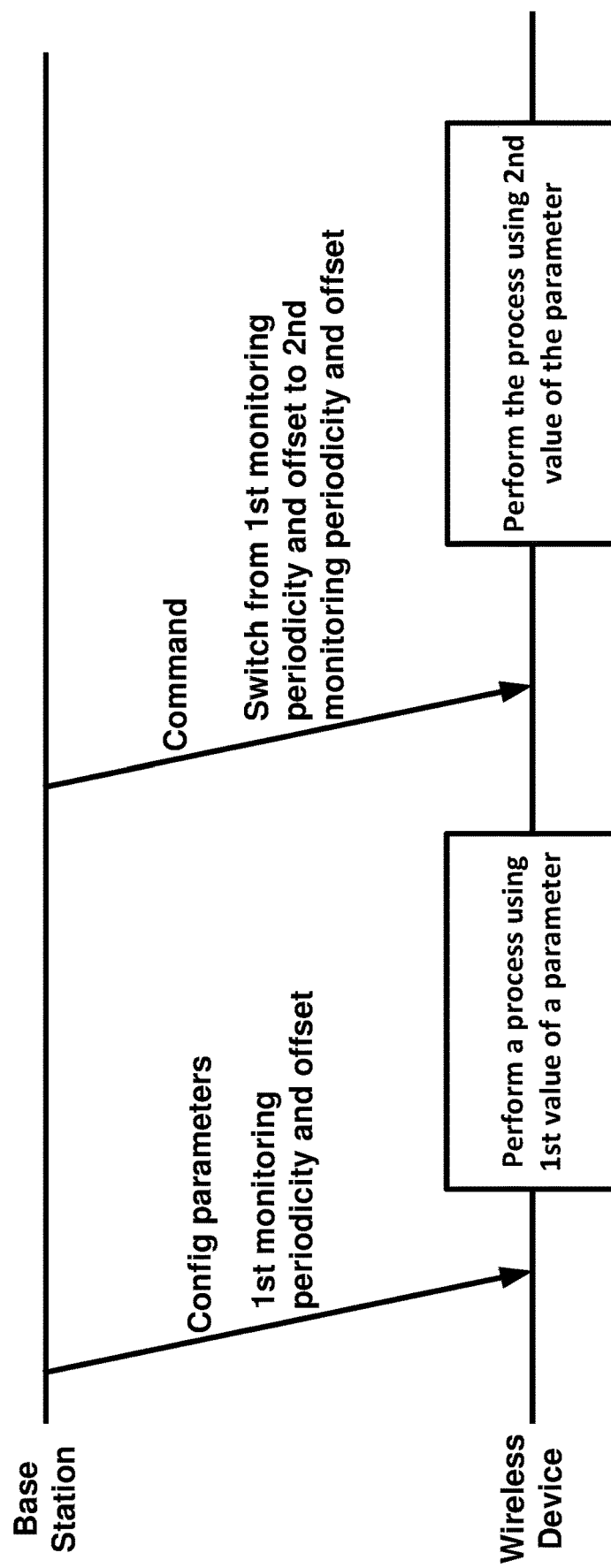
FIG. 16 shows an example process in accordance with several of various embodiments of the present disclosure.
Figure 17:
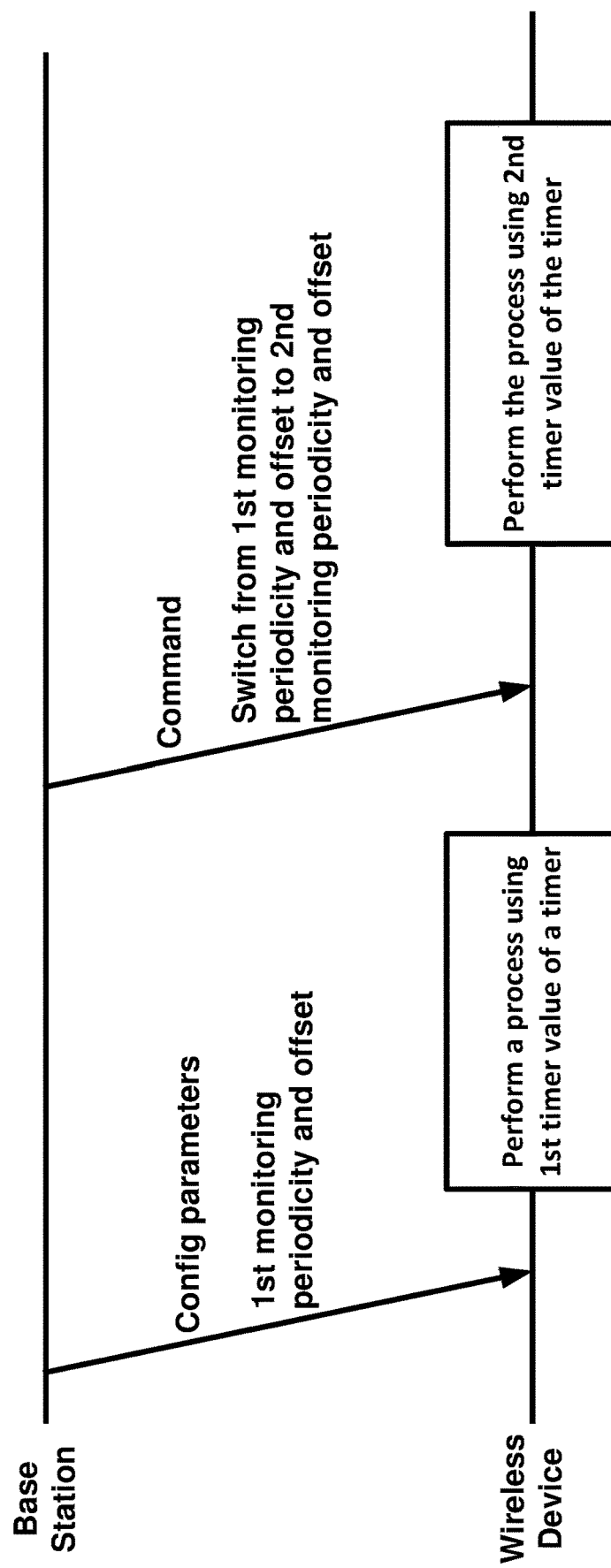
FIG. 17 shows an example process in accordance with several of various embodiments of the present disclosure.

In an example embodiment as shown in FIG. 16 and FIG. 17, a wireless device may receive configuration parameters comprising one or more first parameters for determining monitoring occasions for control channel monitoring. The one or more first parameters may comprise a first monitoring periodicity value for a monitoring periodicity parameter or a first monitoring periodicity and offset value for a first monitoring periodicity and offset parameter. The wireless device may determine the monitoring occasions for control channel monitoring based on the first monitoring periodicity parameter or the first monitoring periodicity and offset parameter. The wireless device may perform a process using a first value of a parameter associated with the process, as shown in FIG. 16, or using a first timer value of a first timer associated with the process as shown in FIG. 17. In an example, the configuration parameters may comprise the parameter associated with the process and/or the timer associated with the process and may indicate the first value of the parameter or the first timer value of the timer.

The wireless device may switch from the one or more first parameters to one or more second parameters for determining monitoring occasions for control channel monitoring. For example, the wireless device may switch form the first monitoring periodicity value to a second monitoring periodicity value for the monitoring periodicity parameter or the wireless device may switch from the first monitoring periodicity and offset value to a second monitoring periodicity and offset value for the monitoring periodicity and offset parameter. In an example, the switching from the first monitoring periodicity value to a second monitoring periodicity value or from the first monitoring periodicity and offset value to a second monitoring periodicity and offset value may be based on receiving a command/signaling indicating the switching. In an example, the switching form the first monitoring periodicity value to a second monitoring periodicity value or from the first monitoring periodicity and offset value to a second monitoring periodicity and offset value may be performed autonomously by the wireless device (e.g., without receiving a command/signaling from the base station), for example, based on expiry of a timer or based on a time duration/window elapsing.

In an example, the configuration parameters may comprise the one or more second parameters (e.g., the second monitoring periodicity or the second monitoring and offset parameter) and may indicate the second monitoring periodicity value or the second monitoring periodicity and offset value.

In an example, the wireless device may determine the one or more second parameters (e.g., the second monitoring periodicity or the second monitoring and offset parameter) based on the one or more first parameters (e.g., the first monitoring periodicity value or the first monitoring periodicity and offset value) and a scaling factor. For example, the one or more second parameters (e.g., the second monitoring periodicity or the second monitoring and offset value) may be the one or more first parameters (e.g., the first monitoring periodicity or the first monitoring periodicity and offset value) multiplied by the scaling factor. The scaling factor may be a value larger than one (e.g., 2, 3, 4, 8, 16, . . . ). In an example, the configuration parameters may comprise and/or indicate the scaling factor. The configuration parameters may comprise a scaling factor parameter indicating the scaling factor. In an example, the command/signaling indicating the switching, from the first monitoring periodicity value to a second monitoring periodicity value or from the first monitoring periodicity and offset value to a second monitoring periodicity and offset value, may indicate the scaling factor. For example, the command/signaling may comprise a field, a value of the field indicating the scaling factor. In an example, the configuration parameters may comprise a plurality of scaling factors and the command/signaling may indicate a scaling factor in the plurality of scaling factors. The configuration parameters may comprise one or more parameters indicating the plurality of scaling factors. For example, the command/signaling may comprise a field, a value of the field indicating a scaling factor, for example by providing an index to a scaling factor, in the plurality of scaling factors.

The wireless device may determine the monitoring occasions for control channel monitoring based on the one or more first parameters (e.g., the first monitoring periodicity value or the first monitoring periodicity and offset value) before the switching from the one or more first parameters to the one or more second parameters. The wireless device may determine the monitoring occasions for control channel monitoring based on the one or more second parameters (e.g., the second monitoring periodicity value or the second monitoring periodicity and offset value) after the switching from the one or more first parameters to the one or more second parameters.

Based on the switching from the one or more first parameters to the one or more second parameters (e.g., switching from the first monitoring periodicity value to the second monitoring periodicity value or from the first monitoring periodicity and offset value to a second monitoring periodicity and offset value), for example based on the receiving the command/signaling, the wireless device may perform the process using a second value of the parameter associated with the process or a second timer value of the timer associated with the process.

In an example, the configuration parameters may indicate the second value of the timer associated with the process and/or the second value of the parameter associated with the process. The configuration parameters may comprise one or more parameters indicating the second value of the parameter and/or the second timer value of the timer. In an example, the command/signaling indicating the switching may indicate the switching may comprise a field, a value of the field indicating the second value (e.g., configured value) of the parameter or the second timer value (e.g., configured value) of the timer associated with the process. In an example, the configuration parameters may comprise/indicate a plurality of values for the parameter and/or a plurality of timer values of the timer. The command/signaling may comprise a field, a value of the field indicating the second value of the parameter or the second timer value of the timer. For example, the value of the field may provide an index to the second value of the parameter in the plurality of values or the second timer value in the plurality of timer values.

In an example, the second value of the parameter associated with the process may be based on the first value of the parameter associated with the process and a first scaling factor based on the scaling factor. In an example, the second timer value of the timer associated with the process may be based the first timer value of the timer associated with the process and a first scaling factor based on the scaling factor. In an example, the first scaling factor may be the scaling factor.

In an example, the second value of the parameter associated with the process may be the first value of the parameter multiplied by the scaling factor. In an example, the second timer value of the timer associated with the process may be the first timer value of the timer multiplied by the scaling factor.

In an example, a wireless device may receive configuration parameters comprising one or more first parameters for determining monitoring occasions for monitoring a control channel. The one or more first parameters may comprise a first monitoring periodicity value for a monitoring periodicity parameter or a first monitoring periodicity and offset value for a monitoring periodicity and offset parameter.

In an example, the configuration parameters may comprise a first DRX retransmission timer value for a DRX process. The wireless device may determine to start a DRX retransmission timer based on a DRX process. The wireless device may start the DRX retransmission timer with the first DRX retransmission timer received via the configuration parameters. The starting the DRX retransmission timer with the first value may be associated with a first transport block.

In an example, the wireless device may switch from the one or more first parameters to one or more second parameters for determining monitoring occasions for monitoring the control channel. For example, the wireless device may switch from the first monitoring periodicity value to a second monitoring periodicity value for the monitoring periodicity parameter or switch from a first monitoring periodicity and offset value to a second monitoring periodicity value for the monitoring periodicity and offset parameter. In an example, the wireless device may switch from the first monitoring periodicity value to a second monitoring periodicity value for the monitoring periodicity parameter or switch from a first monitoring periodicity and offset value to a second monitoring periodicity value for the monitoring periodicity and offset parameter based on receiving a command/signaling indicating the switching. In an example, the wireless device may switch the monitoring periodicity value or the monitoring periodicity and offset autonomously, for example based on an expiry of a timer or based on a time duration/time window elapsing or based on other conditions.

Figure 18:
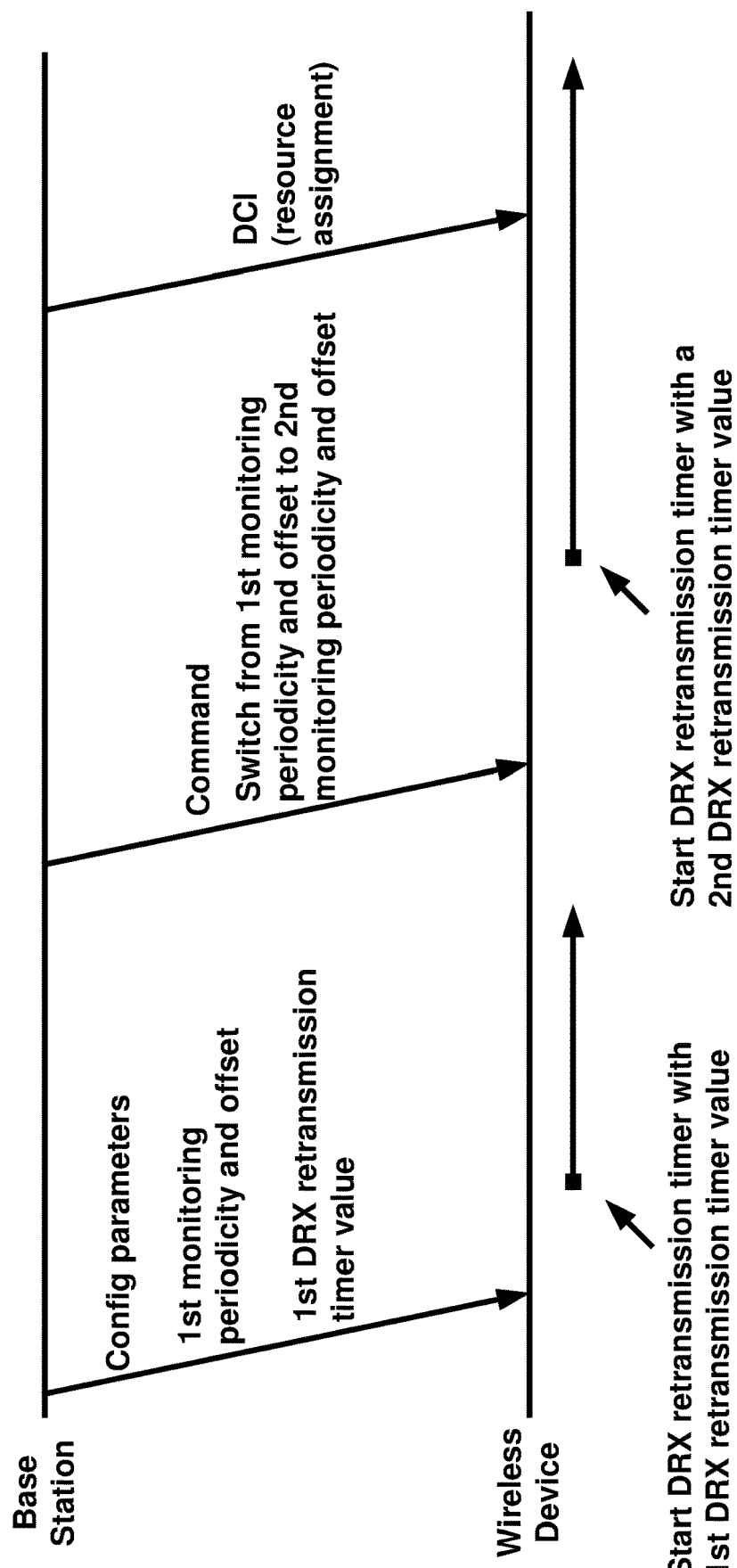
FIG. 18 shows an example process in accordance with several of various embodiments of the present disclosure.

In an example embodiment as shown in FIG. 18, based on (e.g., after) the switching from the first monitoring periodicity value to a second monitoring periodicity value for the monitoring periodicity parameter or based on (e.g., after) the switching from a first monitoring periodicity and offset value to a second monitoring periodicity value for the monitoring periodicity and offset parameter, for example based on (e.g., after) the receiving the command/signaling indicating the switching, the wireless device may start the DRX retransmission timer with a second DRX retransmission timer value.

The wireless device may determine the second DRX retransmission timer value. For example, the configuration parameters may comprise/indicate the second DRX retransmission timer value. For example, the second DRX retransmission timer value may be based on the first DRX retransmission timer value and the command/signaling indicating the switching the monitoring periodicity and/or the monitoring periodicity and offset. For example, the command/signaling, indicating the switching the monitoring periodicity and/or the monitoring periodicity and offset, may comprise a field, wherein the second DRX retransmission timer value may be based on the first DRX retransmission timer value and a value of the field of the command/signaling.

The wireless device may start the DRX retransmission timer, associated with a second transport block, with the second DRX retransmission timer value. In an example, the starting the DRX retransmission timer with the second DRX retransmission timer value based on the switching may be based on a priority associated with the second transport block. For example, the priority associated with the second transport block may be based on configuration parameters associated with the second transport block. For example, the second transport block may comprise one or more logical channels and the priority associated with the second transport block may be based on the one or more logical channels (e.g., logical channel priorities corresponding to the one or more logical channels). For example, the configuration parameters associated with the second transport block and/or the one or more logical channels may be associated with a first traffic type (e.g., an ultra-reliable low-latency communications (URLLC) traffic/service type).

In an example, the DRX retransmission timer may be a downlink DRX retransmission timer, the first transport block may be a first downlink transport block and the second transport block may be a second downlink transport block. The wireless device may receive the first transport block and may transmit a negative acknowledgement HARQ feedback based on the received first transport block not being received/decoded correctly. The wireless device may start a HARQ RTT timer based on the transmitting the negative acknowledgement HARQ feedback. The wireless device may start the DRX retransmission timer, with the first DRX retransmission timer value, based on the HARQ RTT timer expiring. The wireless device may receive the second transport block and may transmit a negative acknowledgement HARQ feedback based on the received second transport block not being received/decoded correctly. The wireless device may start a HARQ RTT timer based on the transmitting the negative acknowledgement HARQ feedback. The wireless device may start the DRX retransmission timer, with the second DRX retransmission timer value, based on the HARQ RTT timer expiring.

In an example, the DRX retransmission timer may be an uplink DRX retransmission timer, the first transport block may be a first uplink transport block and the second transport block may be a second uplink transport block. The wireless device may transmit the first transport block. The wireless device may start a HARQ RTT timer based on the transmitting the first transport block. The wireless device may start the DRX retransmission timer, with the first DRX retransmission timer value, based on the HARQ RTT timer expiring. The wireless device may transmit the second transport block. The wireless device may start a HARQ RTT timer based on the transmitting the second transport block. The wireless device may start the DRX retransmission timer, with the second DRX retransmission timer value, based on the HARQ RTT timer expiring.

The wireless device may determine, based on a DRX process and after starting the DRX retransmission timer with the second DRX retransmission timer value, that the wireless device is in Active time based on the DRX retransmission timer running. The wireless device may monitor the control channel based on the wireless device being in the Active time. The wireless device may receive a resource assignment for retransmission of the second transport block. The wireless device may receive a DCI indicating the resource assignment. In an example, the resource assignment may be an uplink grant and the second transport block may be an uplink transport block. In an example, the resource assignment may be a downlink assignment and the second transport block may be a downlink transport block.

In an example, the wireless device may switch from the one or more first parameters to one or more second parameters for determining monitoring occasions for monitoring the control channel. For example, the wireless device may switch from the first monitoring periodicity value to a second monitoring periodicity value for the monitoring periodicity parameter or switch from a first monitoring periodicity and offset value to a second monitoring periodicity value for the monitoring periodicity and offset parameter. In an example, the wireless device may switch from the first monitoring periodicity value to a second monitoring periodicity value for the monitoring periodicity parameter or switch from a first monitoring periodicity and offset value to a second monitoring periodicity value for the monitoring periodicity and offset parameter based on receiving a command/signaling indicating the switching. In an example, the wireless device may switch the monitoring periodicity value or the monitoring periodicity and offset autonomously, for example based on an expiry of a timer or based on a time duration/time window elapsing or based on other conditions.

Figure 19:
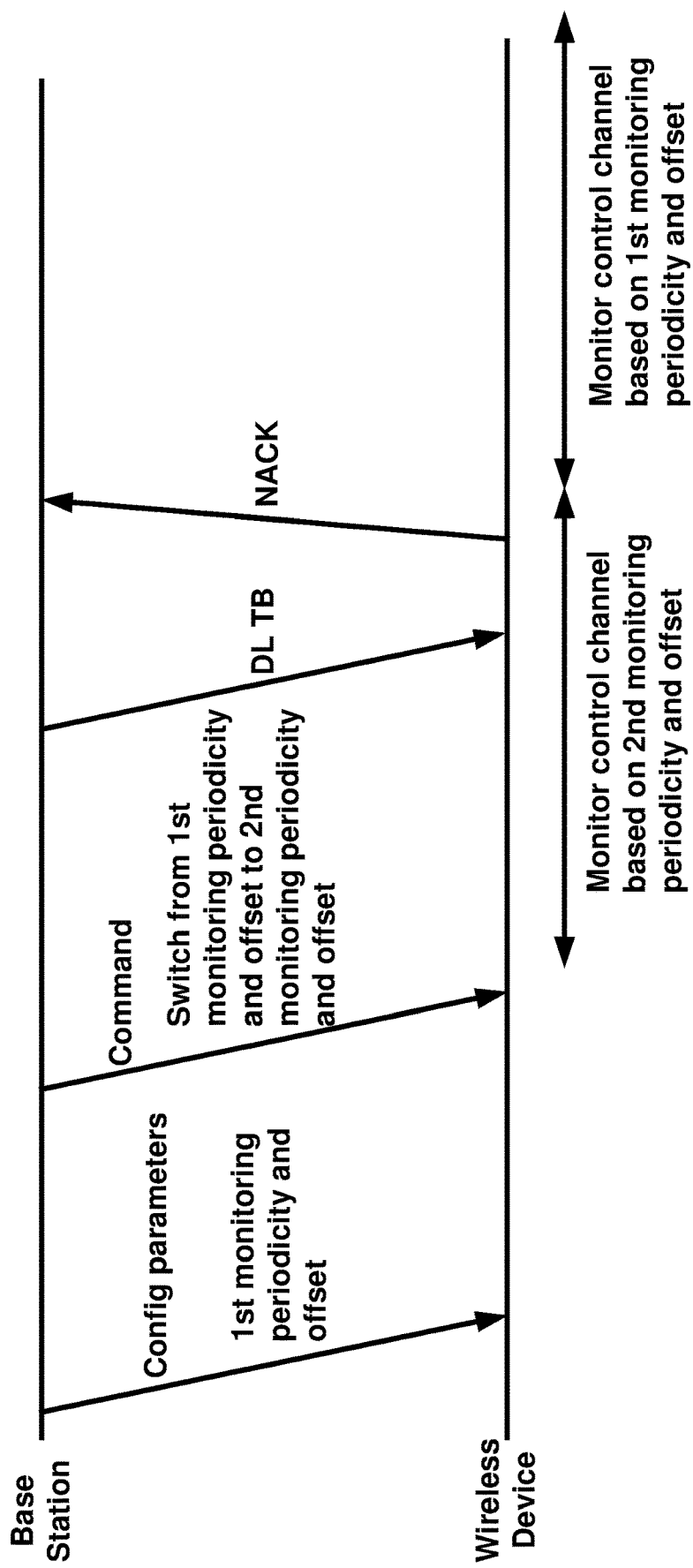
FIG. 19 shows an example process in accordance with several of various embodiments of the present disclosure.

In an example embodiment as shown in FIG. 19, the wireless device may monitor the control channel based on the one or more second parameters (e.g., the second monitoring periodicity value or the second monitoring periodicity and offset value) based on the switching from the one or more first parameters to the one or more second parameters. The wireless device may receive a downlink transport block. The wireless device may receive the downlink transport block based on receiving a downlink assignment indicating radio resources for receiving the downlink transport block. The wireless device may receive, based on the monitoring the control channel, a downlink control information, indicating the downlink assignment. The wireless device may transmit a negative acknowledgement (NACK) HARQ feedback based on the downlink transport block being received/decoded incorrectly (not being received/decoded correctly).

In an example embodiment as shown in FIG. 19, based on the transmitting the negative acknowledgement (NACK), the wireless device may monitor the control channel based on the one or more first parameters (e.g., the first monitoring periodicity or the first monitoring periodicity and offset). The wireless device may determine monitoring occasions based on the one or more first parameters (e.g., the first monitoring periodicity or the first monitoring periodicity and offset value). In an example, the wireless device may start a HARQ RTT timer based on the transmitting the negative acknowledgement. The wireless device may monitor the control channel based on the one or more first parameters based on the HARQ RTT timer expiring.

In an example embodiment, based on the transmitting the negative acknowledgement (NACK), the wireless device may monitor the control channel based on one or more third parameters (e.g., a third monitoring periodicity value a third monitoring periodicity and offset value). The wireless device may determine monitoring occasions based on the one or more third parameters (e.g., the third monitoring periodicity the third monitoring periodicity and offset value). In an example, the third monitoring periodicity may be based on the first monitoring periodicity and/or the third monitoring periodicity and offset may be based on the first monitoring and offset value. In an example, the wireless device may start a HARQ RTT timer based on the transmitting the negative acknowledgement. The wireless device may monitor the control channel based on the one or more third parameters based on the HARQ RTT timer expiring.

In an example, the monitoring the control channel based on the one or more first parameters or the one or more third parameters based on the transmitting the negative acknowledgement may be based on a priority associated with the downlink transport block. For example, the downlink transport block may be associated with one or more configuration parameter indicating the priority associated with the downlink transport block. For example, the downlink transport block may be a SPS transport block and may be associated with a SPS configuration. The priority associated with the downlink transport block may be based on the SPS configuration. The configuration parameters may comprise first configuration parameters of the SPS configuration and the first configuration parameters may comprise a first parameter indicating the priority associated with the downlink transport block. For example, the downlink transport block may comprise one or more logical channels. The priority associated with the downlink transport block may be based on priorities (e.g., logical channel priorities) of the one or more logical channels. In an example, the priority associated with the downlink transport block may be based on a service/traffic type of the downlink transport block. For example, the configuration parameters associated with the downlink transport block and/or the one or more logical channels may be associated with a first traffic type (e.g., an ultra-reliable low-latency communications (URLLC) traffic/service type).

In an example, the monitoring the control channel based on the one or more first parameters (e.g., the first monitoring periodicity or the first monitoring periodicity and offset) or the one or more third parameters (e.g., the third monitoring periodicity or the third monitoring periodicity and offset), based on the transmitting the negative acknowledgement, may be after a first duration/offset from the transmitting the negative acknowledgement. For example, the first duration/offset may have a pre-configured/pre-determined value. For example, the first duration/offset may be based on a first wireless device capability parameter. The wireless device may transmit a capability message comprising the first wireless device capability parameter to a base station. In response to the transmitting the wireless device capability message indicating the first wireless device capability parameter, the wireless device may receive configuration parameters comprising the one or more parameters indicating the first duration/offset.

Figure 20:
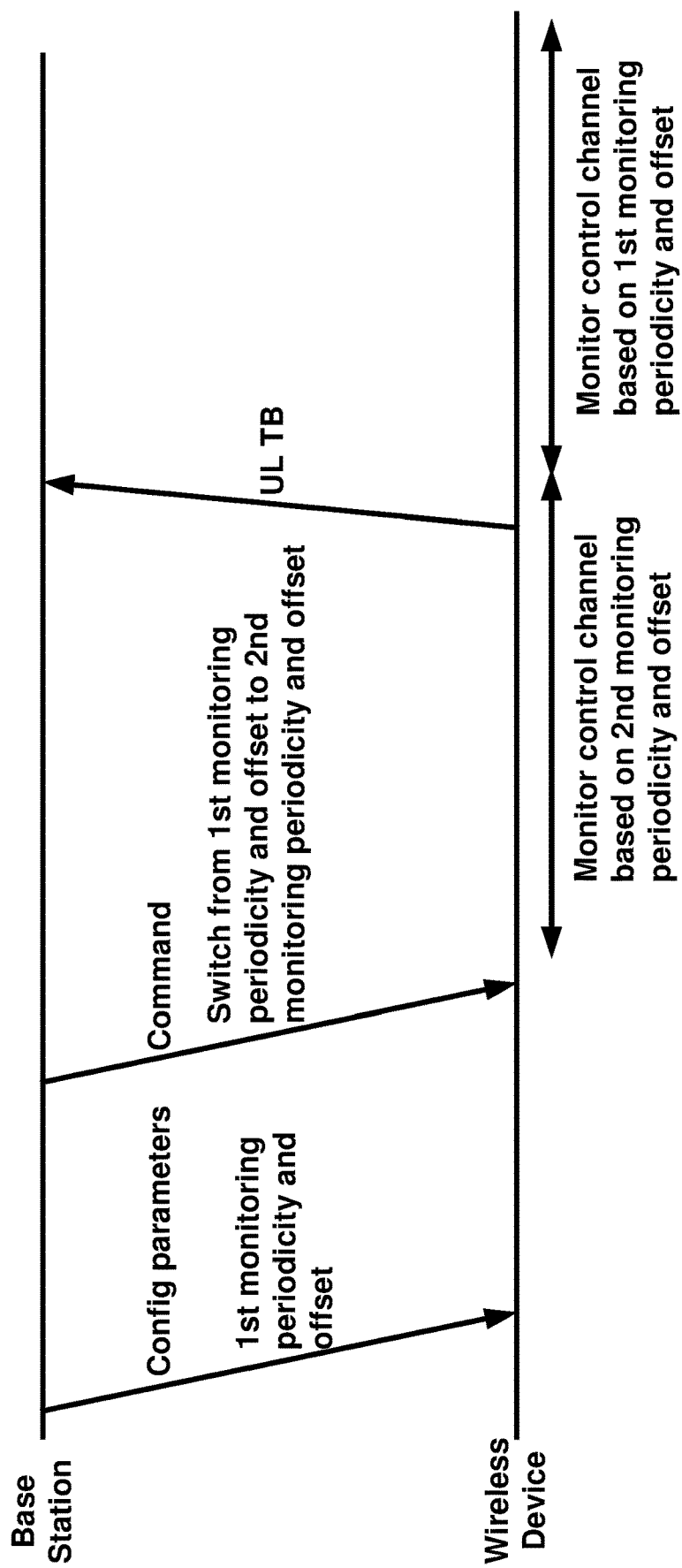
FIG. 20 shows an example process in accordance with several of various embodiments of the present disclosure.

In an example embodiment as shown in FIG. 20, the wireless device may transmit an uplink transport block. The transmission of the uplink transport block may be based on a dynamic uplink grant or a configured uplink grant. Based on the transmitting the uplink transport block, the wireless device may monitor the control channel based on the one or more first parameters (e.g., the first monitoring periodicity or the first monitoring periodicity and offset). The wireless device may determine monitoring occasions based on the one or more first parameters (e.g., the first monitoring periodicity or the first monitoring periodicity and offset value). In an example, the wireless device may start a HARQ RTT timer based on the transmitting the uplink transport block. The wireless device may monitor the control channel based on the one or more first parameters based on the HARQ RTT timer expiring.

In an example embodiment, based on the transmitting the uplink transport block, the wireless device may monitor the control channel based on the one or more third parameters (e.g., the third monitoring periodicity or the third monitoring periodicity and offset). The wireless device may determine monitoring occasions based on the one or more third parameters (e.g., the third monitoring periodicity or the third monitoring periodicity and offset value). In an example, the third monitoring periodicity may be based on the first monitoring periodicity and/or the third monitoring periodicity and offset may be based on the first monitoring and offset value. In an example, the wireless device may start a HARQ RTT timer based on the transmitting the uplink transport block. The wireless device may monitor the control channel based on the one or more third parameters based on the HARQ RTT timer expiring.

In an example, the monitoring the control channel based on the one or more first parameters or the one or more third parameters based on the transmitting the transport block may be based on a priority associated with the uplink transport block. For example, the uplink transport block may be associated with one or more configuration parameter indicating the priority associated with the uplink transport block. For example, the uplink transport block may be a configured grant (CG) transport block and may be associated with a configured grant configuration. The priority associated with the uplink transport block may be based on the configured grant configuration. The configuration parameters may comprise first configuration parameters of the configured grant configuration and the first configuration parameters may comprise a first parameter indicating the priority associated with the uplink transport block. For example, the uplink transport block may comprise one or more logical channels. The priority associated with the uplink transport block may be based on priorities (e.g., logical channel priorities) of the one or more logical channels. In an example, the priority associated with the uplink transport block may be based on a service/traffic type of the uplink transport block. For example, the configuration parameters associated with the uplink transport block and/or the one or more logical channels may be associated with a first traffic type (e.g., an ultra-reliable low-latency communications (URLLC) traffic/service type).

In an example, the monitoring the control channel based on the one or more first parameters (e.g., the first monitoring periodicity or the first monitoring periodicity and offset) or the one or more third parameters (e.g., the third monitoring periodicity or the third monitoring periodicity and offset), based on the transmitting the uplink transport block, may be after a first duration/offset from the transmitting the uplink transport block. For example, the first duration/offset may have a pre-configured/pre-determined value. For example, the first duration/offset may be based on a first wireless device capability parameter. The wireless device may transmit a capability message comprising the first wireless device capability parameter to a base station. In response to the transmitting the wireless device capability message indicating the first wireless device capability parameter, the wireless device may receive configuration parameters comprising the one or more parameters indicating the first duration/offset.

Figure 21:
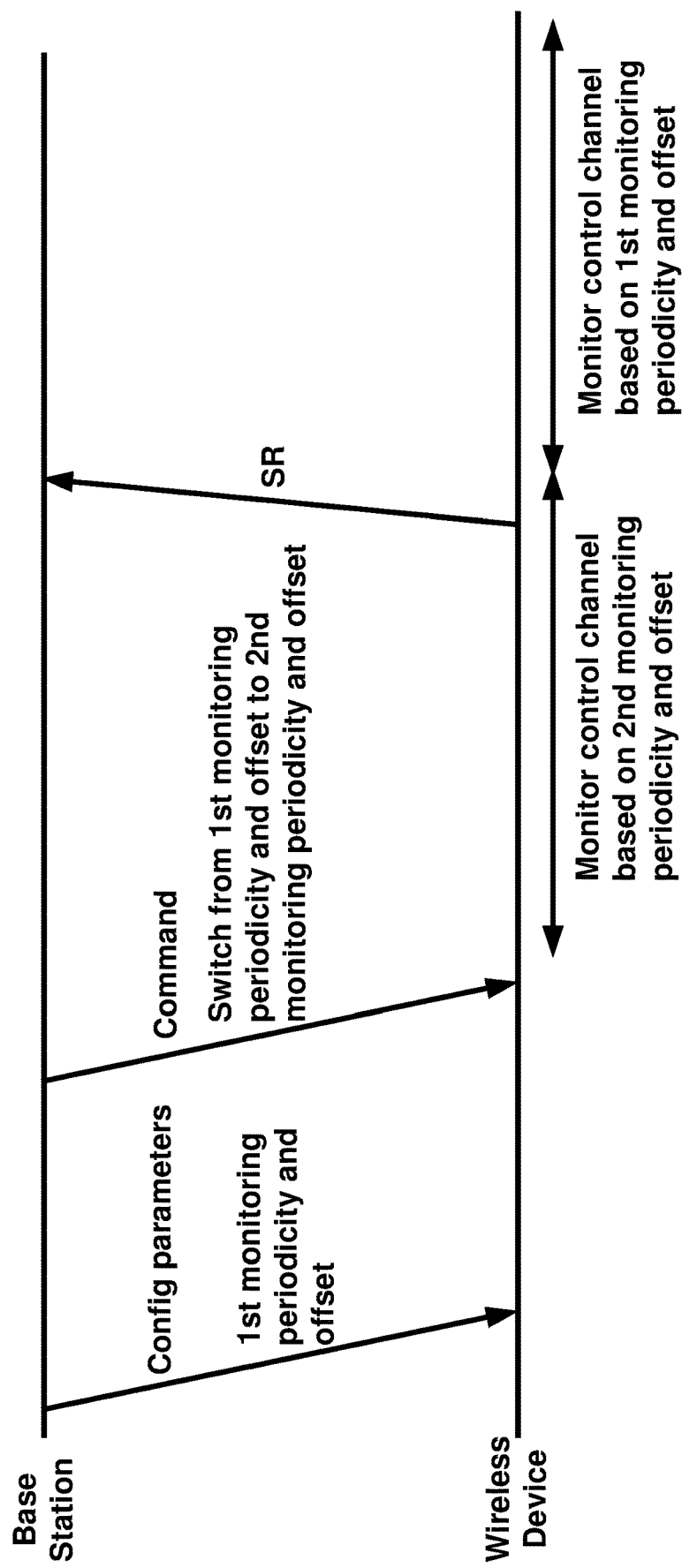
FIG. 21 shows an example process in accordance with several of various embodiments of the present disclosure.

In an example embodiment, as shown in FIG. 21, the wireless device may trigger/transmit a scheduling request. The triggering/transmission of the scheduling request may be based on triggering a buffer status report and no resources being available for transmission of the buffer status report. Based on the triggering/transmitting the scheduling request, the wireless device may switch from the one or more second parameters (e.g., the second monitoring periodicity or the second monitoring periodicity and offset value) to the one or more first parameters (e.g., the first monitoring periodicity or the first monitoring periodicity and offset). Based on the triggering/transmitting the scheduling request and/or based on the switching from the one or more second parameters to the one or more first parameters, the wireless device may monitor the control channel based on the one or more first parameters (e.g., the first monitoring periodicity or the first monitoring periodicity and offset). The wireless device may determine monitoring occasions based on the one or more first parameters (e.g., the first monitoring periodicity or the first monitoring periodicity and offset value).

In an example embodiment, based on the triggering/transmitting the scheduling request, the wireless device may switch from the one or more second parameters (e.g., the second monitoring periodicity or the second monitoring periodicity and offset value) to one or more third parameters (e.g., the third monitoring periodicity or the third monitoring periodicity and offset). Based on the triggering/transmitting the scheduling request and/or based on the switching from the one or more second parameters to the one or more third parameters, the wireless device may monitor the control channel based on one or more third parameters (e.g., the third monitoring periodicity or the third monitoring periodicity and offset). The wireless device may determine monitoring occasions based on the one or more third parameters (e.g., the third monitoring periodicity or the third monitoring periodicity and offset value).

In an example, the switching from the one or more second parameters to the one or more first parameters or the one or more third parameters and/or the monitoring the control channel based on the one or more first parameters or the one or more third parameters may be based on a scheduling request configuration associated with the scheduling request and/or the scheduling request configuration parameters associated with the scheduling request and/or one or more configuration parameters associated with a logical channel corresponding to the scheduling request, wherein the triggering the scheduling request may be based on data becoming available for the logical channel. For example, the switching from the one or more second parameters to the one or more first parameters or from the one or more second parameters to the one or more third parameters and/or the monitoring the control channel based on the one or more first parameters or the one or more third parameters may be based on a value of a first configuration parameter of the scheduling request configuration parameters or a first configuration parameters of the logical channel configuration parameters. In an example, the value of the first configuration parameter may indicate a priority associated with the scheduling request configuration and/or a priority associated with the logical channel. In an example, the switching from the one or more second parameters to the one or more first parameters or from the one or more second parameters to the one or more third parameters and/or the monitoring the control channel based on the one or more first parameters or the one or more third parameters may be based on the scheduling request being associated with beam failure recovery. The wireless device may start a scheduling request for beam failure recovery (e.g., beam failure recovery for a SCell) and while monitoring the control channel based on the one or more second parameters (e.g., second monitoring periodicity or second monitoring periodicity and offset). The wireless device may switch from the one or more second parameters to the one or more first parameters for control channel monitoring based on triggering/transmitting the scheduling request for the beam failure recovery.

In an example, the monitoring the control channel based on the one or more first parameters (e.g., the first monitoring periodicity or the first monitoring periodicity and offset) or the one or more third parameters (e.g., the third monitoring periodicity or the third monitoring periodicity and offset), based on the transmitting/triggering the scheduling request, may be after a first duration/offset from the transmitting/triggering the scheduling request. For example, the first duration/offset may have a pre-configured/pre-determined value. For example, the first duration/offset may be based on a first wireless device capability parameter. The wireless device may transmit a capability message comprising the first wireless device capability parameter to a base station. In response to the transmitting the wireless device capability message indicating the first wireless device capability parameter, the wireless device may receive configuration parameters comprising the one or more parameters indicating the first duration/offset.

Figure 22:
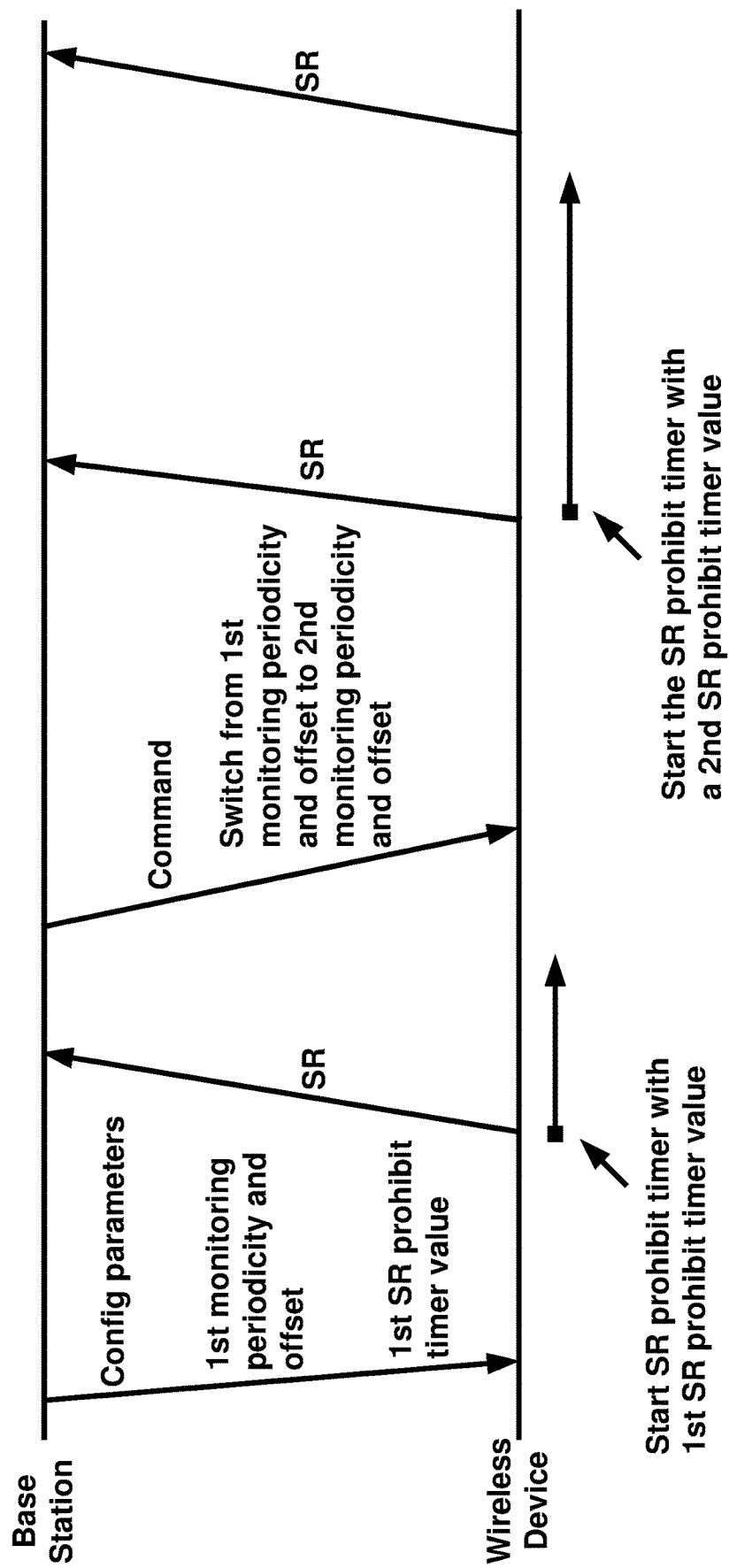
FIG. 22 shows an example process in accordance with several of various embodiments of the present disclosure.

In an example embodiment as shown in FIG. 22, a wireless device may receive configuration parameters comprising one or more first parameters (e.g., a monitoring periodicity value or a monitoring periodicity and offset value) for monitoring a control channel. The configuration parameters may comprise configuration parameters of a scheduling request configuration. The scheduling request configuration parameters may comprise a first scheduling request prohibit timer value for a scheduling request prohibit timer associated with the scheduling request configuration. The wireless device may transmit a first scheduling request, based on one or more conditions and using a scheduling request resource determined based on the scheduling request configuration parameters. Based on the transmitting the first scheduling request, the wireless device may start a scheduling request prohibit timer with the first scheduling request prohibit timer value. The scheduling request prohibit timer may be associated with the scheduling request configuration.

The wireless device may switch from the one or more first parameters to one or more second parameters for determining monitoring occasions for monitoring the control channel. For example, the wireless device may switch from the first monitoring periodicity value to a second monitoring periodicity value for the monitoring periodicity parameter or switch from a first monitoring periodicity and offset value to a second monitoring periodicity value for the monitoring periodicity and offset parameter. In an example, the wireless device may switch from the one or more first parameters to one or more second parameters (e.g., switch from the first monitoring periodicity value to a second monitoring periodicity value for the monitoring periodicity parameter or switch from the first monitoring periodicity and offset value to a second monitoring periodicity value for the monitoring periodicity and offset parameter) based on receiving a command/signaling indicating the switching. In an example, the wireless device may switch the control channel monitoring parameters (e.g., the monitoring periodicity value or the monitoring periodicity and offset value) autonomously, for example based on an expiry of a timer or based on a time duration/time window elapsing or based on other conditions.

The wireless device may transmit a second scheduling request, based on one or more conditions and using a scheduling request resource determined based on the scheduling request configuration parameters. Based on the transmitting the second scheduling request, the wireless device may start the scheduling request prohibit timer with a second scheduling request prohibit timer value. The starting the scheduling request prohibit timer with the second scheduling request prohibit timer value may be based on the switching and/or based on the command/signaling indicating the switching from the one or more first parameters (e.g., the first monitoring periodicity value or the first monitoring periodicity and offset value) to one or more second parameters (e.g., the second monitoring periodicity value or the second monitoring periodicity and offset value) for determining monitoring occasions for monitoring the control channel. The scheduling request prohibit timer may be associated with the scheduling request configuration. The wireless device may transmit a third scheduling request based on the scheduling request prohibit timer expiring.

In an example, the configuration parameters may comprise/indicate the second scheduling request prohibit timer value. The configuration parameters may comprise/indicate the second scheduling request prohibit timer value for the scheduling request prohibit timer associated with the scheduling request configuration. In an example, the second scheduling request prohibit timer value may be based on a command/signaling indicating switching from the one or more first parameters (e.g., the first monitoring periodicity or the first monitoring periodicity and offset) to one or more second parameters (e.g., the second monitoring periodicity or the second monitoring periodicity and offset) for determining monitoring occasions for monitoring the control channel. For example, the configuration parameters may comprise/indicate a plurality of scheduling request prohibit timer values. The command/signaling may indicate the second scheduling request prohibit timer value in the plurality of scheduling request prohibit timer values. The command/signaling may comprise a field, a value of the field indicating (e.g., providing an index to) the second scheduling request prohibit timer in the plurality of the scheduling request prohibit timer values. For example, the second scheduling request prohibit timer value may be based on the first scheduling request prohibit timer value and the command/signaling. For example, the command/signaling may indicate a scaling factor. The second scheduling request prohibit timer value may be based on the first scheduling request prohibit timer value and the scaling factor. In an example, the configuration parameters may comprise/indicate a plurality of scaling factors. The command/signaling may indicate a first scaling factor in the plurality of scaling factors. For example, the command/signaling may comprise a field, a value of the field indicating (e.g., providing an index to) the scaling factor in the plurality of the scaling factors. In an example, the wireless device may determine the second scheduling request prohibit timer value based on the first scheduling request prohibit timer value, the one or more first parameters (e.g., the first monitoring periodicity value or the first monitoring periodicity and offset value) and the one or more second parameters (e.g., the second monitoring periodicity or the second monitoring periodicity and offset value).

Figure 23:
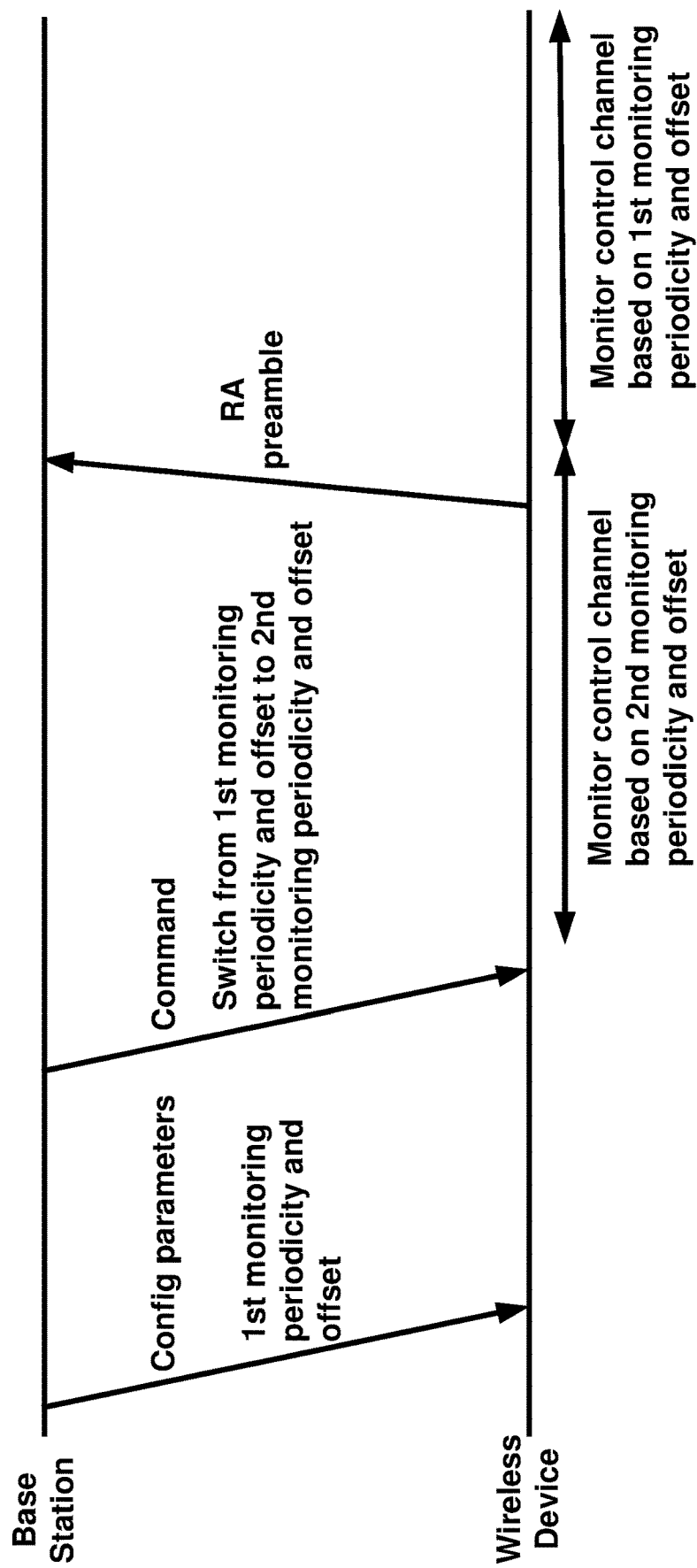
FIG. 23 shows an example process in accordance with several of various embodiments of the present disclosure.

In an example embodiment as shown in FIG. 23, a wireless device may transmit a random access preamble based on starting a random access process. Based on the transmitting the random access preamble, the wireless device may switch from the one or more second parameters (e.g., the second monitoring periodicity or the second monitoring periodicity and offset value) to the one or more first parameters (e.g., the first monitoring periodicity or the first monitoring periodicity and offset). Based on the transmitting the random access preamble and/or based on the switching from the one or more second parameters to the one or more first parameters, the wireless device may monitor the control channel based on the one or more first parameters (e.g., the first monitoring periodicity or the first monitoring periodicity and offset). The wireless device may determine monitoring occasions based on the one or more first parameters (e.g., the first monitoring periodicity or the first monitoring periodicity and offset value).

In an example embodiment, based on the transmitting the random access preamble, the wireless device may switch from the one or more second parameters (e.g., the second monitoring periodicity or the second monitoring periodicity and offset value) to one or more third parameters (e.g., the third monitoring periodicity or the third monitoring periodicity and offset). Based on the transmitting the random access preamble and/or based on the switching from the one or more second parameters to the one or more third parameters, the wireless device may monitor the control channel based on one or more third parameters (e.g., the third monitoring periodicity or the third monitoring periodicity and offset). The wireless device may determine monitoring occasions based on the one or more third parameters (e.g., the third monitoring periodicity or the third monitoring periodicity and offset value).

In an example, the switching from the one or more second parameters to the one or more first parameters or the one or more third parameters and/or the monitoring the control channel based on the one or more first parameters or the one or more third parameters may be based on configuration parameters associated with the random access process. For example, the switching from the one or more second parameters to the one or more first parameters or from the one or more second parameters to the one or more third parameters and/or the monitoring the control channel based on the one or more first parameters or the one or more third parameters may be based on a value of a first configuration parameter of the random access configuration parameters. In an example, the value of the first configuration parameter may indicate a priority associated with the random access process. In an example, the switching from the one or more second parameters to the one or more first parameters or from the one or more second parameters to the one or more third parameters and/or the monitoring the control channel based on the one or more first parameters or the one or more third parameters may be based on the random access process being associated with beam failure recovery. The wireless device may start a random access process for beam failure recovery and while monitoring the control channel based on the one or more second parameters (e.g., second monitoring periodicity or second monitoring periodicity and offset). The wireless device may switch from the one or more second parameters to the one or more first parameters for control channel monitoring based on the starting the random access process or transmitting a random access preamble for the beam failure recovery. In an example, the switching from the one or more second parameters to the one or more first parameters or from the one or more second parameters to the one or more third parameters and/or the monitoring the control channel based on the one or more first parameters or the one or more third parameters may be after transmitting a message or receiving a message associated with the random access process. In an example, the message may be Msg1/preamble. In an example, the message may be Msg2/random access response. In an example, the message may be Msg3.

In an example, the monitoring the control channel based on the one or more first parameters (e.g., the first monitoring periodicity or the first monitoring periodicity and offset) or the one or more third parameters (e.g., the third monitoring periodicity or the third monitoring periodicity and offset), based on the transmitting the random access preamble, may be after a first duration/offset from the transmitting the random access preamble or a message associated with the random access process (e.g., Msg3). For example, the first duration/offset may have a pre-configured/pre-determined value. For example, the first duration/offset may be based on a first wireless device capability parameter. The wireless device may transmit a capability message comprising the first wireless device capability parameter to a base station. In response to the transmitting the wireless device capability message indicating the first wireless device capability parameter, the wireless device may receive configuration parameters comprising the one or more parameters indicating the first duration/offset.

Figure 24:
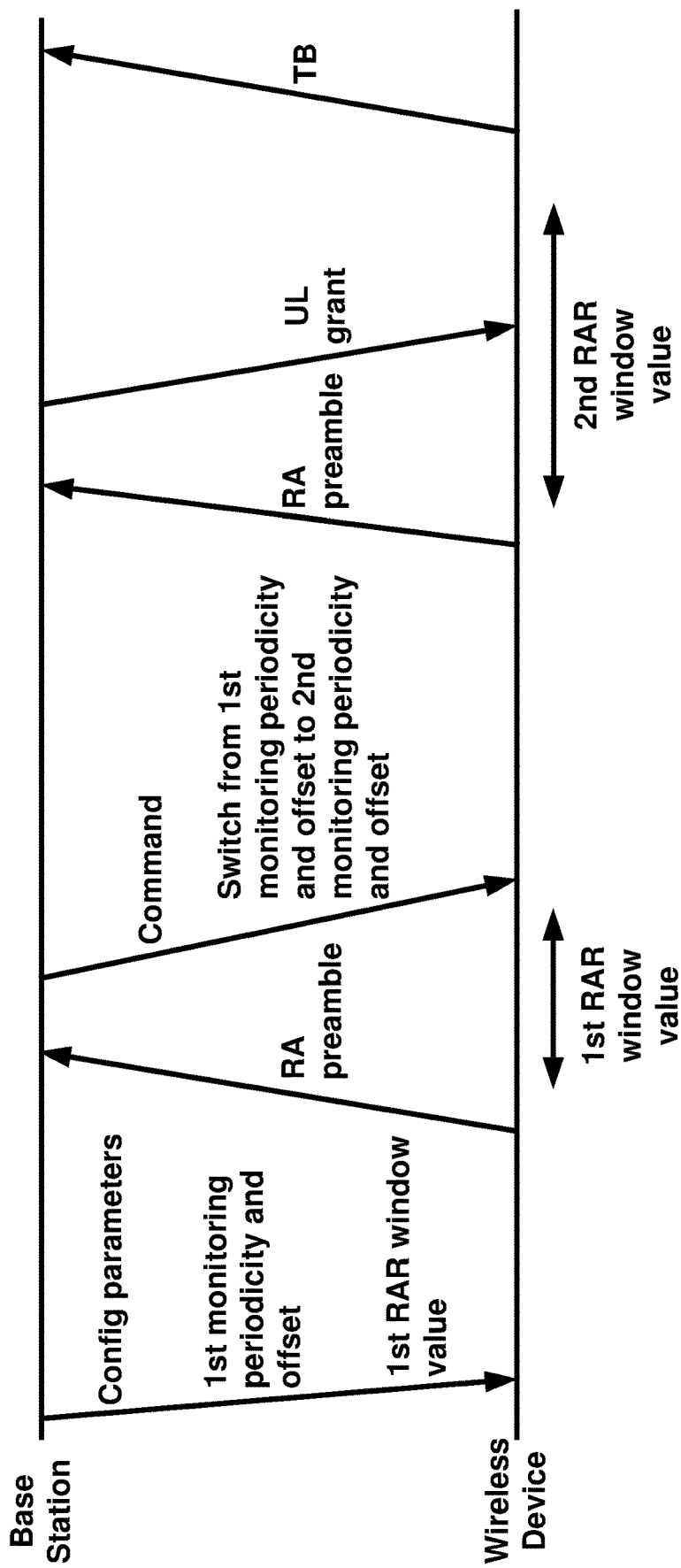
FIG. 24 shows an example process in accordance with several of various embodiments of the present disclosure.

In an example embodiment as shown in FIG. 24, a wireless device may receive configuration parameters. The configuration parameters may comprise one or more first parameters for determining monitoring occasions for monitoring a control channel. The one or more first parameters may comprise a first monitoring periodicity parameter or a first monitoring periodicity and offset parameter. The configuration parameters may comprise random access configuration parameters. The random access configuration parameters may comprise a first random access response window value. The wireless device may start a random access process. The wireless device may transmit a first random access preamble based on the starting the random access process. The wireless device may monitor a control channel based on the first random access response value based on the transmitting the first random access preamble. The wireless device may monitor the control channel for a random access RNTI (RA-RNTI) during a random access response window with the first random access response window value.

The wireless device may switch from the one or more first parameters to one or more second parameters for determining monitoring occasions for control channel monitoring. For example, the wireless device may switch form the first monitoring periodicity value to a second monitoring periodicity value for the monitoring periodicity parameter or the wireless device may switch from the first monitoring periodicity and offset value to a second monitoring periodicity and offset value for the monitoring periodicity and offset parameter. In an example, the switching from the first monitoring periodicity value to a second monitoring periodicity value or from the first monitoring periodicity and offset value to a second monitoring periodicity and offset value may be based on receiving a command/signaling indicating the switching. In an example, the switching form the first monitoring periodicity value to a second monitoring periodicity value or from the first monitoring periodicity and offset value to a second monitoring periodicity and offset value may be performed autonomously by the wireless device (e.g., without receiving a command/signaling from the base station), for example, based on expiry of a timer or based on a time duration/window elapsing.

The wireless device may, after the switching from the one or more first parameters to the one or more second parameters, start a second random access process. The wireless device may transmit a second random access preamble based on starting the second random access process. The wireless device may monitor the control channel based on a second random access response value based on the transmitting the second random access preamble. The wireless device may monitor the control channel for a random access RNTI (RA-RNTI) during a random access response window with the second random access response window value. The wireless device may monitor the control channel for an RA-RNTI during a random access response window with the second random access response window value based on the starting the second random access process/the transmitting the second random access preamble being after switching from the one or more first parameters to the one or more second parameters for the control channel monitoring.

In an example, the configuration parameters may comprise/indicate the second random access response value. In an example, the wireless device may determine the second random access response window value based on the command/signaling indicating the switching from the one or more first parameters to the one or more second parameters for determining monitoring occasions for monitoring the control channel. In an example, the wireless device may determine the second random access response window value based on the command/signaling and the first random access response window value. For example, the command/signaling may indicate a scaling factor. The second random access response window value may be based on the first random access response window value and the scaling factor. In an example, the configuration parameters may comprise/indicate a plurality of scaling factors and the command/signaling may indicate (e.g., provide an index to) a scaling factor in the plurality of scaling factors.

In an example, the configuration parameters may comprise/indicate a plurality of random access response window values. The command/signaling may indicate the second random access response window value in the plurality of random access response values. For example, the command/signaling may comprise a field, the value of the field indicating the second random access response window value. For example, the value of the field may indicate an index to the second random access response window value in the plurality of the random access response window values.

The wireless device may receive an uplink grant based on the monitoring the control channel. The wireless device may receive a random access response based on the monitoring the control channel for RA-RNTI during the random access response window in response to the transmitting the second random access preamble, wherein the random access response may comprise the uplink grant. The wireless device may transmit a transport block based on the uplink grant.

Figure 25:
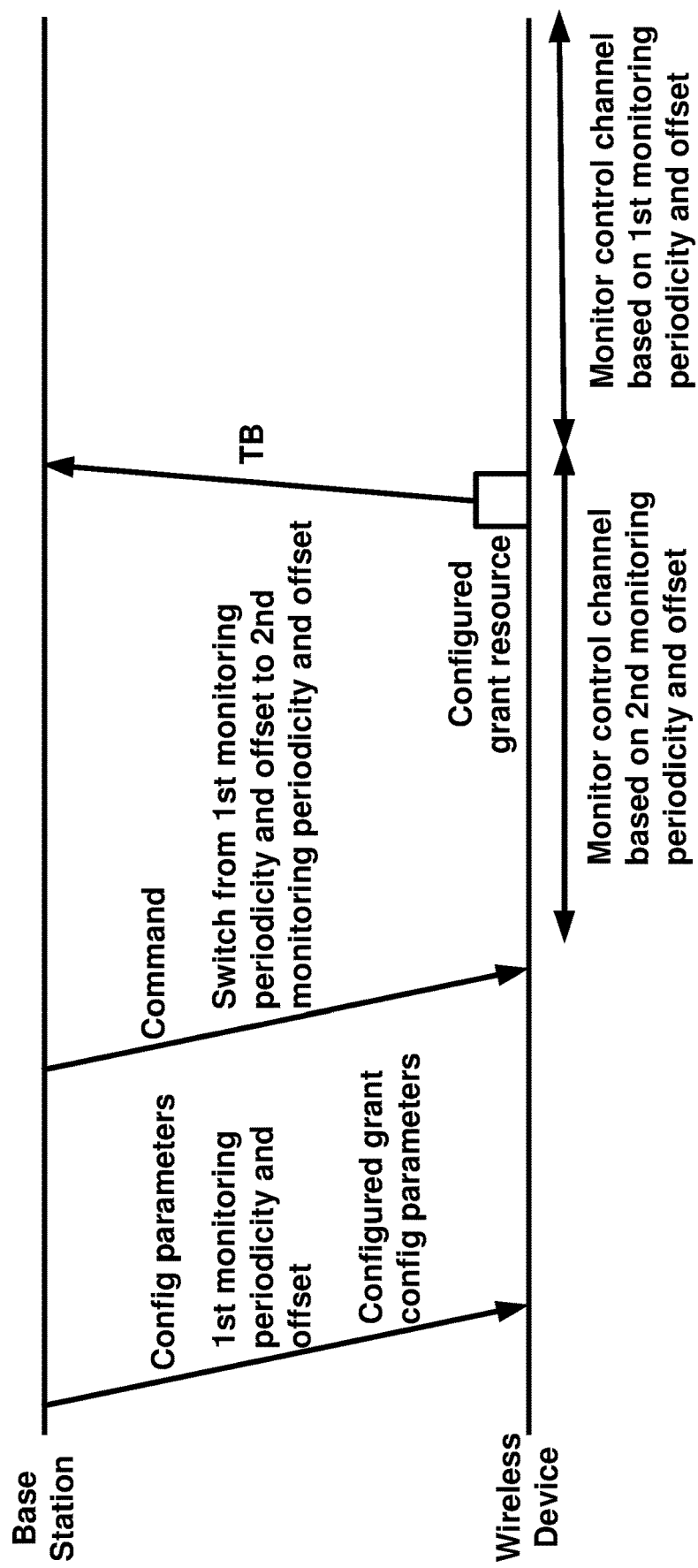
FIG. 25 shows an example process in accordance with several of various embodiments of the present disclosure.

In an example embodiment as shown in FIG. 25, a wireless device may receive configuration parameters. The configuration parameters may comprise one or more first parameters for determining monitoring occasions for monitoring a control channel. The one or more first parameters may comprise a first monitoring periodicity parameter or a first monitoring periodicity and offset parameter. The configuration parameters may comprise first configuration parameters of a configured grant configuration.

The wireless device may switch from the one or more first parameters to one or more second parameters for determining monitoring occasions for control channel monitoring. For example, the wireless device may switch form the first monitoring periodicity value to a second monitoring periodicity value for the monitoring periodicity parameter or the wireless device may switch from the first monitoring periodicity and offset value to a second monitoring periodicity and offset value for the monitoring periodicity and offset parameter. In an example, the switching from the first monitoring periodicity value to a second monitoring periodicity value or from the first monitoring periodicity and offset value to a second monitoring periodicity and offset value may be based on receiving a command/signaling indicating the switching. In an example, the switching form the first monitoring periodicity value to a second monitoring periodicity value or from the first monitoring periodicity and offset value to a second monitoring periodicity and offset value may be performed autonomously by the wireless device (e.g., without receiving a command/signaling from the base station), for example, based on expiry of a timer or based on a time duration/window elapsing. The wireless device may monitor the control channel based on the one or more second parameters (e.g., the second monitoring periodicity or the second monitoring periodicity and offset parameter) in response to the switching from the one or more first parameters to the one or more second parameters (e.g., switching based on the receiving the command/signaling). The wireless device may determine the monitoring occasions for monitoring the control channel based on the one or more second parameters (e.g., the second monitoring periodicity or the second monitoring periodicity and offset parameter) in response to the switching from the one or more first parameters to the one or more second parameters (e.g., switching based on the receiving the command/signaling).

The wireless device may, after the switching from the one or more first parameters to the one or more second parameters for monitoring the control channel, transmit a transport block based on the first configuration parameters of the configured grant configuration. The wireless device may determine radio resources for transmission of the transport block based on the first configuration parameters. For example, the first configuration parameters may comprise a periodicity parameter wherein the transmitting the transport block may be based on the periodicity parameter. In an example, the wireless device may determine time resources for transmission of the transport block based on the periodicity parameter.

Based on the transmitting the transport block associated with the first configuration parameters of the configured grant configuration, the wireless device may switch from the one or more second parameters (e.g., the second monitoring periodicity or the second monitoring periodicity and offset value) to the one or more first parameters (e.g., the first monitoring periodicity or the first monitoring periodicity and offset). Based on the transmitting the transport block and/or based on the switching from the one or more second parameters to the one or more first parameters, the wireless device may monitor the control channel based on one or more first parameters (e.g., the first monitoring periodicity or the first monitoring periodicity and offset). The wireless device may determine monitoring occasions based on the one or more first parameters (e.g., the first monitoring periodicity or the first monitoring periodicity and offset value).

In an example, based on the transmitting the transport block associated with the first configuration parameters of the configured grant configuration, the wireless device may switch from the one or more second parameters (e.g., the second monitoring periodicity or the second monitoring periodicity and offset value) to one or more third parameters (e.g., a third monitoring periodicity or a third monitoring periodicity and offset). In an example, the wireless device may determine/derive the one or more third parameters based on/from the one or more first parameters. Based on the transmitting the transport block and/or based on the switching from the one or more second parameters to the one or more third parameters, the wireless device may monitor the control channel based on one or more third parameters (e.g., the third monitoring periodicity or the third monitoring periodicity and offset). The wireless device may determine monitoring occasions based on the one or more third parameters (e.g., the third monitoring periodicity or the third monitoring periodicity and offset value).

In an example, switching from the one or more second parameters (e.g., the second monitoring periodicity or the second monitoring periodicity and offset) to the one or more first parameters (e.g., the first monitoring periodicity or the first monitoring periodicity and offset) or the one or more third parameters (e.g., the third monitoring periodicity or the third monitoring periodicity and offset), may be based on the first configuration parameters of the configured grant configuration (e.g., based on a value of a configuration parameter of the first configuration parameters). For example, the value of the configuration parameter may indicate a priority associated with the configured grant configuration.

In an example, switching from the one or more second parameters (e.g., the second monitoring periodicity or the second monitoring periodicity and offset) to the one or more first parameters (e.g., the first monitoring periodicity or the first monitoring periodicity and offset) or the one or more third parameters (e.g., the third monitoring periodicity or the third monitoring periodicity and offset), may be after a first duration/offset from the transmitting the transport block. For example, the first duration/offset may have a pre-configured/pre-determined value. For example, the first duration/offset may be based on a first wireless device capability parameter. The wireless device may transmit a capability message comprising the first wireless device capability parameter to a base station. In response to the transmitting the wireless device capability message indicating the first wireless device capability parameter, the wireless device may receive configuration parameters comprising the one or more parameters indicating the first duration/offset.

Figure 26:
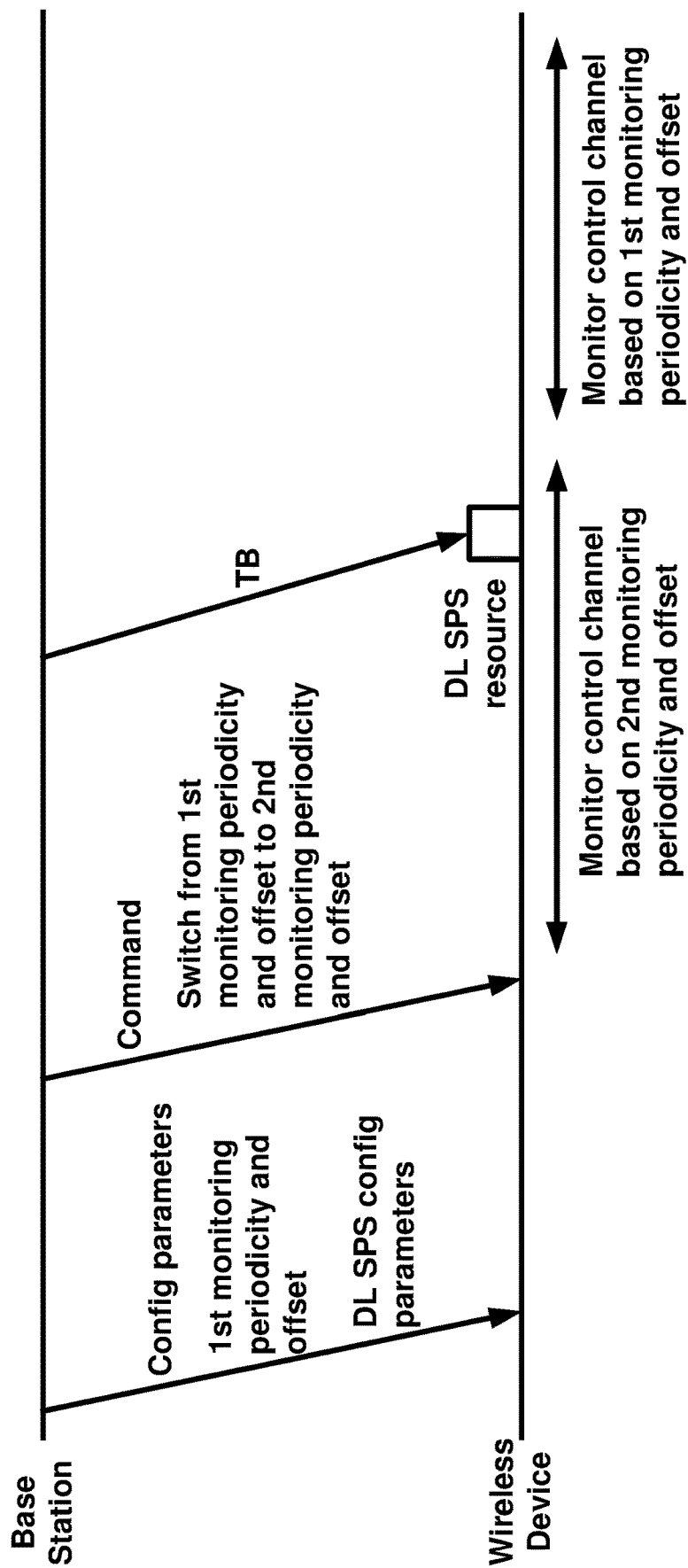
FIG. 26 shows an example process in accordance with several of various embodiments of the present disclosure.

In an example embodiment as shown in FIG. 26, a wireless device may receive configuration parameters. The configuration parameters may comprise one or more first parameters for determining monitoring occasions for monitoring a control channel. The one or more first parameters may comprise a first monitoring periodicity parameter or a first monitoring periodicity and offset parameter. The configuration parameters may comprise first configuration parameters of a semi-persistent scheduling configuration.

The wireless device may switch from the one or more first parameters to one or more second parameters for determining monitoring occasions for control channel monitoring. For example, the wireless device may switch form the first monitoring periodicity value to a second monitoring periodicity value for the monitoring periodicity parameter or the wireless device may switch from the first monitoring periodicity and offset value to a second monitoring periodicity and offset value for the monitoring periodicity and offset parameter. In an example, the switching from the first monitoring periodicity value to a second monitoring periodicity value or from the first monitoring periodicity and offset value to a second monitoring periodicity and offset value may be based on receiving a command/signaling indicating the switching. In an example, the switching form the first monitoring periodicity value to a second monitoring periodicity value or from the first monitoring periodicity and offset value to a second monitoring periodicity and offset value may be performed autonomously by the wireless device (e.g., without receiving a command/signaling from the base station), for example, based on expiry of a timer or based on a time duration/window elapsing. The wireless device may monitor the control channel based on the one or more second parameters (e.g., the second monitoring periodicity or the second monitoring periodicity and offset parameter) in response to the switching from the one or more first parameters to the one or more second parameters (e.g., switching based on the receiving the command/signaling). The wireless device may determine the monitoring occasions for monitoring the control channel based on the one or more second parameters (e.g., the second monitoring periodicity or the second monitoring periodicity and offset parameter) in response to the switching from the one or more first parameters to the one or more second parameters (e.g., switching based on the receiving the command/signaling).

The wireless device may, after the switching from the one or more first parameters to the one or more second parameters for monitoring the control channel, receive a transport block based on the first configuration parameters of the semi-persistent scheduling configuration. The wireless device may determine radio resources for receiving the transport block based on the first configuration parameters. For example, the first configuration parameters may comprise a periodicity parameter wherein the receiving the transport block may be based on the periodicity parameter. In an example, the wireless device may determine time resources for reception of the transport block based on the periodicity parameter.

Based on the receiving the transport block associated with the first configuration parameters of the semi-persistent scheduling configuration, the wireless device may switch from the one or more second parameters (e.g., the second monitoring periodicity or the second monitoring periodicity and offset value) to the one or more first parameters (e.g., the first monitoring periodicity or the first monitoring periodicity and offset). Based on the receiving the transport block and/or based on the switching from the one or more second parameters to the one or more first parameters, the wireless device may monitor the control channel based on one or more first parameters (e.g., the first monitoring periodicity or the first monitoring periodicity and offset). The wireless device may determine monitoring occasions based on the one or more first parameters (e.g., the first monitoring periodicity or the first monitoring periodicity and offset value).

In an example, based on the receiving the transport block associated with the first configuration parameters of the semi-persistent scheduling configuration, the wireless device may switch from the one or more second parameters (e.g., the second monitoring periodicity or the second monitoring periodicity and offset value) to one or more third parameters (e.g., a third monitoring periodicity or a third monitoring periodicity and offset). In an example, the wireless device may determine/derive the one or more third parameters based on/from the one or more first parameters. Based on the receiving the transport block and/or based on the switching from the one or more second parameters to the one or more third parameters, the wireless device may monitor the control channel based on one or more third parameters (e.g., the third monitoring periodicity or the third monitoring periodicity and offset). The wireless device may determine monitoring occasions based on the one or more third parameters (e.g., the third monitoring periodicity or the third monitoring periodicity and offset value).

In an example, switching from the one or more second parameters (e.g., the second monitoring periodicity or the second monitoring periodicity and offset) to the one or more first parameters (e.g., the first monitoring periodicity or the first monitoring periodicity and offset) or the one or more third parameters (e.g., the third monitoring periodicity or the third monitoring periodicity and offset), may be based on the first configuration parameters of the semi-persistent scheduling configuration (e.g., based on a value of a configuration parameter of the first configuration parameters). For example, the value of the configuration parameter may indicate a priority associated with the configured grant configuration.

In an example, switching from the one or more second parameters (e.g., the second monitoring periodicity or the second monitoring periodicity and offset) to the one or more first parameters (e.g., the first monitoring periodicity or the first monitoring periodicity and offset) or the one or more third parameters (e.g., the third monitoring periodicity or the third monitoring periodicity and offset), may be after a first duration/offset from the receiving the transport block. For example, the first duration/offset may have a pre-configured/pre-determined value. For example, the first duration/offset may be based on a first wireless device capability parameter. The wireless device may transmit a capability message comprising the first wireless device capability parameter to a base station. In response to the transmitting the wireless device capability message indicating the first wireless device capability parameter, the wireless device may receive configuration parameters comprising the one or more parameters indicating the first duration/offset.

Figure 27:
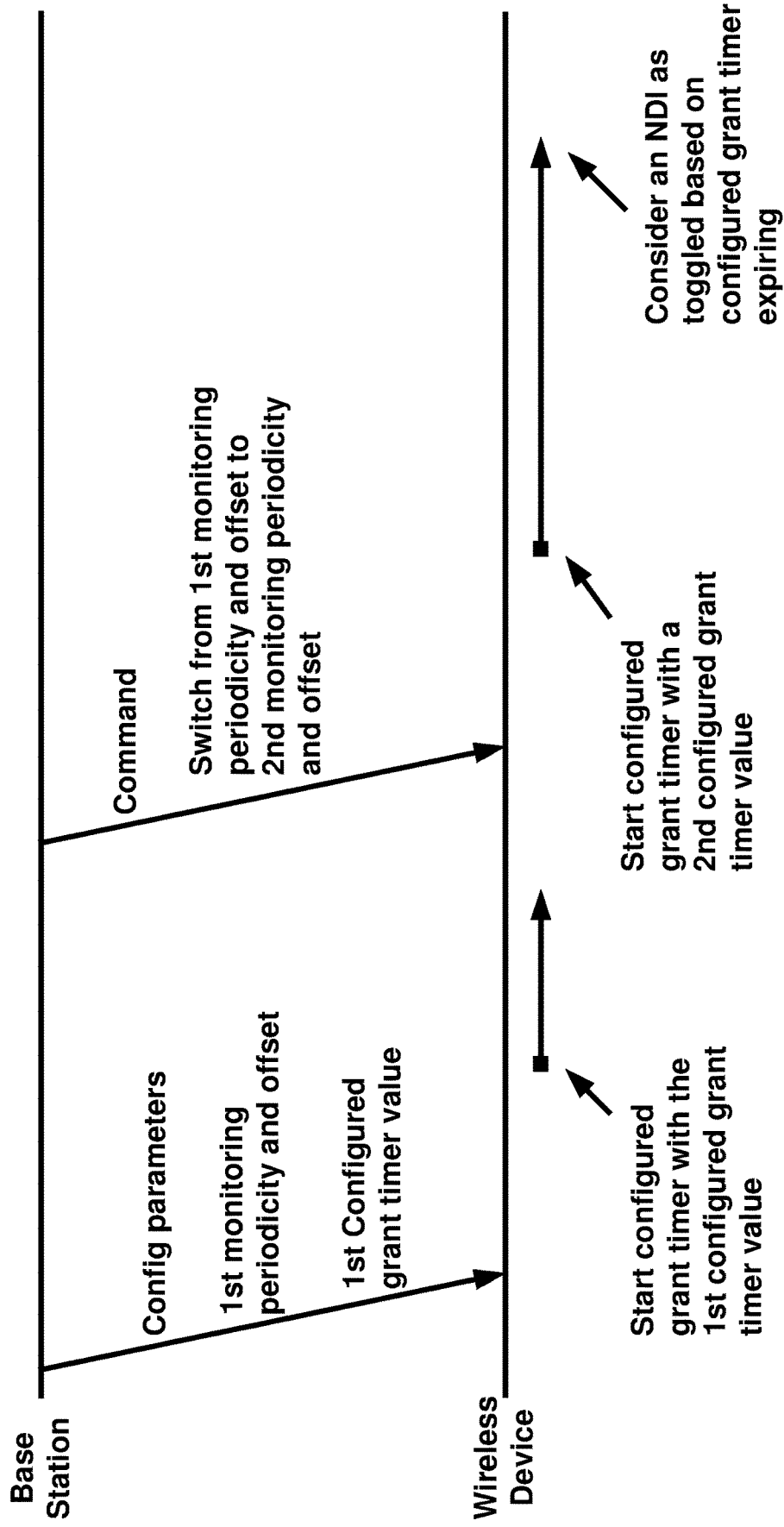
FIG. 27 shows an example process in accordance with several of various embodiments of the present disclosure.

In an example embodiment as shown in FIG. 27, a wireless device may receive configuration parameters. The configuration parameters may comprise one or more first parameters for determining monitoring occasions for monitoring a control channel. The one or more first parameters may comprise a first monitoring periodicity parameter or a first monitoring periodicity and offset parameter. The configuration parameters may comprise a first configured grant timer value. The wireless device may start a configured grant timer with the first configured grant timer value based on one or more conditions. The configured grant timer may be associated with a HARQ process identifier. The HARQ process identifier may be configured for a configured grant configuration. A configured grant configuration may be associated with a plurality of HARQ process identifiers comprising the HARQ process identifier.

The wireless device may switch from the one or more first parameters to one or more second parameters for determining monitoring occasions for control channel monitoring. For example, the wireless device may switch form the first monitoring periodicity value to a second monitoring periodicity value for the monitoring periodicity parameter or the wireless device may switch from the first monitoring periodicity and offset value to a second monitoring periodicity and offset value for the monitoring periodicity and offset parameter. In an example, the switching from the first monitoring periodicity value to a second monitoring periodicity value or from the first monitoring periodicity and offset value to a second monitoring periodicity and offset value may be based on receiving a command/signaling indicating the switching. In an example, the switching form the first monitoring periodicity value to a second monitoring periodicity value or from the first monitoring periodicity and offset value to a second monitoring periodicity and offset value may be performed autonomously by the wireless device (e.g., without receiving a command/signaling from the base station), for example, based on expiry of a timer or based on a time duration/window elapsing. The wireless device may monitor the control channel based on the one or more second parameters (e.g., the second monitoring periodicity or the second monitoring periodicity and offset parameter) in response to the switching from the one or more first parameters to the one or more second parameters (e.g., switching based on the receiving the command/signaling). The wireless device may determine the monitoring occasions for monitoring the control channel based on the one or more second parameters (e.g., the second monitoring periodicity or the second monitoring periodicity and offset parameter) in response to the switching from the one or more first parameters to the one or more second parameters (e.g., switching based on the receiving the command/signaling).

The wireless device may, after the switching from the one or more first parameters to the one or more second parameters for monitoring the control channel, start a configured grant timer with a second configured grant timer value based on one or more conditions. The configured grant timer may be associated with a HARQ process identifier. The HARQ process identifier may be configured for a configured grant configuration. A configured grant configuration may be associated with a plurality of HARQ process identifiers comprising the HARQ process identifier. Based on the configured grant timer not running, the wireless device may consider a new data indicator as toggled.

In an example, the configuration parameters may comprise/indicate the second configured grant timer value. For example, the configuration parameters may comprise first configuration parameters of a configured grant configuration. The first configuration parameters may comprise the second configured grant timer value. In an example, the first configuration parameters may comprise a plurality of configured timer values associated with a plurality of monitoring periodicity values and/or a plurality of monitoring periodicity and offset values. In an example, the first configuration parameters of the configured grant configuration may comprise/indicate the first configured grant timer value and may indicate a priority associated with the configured grant configuration. For example, the first configuration parameters may comprise a first parameter indicating the priority associated with the configured grant configuration. The starting the configured gran timer, after the switching from the one or more first parameters to the one or more second parameters for monitoring the control channel, with the second configured grant timer value may be based on the priority associated with the configured grant configuration.

In an example, the second configured grant timer value may be based on the first configured grant timer value and the command/signaling indicating the switching from the one or more first parameters to the one or more second parameters for control channel monitoring. For example, the command/signaling may comprise a field, wherein the second configured grant timer value may be based on the first configured grant timer value and a value of the field. For example, the configuration parameters may comprise a plurality of configured grant timer values. The command/signaling may indicate the second configured grant timer value in the plurality of configured timer values. The command/signaling may comprise a field, a value of the field indicating (e.g., providing an index to) the second configured timer value in the plurality of configured grant timer values.

Figure 28:
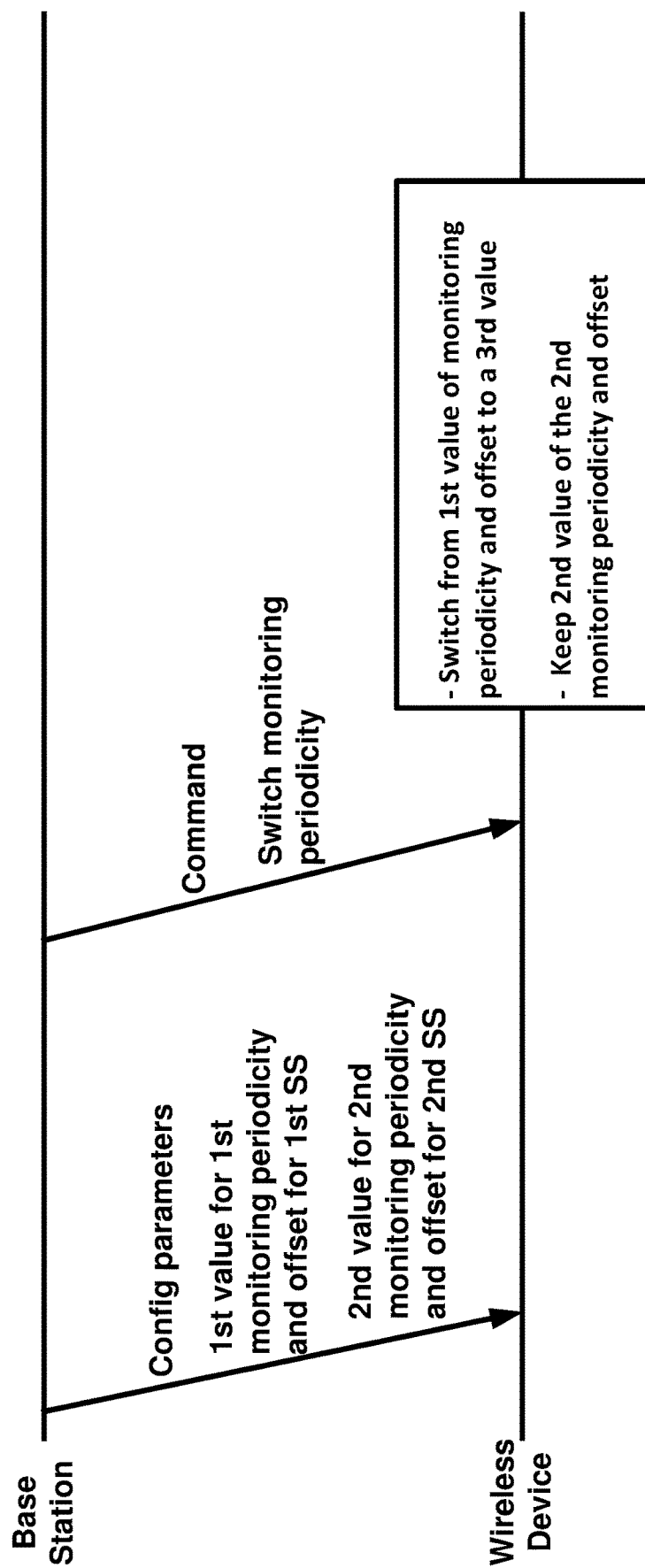
FIG. 28 shows an example process in accordance with several of various embodiments of the present disclosure.

In an example embodiment as shown in FIG. 28, a wireless device may receive configuration parameters. The configuration parameters may comprise one or more first values for one or more first parameters for monitoring a control channel on a first search space set. The one or more first parameters may comprise a first monitoring periodicity parameter or a first monitoring periodicity and offset parameter. The configuration parameters may comprise one or more second values for one or more second parameters for monitoring a control channel on a second search space set. The one or more second parameters may comprise a second monitoring periodicity parameter or a second monitoring periodicity and offset parameter.

The wireless device may determine switching the parameters for control channel monitoring (e.g., the monitoring periodicity or the monitoring periodicity and offset). In an example, the wireless device may receive a command/signaling indicating the switching the parameters for the control channel monitoring. The wireless device may determine the switching based on receiving a command/signaling. In an example, the wireless device may determine the switching autonomously (e.g., without receiving a command/signaling), for example, based on an expiry timer or a time window/duration elapsing.

Based on the determining to switch the parameters for control channel monitoring (e.g., in response to receiving the command/signaling indicating the switching), the wireless device may switch from the one or more first values of the one or more first parameters (e.g., the first monitoring periodicity parameter or the first monitoring periodicity and offset parameter) to one or more third value of the one or more first parameters. Based on the determining to switch the parameters for control channel monitoring (e.g., in response to receiving the command/signaling indicating the switching), the wireless device may not switch (e.g., may keep/maintain) the one or more second values of the one or more second parameters (e.g., the second monitoring periodicity parameter or the second monitoring periodicity and offset parameter).

In an example, the switching the one or more first values of the one or more first parameters to the one or more third values and not switching (e.g., keeping/maintaining) the one or more second values of the one or more second parameters may be based on a first type of the first search space set and/or a second type of the second search space set. For example, the first search space may be a wireless device specific (UE specific) search space. For example, the second search space may be a group common/common search space. For example, the second search space may be a common search for receiving downlink control information during a random access process (e.g., associated with an RA-RNTI). For example, the second search space may be a common search space for receiving downlink control information associated with at least one of INT-RNTI, SFI-RNTI, TPC-PUSCH-RNTI, TPC-PUCCH-RNTI and TPC-SRS-RNTI. For example, the second search space may be for receiving system information associated with system information RNTI (SI-RNTI). For example, the second search space may be for receiving downlink control information associated with a paging RNTI (P-RNTI).

In an example, P-RNTI may be used for the reception of paging in the downlink. In an example, the P-RNTI may be used to inform the wireless devices about system information (SI) modifications using Short Message transmitted with P-RNTI over DCI. The Paging messages and Short Messages may be addressed to P-RNTI on PDCCH. The paging may be sent on PCCH logical channel. The SI modification may be sent over PDCCH directly. In an example, PDCCH DCI format 1_0 may be used for paging and notification for SI modifications purposes. The paging message may be carried by PCCH logical channel which may be mapped to PCH transport channel. The PCH transport channel may be mapped to PDSCH physical channel. The bae station may scramble the CRC for PDCCH with P-RNTI for transmission of PDSCH that carries paging information.

In an example, the SI-RNTI may be used for identification of Broadcast and System Information in the downlink. In an example, PDCCH DCI format 1_0 may be used for SI purpose. In an example, broadcast of System Information may use BCCH logical channel which may be mapped to DL-SCH transport channel mapped to PDSCH physical channel. In an example, the UE may receive the PDCCH scrambled with SI-RNTI in the PDCCH monitoring occasion(s) for SI message acquisition, from the start of the SI-window and continue until the end of the SI-window or until the SI message was received. If the SI message was not received by the end of the SI-window, the wireless device may repeat reception at the next SI-window occasion for the concerned SI message in the current modification period.

In an example, SFI-RNTI may be used for the notification of slot format information over PDCCH and may be assigned to a group of UEs. In an example, the DCI format 2_0 may be used to dynamically change the slot format. In an example, DCI format 2_0 whose CRC scrambled by SFI-RNTI may carry Slot format indicator 1, Slot format indicator 2, . . . , Slot format indicator N. The size of DCI format 2_0 may be configurable by RRC layer.

An RRC parameter positionInDCI may indicate the starting position bit of the slotFormatCombinationId (SFI-Index) for this serving cell (servingCellId) within the DCI payload. The base station may configure the UE with SFI-RNTI via RRC configuration within the IE SlotFormatIndicator which may carry information about total length of the DCI payload scrambled with SFI-RNTI (dci-PayloadSize).

In an example, INT-RNTI may be used for the identification of preemption in the downlink. The base station may preempt an ongoing PDSCH transmission. The base station may configure UEs to monitor interrupted transmission indications using INT-RNTI on a PDCCH. If a UE receives the interrupted transmission indication, the UE may assume that no useful information to that UE was carried by the resource elements included in the indication, even if some of the resource elements were already scheduled to this UE. In an example, the DCI format 2_1 may be used for notifying the PRB(s) and symbol(s) where UE may assume no transmission is intended for the UE. In an example, INT-RNTI may be assigned to a group of UEs. The base station may configure INT-RNTI and other parameters related to preemption in the IE DownlinkPreemption within PDCCH-Config IE.

In an example, TPC-PUSCH-RNTI and TPC-PUCCH-RNTI may be used for PUSCH and PUCCH power control purposes respectively. The DCI format 2_2 may be used for the transmission of TPC commands for PUCCH and PUSCH. The TPC RNTI may be assigned to a group of UEs. DCI format 2_2 with CRC scrambled by TPC-PUSCH-RNTI or TPC-PUCCH-RNTI may carry TPC commands for N UEs by means of block number 1, block number 2, . . . , block number N. For a specific UE, the parameter tpc-PUSCH or tpc-PUCCH configured by the base station may determine the index to the block number. The base station may configure the UE with TPC-PUSCH-RNTI or TPC-PUCCH-RNTI using IE PhysicalCellGroupConfig via RRC configuration through IE PhysicalCellGroupConfig.

Figure 29:
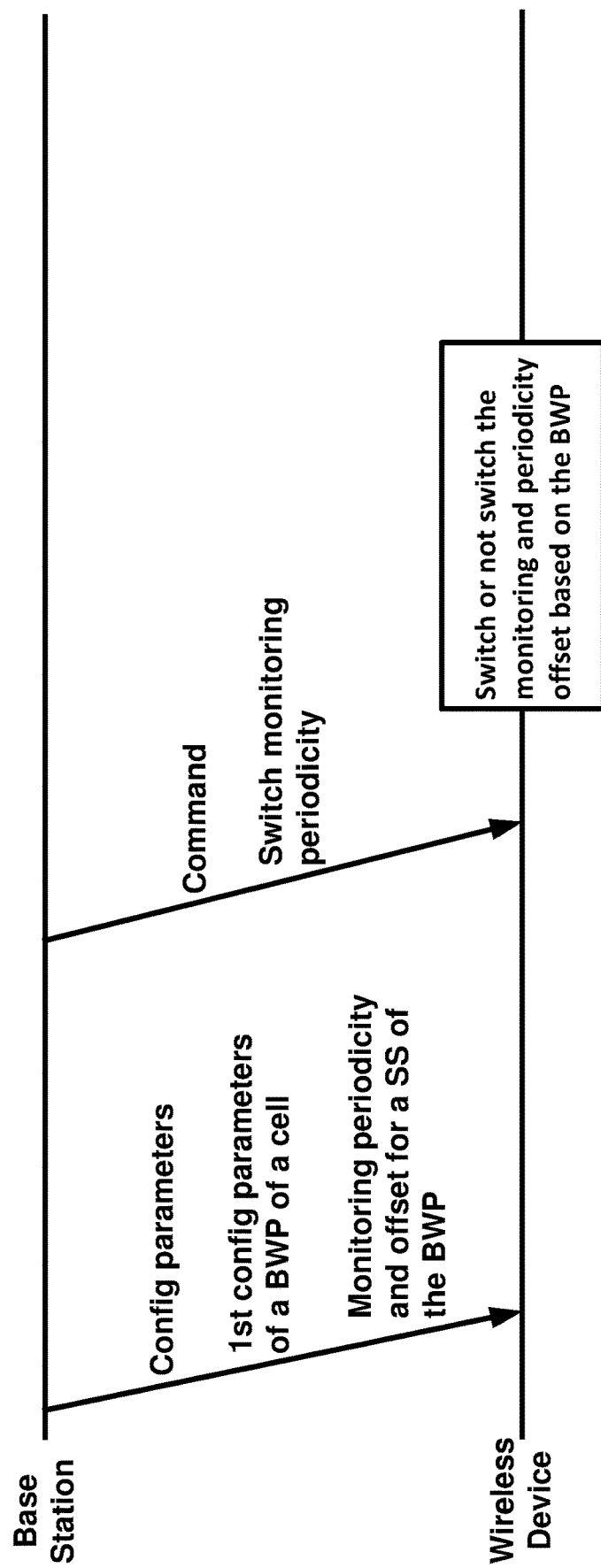
FIG. 29 shows an example process in accordance with several of various embodiments of the present disclosure.

In an example embodiment, as shown in FIG. 29, a wireless device may receive configuration parameters. The configuration parameters may comprise first configuration parameters of a bandwidth part of a cell. The configuration parameters may comprise one or more parameters for monitoring a control channel on a search space of the bandwidth part. The wireless device may determine monitoring occasions for monitoring the control channel based on the one or more parameters. The one or more parameters may comprise a monitoring periodicity or a monitoring periodicity and offset parameter.

The wireless device may receive a command/signaling indicating switching the parameters (e.g., the monitoring periodicity parameter or the monitoring periodicity and offset parameter) for the control channel monitoring. In response to the receiving the command/signaling, the wireless device may switch or not switch the parameters (e.g., the monitoring periodicity parameter or the monitoring periodicity and offset parameter) for the control channel monitoring based on the bandwidth part of the cell. In an example, the switching or not switching may be based on a type of the bandwidth part. For example, the switching or not switching may be based on the bandwidth part being a default bandwidth part or not. In an example, the switching or not may be based on one or more parameters associated with the bandwidth part. For example, the switching or not switching may be based on a numerology of the bandwidth part (e.g., a subcarrier spacing/symbol duration associated with the bandwidth part).

Figure 30:
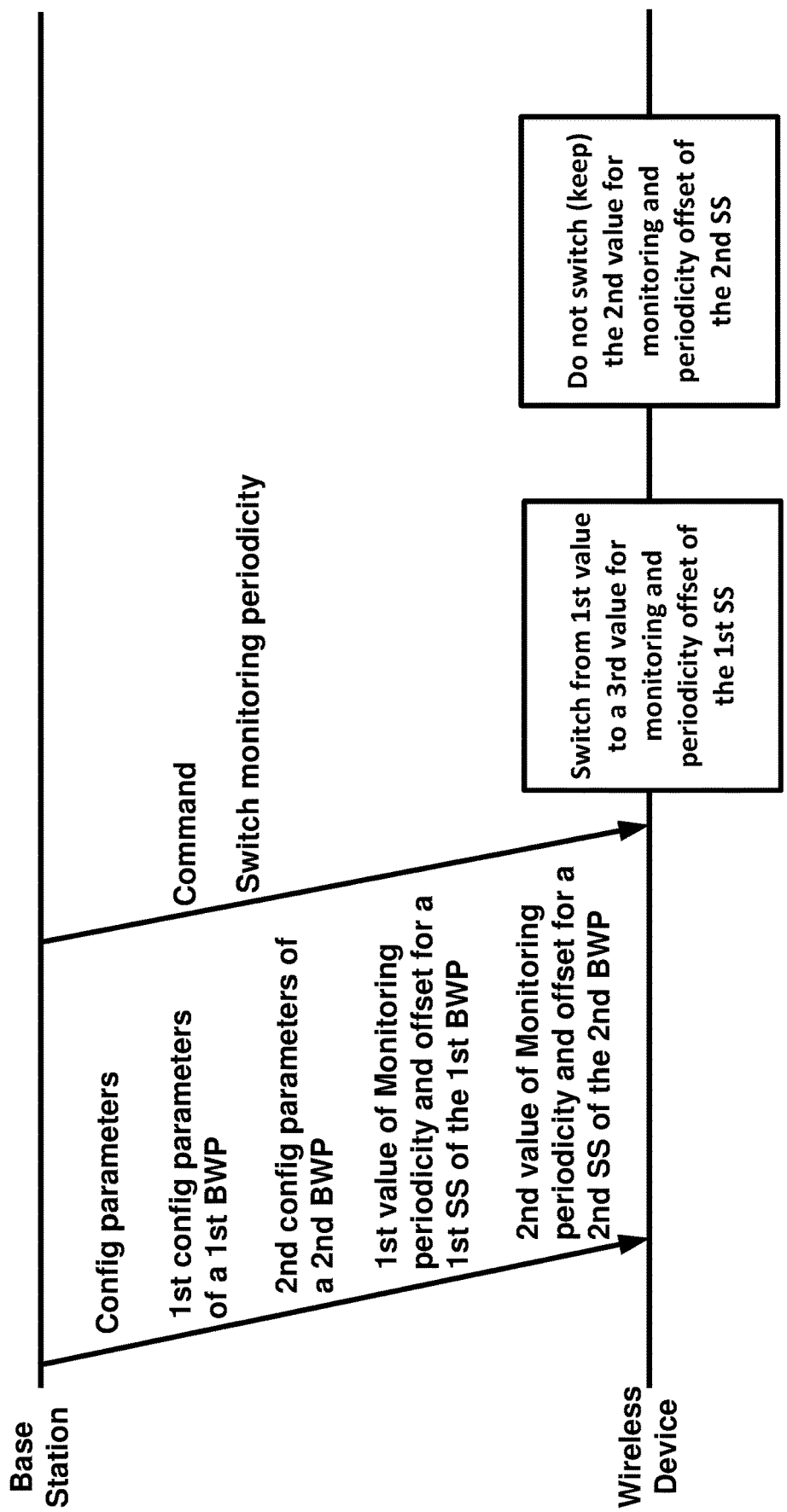
FIG. 30 shows an example process in accordance with several of various embodiments of the present disclosure.

In an example embodiment as shown in FIG. 30, a wireless device may receive configuration parameters. The configuration parameters may comprise first configuration parameters of a first bandwidth part. The configuration parameters may comprise second configuration parameters of a second bandwidth part. The configuration parameters may comprise one or more first values for one or more first parameters for monitoring a control channel on a first search space set of the first bandwidth part. The wireless device may determine one or more monitoring occasions for monitoring the control channel on the first search space set based on the one or more first parameters. The one or more first parameters may comprise a first monitoring periodicity parameter or a first monitoring periodicity and offset parameter for the first search space. The configuration parameters may comprise one or more second values for one or more second parameters for monitoring a control channel on a second search space set of the second bandwidth part. The wireless device may determine one or more monitoring occasions for monitoring the control channel on the second search space set based on the one or more second parameters. The one or more second parameters may comprise a second monitoring periodicity parameter or a second monitoring periodicity and offset parameter for the second search space.

The wireless device may receive a command/signaling indicating switching the parameters (e.g., the monitoring periodicity parameter or the monitoring periodicity and offset parameter) for the control channel monitoring. In response to the receiving the command/signaling, the wireless device may switch from the one or more first values for the one or more first parameters to one or more third values.

For example, in response to the receiving the signaling/command, the wireless device may switch from the first value of the monitoring periodicity parameter to a third value of the monitoring periodicity parameter. For example, in response to the receiving the signaling/command, the wireless device may switch from the first value of the monitoring periodicity and offset parameter to a third value of the monitoring periodicity and offset parameter. In response to the receiving the command/signaling, the wireless device may not switch (e.g., may keep/maintain) the one or more second values of the one or more second parameters (e.g., the second monitoring periodicity parameter or the second monitoring periodicity and offset parameter) for monitoring the control channel on the second search space set of the second bandwidth part.

In an example, the first bandwidth part may be a first type bandwidth part and the second bandwidth part may be a second type bandwidth part. For example, the first bandwidth part may be a non-default bandwidth part and the second bandwidth part may be default bandwidth part. In an example, the first bandwidth part may be associated with one or more first parameters (e.g., a first numerology (e.g., first subcarrier spacing, first symbol duration), etc.) and the second bandwidth part may be associated with one or more second parameters (e.g., second numerology (e.g., second subcarrier spacing, second symbol duration), etc.)

In an example, the first bandwidth part may be for a first cell and the second bandwidth part may be for a second cell. For example, the first cell may be a secondary cell and the second cell may be a primary cell.

Figure 31:
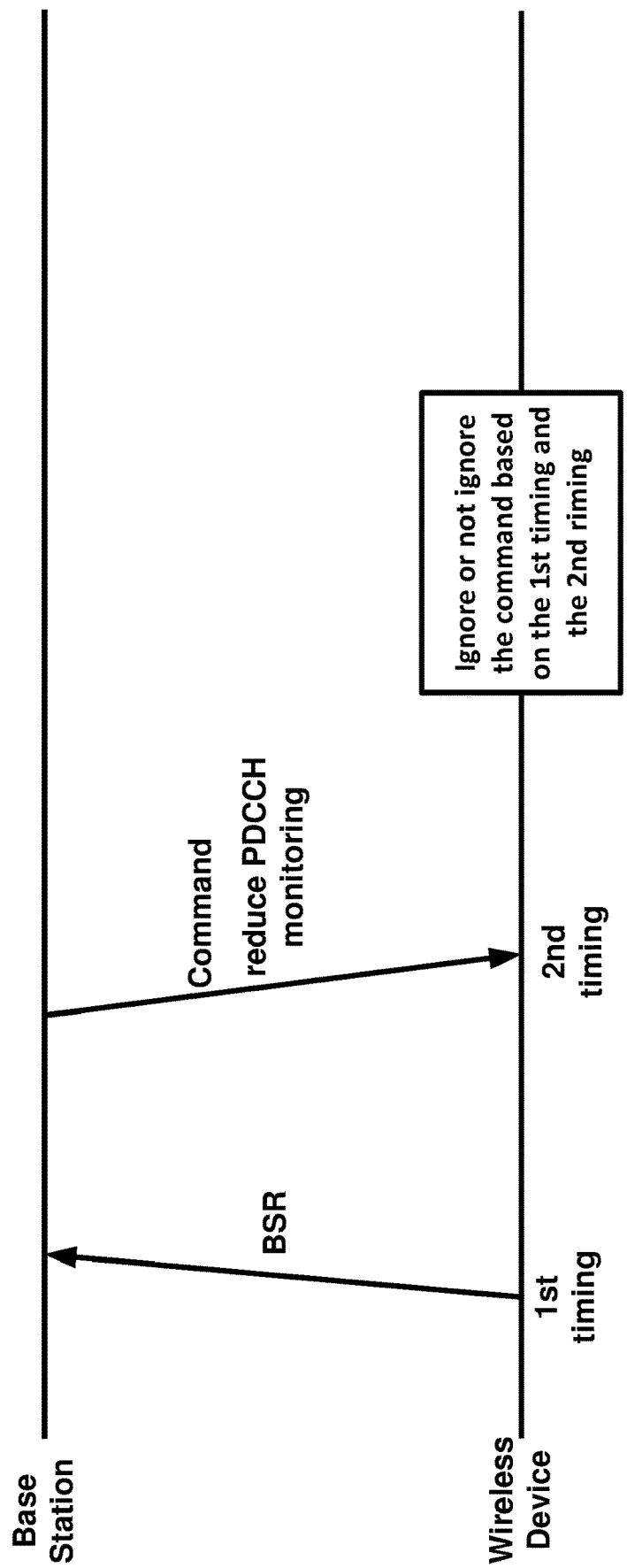
FIG. 31 shows an example process in accordance with several of various embodiments of the present disclosure.

In an example embodiment as shown in FIG. 31, a wireless device may trigger a buffer status report based on one or more BSR trigger conditions. The wireless device may transmit the buffer status report. The wireless device may create an uplink transport block wherein the uplink transport block may comprise the buffer status report. The wireless device may transmit the uplink transport block, comprising the buffer status report, based on an uplink grant. The uplink grant may be a configured grant or a dynamic grant. The uplink grant may indicate radio resources for transmission of the transport block comprising the buffer status report. The uplink grant may indicate transmission of the transport block, comprising the buffer status report, in a first timing. The first timing may comprise one or more symbol durations (e.g., a slot or a mini-slot of one or more symbols) and may start at a first symbol and end at a second symbol.

The wireless device may receive a command/signaling indicating reducing monitoring a control channel. The wireless device may receive the command/signaling after transmission of the buffer status report. The wireless device may receive the command/signaling at a second timing. The second timing may comprise one or more symbol durations and may start at a third symbol and end at a fourth symbol. In an example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command signaling may indicate reducing monitoring the control channel by indicating a switching in a monitoring periodicity or switching a monitoring periodicity and offset. For example, the command/ signaling may indicate switching from a first monitoring periodicity or a first monitoring periodicity and offset to a second monitoring periodicity or a second monitoring periodicity and offset.

The wireless device may ignore or not ignore the command/signaling based on the first timing and the second timing. For example, the wireless device may ignore or not ignore the command/signaling based on the first symbol and the third symbol. In an example, the ignoring or not ignoring the command/signaling maybe based on a difference between the first timing and the second timing (e.g., number of symbols/duration between the first symbol and the third symbol). For example, the ignoring or not ignoring the command/signaling may be based on the difference between the first timing and the second timing (e.g., number of symbols/duration between the first symbol and the third symbol) being smaller or larger than a threshold. For example, the threshold ay be the processing time of the buffer status report. The processing time of the buffer status report may be based on a wireless device capability parameter. For example, the wireless device may transmit a wireless device capability message comprising the wireless device capability parameter. Based on the transmitting the wireless device capability message, the wireless device may receive a configuration parameter indicating the buffer status report processing time. For example, the buffer status report processing time may be a pre-configured/pre-determined value. For example, the threshold value may be a pre-configured/pre-determined value.

Figure 32:
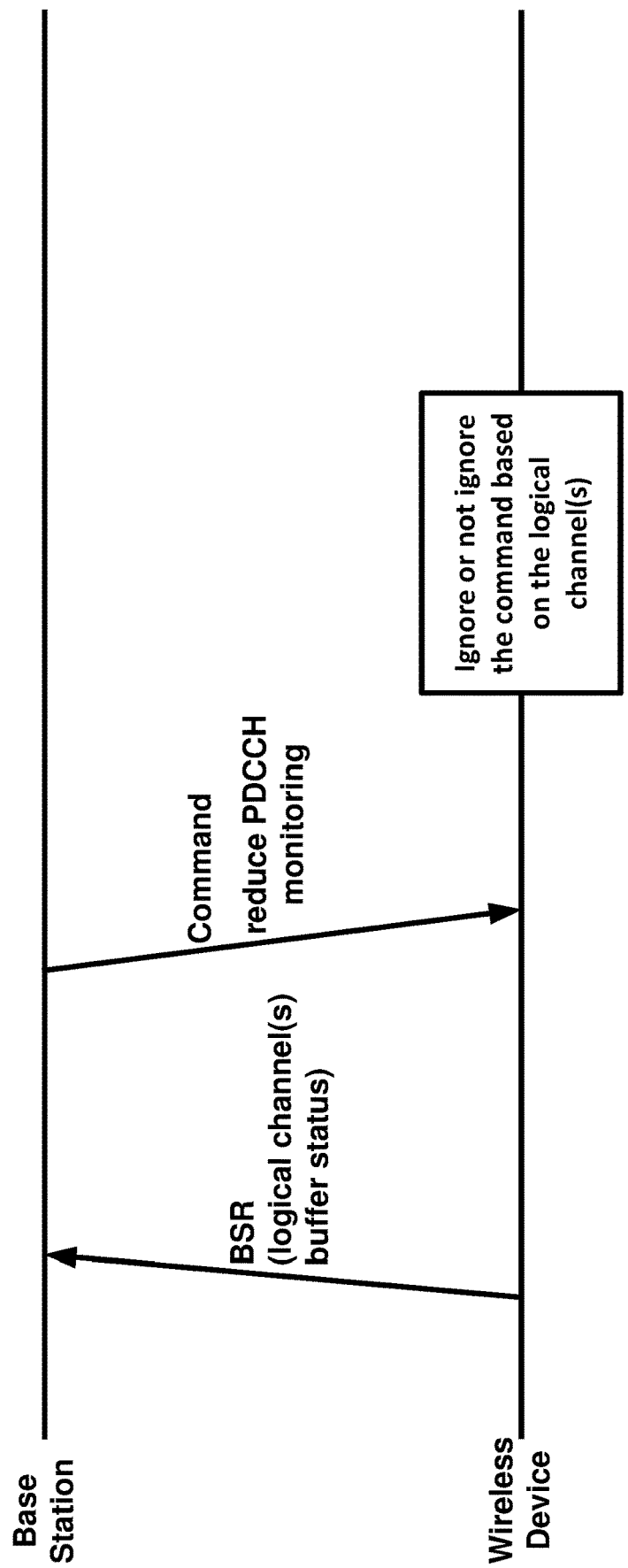
FIG. 32 shows an example process in accordance with several of various embodiments of the present disclosure.

In an example embodiment as shown in FIG. 32, a wireless device may trigger a buffer status report based on one or more BSR trigger conditions. The wireless device may transmit the buffer status report. The wireless device may create an uplink transport block wherein the uplink transport block may comprise the buffer status report. The wireless device may transmit the uplink transport block, comprising the buffer status report, based on an uplink grant. The uplink grant may be a configured grant or a dynamic grant. The uplink grant may indicate radio resources for transmission of the transport block comprising the buffer status report. The buffer status report may indicate available data for one or more logical channels. The buffer status report may indicate data available for one or more logical channel groups. The wireless device may receive configuration parameters of a plurality of logical channels, wherein configuration parameters of a first logical channel in the plurality of logical channels may indicate which logical channel group the logical channel belongs to. For example, the buffer status report may comprise a plurality of field corresponding to a plurality of logical channel groups and a value of a field, corresponding to a logical channel group, may indicate whether the buffer status report indicates buffer status for the logical channel group.

The wireless device may receive a command/signaling indicating reducing monitoring a control channel. The wireless device may receive the command/signaling after transmission of the buffer status report. In an example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

The wireless device may ignore or not ignore the command/signaling based on the one or more logical channels and/or the one or more logical channel groups. In an example, the one or more logical channels or the one or more logical channel groups may be associated with one or more priorities. The ignoring or not ignoring the command/signaling may be based on the one or priorities associated with the more logical channels and/or the one or more logical channel groups. In an example, the one or more logical channels or the one or more logical channel groups may be associated with one or more service/traffic types. The ignoring or not ignoring the command/signaling may be based on the one or more service/traffic types.

Figure 33:
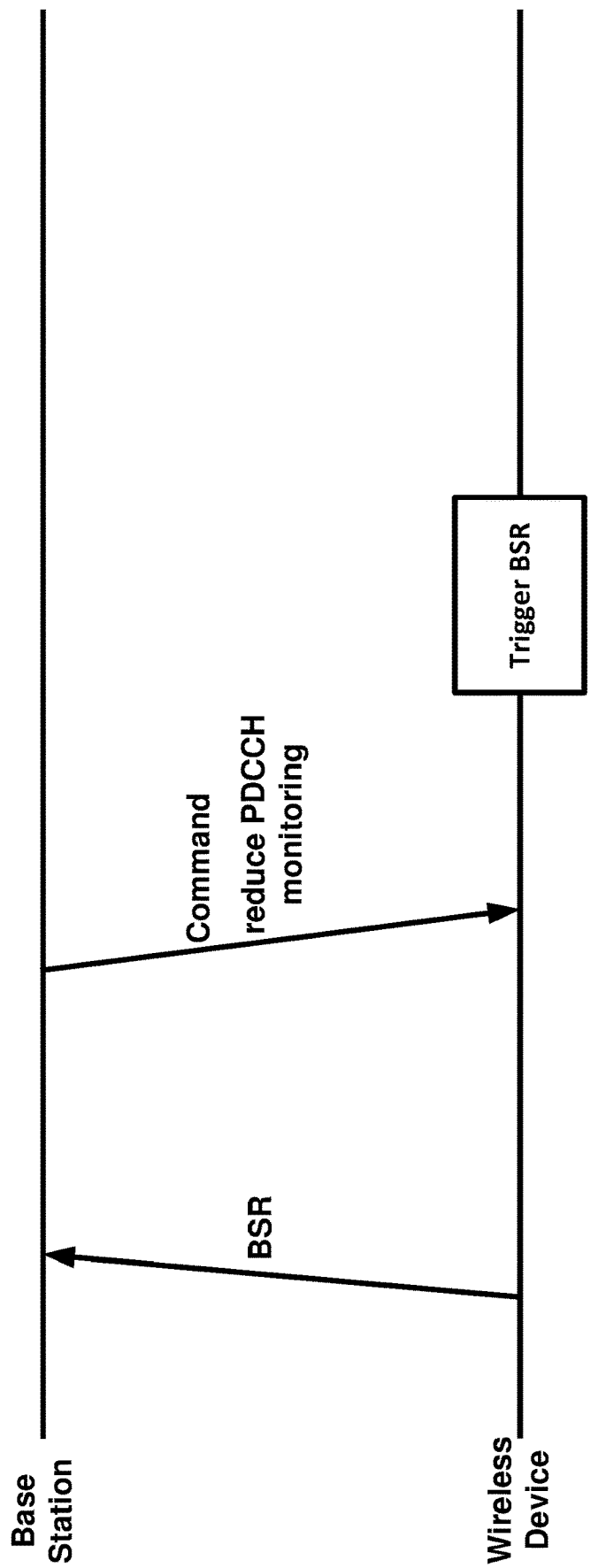
FIG. 33 shows an example process in accordance with several of various embodiments of the present disclosure.
Figure 34:
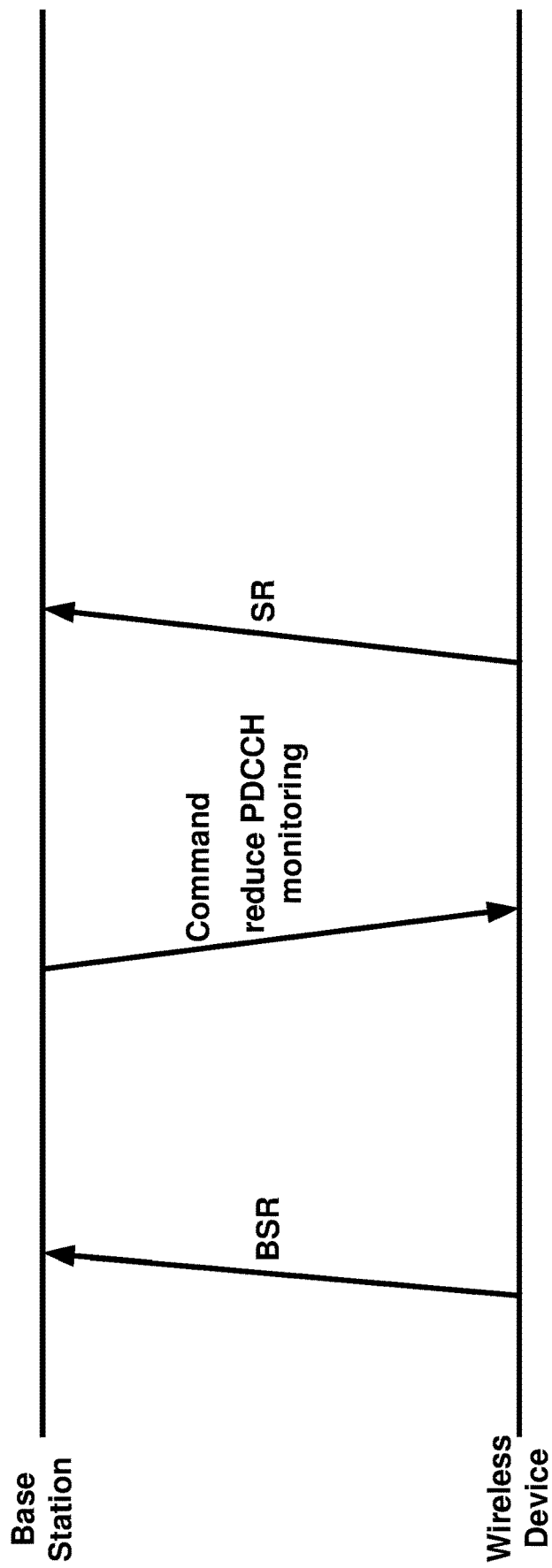
FIG. 34 shows an example process in accordance with several of various embodiments of the present disclosure.
Figure 35:
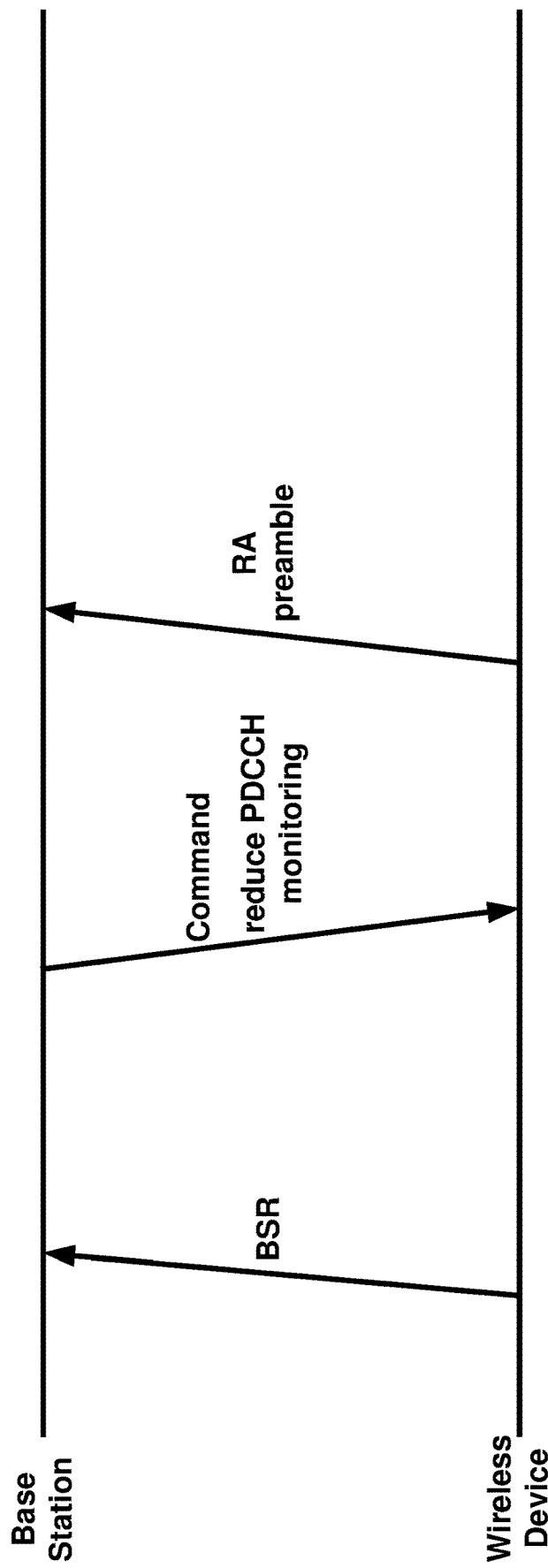
FIG. 35 shows an example process in accordance with several of various embodiments of the present disclosure.

In an example embodiment as shown in FIG. 33, FIG. 34 and FIG. 35, a wireless device may trigger a buffer status report based on one or more BSR trigger conditions. The wireless device may transmit the buffer status report. The wireless device may create an uplink transport block wherein the uplink transport block may comprise the buffer status report. The wireless device may transmit the uplink transport block, comprising the buffer status report, based on an uplink grant. The uplink grant may be a configured grant or a dynamic grant. The uplink grant may indicate radio resources for transmission of the transport block comprising the buffer status report. The wireless device may receive a command/signaling indicating reducing monitoring a control channel. The wireless device may receive the command/signaling after transmission of the buffer status report. In an example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

In an example embodiment as shown in FIG. 33, the wireless device may trigger a buffer status report in response to the receiving the command/signaling after transmitting the buffer status report. In an example, the wireless device may transmit the same buffer status report that was created and transmitted before receiving the command/signaling. In an example, the wireless device may create a new buffer status report and may transmit the new buffer status report via an uplink grant and after the triggering the buffer status report. In an example, the wireless device may trigger the buffer status report and may ignore the command/signaling in response to the receiving the command/signaling after the transmitting the buffer status report.

In an example embodiment as shown in FIG. 34, the wireless device may trigger/transmit a scheduling request in response to the receiving the command/signaling after transmitting the buffer status report. The wireless device may trigger/transmit a scheduling request corresponding to one or more logical channels that triggered the buffer status report that was transmitted before receiving the command/signaling. In an example, the wireless device may trigger a new buffer status report after receiving the command/signaling and may trigger a scheduling request based on one or more logical channels that triggered the buffer status report. In an example, the wireless device may trigger/transmit the scheduling request and may ignore the command/signaling in response to the receiving the command/signaling after the transmitting the buffer status report.

In an example embodiment as shown in FIG. 35, the wireless device may start a random access process/transmit a random access preamble in response to the receiving the command/signaling and after transmitting the buffer status report. In an example, the random access preamble and/or the random access occasion that the random access preamble is transmitted may indicate that the random access is started in response to the wireless device receiving the command/signaling after transmitting the buffer status report. In an example, the base station may determine that the random access process is in response to transmission of the command/signaling to the wireless device after the wireless device transmits the buffer status report. The base station may transmit a PDCCH monitoring resume signaling in response to receiving the random access preamble. In an example, the wireless device may start the random access process/transmit the random access preamble and may ignore the command/signaling in response to the receiving the command/signaling after the transmitting the buffer status report.

Figure 36:
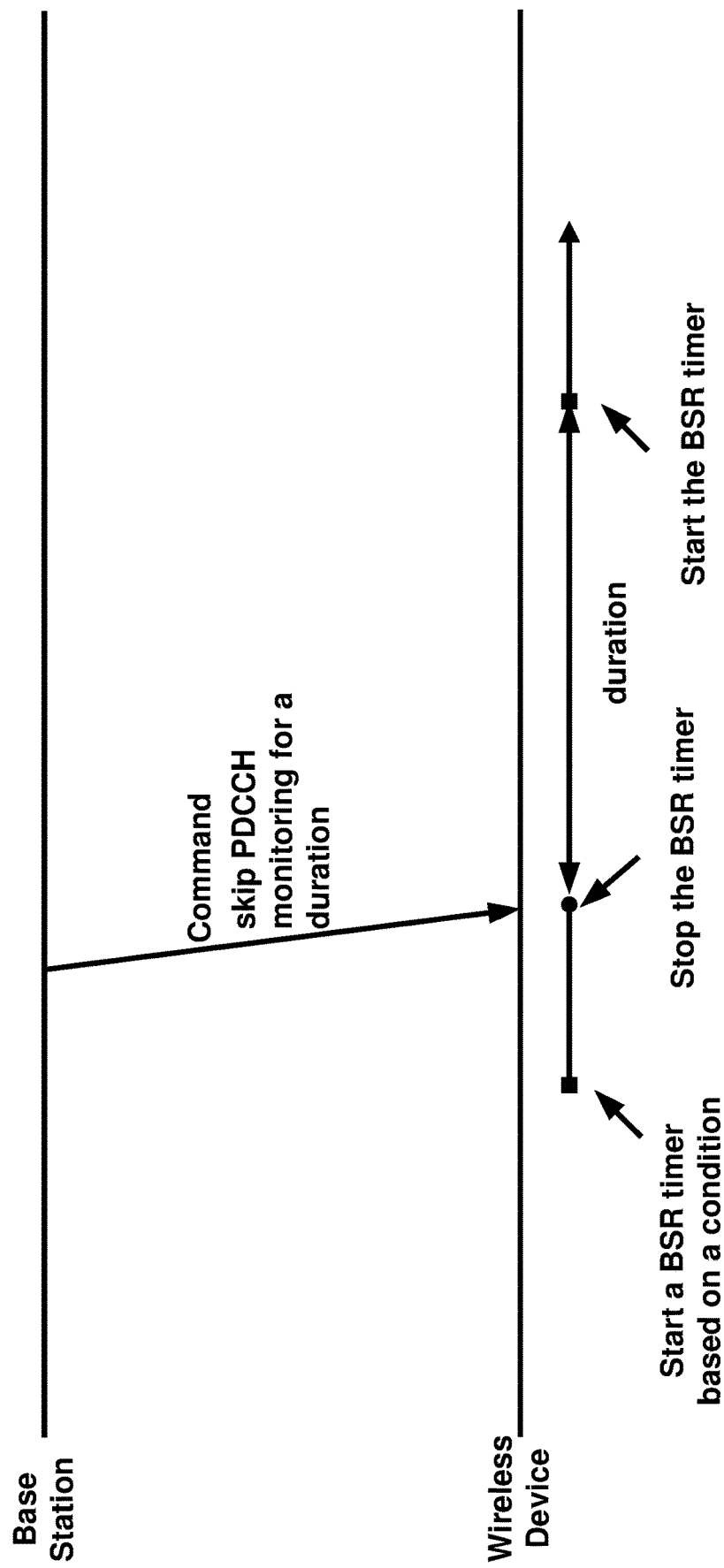
FIG. 36 shows an example process in accordance with several of various embodiments of the present disclosure.
Figure 37:
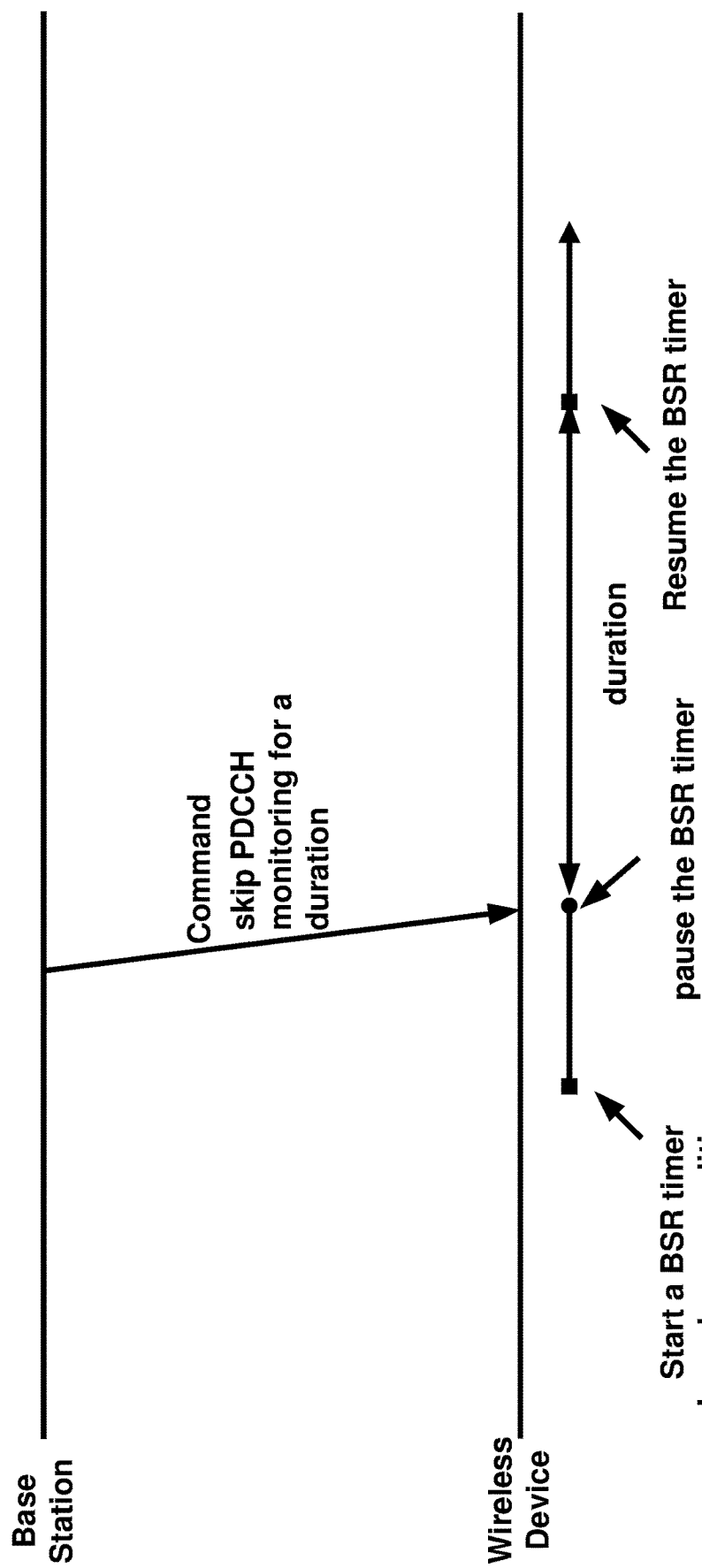
FIG. 37 shows an example process in accordance with several of various embodiments of the present disclosure.

In an example embodiment as shown in FIG. 36 and FIG. 37, a wireless device may start a first timer (e.g., a buffer status report timer) based on one or more conditions. The buffer status report timer may be, for example, a retransmission BSR timer (retx-BSR-Timer), a periodic BSR timer (periodicBSR-Timer), logical channel SR delay timer (logicalChannelSR-DelayTimer), etc. The wireless device may receive a command/signaling indicating reducing monitoring a control channel. For example, the first timer may be the retransmission BSR timer (retx-BSR-Timer) and the one or more conditions may comprise transmitting a buffer status report or receiving an uplink grant for transmission of new data on any UL-SCH. For example, the first timer may be a periodic buffer status report timer (periodicBSR-Timer) and the one or more conditions may comprise transmitting a buffer status report. For example, the first timer may be a logical channel SR delay timer (logicalChannelSR-DelayTimer) and the one or more conditions may comprise a buffer status report being triggered for a logical channel and for which a logicalChannelSR-DelayTimer with value True is configured.

The wireless device may receive the command/signaling after starting the first timer. The command/signaling may indicate reducing monitoring the control channel for a duration. In an example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

In an example embodiment as shown in FIG. 36, in response to the receiving the command/signaling, indicating reducing monitoring a control channel for a duration, the wireless device may stop the first timer. The wireless device may start the first timer after the duration indicated by the command/signaling (after the duration for reduced monitoring of the control channel).

In an example embodiment as shown in FIG. 37, in response to the receiving the command/signaling, indicating reducing monitoring a control channel for a duration, the wireless device may pause the first timer. The wireless device may resume the first timer after the duration indicated by the command/signaling (after the duration for reduced monitoring of the control channel).

Figure 38:
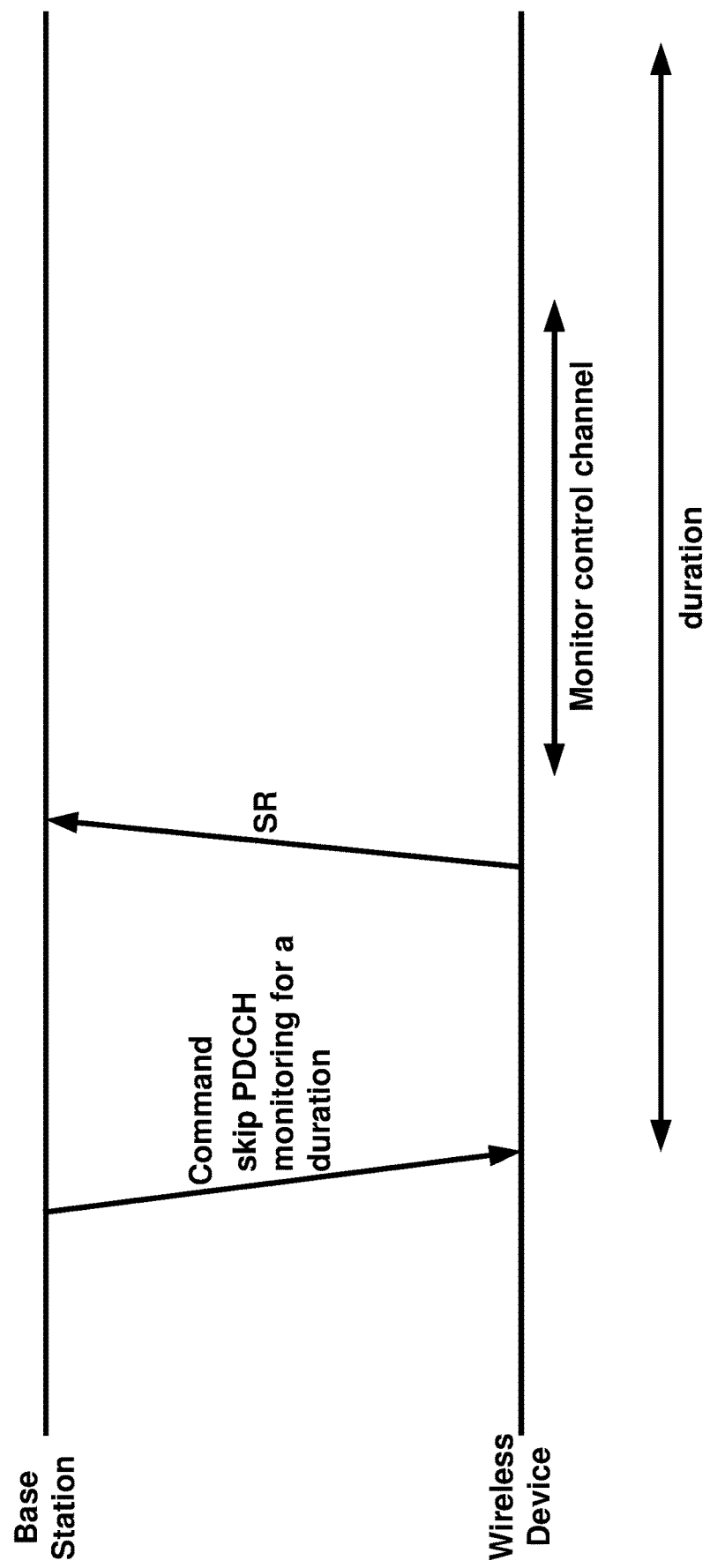
FIG. 38 shows an example process in accordance with several of various embodiments of the present disclosure.

In an example embodiment as shown in FIG. 38, a wireless device may receive command/signaling indicating reducing monitoring a control channel. In an example, the command/signaling may indicate skipping monitoring the control channel (e.g., for a duration). For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

The wireless device may transmit a scheduling request while reducing the monitoring the control channel (e.g., while skipping the monitoring the control channel (e.g., during the duration indicated by the command/signaling) or while using the second monitoring periodicity or the second monitoring periodicity and offset). Based on the transmitting the scheduling request, the wireless device may stop the reduced control channel monitoring (e.g., may stop the skipping (e.g., may resume) the monitoring the control channel or may resume/switch to the first monitoring periodicity or the first monitoring periodicity and offset). The wireless device may stop the reduced control channel monitoring (e.g., may stop the skipping (e.g., may resume) the monitoring the control channel or may resume/switch to the first monitoring periodicity or the first monitoring periodicity and offset) may be after a first duration from the transmitting scheduling request.

In an example, the wireless device may cancel the scheduling request based on one or more conditions. The wireless device may reduce monitoring the control channel until a first timing based on (e.g., after) canceling the scheduling request. The command/signaling may indicate reducing monitoring the control channel until the first timing. For example, the command/signaling may indicate skipping monitoring the control channel until the first timing. For example, the command/signaling may indicate reducing monitoring the control channel by indicating a switching in a monitoring periodicity or switching a monitoring periodicity and offset until the first timing. For example, the command/signaling may indicate switching from a first monitoring periodicity or a first monitoring periodicity and offset to a second monitoring periodicity or a second monitoring periodicity and offset until the first timing.

Figure 39:
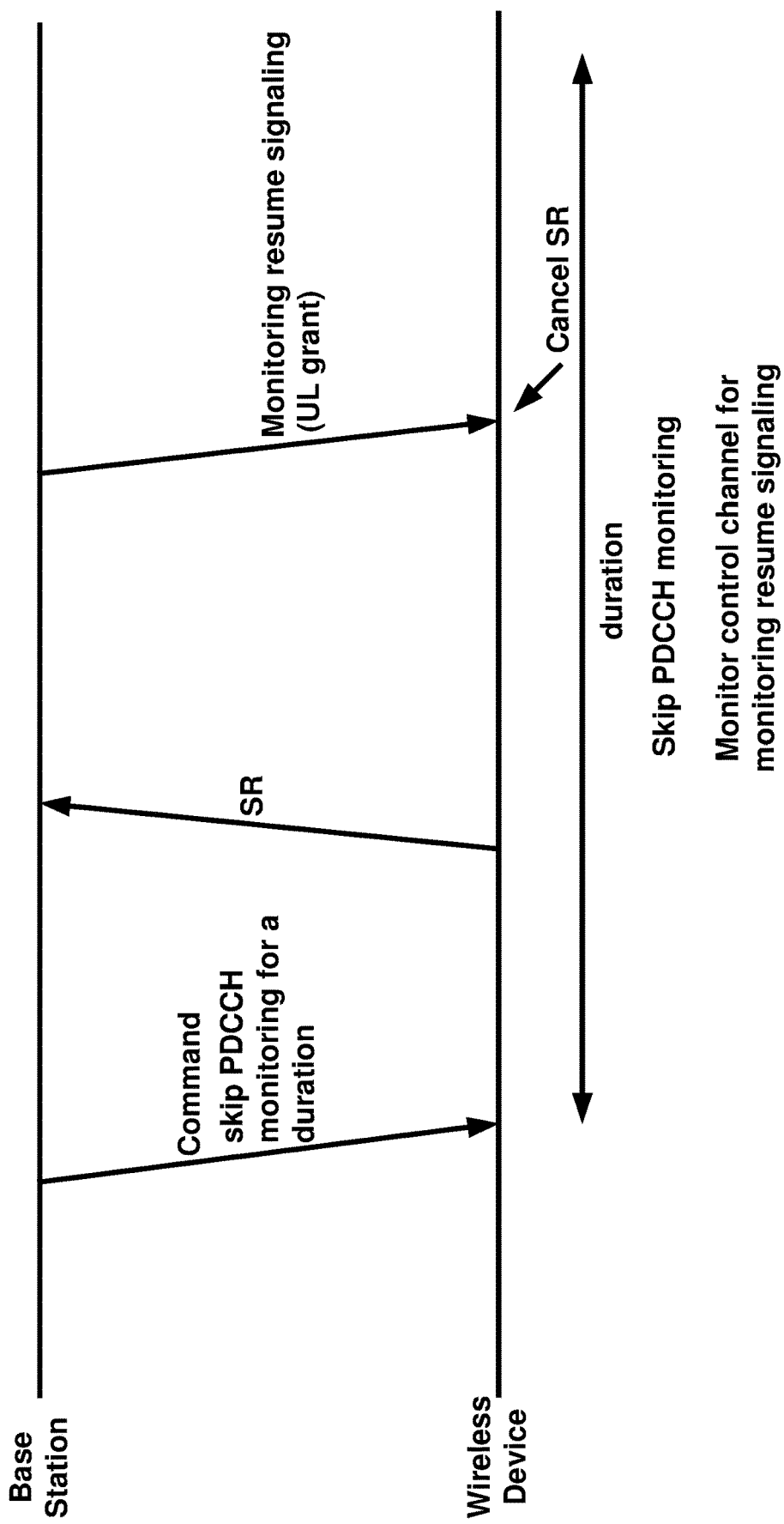
FIG. 39 shows an example process in accordance with several of various embodiments of the present disclosure.

In an example embodiment as shown in FIG. 39, a wireless device may receive command/signaling indicating reducing monitoring a control channel. In an example, the command/signaling may indicate skipping monitoring the control channel (e.g., for a duration). For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

The wireless device may transmit a scheduling request while reducing the monitoring the control channel (e.g., while skipping the monitoring the control channel (e.g., during the duration indicated by the command/signaling) or while using the second monitoring periodicity or the second monitoring periodicity and offset). The wireless The wireless device may monitor the control channel for a control channel monitoring resume signaling during a reduced control channel monitoring period. The control channel monitoring resume signaling may indicate stopping the reduced control channel monitoring (e.g., stopping the skipping (e.g., resuming) monitoring the control channel or switching from the second monitoring periodicity or the second monitoring periodicity and offset to the first monitoring periodicity or the first monitoring periodicity and offset). The wireless device may determine monitoring occasions associated with the control channel monitoring resume signaling. The control channel monitoring resume signaling may be associated with a first RNTI. Based on the monitoring the control channel for the control channel monitoring resume signaling at the determined monitoring occasions, the wireless device may receive the control channel resume signaling. The control channel monitoring resume signaling may comprise an uplink grant. The wireless device may cancel the scheduling request based on the uplink grant.

Figure 40:
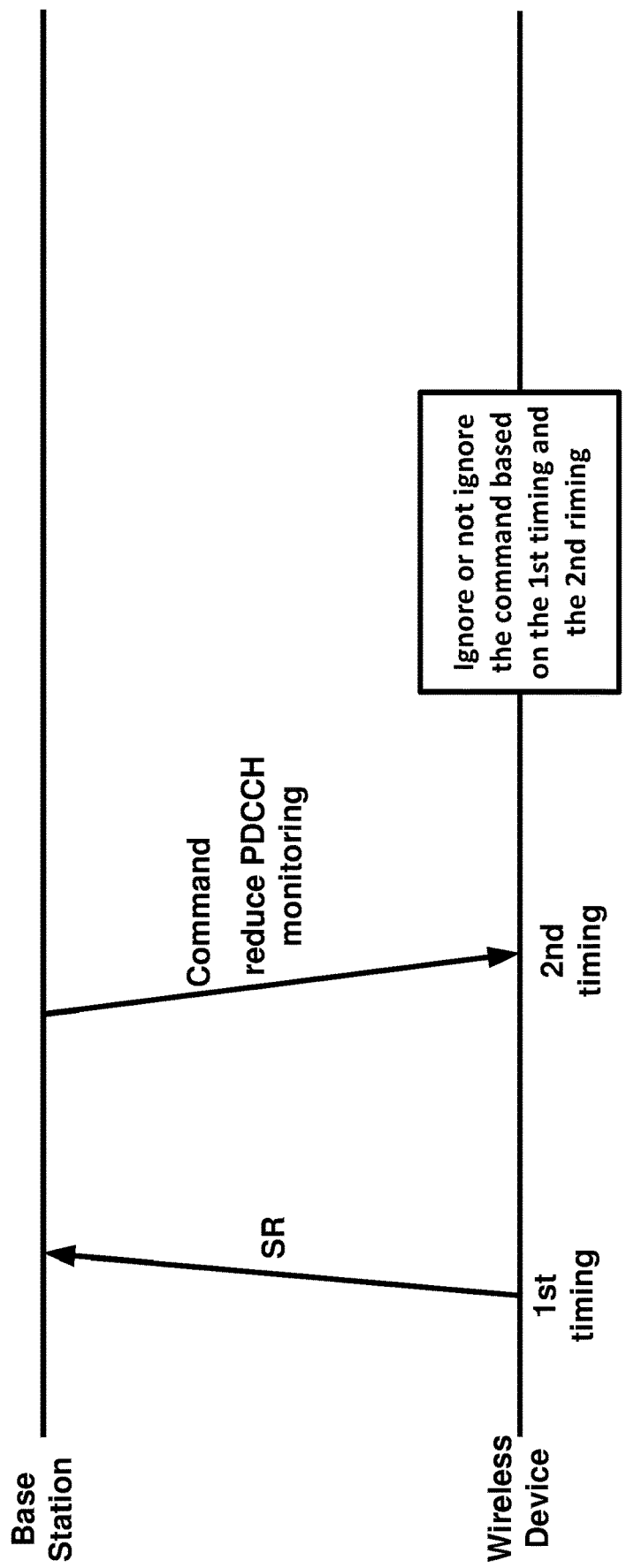
FIG. 40 shows an example process in accordance with several of various embodiments of the present disclosure.

In an example embodiment as shown in FIG. 40, a wireless device may trigger a scheduling request based on one or more conditions. The one or more conditions may comprise buffer status report being triggered and no radio resources being available for transmission of the buffer status report. In an example, the scheduling request may correspond to a first scheduling request configuration. The logical channel that triggered the buffer status report may correspond to the first scheduling request configuration. For example, the wireless device may receive configuration parameters of logical channels comprising configuration parameters of the logical channel that triggered the buffer status report. The configuration parameters of the logical channel that triggered the buffer status report may indicate the first scheduling request configuration (e.g., an identifier of the first scheduling request configuration). The wireless device may receive configuration parameters comprising first configuration parameters of the first scheduling request configuration. The wireless device may transmit the scheduling request via a first scheduling request resource. The first configuration parameters may indicate a plurality of scheduling request resources comprising the first scheduling request resource. The first scheduling request resource may be a PUCCH resource. The wireless device may transmit the first scheduling request via the first scheduling request resource at a first timing. The first timing of the first scheduling request resource may comprise one or more symbol durations in the time domain and may start at a first symbol and may end at a second symbol.

The wireless device may receive a command/signaling indicating reducing monitoring a control channel. The wireless device may receive the command/signaling after transmission of the scheduling request. The wireless device may receive the command/signaling at a second timing. The second timing may comprise one or more symbol durations and may start at a third symbol and end at a fourth symbol. In an example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

The wireless device may ignore or not ignore the command/signaling based on the first timing and the second timing. For example, the wireless device may ignore or not ignore the command/signaling based on the first symbol and the third symbol. In an example, the ignoring or not ignoring the command/signaling maybe based on a difference between the first timing and the second timing (e.g., number of symbols/duration between the first symbol and the third symbol). For example, the ignoring or not ignoring the command/signaling may be based on the difference between the first timing and the second timing (e.g., number of symbols/duration between the first symbol and the third symbol) being smaller or larger than a threshold. For example, the threshold may be the processing time of the scheduling request. The processing time of the scheduling request may be based on a wireless device capability parameter. For example, the wireless device may transmit a wireless device capability message comprising the wireless device capability parameter. Based on the transmitting the wireless device capability message, the wireless device may receive a configuration parameter indicating the scheduling request processing time. For example, the scheduling request processing time may be a pre-configured/pre-determined value. For example, the threshold value may be a pre-configured/pre-determined value.

Figure 41:
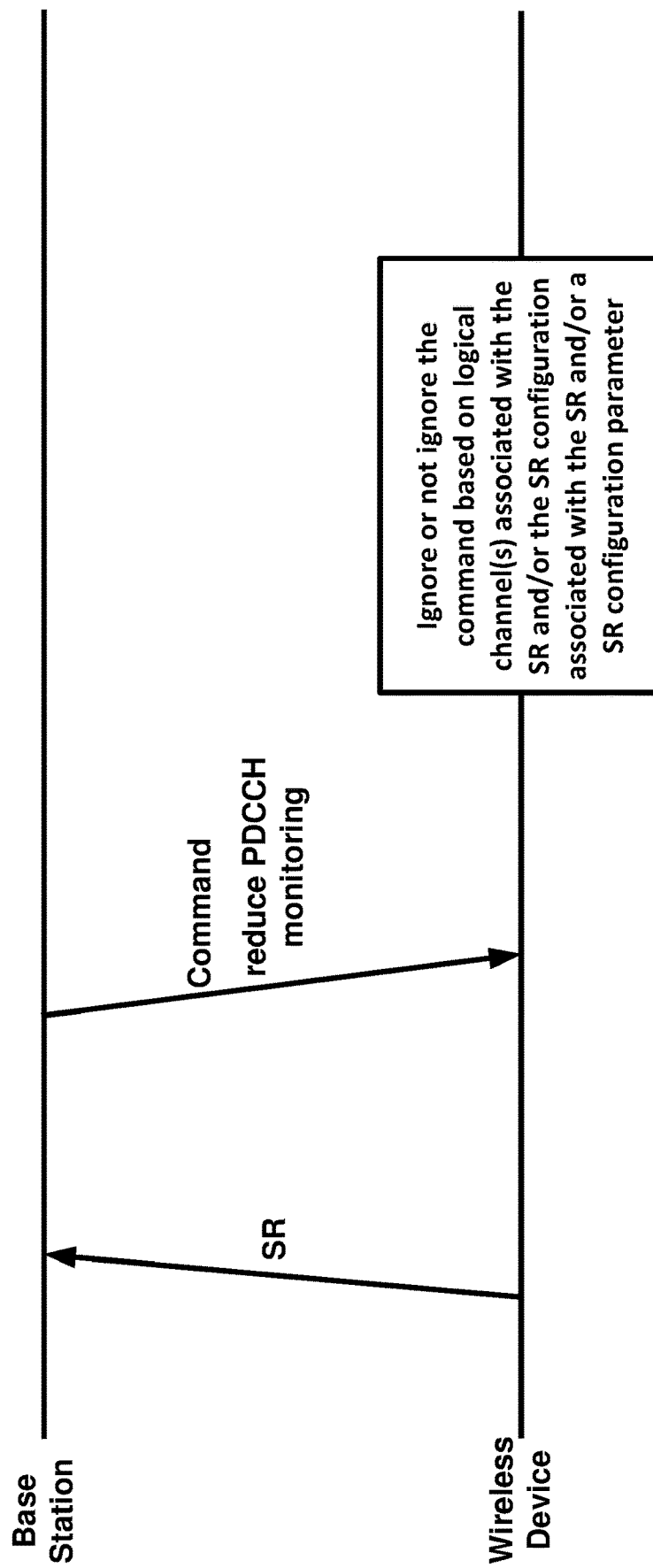
FIG. 41 shows an example process in accordance with several of various embodiments of the present disclosure.

In an example embodiment as shown in FIG. 41, a wireless device may trigger a scheduling request based on one or more conditions. The one or more conditions may comprise buffer status report being triggered and no radio resources being available for transmission of the buffer status report. In an example, the scheduling request may correspond to a first scheduling request configuration. The logical channel that triggered the buffer status report may correspond to the first scheduling request configuration. For example, the wireless device may receive configuration parameters of logical channels comprising configuration parameters of the logical channel that triggered the buffer status report. The configuration parameters of the logical channel that triggered the buffer status report may indicate (e.g., comprise a parameter indicating) the first scheduling request configuration (e.g., an identifier of the first scheduling request configuration). The wireless device may receive configuration parameters comprising first configuration parameters of the first scheduling request configuration. The wireless device may transmit the scheduling request via a first scheduling request resource. The first configuration parameters may indicate a plurality of scheduling request resources comprising the first scheduling request resource. The first scheduling request resource may be a PUCCH resource.

The wireless device may receive a command/signaling indicating reducing monitoring a control channel. The wireless device may receive the command/signaling after transmission of the scheduling request. In an example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

The wireless device may ignore or not ignore the command/signaling based on the one or more logical channels associated with the transmitted scheduling request. The one or more logical channels associated with the transmitted scheduling request may comprise the logical channel that triggered the buffer status report. In an example, the wireless device may ignore or not ignore the command/signaling based on the first scheduling request configuration corresponding to the transmitted scheduling request. The first configuration parameters of the first scheduling request configuration may comprise a first configuration parameter. In an example, the wireless device may ignore or not ignore the command/signaling based on a value of the first configuration parameter. For example, the value of the first configuration parameter may indicate a priority associated with the first scheduling request configuration and the wireless device may ignore or not ignore the command/signaling based on the priority associated with the first scheduling request configuration.

Figure 42:
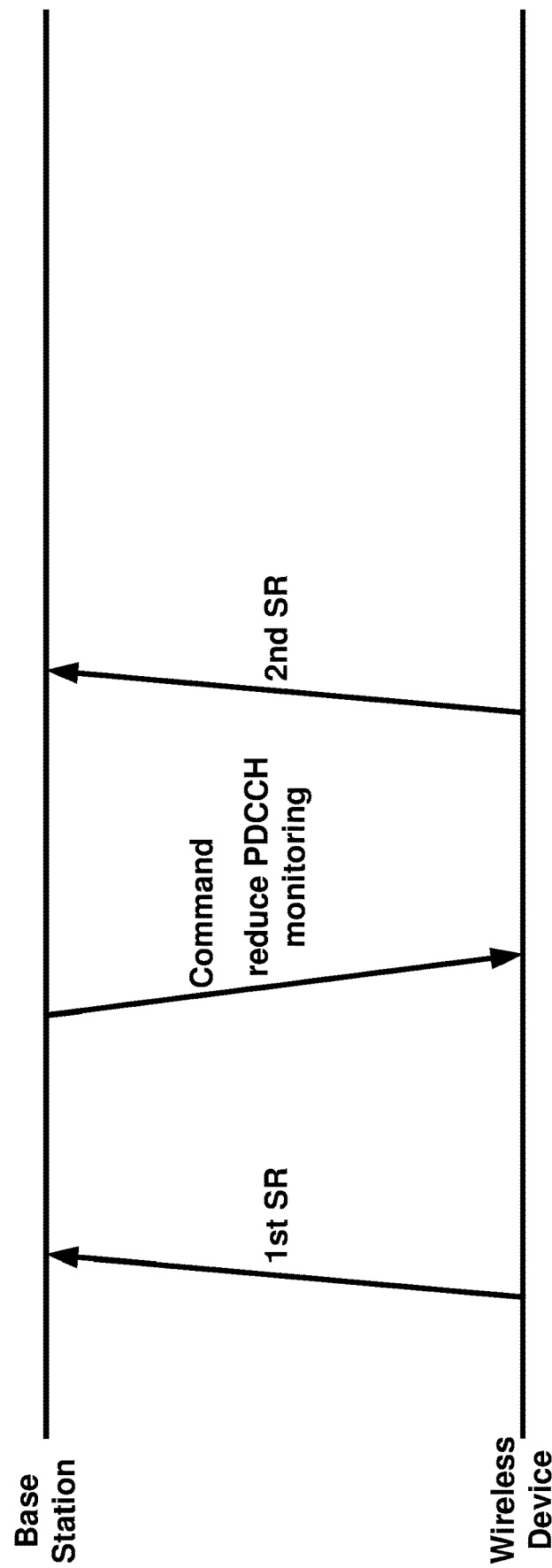
FIG. 42 shows an example process in accordance with several of various embodiments of the present disclosure.

In an example embodiment as shown in FIG. 42, a wireless device may trigger a first scheduling request based on one or more conditions. The one or more conditions may comprise buffer status report being triggered and no radio resources being available for transmission of the buffer status report. In an example, the first scheduling request may correspond to a first scheduling request configuration. The wireless device may receive a command/signaling indicating reducing monitoring a control channel. The wireless device may receive the command/signaling after transmission of the first scheduling request. In an example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset. Based on the receiving the command/signaling, the wireless device may trigger/transmit a second scheduling request. In an example, the second scheduling request may be associated with the first scheduling request configuration (e.g., the scheduling request configuration of the first scheduling request).

In an example, the triggering/transmitting the second scheduling request may be while a scheduling request prohibit timer is running. For example, the wireless device may start the scheduling request prohibit timer based on the transmitting the first scheduling request. In response to the receiving the command/signaling indicating reducing the monitoring the control channel after transmission of the first scheduling request, the wireless device may trigger/transmit the second scheduling request even if the scheduling request prohibit timer is running. In an example, the wireless device may transit the second scheduling request in an earliest available useful scheduling request (for example, even if the scheduling request prohibit timer is running). In an example, the wireless device may stop the scheduling request prohibit timer based on the receiving the command/signaling after transmitting the first scheduling request. In an example, the wireless device may ignore the command/signaling based on receiving the command/signaling after transmitting the first scheduling request.

Figure 43:
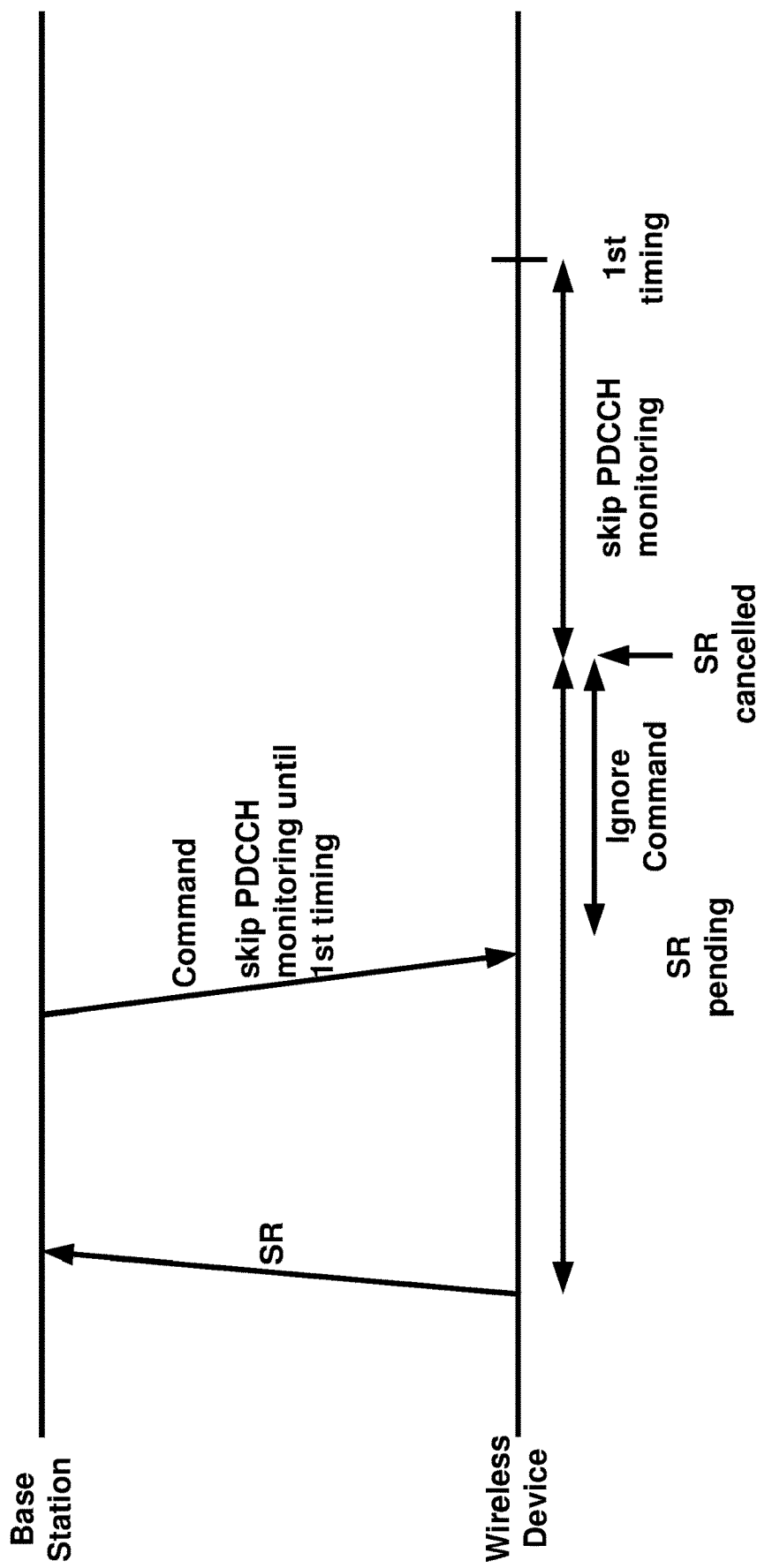
FIG. 43 shows an example process in accordance with several of various embodiments of the present disclosure.

In an example embodiment as shown in FIG. 43, a wireless device may trigger a scheduling request based on one or more conditions. The one or more conditions may comprise buffer status report being triggered and no radio resources being available for transmission of the buffer status report. In an example, the scheduling request may correspond to a scheduling request configuration. The wireless device may receive a command/signaling indicating reducing monitoring a control channel until a first timing. The wireless device may receive the command/signaling after transmission of the scheduling request. In an example, the command/signaling may indicate skipping monitoring the control channel for a duration and until the first timing. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel until the first timing by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset until the first timing. Based on the receiving the command/signaling after the transmitting the scheduling request, the wireless device may ignore the command/signaling while the scheduling request is pending. The wireless device may determine that the scheduling request is cancelled (e.g., no longer pending) based on one or more second conditions. The wireless device may cancel the scheduling request before the first timing indicated by the command/signaling. Based on (e.g., after) canceling the scheduling request, the wireless device may monitor the control channel with the reduced control channel monitoring according to the command/signaling (e.g., may skip monitoring the control channel or may monitor the control channel with the second monitoring periodicity or the second monitoring periodicity and offset) until the first timing in response to the scheduling request being cancelled before the first timing.

Figure 44:
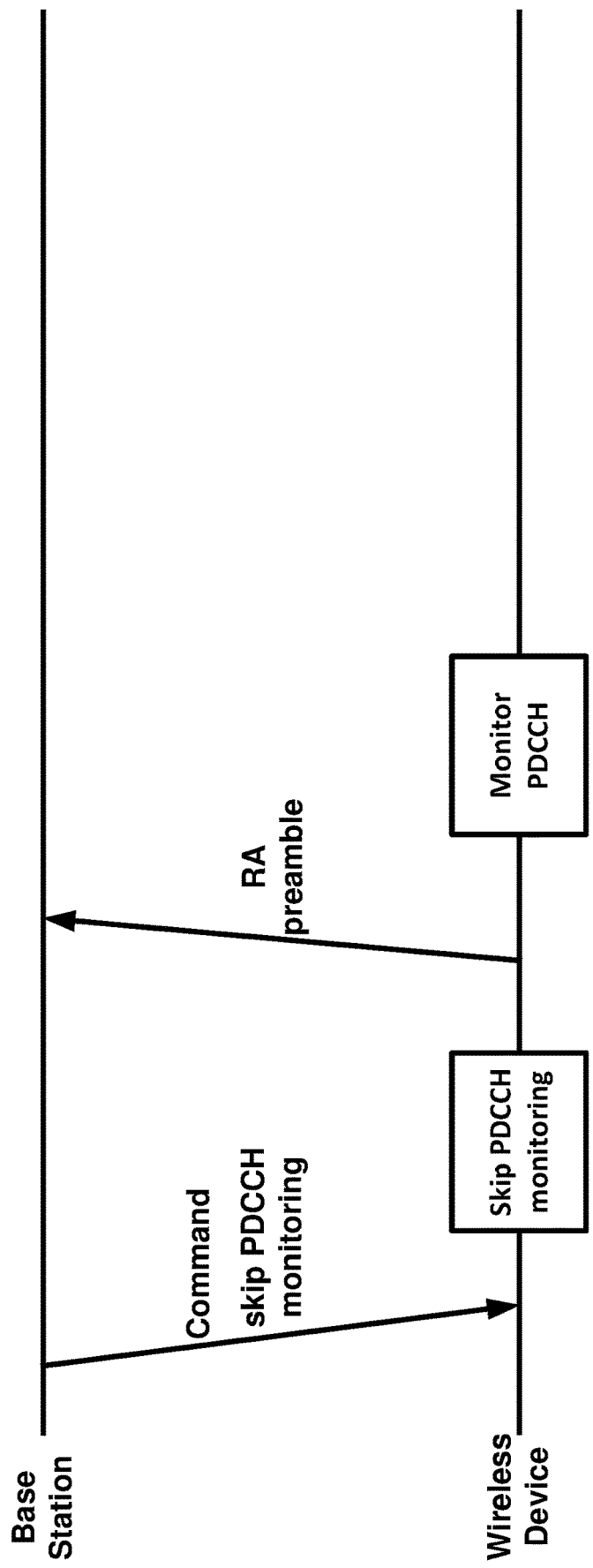
FIG. 44 shows an example process in accordance with several of various embodiments of the present disclosure.

In an example embodiment as shown in FIG. 44, a wireless device may receive a command/signaling indicating reducing monitoring a control channel. For example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset. The wireless device may start a random access process after receiving the command/signaling. The wireless device may start the random access process in response to one or more conditions. The one or more conditions may comprise a time alignment timer associated with a timing advance group expiring, transmitting a maximum number of scheduling requests and not receiving an uplink grant (e.g., useful uplink grant), starting a beam failure recovery process, etc. The wireless device may transmit a random access preamble in response to the starting the random access process. Based on starting the random access process/transmitting the random access preamble, the wireless device may ignore the command/signaling and/or may monitor the control channel without the reduced monitoring indicated by the command/signaling. For example, the wireless device may stop skipping (e.g., may resume) monitoring the control channel based on the starting the random access process/transmitting the random access preamble. For example, the wireless device may switch from the second monitoring periodicity or monitoring periodicity and offset to the first monitoring periodicity or the first monitoring periodicity and offset based on the starting the random access process/transmitting the random access preamble. In an example, the wireless device may ignore the command/signaling and/or monitor the control channel without the reduced monitoring indicated by the command/signaling (e.g., may stop skipping (e.g., may resume) monitoring the control channel or may switch from the second monitoring periodicity and offset to the first monitoring periodicity or the first monitoring periodicity and offset) after an offset from transmitting the random access preamble. In an example, the wireless device may ignore the command/signaling and/or may monitor the control channel without the reduced monitoring indicated by the command/signaling (e.g., may stop skipping (e.g., may resume) monitoring the control channel or may switch from the second monitoring periodicity or monitoring periodicity and offset to the first monitoring periodicity or the first monitoring periodicity and offset) after an offset from transmitting the Msg3/MsgA or within a window after transmitting the Msg3/MsgA. In an example, the offset may be pre-configured/pre-determined. In an example, the offset may be based on a wireless device capability parameter. The wireless device may transmit a wireless device capability message comprising the wireless device capability parameter. In response to the transmitting the wireless device capability message, the wireless device may receive configuration parameters comprising a first parameter indicating the offset. In an example, the wireless device may ignore the command/signaling and/or may monitor the control channel without the reduced monitoring indicated by the command/signaling (e.g., may stop skipping (e.g., may resume) monitoring the control channel or may switch from the second monitoring periodicity or monitoring periodicity and offset to the first monitoring periodicity or the first monitoring periodicity and offset) during a random access response window.

In an example, a wireless device may start a random access process. The wireless device may start the random access process in response to one or more conditions. The one or more conditions may comprise a time alignment timer associated with a timing advance group expiring, transmitting a maximum number of scheduling requests and not receiving an uplink grant (e.g., useful uplink grant), starting a beam failure recovery process, etc. The wireless device may transmit a random access preamble in response to the starting the random access process. The wireless device may transmit a random access preamble in response to the starting the random access process. The wireless device may receive a command/signaling indicating reducing monitoring a control channel. The wireless device may receive the command/signaling after starting the random access process/transmitting the random access preamble. For example, the command/signaling may indicate skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In an example, the command/signaling may indicate reducing monitoring the control channel by indicating a switching in a monitoring periodicity or switching a monitoring periodicity and offset. For example, the command/signaling may indicate switching from a first monitoring periodicity or a first monitoring periodicity and offset to a second monitoring periodicity or a second monitoring periodicity and offset.

Figure 45:
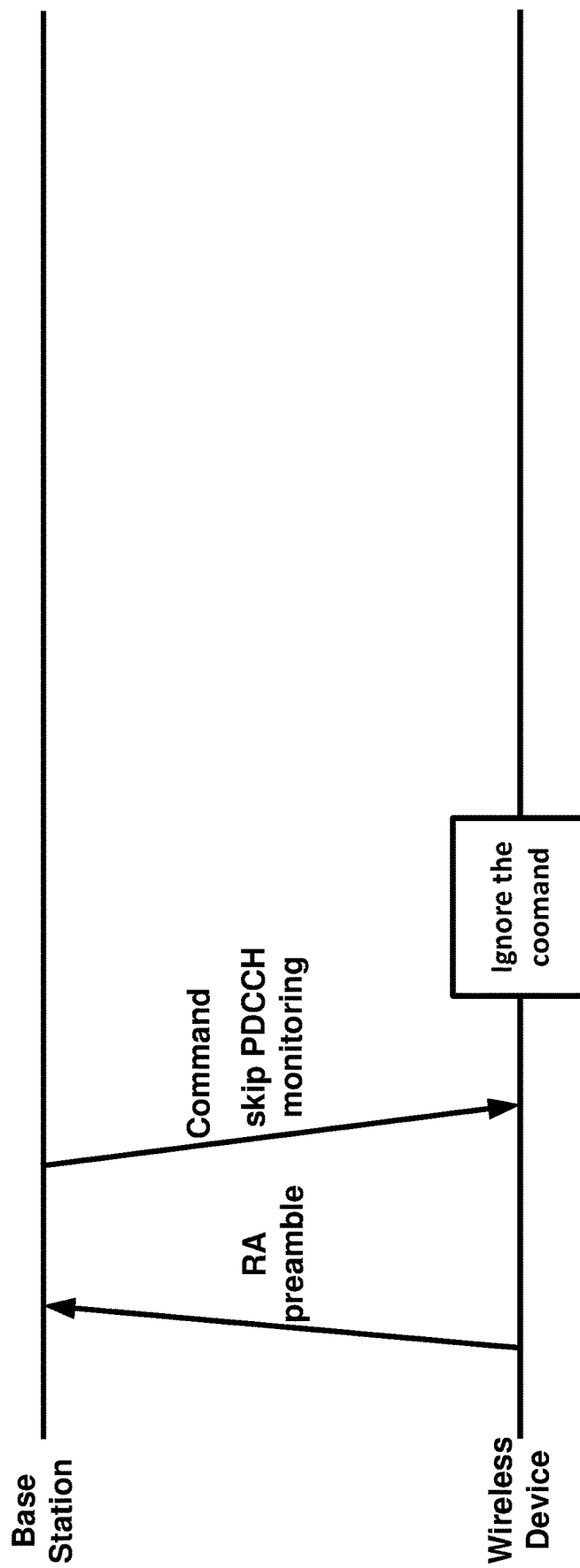
FIG. 45 shows an example process in accordance with several of various embodiments of the present disclosure.

In an example embodiment as shown in FIG. 45, based on the receiving the command/signaling after starting the random access process, the wireless device may ignore the command/signaling. In an example, ignoring the command/signaling may be based on which random access message has been transmitted and/or received. For example, the ignoring the command/signaling may be based on receiving the command/signaling after the random access preamble/

MsgA being transmitted. For example, the ignoring the command/signaling may be based on receiving the command/signaling during a random access response window after transmitting a random access preamble. In an example, the ignoring the command/signaling may be based on a receiving the command/signaling after a random access response being received. In an example, the ignoring the command/signaling may be based on receiving the command/signaling after a Msg3 being transmitted.

Figure 46:
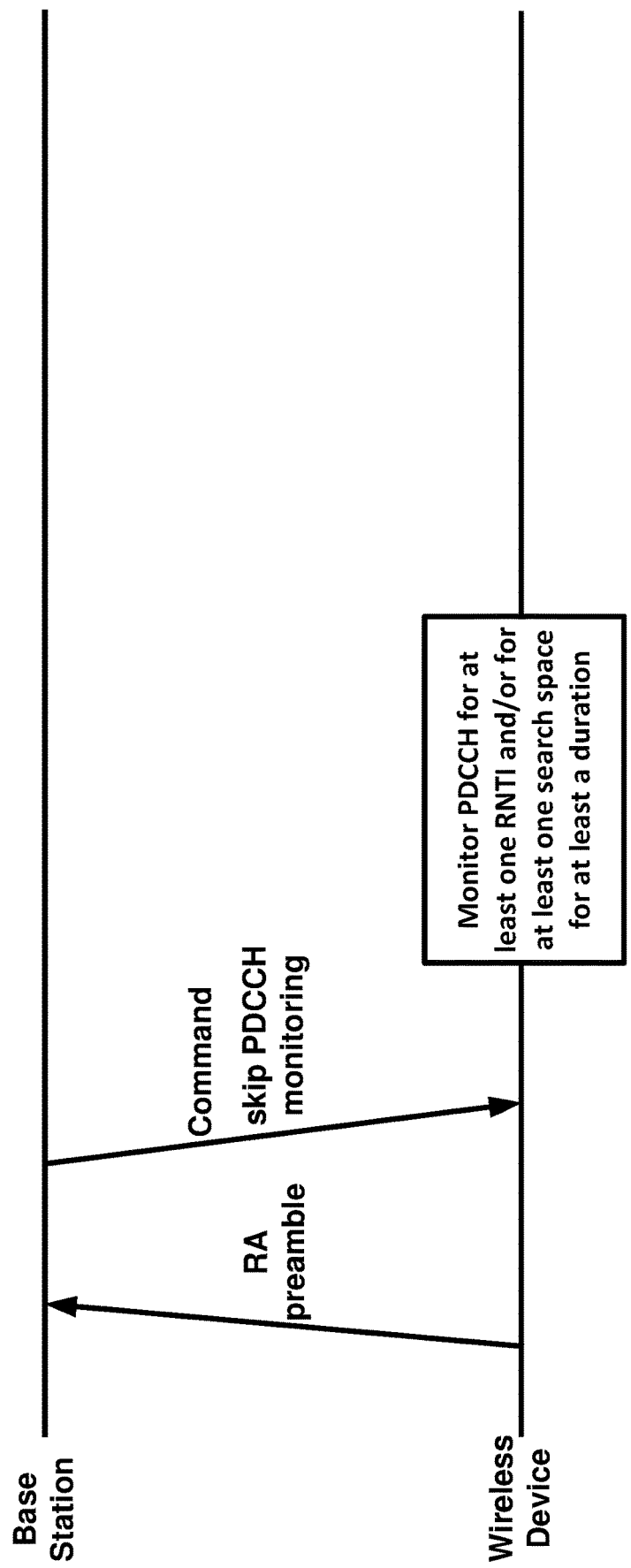
FIG. 46 shows an example process in accordance with several of various embodiments of the present disclosure.

In an example embodiment as shown in FIG. 46, based on the receiving the command/signaling after starting the random access process, the wireless device may monitor the control channel for at least one RNTI and/or may monitor at least one search space. The at least one search space may correspond to at least one search space identifier. The at least one search space identifier may identify at least one search space that the wireless device monitors after receiving the command after receiving the command/signaling indicating skipping monitoring the control channel. The wireless device may receive configuration parameters indicating the one or more search spaces (e.g., indicating the identifiers of the one or more search spaces) for monitoring the control channel after receiving the command/signaling. In an example, the monitoring the control channel for at least one RNTI and/or for at least one search space may be for a time duration after transmitting the random access preamble. In an example, the at least one RNTI may comprise an RA-RNTI. In an example, the at least one search space may comprise a search space for receiving downlink control information associated with a random access radio network temporary identifier (RA-RNTI).

Figure 47:
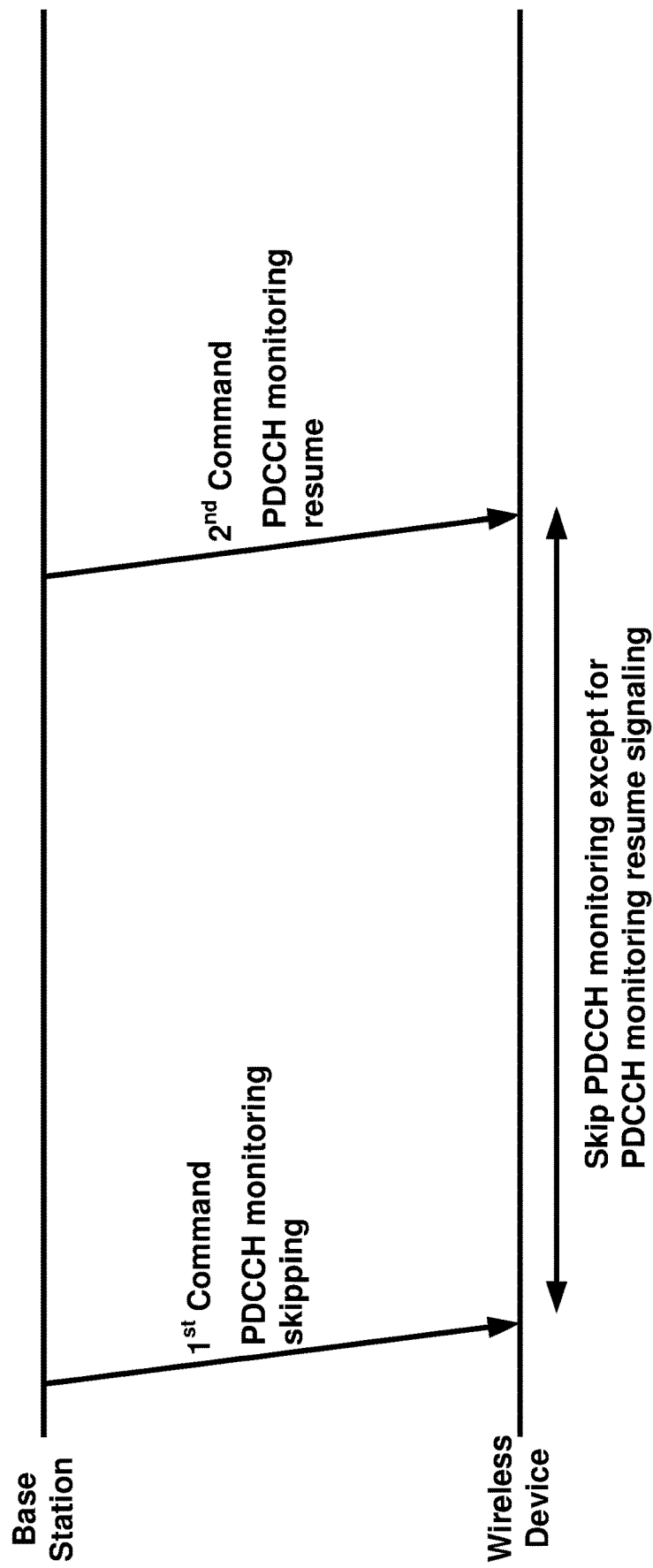
FIG. 47 shows an example process in accordance with several of various embodiments of the present disclosure.

In an example embodiment as shown in FIG. 47, a wireless device may receive a command/signaling indicating skipping monitoring the control channel for a duration. For example, the command/signaling may indicate skipping monitoring the control channel for a first number of monitoring occasions. In an example, the command/signaling may indicate the first number. In an example, the wireless device may receive configuration parameters comprising a plurality of values and the command/signaling may indicate (e.g., provide an index to) the first number in the plurality of values. In response to receiving the command/signaling, the wireless device may skip monitoring the control channel, for example for the duration indicated by the command/signaling, except for a control channel monitoring resume signaling. For example, based on receiving the command/signaling, the wireless device may monitor the control channel at monitoring occasions and/or search spaces associated with the control channel monitoring resume signaling. The wireless device may receive configuration parameters and may determine the monitoring occasions and/or the search space associated with the control channel monitoring resume signaling based on the configuration parameters. The control channel monitoring resume signaling may be associated with a first RNTI (e.g., PS-RNTI) and the wireless device may monitor the control channel for the first RNTI based on receiving the command/signaling.

In an example embodiment, a wireless device may start a random access process. The wireless device may start the random access process in response to one or more conditions. The one or more conditions may comprise a time alignment timer associated with a timing advance group expiring, transmitting a maximum number of scheduling requests and not receiving an uplink grant (e.g., useful uplink grant), starting a beam failure recovery process, etc. The wireless device may transmit a random access preamble in response to the starting the random access process. The wireless device may transmit a random access preamble in response to the starting the random access process. The wireless device may successfully receive a random access response after transmission of the random access preamble. The wireless device may receive a command/signaling indicating reducing monitoring the control channel (e.g., skipping monitoring the control channel or switching a monitoring periodicity or a monitoring periodicity and offset) before a PDCCH indicating a new transmission addressed to C-RNTI is received. The wireless device may ignore the command/signaling based on the receiving the command/signaling before a PDCCH indicating a new transmission addressed to C-RNTI is received.

In an example embodiment, a wireless device may receive configuration parameters indicating a first monitoring periodicity value for a monitoring periodicity parameter. The configuration parameters may indicate a first monitoring periodicity and offset value for a monitoring periodicity and offset parameter. The wireless device may perform a process using a first value for a parameter associated with the process. The wireless device may perform a process using a first value for a timer associated with the process. The wireless device may receive a command/signaling indicating switching from the first monitoring periodicity value to a second monitoring periodicity value. The command/signaling may indicate switching from the first monitoring periodicity and offset value to a second monitoring periodicity and offset value. Based on (e.g., in response to) the receiving the command/signaling, the wireless device may perform the process using a second value of the parameter and/or a second timer value of the timer. In an example, the wireless device may autonomously (e.g., without receiving a command/signaling from the base station indicating the switching, for example, based on an expiry of a timer) switch from the first monitoring periodicity value or the first monitoring periodicity and offset value to the second monitoring periodicity value or the second monitoring periodicity and offset value. Based on the switching from the first monitoring periodicity value to the second monitoring periodicity value or the switching from the first monitoring periodicity and offset value to the second monitoring periodicity and offset value, the wireless device may perform the process using a second value of the parameter and/or a second timer value of the timer.

In an example, the configuration parameters may comprise the first value for the parameter and/or the first timer value of the timer. In an example, the configuration parameters may indicate the first value for the parameter and/or the first timer value of the timer. In an example, the configuration parameters may comprise a first parameter indicating the first timer value of the timer. In an example, the configuration parameters may comprise a first parameter indicating a first value for the parameter.

In an example, the configuration parameters may comprise the second monitoring periodicity value. In an example, the configuration parameters may comprise the second monitoring periodicity and offset value. In an example, the configuration parameters may indicate the second monitoring periodicity value. In an example, the configuration parameters may indicate the second monitoring periodicity and offset value. In an example, the configuration parameters may comprise a second parameter (e.g., a second monitoring periodicity parameter) indicating the second monitoring periodicity value. In an example, the configuration parameters may comprise a second parameter (e.g., a second monitoring periodicity and offset parameter) indicating the second monitoring periodicity and offset value.

In an example, the second monitoring periodicity value may be the first monitoring periodicity value multiplied by a scaling factor. In an example, the second monitoring periodicity and offset value may be the first monitoring periodicity and offset value multiplied by a scaling factor. In an example, the scaling factor may have a value larger than one (e.g., 2, 3, 4, 8, 16, . . . ). In an example, the configuration parameters may comprise the scaling factor. The configuration parameters may indicate the scaling factor. The configuration parameters may comprise a parameter (e.g., a scaling factor parameter) indicating the scaling factor.

In an example, the command/signaling may indicate the scaling factor. The command/signaling may comprises a field, a value of the field indicating the scaling factor.

In an example, the configuration parameters may comprise and/or indicate a plurality of scaling factors. The configuration parameters may comprise one or more parameters indicating the plurality of the scaling factors. The command/signaling may indicate a scaling factor in the plurality of scaling factors. The command/signaling may comprise a field, a value of the field indicating the scaling factor in the plurality of the scaling factors.

In an example, the second value of the parameter may be based on the first value of the parameter and a first scaling factor, wherein the first scaling factor may be based on the scaling factor. For example, the second value of the parameter may be based on the first value of the parameter multiplied by first scaling factor. In an example, the second timer value may be based on the first timer value and a first scaling factor, wherein the first scaling factor may be based on the scaling factor. For example, the second timer value may be the first timer value multiplied by the first scaling factor. In an example, the first scaling factor may be the scaling factor.

In an example, wherein the configuration parameters may comprise the second value of the parameter. In an example, the configuration parameters may indicate the second value of the parameter. The configuration parameters may comprise a second parameter indicating the second value of the parameter. In an example, the configuration parameters may comprise the second timer value of the timer. In an example, the configuration parameters may indicate the second timer value of the timer. The configuration parameters may comprise a second parameter indicating the second timer value.

In an example, the command/signaling may comprise a field, a value of the field indicating the second value of the parameter. In an example, the command/signaling may comprise a field, a value of the field indicating the second timer value of the timer.

In an example, the configuration parameters may comprise a plurality of values of the parameter. The command/signaling may comprise a field, a value of the field indicating an index to the second value of the parameter in the plurality of values of the parameter.

In an example, the configuration parameters may comprise a plurality of timer values of the timer. The command/signaling may comprise a field, a value of the field indicating an index to the second timer value of the plurality of timer values.

In an example, the wireless device may monitor the control channel based on the first monitoring periodicity value before receiving the command/signaling. The wireless may monitor the control channel based on the first monitoring periodicity and offset value before receiving the command/signaling. The wireless device may monitor the control channel based on the second monitoring periodicity value after receiving the command. The wireless device may monitor the control channel based on the second monitoring periodicity and offset value after receiving the command.

In an example, the signaling/command may be received via a downlink control channel (e.g., PDCCH). The signaling/command may be based on a downlink control information of a first format.

In an example, the signaling/command may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example, the process may be a discontinuous reception (DRX) process. The timer may be a timer associated with a DRX process and/or the parameter may be a parameter associated with the DRX process.

In an example embodiment, a wireless device may receive configuration parameters comprising: a first monitoring periodicity value for a monitoring periodicity parameter or a first monitoring periodicity and offset value for a monitoring periodicity and offset parameter; and a first DRX retransmission timer value. The wireless device may start a DRX retransmission timer, associated with a first transport block, with the first DRX retransmission timer value. The wireless device may receive a command/signaling indicating switching from the first monitoring periodicity value to a second monitoring periodicity value. The command/signaling may indicate switching from the first monitoring periodicity and offset value to a second monitoring periodicity and offset value. Based on (e.g., after) receiving the command/signaling, the wireless device may start the DRX retransmission timer, associated with a second transport block, with a second DRX retransmission timer value. In an example, the wireless device may autonomously (e.g., without receiving a command/signaling from the base station indicating the switching, for example, based on an expiry of a timer) switch from the first monitoring periodicity value or the first monitoring periodicity and offset value to the second monitoring periodicity value or the second monitoring periodicity and offset value. Based on (e.g., after) switching from the first monitoring periodicity value to the second monitoring periodicity value or the switching from the first monitoring periodicity and offset value to the second monitoring periodicity and offset value, the wireless device may start the DRX retransmission timer, associated with a second transport block, with a second DRX retransmission timer value. The wireless device may receive a downlink control information indicating a resource assignment for retransmission of the second transport block.

In an example, the configuration parameters may further comprise/indicate the second DRX retransmission timer value. The configuration parameters may comprise a parameter indicating the second DRX retransmission timer value.

In an example, the starting the DRX retransmission timer with the second DRX retransmission value may be based on a priority associated with the second transport block. In an example, the second transport block may comprise one or more logical channel. The priority associated with second transport block may be based on the one or more logical channels.

In an example, the second DRX retransmission timer value may be based on the first DRX retransmission timer value and the command/signaling. In an example, the second DRX retransmission timer value may be based on the first DRX retransmission timer value and a value of a field of the command/signaling.

In an example, the DRX retransmission timer may be a downlink DRX retransmission timer. The first transport block may be a first downlink transport block. The second transport block may be a second downlink transport block. In an example, the wireless device may receive the first transport block. The wireless device may transmit a HARQ feedback (e.g., negative acknowledgement) associated with the first transport block. The wireless device may start a Hybrid Automatic Repeat Request (HARQ) round trip time (RTT) timer based on the transmitting the HARQ feedback (e.g., the negative acknowledgement). The starting the DRX retransmission timer, with the first DRX retransmission timer value, may be based on the HARQ RTT timer expiring. In an example, the wireless device may receive the second transport block. The wireless device may transmit a HARQ feedback (e.g., a negative acknowledgement) associated with the second transport block. The wireless device may start a HARQ RTT timer based on the transmitting the HARQ feedback (e.g., the negative acknowledgement). The starting the DRX retransmission timer, with the second DRX retransmission timer value, may be based on the HARQ RTT timer expiring.

In an example, the DRX retransmission timer may be an uplink DRX retransmission timer. The first transport block may be a first uplink transport block. The second transport block may be a second uplink transport block. In an example, the wireless device may transmit the first transport block. The wireless device may start a HARQ RTT timer based on transmitting the first transport block. The starting the DRX retransmission timer, with the first DRX retransmission timer value, may be based on the HARQ RTT timer expiring. In an example, the wireless device may transmit the second transport block. The wireless device may start a HARQ RTT timer based on transmitting the second transport block. The starting the DRX retransmission timer, with the second DRX retransmission timer value, may be based on the HARQ RTT timer expiring.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising a first monitoring periodicity value for a monitoring periodicity parameter. The configuration parameters may comprise a first monitoring periodicity and offset value for a first monitoring periodicity and offset parameter. The wireless device may receive a command/signaling indicating switching from the first monitoring periodicity value to a second monitoring periodicity value. The command/signaling may indicate switching from the first monitoring periodicity and offset value to a second monitoring periodicity and offset value. The wireless device may monitor a control channel based on the second monitoring periodicity value or the second monitoring periodicity and offset value in response to the receiving the command/signaling. The wireless device may transmit a negative acknowledgement associated with a downlink transmission. In an example, the wireless device may monitor the control channel based on the first monitoring periodicity value or the first monitoring periodicity and offset value based on the transmitting the negative acknowledgement. The wireless device may switch from the second monitoring periodicity or the second monitoring periodicity and offset value to the first monitoring periodicity or the first monitoring periodicity and offset value based on (e.g., in response to) transmitting the negative acknowledgement. In an example, the wireless device may monitor the control channel based on a third monitoring periodicity value or a third monitoring periodicity and offset value based on the transmitting the negative acknowledgement. The wireless device may switch from the second monitoring periodicity or the second monitoring periodicity and offset value to the third monitoring periodicity or the third monitoring periodicity and offset value based on (e.g., in response to) transmitting the negative acknowledgement.

In an example, the monitoring the control channel based on the first monitoring periodicity value or the first monitoring periodicity and offset value may be after a first time duration from the transmitting the negative acknowledgement. In an example, the monitoring the control channel based on the third monitoring periodicity value or the third monitoring periodicity and offset value may be after a first duration from the transmitting the negative acknowledgement. In an example, the first duration may be a pre-configured value. In an example, the first duration may be based on a first wireless device capability parameter. In an example, the wireless device may transmit to a base station, a wireless device capability message comprising the first wireless device capability parameter. In an example, the configuration parameters may comprise/indicate the first duration.

In an example, the wireless device may start a timer (e.g., a HARQ RTT timer) based on the transmitting the negative acknowledgement, wherein the monitoring the control channel based on the first (or third) monitoring periodicity or the first (or third) monitoring periodicity and offset value may be based on an expiry of the timer. The switching from the second monitoring periodicity or the second monitoring periodicity and offset to the first (or third) monitoring periodicity or the first (or third) monitoring periodicity and offset value may be based on the expiry of the timer.

In an example, the downlink transmission may be a downlink transport block. In an example, the monitoring the control channel based on the first (the third) monitoring periodicity value or the first (the third) monitoring periodicity and offset value based on the transmitting the negative acknowledgement (e.g., switching from the second monitoring periodicity value or the second monitoring periodicity and offset value to the first (or third) monitoring periodicity value or the first (or third) monitoring periodicity and offset value) may be based on a priority associated with the downlink transport block.

In an example, the downlink transport block comprises one or more logical channels. The priority associated with the downlink transport block may be based on one or more priorities associated with the one or more logical channels.

In an example, the priority associated with the downlink transport block may be based on a traffic/service type of the downlink transport block.

In an example, the downlink transport block may be a semi-persistent scheduling (SPS) transport block associated with a SPS configuration. The priority associated with the downlink transport block may be based on the SPS configuration. In an example, the configuration parameters received by the wireless device may further comprise first configuration parameters of the SPS configuration, the first configuration parameters comprising a first parameter indicating the priority.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising a first monitoring periodicity value for a monitoring periodicity parameter. The configuration parameters may comprise a first monitoring periodicity and offset value for a monitoring periodicity and offset parameter. The wireless device may receive a command/signaling indicating switching from the first monitoring periodicity value to a second monitoring periodicity value. The command/signaling may indicate switching from the first monitoring periodicity and offset value to a second monitoring and offset value. The wireless device may monitor a control channel based on the second monitoring periodicity value or the second monitoring periodicity and offset value in response to the receiving the command/signaling. The wireless device may transmit an uplink transport block. In an example, the wireless device may monitor the control channel based on the first monitoring periodicity value or the first monitoring periodicity and offset value based on the transmitting the uplink transport block. The wireless device may switch from the second monitoring periodicity or the second monitoring periodicity and offset value to the first monitoring periodicity or the first monitoring periodicity and offset value based on (e.g., in response to) transmitting the uplink transport block. In an example, the wireless device may monitor the control channel based on a third monitoring periodicity value or a third monitoring periodicity and offset value based on the transmitting the uplink transport block. The wireless device may switch from the second monitoring periodicity or the second monitoring periodicity and offset value to the third monitoring periodicity or the third monitoring periodicity and offset value based on (e.g., in response to) transmitting the uplink transport block.

In an example, the monitoring the control channel based on the first monitoring periodicity value or the first monitoring periodicity and offset value may be after a first duration from the transmitting the uplink transport block. In an example, the monitoring the control channel based on the third monitoring periodicity value or the third monitoring periodicity and offset value may be after a first duration from the transmitting the uplink transport block. In an example, the first duration may be a pre-configured value. In an example, the first duration may be based on a first wireless device capability parameter. In an example, the wireless device may transmit to a base station, a wireless device capability message comprising the first wireless device capability parameter. In an example, the configuration parameters may comprise/indicate the first duration.

In an example, the wireless device may start a timer (e.g., a HARQ RTT timer) based on the transmitting the uplink transport block, wherein the monitoring the control channel based on the first (or the third) monitoring periodicity or the first (or the third) monitoring periodicity and offset value may be based on an expiry of the timer. The switching from the second monitoring periodicity or the second monitoring periodicity and offset to the first (or third) monitoring periodicity or the first (or third) monitoring periodicity and offset value may be based on the expiry of the timer.

In an example, the monitoring the control channel based on the first (or the third) monitoring periodicity value or the first (or the third) monitoring periodicity and offset parameter value based on the transmitting the uplink transport block may be based on a priority associated with the uplink transport block.

In an example, the uplink transport block may comprise one or more logical channels. The priority associated with the uplink transport block may be based on one or more priorities associated with the one or more logical channels.

In an example, the priority associated with the uplink transport block may be based on a traffic/service type of the uplink transport block.

In an example, the uplink transport block may be a configured grant transport block associated with a configured grant configuration. The priority associated with the uplink transport block may be based on the configured grant configuration. In an example, the configuration parameters received by the wireless device may further comprise first configuration parameters of the configured grant configuration, the first configuration parameters comprising a first parameter indicating the priority.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising a first monitoring periodicity value for a monitoring periodicity parameter. The configuration parameters may comprise a first monitoring periodicity and offset value for a monitoring periodicity and offset parameter. The wireless device may receive a command/signaling indicating switching from the first monitoring periodicity value to a second monitoring periodicity value. The command/signaling may indicate switching from the first monitoring periodicity and offset value to a second monitoring and offset value. The wireless device may monitor a control channel based on the second monitoring periodicity value or the second monitoring periodicity and offset value in response to the receiving the command/signaling. The wireless device may trigger and/or transmit a scheduling request. The wireless device may switch from the second monitoring periodicity or the second monitoring periodicity and offset value to the first (or a third) monitoring periodicity or the first (or a third) monitoring periodicity and offset value based on the triggering and/or based on the transmitting the scheduling request. The wireless device may monitor the control channel based on the first (or the third) monitoring periodicity or the first (or the third) monitoring periodicity and offset value based on the triggering and/or transmitting the scheduling request or based on the switching.

In an example, the triggering and/or the transmitting the scheduling request may be based on data becoming available for a logical channel. In an example, the switching from the second monitoring periodicity value to the first (or the third) monitoring periodicity value or the switching from the second monitoring periodicity and offset value to the first (or the third) monitoring periodicity and offset value may be based on a scheduling request configuration (e.g., scheduling request scheduling configuration parameters) associated with the logical channel and/or the scheduling request. In an example, the monitoring the control channel based on the first (or the third) monitoring periodicity value or the first (or the third) monitoring periodicity and offset value may be based on a scheduling request configuration (e.g., scheduling request scheduling configuration parameters) associated with the logical channel and/or the scheduling request.

In an example, the triggering and/or the transmitting the scheduling request may be based on data becoming available for a logical channel. In an example, the switching from the second monitoring periodicity value to the first (or the third) monitoring periodicity value or the switching from the second monitoring periodicity and offset value to the first (or the third) monitoring periodicity and offset value may be based on a value of a first configuration parameter in the scheduling request configuration parameters associated with the logical channel/scheduling request. In an example, the monitoring the control channel based on the first (or the third) monitoring periodicity value or the first (or the third) monitoring periodicity and offset value may be based on a value of a first configuration parameter of the scheduling request configuration parameters associated with the logical channel/scheduling request. In an example, the first configuration parameter indicates a priority associated with the scheduling request configuration.

In an example, the switching from the second monitoring periodicity value to the first (or the third) monitoring periodicity value or the switching from the second monitoring periodicity and offset value to the first (or the third) monitoring periodicity and offset value may be based on the scheduling request being associated with beam failure recovery process. In an example, the monitoring the control channel based on the first (or the third) monitoring periodicity value or the first (or the third) monitoring periodicity and offset value may be based on the scheduling request being associated with beam failure recovery process.

In an example, the switching from the second monitoring periodicity or the second monitoring periodicity and offset value to the first (or the third) monitoring periodicity value or the first (or the third) monitoring periodicity and offset value may be after a first duration from the transmitting the scheduling request. In an example, the monitoring the control channel based on the first (or the third) monitoring periodicity and offset value may be after a first duration from the transmitting the scheduling request. In an example, the first duration is a pre-configured value. In an example, the first duration is based on a first wireless device capability parameter. In an example, the wireless device may transmit to a base station, a wireless device capability message comprising the first wireless device capability parameter. In an example, the configuration parameters may comprise/indicate the first duration.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising: a first monitoring periodicity value for a monitoring periodicity parameter; and a first scheduling request prohibit timer value for a scheduling request prohibit timer associated with a scheduling request configuration. The configuration parameters may comprise a first monitoring periodicity and offset value for a monitoring periodicity and offset parameter. The wireless device may transmit a first scheduling request associated with the scheduling request configuration. The wireless device may start the scheduling request prohibit timer with the first scheduling request prohibit timer value based on transmitting the first scheduling request. The wireless device may receive a command/signaling indicating switching from the first monitoring periodicity value to a second monitoring periodicity value or switching from the first monitoring periodicity and offset value to a second monitoring periodicity and offset value. In an example, the wireless device may autonomously (e.g., without receiving a command/signaling from the base station indicating the switching, for example, based on an expiry of a timer) switch from the first monitoring periodicity value or the first monitoring periodicity and offset value to the second monitoring periodicity value or the second monitoring periodicity and offset value. The wireless device may transmit a second scheduling request associated with the scheduling request configuration. The wireless device may start the scheduling request prohibit timer with a second scheduling request prohibit timer value based on transmitting the second scheduling request, wherein the second scheduling request prohibit timer value is based on the receiving the command/signaling or based on the switching from the from the first monitoring periodicity value or the first monitoring periodicity and offset value to the second monitoring periodicity value or the second monitoring periodicity and offset value. The wireless device may start a third scheduling request based on expiry of the scheduling request prohibit timer.

In an example, the configuration parameters may further comprise the second scheduling request prohibit timer value for the scheduling request prohibit timer associated with the scheduling request configuration.

In an example, the second scheduling request prohibit timer value may be based on the command/signaling. In an example, the second scheduling request prohibit timer value may be based on the command/signaling and the first scheduling request prohibit timer value. In an example, the command/signaling may indicate a scaling factor. The second scheduling request prohibit timer value may be based on the first scheduling request prohibit timer value and the scaling factor. In an example, the configuration parameters may comprise/indicate a plurality of scaling factors. The command/signaling may indicate a scaling factor in the plurality of scaling factors.

In an example, the configuration parameters may comprise/indicate a plurality of scheduling request prohibit timer values. The command/signaling may indicate the second scheduling request prohibit timer in the plurality of the scheduling request prohibit timer values. In an example, the command/signaling may comprise a field, a value of the field indicating the second scheduling request prohibit timer value in the plurality of the scheduling request prohibit timer values.

In an example, the second scheduling request prohibit timer value may be based on the first scheduling request prohibit timer value; the first monitoring periodicity value; and the second monitoring periodicity value. In an example, the second scheduling request prohibit timer value may be based on the first scheduling request prohibit timer value; the first monitoring periodicity and offset value; and the second monitoring periodicity and offset value.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising a first monitoring periodicity value for a monitoring periodicity parameter. The configuration parameters may comprise a first monitoring periodicity and offset value for a monitoring periodicity and offset parameter. The wireless device may receive a command/signaling indicating switching from the first monitoring periodicity value to a second monitoring periodicity value. The command/signaling may indicate switching from the first monitoring periodicity and offset value to a second monitoring and offset value. The wireless device may monitor a control channel based on the second monitoring periodicity value or the second monitoring periodicity and offset value in response to the receiving the command/signaling. The wireless device may transmit a random access preamble based on starting a random access process. The wireless device may switch from the second monitoring periodicity or the second monitoring periodicity and offset value to the first (or a third) monitoring periodicity or the first (or a third) monitoring periodicity and offset value based on the starting the random access process and/or based on the transmitting the random access preamble. The wireless device may monitor the control channel based on the first (or the third) monitoring periodicity value or the first (or the third) monitoring periodicity and offset value based on the starting the random access process and/or based on the transmitting the random access preamble and/or based on the switching the monitoring periodicity or the monitoring periodicity and offset value.

In an example, the switching from the second monitoring periodicity value to the first (or the third) monitoring periodicity value or the switching from the second monitoring periodicity and offset value to the first (or the third) monitoring periodicity and offset value may be based on a priority associated with the random access process. In an example, the monitoring the control channel based on the first (or the third) monitoring periodicity value or the first (or the third) monitoring periodicity and offset value may be based on a priority associated with the random access process.

In an example, the switching from the second monitoring periodicity value to the first (or the third) monitoring periodicity value or the switching from the second monitoring periodicity and offset value to the first (or the third) monitoring periodicity and offset value may be based on the random access process being associated with a beam failure recovery. In an example, the monitoring the control channel based on the first (or the third) monitoring periodicity value or the first (or the third) monitoring periodicity and offset value may be based on the random access process being associated with beam failure recovery.

In an example, the switching from the second monitoring periodicity value to the first (or the third) monitoring periodicity value or the switching from the second monitoring periodicity and offset value to the first (or the third) monitoring periodicity and offset value may be after transmission of a message associated with the random access process (e.g., Msg3). In an example, the switching or the monitoring the control channel based on the first (or the third) monitoring periodicity or the first (or the third) monitoring periodicity and offset value may be after a first duration from the transmitting the message associated with the random access process. In an example, the first duration may be a pre-configured value. In an example, the first duration may be based on a first wireless device capability parameter. In an example, the wireless device may transmit to a base station, a wireless device capability message comprising the first wireless device capability parameter. In an example, the configuration parameters may comprise/indicate the first duration.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising: a first monitoring periodicity and offset value for a monitoring periodicity and offset parameter; and a first random access response window value. The configuration parameters may comprise a first monitoring periodicity value for a monitoring periodicity parameter. The wireless device may transmit a first random access preamble based on starting a first random access process. The wireless device may monitor a control channel based on the first random access response window value in response to the transmitting the first random access preamble. The wireless device may receive a command/signaling indicating switching from the first monitoring periodicity value to a second monitoring periodicity value or switching from the first monitoring periodicity and offset value to a second monitoring periodicity and offset value. In an example, the wireless device may autonomously (e.g., without receiving a command/signaling for example based on an expiry of a timer) switch from the first monitoring periodicity value to a second monitoring periodicity value or switch from the first monitoring periodicity and offset value to a second monitoring periodicity and offset value. The wireless device may transmit a second random access preamble based on starting a second random access process. The wireless device may monitor the control channel based on a second random access response window value in response to the transmitting the second random access preamble, wherein the second random access response window value is based on the receiving the command. The wireless device may receive an uplink grant based on the monitoring the control channel in response to the transmitting the second random access preamble. The wireless device may transit a transport block based on the uplink grant.

In an example, the configuration parameters may further comprise/indicate the second random access response value.

In an example, the second random access response window value may be based on the command/signaling. In an example, the second random access response window value may be based on the command/signaling and the first random access response window value. In an example, the command/signaling may indicate a scaling factor. The second random access response window value may be based on the first random access response window value and the scaling factor.

In an example, the configuration parameters comprise/indicate a plurality of scaling factors.

The command/signaling may indicate a scaling factor in the plurality of scaling factors.

In an example, the configuration parameters may comprise/indicate a plurality of random access response window values. The command/signaling may indicate the second random access response window value in the plurality of the random access response window values. In an example, the command/signaling may comprise a field, a value of the field indicating the second random access response window value in the plurality of the random access response window values.

In an example, the second random access response window value may be based on: the first random access response window value, the first monitoring periodicity value and the second monitoring periodicity value. In an example, the second random access response window value may be based on: the first random access response window value, the first monitoring periodicity and offset value and the second monitoring periodicity and offset value.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising: a first monitoring periodicity and offset value for a monitoring periodicity and offset parameter; and first configuration parameters for a configured grant configuration. The configuration parameters may comprise a first monitoring periodicity value for a monitoring periodicity parameter. The wireless device may receive a command/signaling indicating switching from the first monitoring periodicity value to a second monitoring periodicity value or switching from the first monitoring periodicity and offset value to a second monitoring periodicity and offset value. The wireless device may monitor a control channel based on the second monitoring periodicity value or the second monitoring periodicity and offset value in response to receiving the command/signaling. The wireless device may transmit a transport block via a configured grant resource based on the first configuration parameters. The wireless device may switch from the second monitoring periodicity value or the second monitoring periodicity and offset value to the first (or a third) monitoring periodicity value or the first (or a third) monitoring periodicity and offset value based on the transmitting the transport block via the configured grant resource. The wireless device may monitor the control channel based on the first (or the third) monitoring periodicity value or the first (or the third) monitoring periodicity and offset value based on the transmitting the transport block or based on the switching.

In an example, the switching from the second monitoring periodicity value or the second monitoring periodicity and offset value to the first (or the third) monitoring periodicity value or the first (or the third) monitoring periodicity and offset value may be based on the first configuration parameters of the configured grant configuration. In an example, the monitoring the control channel based on the first (or the third) monitoring periodicity value or the first (or the third) monitoring periodicity and offset value may be based on the first configuration parameters of the configured grant configuration.

In an example, the switching from the second monitoring periodicity value or the second monitoring periodicity and offset value to the first (or the third) monitoring periodicity value or the first (or the third) monitoring periodicity and offset value may be based on a value of a configuration parameter in the first configuration parameters of the configured grant configuration. In an example, the monitoring the control channel based on the first (or the third) monitoring periodicity value or the first (or the third) monitoring periodicity and offset value may be based on a value of a configuration parameter in the first configuration parameters of the configured grant configuration. In an example, the configuration parameter may indicate a priority associated with the configured grant configuration.

In an example, the switching from the second monitoring periodicity value or the second monitoring periodicity and offset value to the first (or the third) monitoring periodicity value or the first (or the third) monitoring periodicity and offset value may be after a first duration from the transmitting the transport block. The monitoring the control channel based on the first (or the third) monitoring periodicity value or the first (or the third) monitoring periodicity and offset value may be after a first duration from the transmitting the transport block. In an example, the first duration may be a pre-configured value. In an example, the first duration may be based on a first wireless device capability parameter. In an example, the wireless device may transmit to a base station, a wireless device capability message comprising the first wireless device capability parameter. In an example, the configuration parameters may comprise/indicate the first duration.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising: a first monitoring periodicity and offset value for a monitoring periodicity and offset parameter; and first configuration parameters for a downlink semi-persistent scheduling configuration. The configuration parameters may comprise a first monitoring periodicity value for a monitoring periodicity parameter. The wireless device may receive a command/signaling indicating switching from the first monitoring periodicity value to a second monitoring periodicity value or switching from the first monitoring periodicity and offset value to a second monitoring periodicity and offset value. The wireless device may monitor a control channel based on the second monitoring periodicity value or the second monitoring periodicity and offset value in response to receiving the command/signaling. The wireless device may receive a transport block via a semi-persistent scheduling resource based on the first configuration parameters. The wireless device may switch from the second monitoring periodicity value or the second monitoring periodicity and offset value to the first (or a third) monitoring periodicity value or the first (or a third) monitoring periodicity and offset value based on the receiving the transport block via the semi-persistent scheduling resource. The wireless device may monitor the control channel based on the first (or the third) monitoring periodicity value or the first (or the third) monitoring periodicity and offset value based on the receiving the transport block or based on the switching.

In an example, the switching from the second monitoring periodicity value or the second monitoring periodicity and offset value to the first (or the third) monitoring periodicity value or the first (or the third) monitoring periodicity and offset value may be based on the first configuration parameters of the downlink semi-persistent scheduling configuration. In an example, the monitoring the control channel based on the first (or the third) monitoring periodicity value or the first (or the third) monitoring periodicity and offset value may be based on the first configuration parameters of the downlink semi-persistent scheduling configuration.

In an example, the switching from the second monitoring periodicity value or the second monitoring periodicity and offset value to the first (or the third) monitoring periodicity value or the first (or the third) monitoring periodicity and offset value may be based on a value of a configuration parameter in the first configuration parameters of the downlink semi-persistent scheduling configuration. In an example, the monitoring the control channel based on the first (or the third) monitoring periodicity value or the first (or the third) monitoring periodicity and offset value may be based on a value of a configuration parameter in the first configuration parameters of the downlink semi-persistent scheduling configuration. In an example, the configuration parameter may indicate a priority associated with the downlink semi-persistent scheduling configuration.

In an example, the switching from the second monitoring periodicity value or the second monitoring periodicity and offset value to the first (or the third) monitoring periodicity value or the first (or the third) monitoring periodicity and offset value may be after a first duration from the receiving the transport block. The monitoring the control channel based on the first (or the third) monitoring periodicity value or the first (or the third) monitoring periodicity and offset value may be after a first duration from the receiving the transport block. In an example, the first duration may be a pre-configured value. In an example, the first duration may be based on a first wireless device capability parameter. In an example, the wireless device may transmit to a base station, a wireless device capability message comprising the first wireless device capability parameter. In an example, the configuration parameters may comprise/indicate the first duration.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising: a first monitoring periodicity and offset value for a monitoring periodicity and offset parameter; and a first configured grant timer value. The configuration parameters may comprise a first monitoring periodicity value for a monitoring periodicity parameter. The wireless device may start a configured grant timer with the first configured grant timer value. The wireless device may receive a command/signaling indicating switching from the first monitoring periodicity value to a second monitoring periodicity value or switching from the first monitoring periodicity and offset value to a second monitoring periodicity and offset value. The wireless device may start the configured grant timer with a second configured grant timer value based on receiving the command. The wireless device may consider a new data indicator associated with a configured grant as toggled based on the configured grant timer not running.

In an example, the configuration parameters may further comprise/indicate the second configured grant timer value.

In an example, the configuration parameters may comprise first configuration parameters of a configured grant configuration, the first configuration parameters comprising the first configured grant timer value. The starting the configured grant timer with the second configured grant timer value may be based on a priority associated with the configured grant configuration. In an example, the first configuration parameters of the configured grant configuration may comprise a first parameter indicating the priority.

In an example, the second configured grant timer value may be based on the first configured grant timer value and the command/signaling.

In an example, the second configured grant timer value may be based on the first configured grant timer value and a value of a field of the command/signaling.

In an example, the configuration parameters comprise a plurality of configured grant timer values. The command/signaling may indicate the second configured grant timer value in the plurality of configured grant timer values.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising: a first value of a first monitoring periodicity for monitoring a control channel on a first search space set; and a second value of a second monitoring periodicity for monitoring the control channel on a second search space set. In an example, the configuration parameters may comprise a first value of a first monitoring periodicity and offset for monitoring a control channel on a first search space set; and a second value of a second monitoring periodicity and offset for monitoring the control channel on a second search space set. In an example, the wireless device may receive a command/signaling indicating switching control channel monitoring periodicities.

Based on the receiving the command/signaling: the wireless device may switch the first monitoring periodicity from the first value to a third value; and may not switch the second monitoring periodicity and/or may keep the second value for the second monitoring periodicity. In an example, based on the receiving the command/signaling: the wireless device may switch the first monitoring periodicity and offset from the first value to a third value; and may not switch the second monitoring periodicity and offset and/or may keep the second value for the second monitoring periodicity and offset.

In an example, the first search space set may be a wireless device specific search space.

In an example, the second search space set may be a common or group-common search space.

In an example, the second search space may be for receiving downlink control information associated with a random access radio network temporary identifier (RA-RNTI).

In an example, the second search space may be for receiving downlink control information associated with at least one of INT-RNTI, SFI-RNTI, TPC-PUSCH-RNTI, TPC-PUCCH-RNTI, and TPC-SRS-RNTI.

In an example, the second search space may be for receiving downlink control information associated with system information system information radio network temporary identifier (RA-RNTI).

In an example, the second search space may be for receiving downlink control information associated with at least one of INT-RNTI, SFI-RNTI, TPC-PUSCH-RNTI, TPC-PUCCH-RNTI, and TPC-SRS-RNTI.

In an example, the second search space may be for receiving downlink control information associated with system information system information radio network temporary identifier (SI-RNTI).

In an example, the second search space may be for receiving downlink control information associated with paging radio network temporary identifier (P-RNTI).

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive configuration parameters comprising: first configuration parameters of a bandwidth part of a cell; and a value of a monitoring periodicity and offset for monitoring a control channel on a search space set of the bandwidth part. The configuration parameters may comprise a value of a monitoring periodicity for monitoring a control channel on a search space set of the bandwidth part. The wireless device may receive a command/signaling indicating switching control channel monitoring periodicities. In response to the receiving the command/signaling, the wireless device may switch or not switch the monitoring periodicity or may switch or not switch the monitoring periodicity and offset based on the bandwidth part, wherein the bandwidth part is an active bandwidth part of the cell.

In an example, the switching the monitoring periodicity or the monitoring periodicity and offset may be based on the bandwidth part not being a default bandwidth part.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example, a wireless device may receive configuration parameters comprising: first configuration parameters of a first bandwidth part; and second configuration parameters of a second bandwidth part; a first value of a first monitoring periodicity and offset for monitoring a control channel on a first search space set of the first bandwidth part; and a second value of a second monitoring periodicity and offset for monitoring a control channel on a second search space set of the second bandwidth part. The configuration parameters may comprise a first value of a first monitoring periodicity for monitoring a control channel on a first search space set of the first bandwidth part; and a second value of a second monitoring periodicity for monitoring a control channel on a second search space set of the second bandwidth part. The wireless device may receive a command/signaling indicating switching control channel monitoring periodicities. Based on the receiving the command: the wireless device may switch the first monitoring periodicity and offset from the first value to a third value. The wireless device may switch the first monitoring periodicity from the first value to a third value. The wireless device may not switch the second monitoring periodicity and offset and/or may keep the second value for the second monitoring periodicity and offset. The wireless device may not switch the second monitoring periodicity and/or may keep the second value for the second monitoring periodicity. The first bandwidth part and the second bandwidth part may be active bandwidth parts.

In an example, the first bandwidth part may not be a default bandwidth part; and the second bandwidth part may be a default bandwidth part.

In an example, the first bandwidth part may be for a first cell; and the second bandwidth part may be for a second cell.

Additional Dependent Claims

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may transmit, at a first timing, a buffer status report. The wireless device may receive a command/signaling, at a second timing, indicating reducing monitoring a control channel. The wireless device may ignore or not ignore the command/signaling based on the first timing and the second timing.

In an example, the ignoring or not ignoring the command/signaling may be based on a difference between the first timing and the second timing. In an example, the ignoring or not ignoring the command/signaling may be based on the difference being smaller or larger than a buffer status report processing time. In an example, the ignoring or not ignoring the command/signaling may be based on the difference being smaller or larger than a configurable/pre-configured duration.

In an example, the command/signaling may indicate skipping monitoring the control channel. In an example, the command/signaling may indicate skipping monitoring the control channel for a duration.

In an example, the command/signaling may indicate switching from a first monitoring periodicity value to a second monitoring periodicity value for control channel monitoring. In an example, the command/signaling may indicate switching from a first monitoring periodicity and offset value to a second monitoring periodicity and offset value for control channel monitoring.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may transmit a buffer status report indicating available data for one or more logical channels. The wireless device may receive a command/signaling indicating reducing monitoring a control channel. The wireless device may ignore or not ignore the command based on the one or more logical channels.

In an example, the ignoring or not ignoring the command/signaling may be based on priorities associated with the one or more logical channels. The wireless device may receive configuration parameters indicating the priorities associated with the one or more logical channels.

In an example, the command/signaling may indicate skipping monitoring control channel.

In an example, the command/signaling may indicate switching from a first monitoring periodicity value to a second monitoring periodicity value for control channel monitoring. In an example, the command/signaling may indicate switching from a first monitoring periodicity and offset value to a second monitoring periodicity and offset value for control channel monitoring.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example, a wireless device may transmit a buffer status report. The wireless device may receive a command/signaling indicating reducing monitoring a control channel.

In an example embodiment, the wireless device may trigger a buffer status report based on the transmitting the buffer status report and the receiving the command/signaling.

In an example embodiment, the wireless device may trigger/transmit a scheduling request based on the transmitting the buffer status report and the receiving the command/signaling.

In an example embodiment, the wireless device may start a random access process based on the transmitting the buffer status report and the receiving the command/signaling.

In an example, the wireless device may ignore the command/signaling based on the transmitting the buffer status report and the receiving the command/signaling.

In an example, a scheduling request resource and/or a scheduling request configuration associated with the scheduling request may indicate that the wireless ignored the command/signaling.

In an example, a RACH occasion/preamble associated with the random access process may indicate that the wireless ignored the command/signaling.

In an example, the command/signaling may indicate skipping monitoring control channel.

In an example, the command/signaling may indicate skipping monitoring control channel for a duration.

In an example, the command/signaling may indicate switching from a first monitoring periodicity value to a second monitoring periodicity value for control channel monitoring. In an example, the command/signaling may indicate switching from a first monitoring periodicity and offset value to a second monitoring periodicity and offset value for control channel monitoring.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may start a first timer (e.g., a buffer status report timer) based on a condition. The wireless device may receive a command/signaling indicating skipping monitoring control channel for a duration. The wireless device may stop the first timer based on the receiving the command/signaling. The wireless device may start the first timer after the duration.

In an example embodiment, a wireless device may start a first timer (e.g., a buffer status report timer) based on a condition. The wireless device may receive a command/signaling indicating skipping monitoring control channel for a duration. The wireless device may pause the first timer based on the receiving the command/signaling. The wireless device may resume the first timer after the duration.

In an example, the first timer/buffer status report timer may be a retransmission buffer status report timer (retxBSR-Timer).

In an example, the condition may comprise transmitting a buffer status report.

In an example, the condition may comprise reception of a grant for transmission of new data on an UL-SCH.

In an example, the first timer/buffer status report timer may be a periodic buffer status report timer (periodicBSR-Timer). The condition may comprise transmitting a buffer status report.

In an example, the first timer/buffer status report timer may be a logical channel scheduling request delay timer (logicalChannelSR-DelayTimer). The condition may comprise a buffer status report being triggered for a logical channel for which logicalChannelSR-DelayTimerApplied with value true is configured.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive a command/signaling indicating skipping monitoring downlink control channel. The wireless device may transmit a scheduling request while skipping the monitoring the downlink control channel. The wireless device may stop the skipping and/or may resume the monitoring the control channel based on the transmitting the scheduling request.

In an example, the stopping the skipping and/or the resuming the monitoring the control channel may be after a first duration from the transmitting the scheduling request.

In an example, the wireless device may cancel the scheduling request based on a condition. The wireless device may skip the monitoring the control channel based on the cancelling the scheduling request and until a first timing, wherein the command/signaling may indicate skipping the monitoring the control channel until the first timing.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive a command/signaling indicating skipping monitoring a downlink control channel. The wireless device may transmit a scheduling request while skipping the monitoring the downlink control channel. The wireless device may monitor the downlink control channel for a control channel monitoring resume signaling. The wireless device may receive the control channel monitoring resume signaling. The control channel monitoring resume signaling may indicate an uplink grant. The wireless device may cancel the scheduling request based on the uplink grant.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example, a wireless device may transmit, at a first timing, a scheduling request. The wireless device may receive a command/signaling, at a second timing, indicating reducing monitoring control channel. The wireless device may ignore or not ignore the command/signaling based on the first timing and the second timing.

In an example, the ignoring or not ignoring the command/signaling may be based on a difference between the first timing and the second timing. In an example, the ignoring or not ignoring the command/signaling may be based on the difference being smaller or larger than a scheduling request processing time.

In an example, the ignoring or not ignoring the command/signaling may be based on the difference being smaller or larger than a configurable/pre-configured duration.

In an example, the command/signaling may indicate skipping monitoring the control channel. The command/signaling may indicate skipping monitoring the control channel for a duration.

In an example, the command/signaling may indicate switching from a first monitoring periodicity value to a second monitoring periodicity value for control channel monitoring. In an example, the command/signaling may indicate switching from a first monitoring periodicity and offset value to a second monitoring periodicity and offset value for control channel monitoring.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may transmit a scheduling request. The wireless device may receive a command/signaling indicating reducing monitoring control channel. The wireless device may ignore or not ignore the command/signaling based on one or more logical channels associated with the scheduling request. In an example, the wireless device may ignore or not ignore the command/signaling based on a scheduling request configuration associated with the scheduling request. In an example, the wireless device may ignore or not ignore the command/signaling based on a configuration parameter associated with the scheduling request.

In an example, the configuration parameter may indicate a priority associated with the scheduling request.

In an example, the command/signaling may indicate skipping monitoring the control channel. The command/signaling may indicate skipping monitoring the control channel for a duration.

In an example, the command/signaling may indicate switching from a first monitoring periodicity value to a second monitoring periodicity value for control channel monitoring. In an example, the command/signaling may indicate switching from a first monitoring periodicity and offset value to a second monitoring periodicity and offset value for control channel monitoring.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless may transmit a first scheduling request. The wireless device may receive a command/signaling indicating reducing monitoring a control channel. The wireless device may transmit a second scheduling request based on the receiving the command/signaling.

In an example, the wireless device may start a scheduling request prohibit timer based on the transmitting the first scheduling request.

In an example, the wireless device may transmit the second scheduling request while a scheduling request prohibit timer is running.

In an example, the wireless device may transmit the second scheduling request via an earliest useful scheduling request resource.

In an example, the wireless device may stop the scheduling request prohibit timer based on the receiving the command/signaling.

In an example, the command/signaling may indicate skipping monitoring the control channel. The command/signaling may indicate skipping monitoring the control channel for a duration.

In an example, the command/signaling may indicate switching from a first monitoring periodicity value to a second monitoring periodicity value for control channel monitoring. In an example, the command/signaling may indicate switching from a first monitoring periodicity and offset value to a second monitoring periodicity and offset value for control channel monitoring.

In an example, the wireless device may ignore the command/signaling.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may transmit a scheduling request. The wireless device may receive a command/signaling indicating skipping monitoring control channel until a first timing. The wireless device may ignore the command/signaling while the scheduling request is pending. The wireless device may skip the monitoring the control channel until the first timing based on the command/signaling in response to the scheduling request being cancelled.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may receive a command/signaling indicating skipping monitoring a control channel. The wireless device may start a random access process after receiving the command/signaling. The wireless device may ignore the command/signaling and/or may resume the control channel monitoring based on the starting the random access process.

In an example, the command/signaling may indicate skipping monitoring the control channel for a duration.

In an example, the ignoring the command/signaling and/or resuming the control channel monitoring may be after an offset from transmitting a random access preamble. In an example, the offset may be pre-configured. In an example, the offset may be configurable. In an example, the offset may be based on wireless device capability.

In an example, the ignoring the command/signaling and/or resuming the control channel monitoring may be during a random access response window.

In an example, the ignoring the command/signaling and/or resuming the control channel monitoring may be after transmitting a Msg3 or a MsgA. The ignoring the command/signaling and/or resuming the control channel monitoring may be after an offset from transmitting a Msg3 or a MsgA or within a window after the transmitting the Msg3 or MsgA.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may transmit a random access preamble based on starting a random access process. The wireless device may receive a command/signaling indicating skipping monitoring a control channel. The wireless device may ignore the command/signaling based on the starting the random access process.

In an example, the command/signaling may indicate skipping monitoring the control channel for a duration.

In an example, the ignoring the command/signaling may be based on which random access message of the random access process has been transmitted/received.

In an example, the ignoring the command/signaling may be based on the random access preamble and/or Msg A being transmitted. In an example, the ignoring the command may be during a random access response window after transmitting the random access preamble and/or Msg A.

In an example, the ignoring the command/signaling may be based on a random access response being received.

In an example, the ignoring the command/signaling may be based on a Msg3 being transmitted.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

In an example embodiment, a wireless device may transmit a random access preamble based on starting a random access process. The wireless device may receive a command/signaling indicating skipping monitoring a control channel. The wireless device may monitor the control channel for at least one radio network temporary identifier (RNTI) and/or at least one search space based on the starting the random access process and the receiving the command/signaling.

In an example, the command/signaling may indicate skipping monitoring the control channel for a duration.

In an example, the monitoring the control channel for the at least one radio network temporary identifier (RNTI) and/or at the least one search space based on the starting the random access process and the receiving the command/signaling may be at least for a duration after the transmitting the random access preamble.

In an example, the signaling/command may be received via a downlink control channel (e.g., PDCCH). The command/signaling may be based on a downlink control information of a first format.

In an example, the command/signaling may be a MAC control element and may be received in a downlink transport block received via a downlink shared channel (e.g., PDSCH). In an example, a subheader of a MAC PDU comprising the MAC control element may comprise/indicate a logical channel identifier (LCID) associated with the MAC control element.

Figure 48:
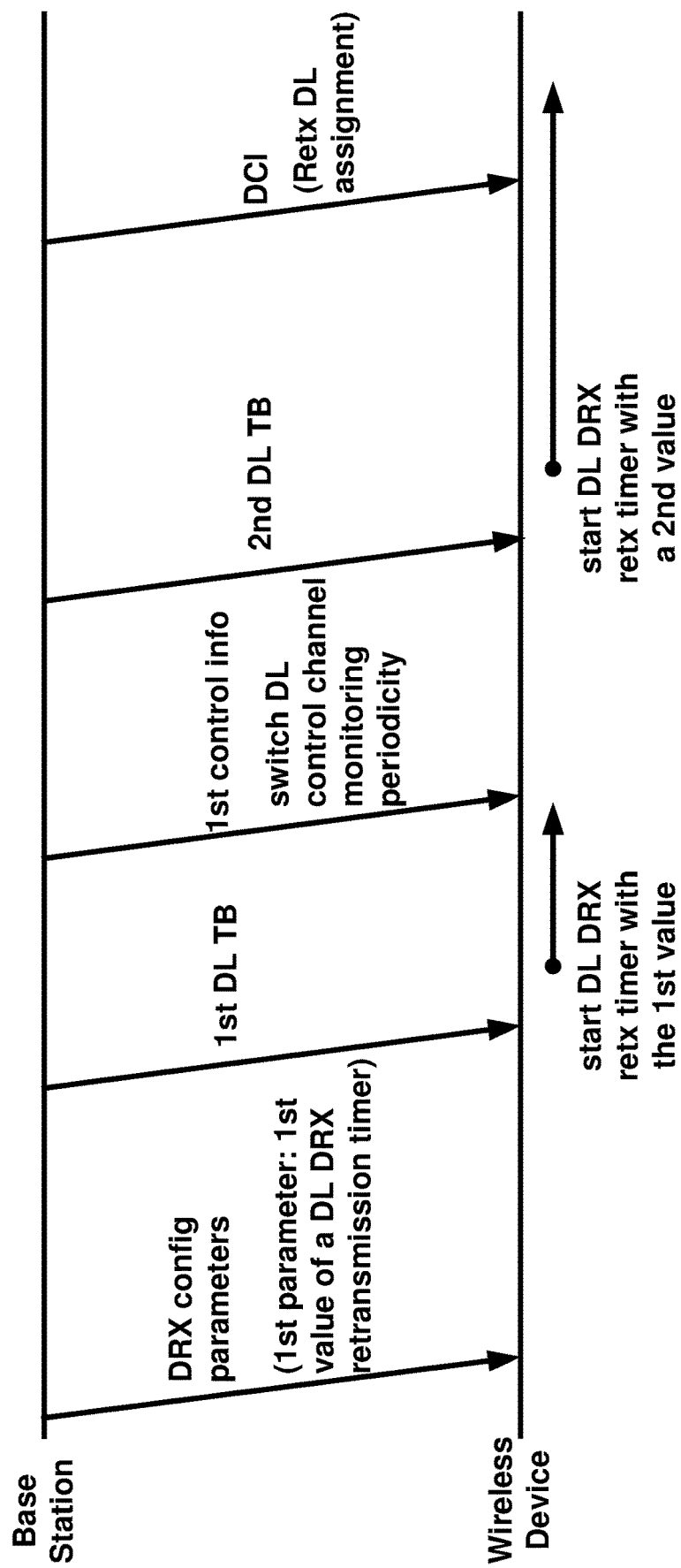
FIG. 48 shows an example process in accordance with several of various embodiments of the present disclosure.

In an example embodiment as shown in FIG. 48, a wireless device may receive one or more messages (e.g., one or more RRC messages) comprising configuration parameters. The configuration parameters may comprise discontinuous reception (DRX) configuration parameters. The DRX configuration parameters may be used by the wireless device in a DRX procedure. The DRX procedure may be used in monitoring of a control channel (e.g., PDCCH) by the wireless device. For example, the wireless device may determine whether the wireless device is in a DRX Active Time and may monitor the control channel (e.g., PDCCH) based on the DRX procedure indicating that the wireless device is in DRX Active Time. The DRX configuration parameters may comprise a first DRX timer. The first DRX timer may be a DL DRX retransmission timer. In an example, the wireless device may be in a DRX Active Time in a plurality of conditions including while the DL DRX retransmission timer is running. The DRX configuration parameters may comprise a first parameter (e.g., drx-RetransmissionTimerDL) indicating a first value of the DL DRX retransmission timer. The wireless device may receive a first transport block (TB). In an example, the wireless device may receive the first TB based on a dynamic uplink grant (e.g., based on a DCI comprising a DL assignment). In an example, the wireless device may receive the first TB based on a DL semi-persistent scheduling (SPS) assignment. In response to receiving the first TB, the wireless device may start the DL DRX retransmission timer with the first value. In an example, the wireless device may determine that the first TB is not received correctly and may transmit a HARQ feedback (e.g., NACK) via a PHUCH. The wireless device may start a DL HARQ RTT timer in a first symbol after the PUCCH carrying the HARQ feedback. The DRX configuration parameters may comprise a parameter indicating the value of the DL HARQ RTT timer. The wireless device may start the DL DRX retransmission timer based on the DL HARQ RTT timer expiring.

The wireless device may switch a downlink control channel periodicity from a first monitoring periodicity to a second monitoring periodicity. The switching from the first monitoring periodicity to the second monitoring periodicity may be based on receiving first control information (e.g., a first DCI). For example, one or more first search space sets (e.g., a first search space set group) may be associated with the first monitoring periodicity and one or more second search space sets (e.g., a second search space set group) may be associated with a second monitoring periodicity. The first control information (e.g., the first DCI) may indicate switching from monitoring the one or more first search space sets (e.g., the first search space set group) to monitoring one or more second search space sets (e.g., the second search space set group). The wireless device may switch the monitoring periodicity from the first monitoring periodicity to the second monitoring periodicity based on switching from monitoring the one or more first search space set (e.g., the first search space set group) to the one or more second search space set (e.g., the second search space set group) in response to receiving the first control information (e.g., the first DCI). In an example, the first control information may indicate switching the monitoring periodicity for one or more cells/BWPs.

The wireless device may receive a second TB. In an example, the wireless device may receive the second TB based on a dynamic uplink grant (e.g., based on a DCI comprising a DL assignment). In an example, the wireless device may receive the second TB based on a DL SPS assignment. In response to receiving the second TB and based on the switching the downlink control channel monitoring periodicity, the wireless device may start the DL DRX retransmission timer with the second value. In an example, the wireless device may determine the second value based on the first value and the first control information. For example, the wireless device may determine the second value based on the first value and a scaling factor. In an example, the wireless device may determine that the second TB is not received correctly and may transmit a HARQ feedback (e.g., NACK) via a PHUCH. The wireless device may start a DL HARQ RTT timer in a first symbol after the PUCCH carrying the HARQ feedback. The DRX configuration parameters may comprise a parameter indicating the value of the DL HARQ RTT timer. In an example, the wireless device may use a value different from the configured value (e.g., a scaled version) of the DL HARQ RTT timer. The wireless device may start the DL DRX retransmission timer based on the DL HARQ RTT timer expiring.

While the DL DRX retransmission timer is running, the wireless device may be in a DRX Active Time. The wireless device may receive a DCI comprising a downlink assignment for retransmission of the second TB. The wireless device may receive the retransmission of the second TB based on the downlink assignment.

Figure 49:
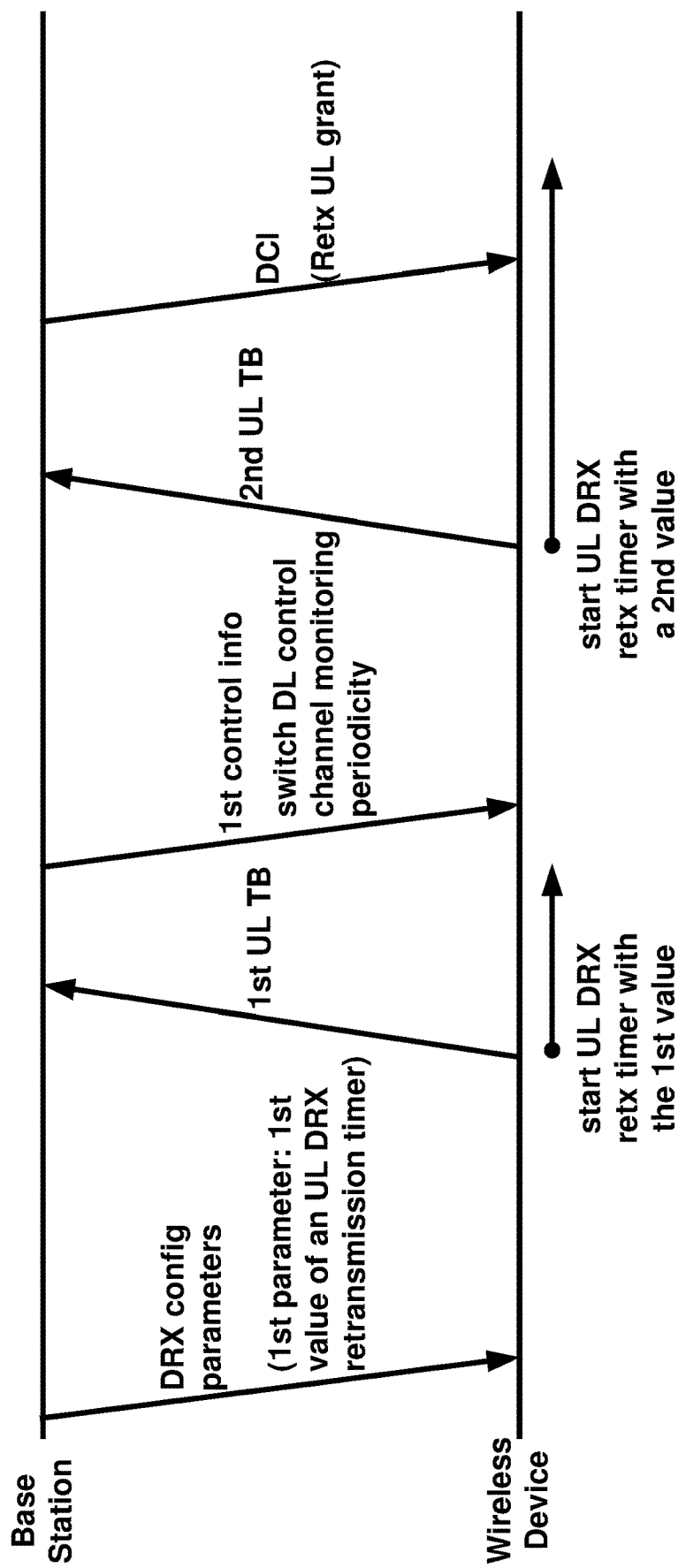
FIG. 49 shows an example process in accordance with several of various embodiments of the present disclosure.

In an example embodiment as shown in FIG. 49, a wireless device may receive one or more messages (e.g., one or more RRC messages) comprising configuration parameters. The configuration parameters may comprise discontinuous reception (DRX) configuration parameters. The DRX configuration parameters may be used by the wireless device in a DRX procedure. The DRX procedure may be used in monitoring of a control channel (e.g., PDCCH) by the wireless device. For example, the wireless device may determine whether the wireless device is in a DRX Active Time and may monitor the control channel (e.g., PDCCH) based on the DRX procedure indicating that the wireless device is in DRX Active Time. The DRX configuration parameters may comprise a first DRX timer. The first DRX timer may be an UL DRX retransmission timer. In an example, the wireless device may be in a DRX Active Time in a plurality of conditions including while the UL DRX retransmission timer is running. The DRX configuration parameters may comprise a first parameter (e.g., drx-RetransmissionTimerUL) indicating a first value of the UL DRX retransmission timer. The wireless device may transmit a first transport block (TB). In an example, the wireless device may transmit the first TB based on a dynamic uplink grant (e.g., based on a DCI comprising an UL grant). In an example, the wireless device may receive the first TB based on an UL configured grant. In response to transmitting the first TB, the wireless device may start the UL DRX retransmission timer with the first value. The wireless device may start an UL HARQ RTT timer in a first symbol after the PUSCH carrying the first TB. The DRX configuration parameters may comprise a parameter indicating the value of the UL HARQ RTT timer. The wireless device may start the UL DRX retransmission timer based on the UL HARQ RTT timer expiring.

The wireless device may switch a downlink control channel periodicity from a first monitoring periodicity to a second monitoring periodicity. The switching from the first monitoring periodicity to the second monitoring periodicity may be based on receiving first control information (e.g., a first DCI). For example, one or more first search space sets (e.g., a first search space set group) may be associated with the first monitoring periodicity and one or more second search space sets (e.g., a second search space set group) may be associated with a second monitoring periodicity. The first control information (e.g., the first DCI) may indicate switching from monitoring the one or more first search space sets (e.g., the first search space set group) to monitoring one or more second search space sets (e.g., the second search space set group). The wireless device may switch the monitoring periodicity from the first monitoring periodicity to the second monitoring periodicity based on switching from monitoring the one or more first search space set (e.g., the first search space set group) to the one or more second search space set (e.g., the second search space set group) in response to receiving the first control information (e.g., the first DCI). In an example, the first control information may indicate switching the monitoring periodicity for one or more cells/BWPs.

The wireless device may transmit a second TB. In an example, the wireless device may transmit the second TB based on a dynamic uplink grant (e.g., based on a DCI comprising an uplink grant). In an example, the wireless device may transmit the second TB based on an uplink configured grant. In response to transmitting the second TB and based on the switching the downlink control channel monitoring periodicity, the wireless device may start the UL DRX retransmission timer with the second value. In an example, the wireless device may determine the second value based on the first value and the first control information. For example, the wireless device may determine the second value based on the first value and a scaling factor. The wireless device may start an UL HARQ RTT timer in a first symbol after the PUSCH carrying the second TB. The DRX configuration parameters may comprise a parameter indicating the value of the UL HARQ RTT timer. In an example, the wireless device may use a value different from the configured value (e.g., a scaled version) of the UL HARQ RTT timer. The wireless device may start the UL DRX retransmission timer based on the UL HARQ RTT timer expiring.

While the UL DRX retransmission timer is running, the wireless device may be in a DRX Active Time. The wireless device may receive a DCI comprising an uplink grant for retransmission of the second TB. The wireless device may transmit the retransmission of the second TB based on the uplink grant.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

FIG. 50 shows an example flow diagram in accordance with several of various embodiments of the present disclosure. At 5010, a wireless device may receive discontinuous reception (DRX) configuration parameters comprising a first parameter indicating a first value of a downlink DRX retransmission timer. At 5020, in response to receiving a first transport block, the wireless device may start the downlink DRX retransmission timer with the first value. At 5030, the wireless device may switch a downlink control channel monitoring periodicity from a first monitoring periodicity to a second monitoring periodicity based on receiving first control information. At 5040, in response to receiving a second transport block and based on the switching the downlink control channel monitoring periodicity, the wireless device may start the downlink DRX retransmission timer with a second value. At 5050, the wireless device may receive, while the downlink DRX retransmission timer is running, a downlink control information comprising a downlink assignment for retransmission of the second transport block.

In an example embodiment, the second value of the downlink DRX retransmission timer may be based on the first value of the downlink DRX retransmission timer and the first control information.

In an example embodiment, the wireless device may receive the first transport block. The wireless device may transmit a hybrid automatic repeat request (HARQ) feedback associated with the first transport block. The wireless device may start a downlink HARQ round trip time (RTT) timer in response to transmitting the HARQ feedback. The starting the downlink DRX retransmission timer, with the first value, may be based on an expiry of the downlink HARQ RTT timer. In an example embodiment, the HARQ feedback may be negative acknowledgement. In an example embodiment, the starting the downlink HARQ RTT timer may be in a first symbol after an end of a corresponding transmission carrying the HARQ feedback. The starting the downlink DRX retransmission timer, with the first value, may be in a first symbol after the expiry of the downlink HARQ RTT timer.

In an example embodiment, the wireless device may receive the second transport block. The wireless device may transmit a hybrid automatic repeat request (HARQ) feedback associated with the second transport block. The wireless device may start a downlink HARQ round trip time (RTT) timer in response to transmitting the HARQ feedback. The starting the downlink DRX retransmission timer, with the second value, may be based on an expiry of the downlink HARQ RTT timer. In an example embodiment, the HARQ feedback may be negative acknowledgement. In an example embodiment, the starting the downlink HARQ RTT timer may be in a first symbol after an end of a corresponding transmission carrying the HARQ feedback. The starting the downlink DRX retransmission timer, with the second value, may be in a first symbol after the expiry of the downlink HARQ RTT timer.

In an example embodiment, the wireless device may receive configuration parameters of a plurality of cells, wherein the switching the downlink control channel monitoring periodicity, at 5030, may be for one or more cells of the plurality of cells. In an example embodiment, the switching the downlink control channel monitoring periodicity, at 5030, may be for one or more bandwidth parts (BWPs) of the one or more cells.

FIG. 51 shows an example flow diagram in accordance with several of various embodiments of the present disclosure. At 5110, a wireless device may receive discontinuous reception (DRX) configuration parameters comprising a first parameter indicating a first value of an uplink DRX retransmission timer. At 5120, in response to transmitting a first transport block, the wireless device may start the uplink DRX retransmission timer with the first value. At 5130, the wireless device may switch a downlink control channel monitoring periodicity from a first monitoring periodicity to a second monitoring periodicity based on receiving first control information. At 5140, in response to transmitting a second transport block and based on the switching the downlink control channel monitoring periodicity, the wireless device may start the uplink DRX retransmission timer with a second value. At 5150, the wireless device may receive, while the uplink DRX retransmission timer is running, a downlink control information comprising an uplink grant for retransmission of the second transport block.

In an example embodiment, the second value of the uplink DRX retransmission timer may be based on the first value of the uplink DRX retransmission timer and the first control information.

In an example embodiment, the wireless device may transmit the first transport block. The wireless device may start an uplink HARQ round trip time (RTT) timer in response to transmitting the first transport block. The starting the uplink DRX retransmission timer, with the first value, may be based on an expiry of the uplink HARQ RTT timer. In an example embodiment, the starting the uplink HARQ RTT timer may be in a first symbol after an end of a corresponding physical uplink shared channel transmission of the first transport block. The starting the uplink DRX retransmission timer, with the first value, may be in a first symbol after the expiry of the uplink HARQ RTT timer.

In an example embodiment, the wireless device may transmit the second transport block. The wireless device may start an uplink HARQ round trip time (RTT) timer in response to transmitting the second transport block. The starting the uplink DRX retransmission timer, with the second value, may be based on an expiry of the uplink HARQ RTT timer. In an example embodiment, the starting the uplink HARQ RTT timer may be in a first symbol after an end of a corresponding physical uplink shared channel transmission of the second transport block. The starting the uplink DRX retransmission timer, with the second value, may be in a first symbol after the expiry of the uplink HARQ RTT timer.

In an example embodiment, the wireless device may receive configuration parameters of a plurality of cells, wherein the switching the downlink control channel monitoring periodicity is for one or more cells of the plurality of cells. In an example embodiment, the switching the downlink control channel monitoring periodicity may be for one or more bandwidth parts (BWPs) of the one or more cells.

In an example embodiment, the wireless device is in a DRX Active Time based on uplink DRX retransmission timer running.

In an example embodiment, the second value of the uplink DRX retransmission timer may be based on the first value and a scaling factor.

Figure 52:
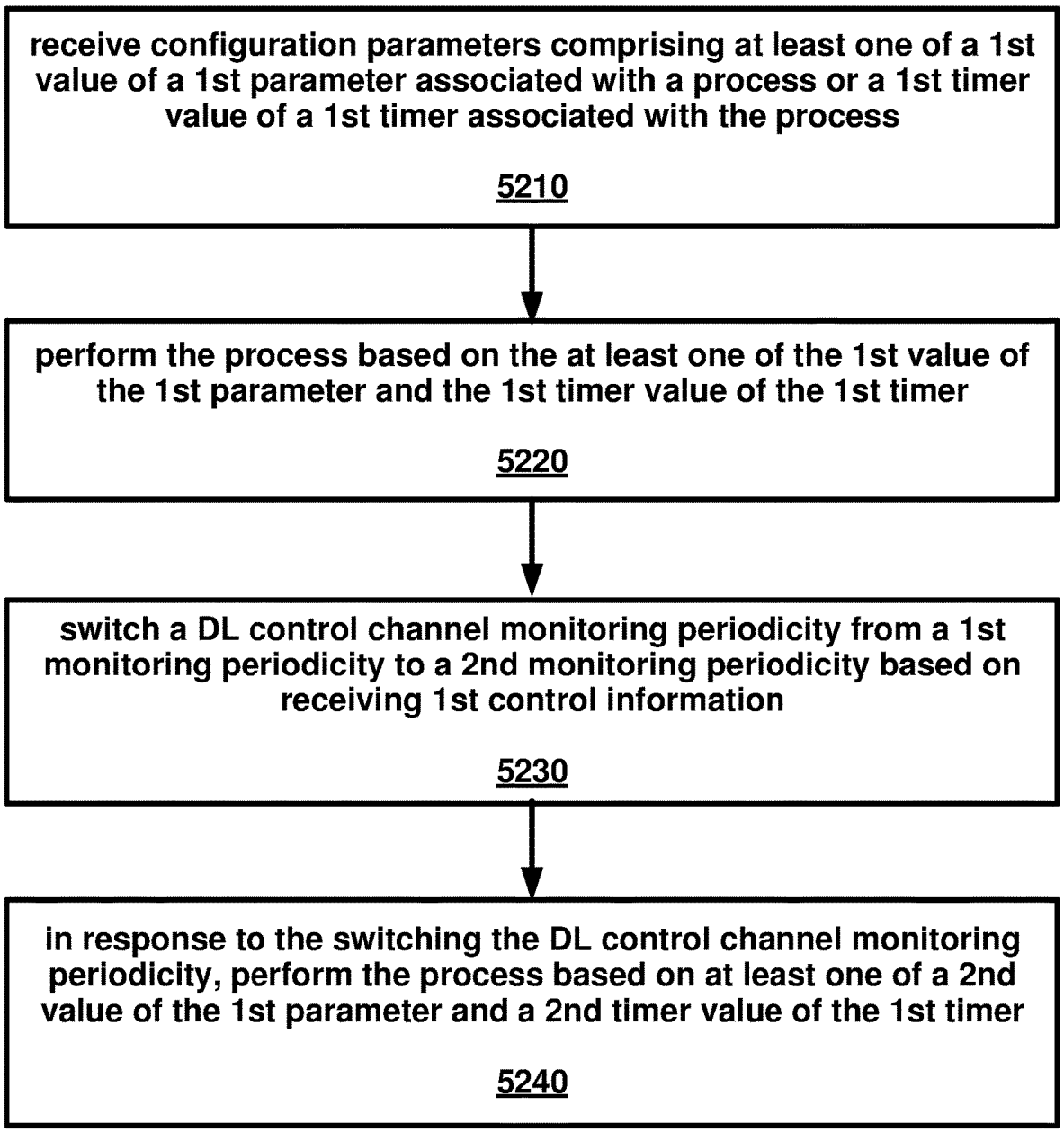
FIG. 52 shows an example flow diagram in accordance with several of various embodiments of the present disclosure.

FIG. 52 shows an example flow diagram in accordance with several of various embodiments of the present disclosure. At 5210, a wireless device may receive configuration parameters comprising at least one of a first value of a first parameter associated with a process or a first timer value of a first timer associated with the process. At 5220, the wireless device may perform the process based on the at least one of the first value of the first parameter and the first timer value of the first timer. At 5230, the wireless device may switch a downlink control channel monitoring periodicity from a first monitoring periodicity to a second monitoring periodicity based on receiving first control information. At 5240, in response to the switching the downlink control channel monitoring periodicity, the wireless device may perform the process based on at least one of a second value of the first parameter and a second timer value of the first timer.

In an example embodiment, the process may be a discontinuous reception (DRX) process.

In an example embodiment, the process may be a random access process.

Figure 53:
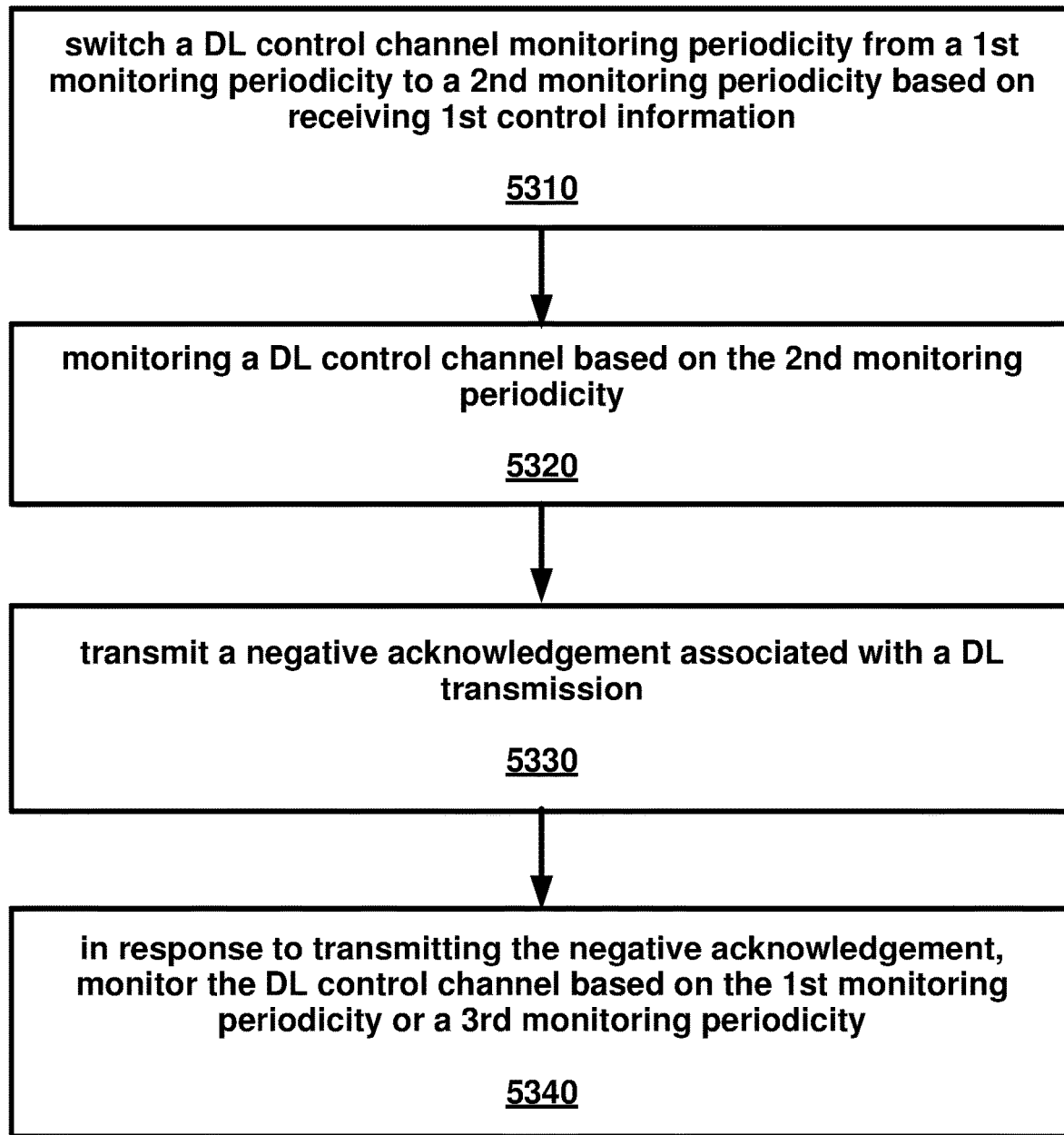
FIG. 53 shows an example flow diagram in accordance with several of various embodiments of the present disclosure.

FIG. 53 shows an example flow diagram in accordance with several of various embodiments of the present disclosure. At 5310, a wireless device may switch a downlink control channel monitoring periodicity from a first monitoring periodicity to a second monitoring periodicity based on receiving first control information. At 5320, the wireless device may monitor a downlink control channel based on the second monitoring periodicity. At 5330, the wireless device may transmit a negative acknowledgement associated with a downlink transmission. At 5340, in response to transmitting the negative acknowledgement, the wireless device may monitor the downlink control channel based on the first monitoring periodicity or a third monitoring periodicity.

Figure 54:
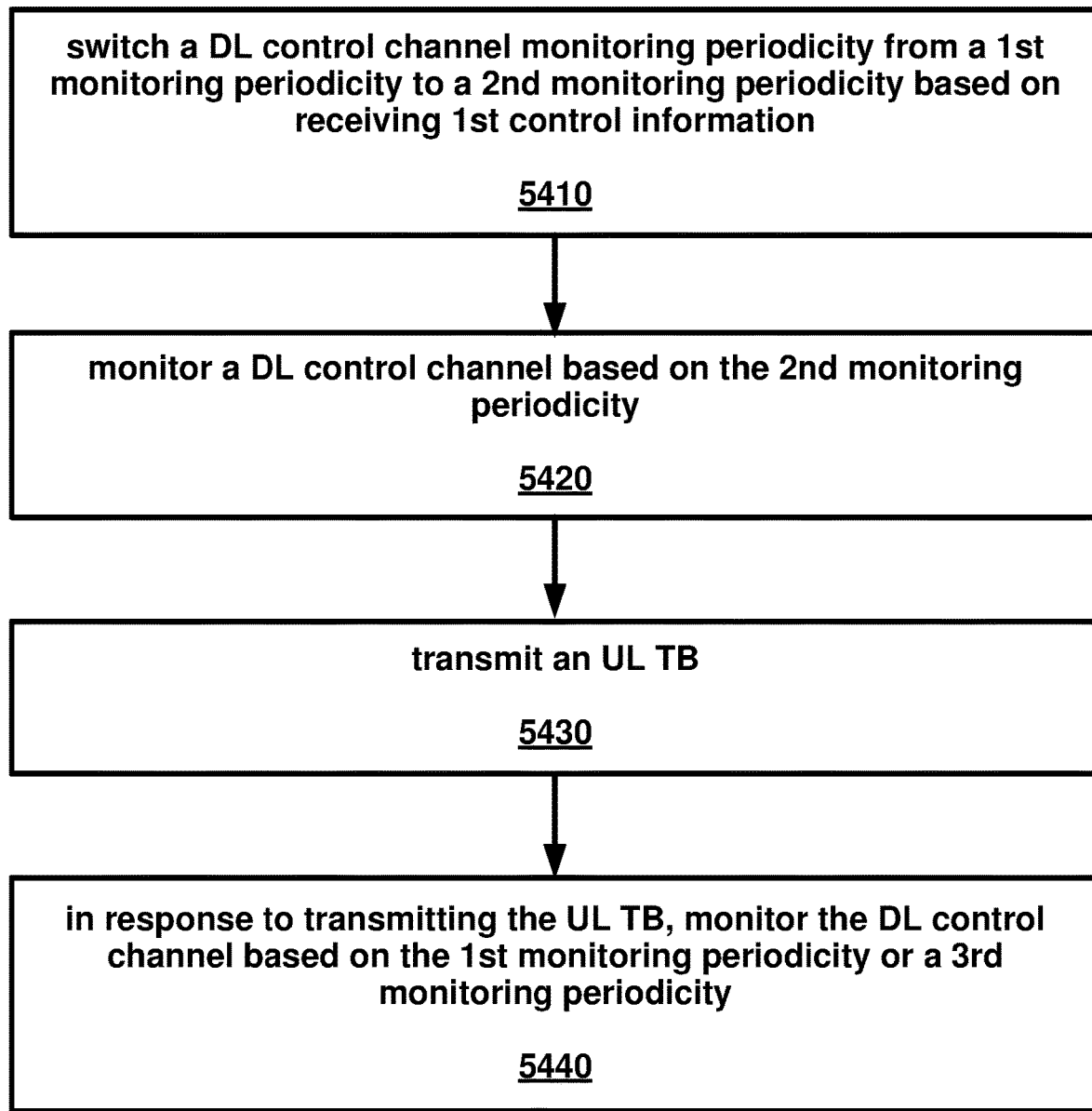
FIG. 54 shows an example flow diagram in accordance with several of various embodiments of the present disclosure.

FIG. 54 shows an example flow diagram in accordance with several of various embodiments of the present disclosure. At 5410, a wireless device may switch a downlink control channel monitoring periodicity from a first monitoring periodicity to a second monitoring periodicity based on receiving first control information. At 5420, the wireless device may monitor a downlink control channel based on the second monitoring periodicity. At 5430, the wireless device may transmit an uplink transport block. At 5440, in response to the transmitting the uplink transport block, the wireless device may monitor the downlink control channel based on the first monitoring periodicity or a third monitoring periodicity.

Figure 55:
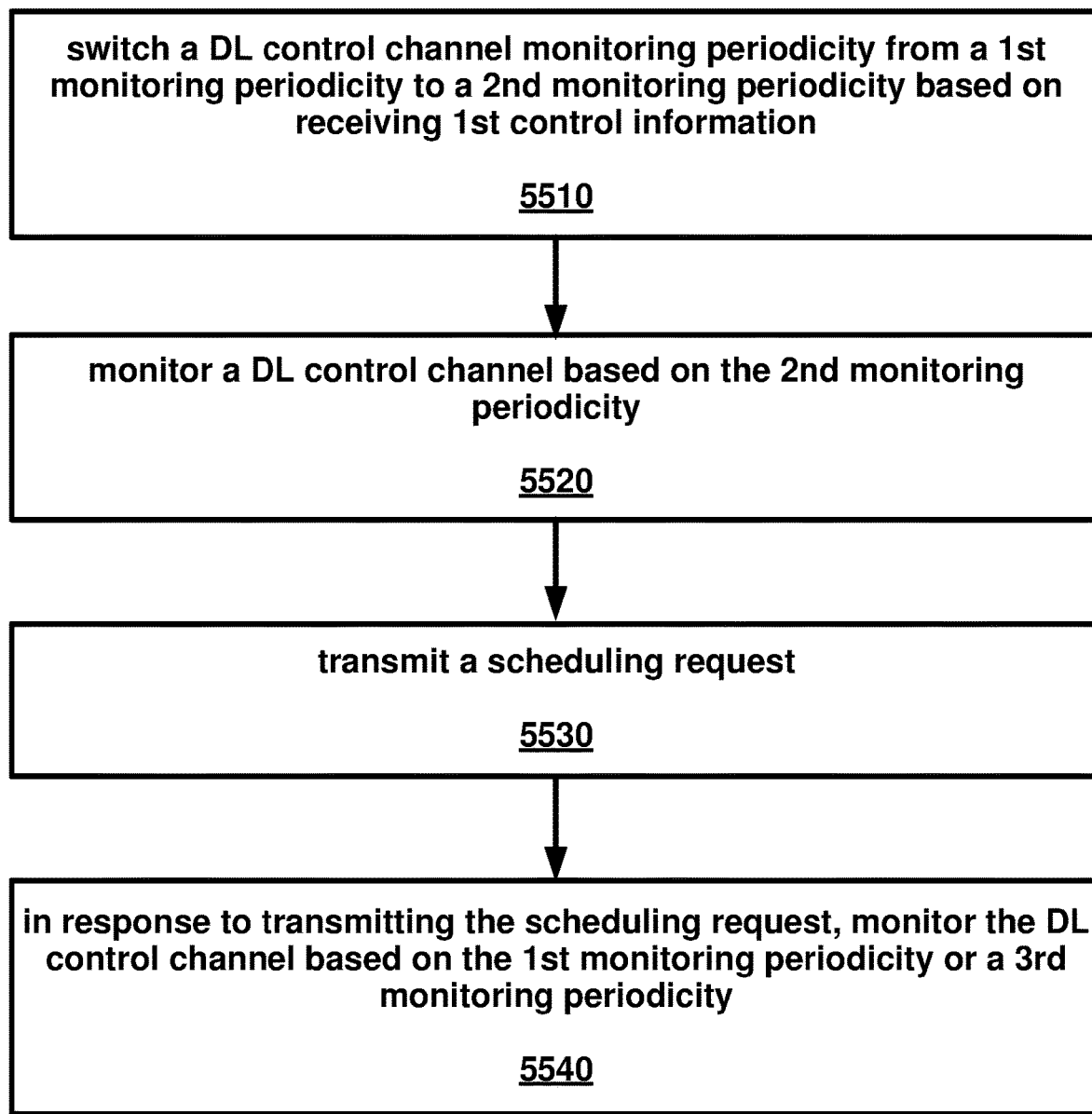
FIG. 55 shows an example flow diagram in accordance with several of various embodiments of the present disclosure.

FIG. 55 shows an example flow diagram in accordance with several of various embodiments of the present disclosure. At 5510, a wireless device may switch a downlink control channel monitoring periodicity from a first monitoring periodicity to a second monitoring periodicity based on receiving first control information. At 5520, the wireless device may monitor a downlink control channel based on the second monitoring periodicity. At 5530, the wireless device may transmit a scheduling request. At 5540, in response to the transmitting the scheduling request, the wireless device may monitor the downlink control channel based on the first monitoring periodicity or a third monitoring periodicity.

Figure 56:
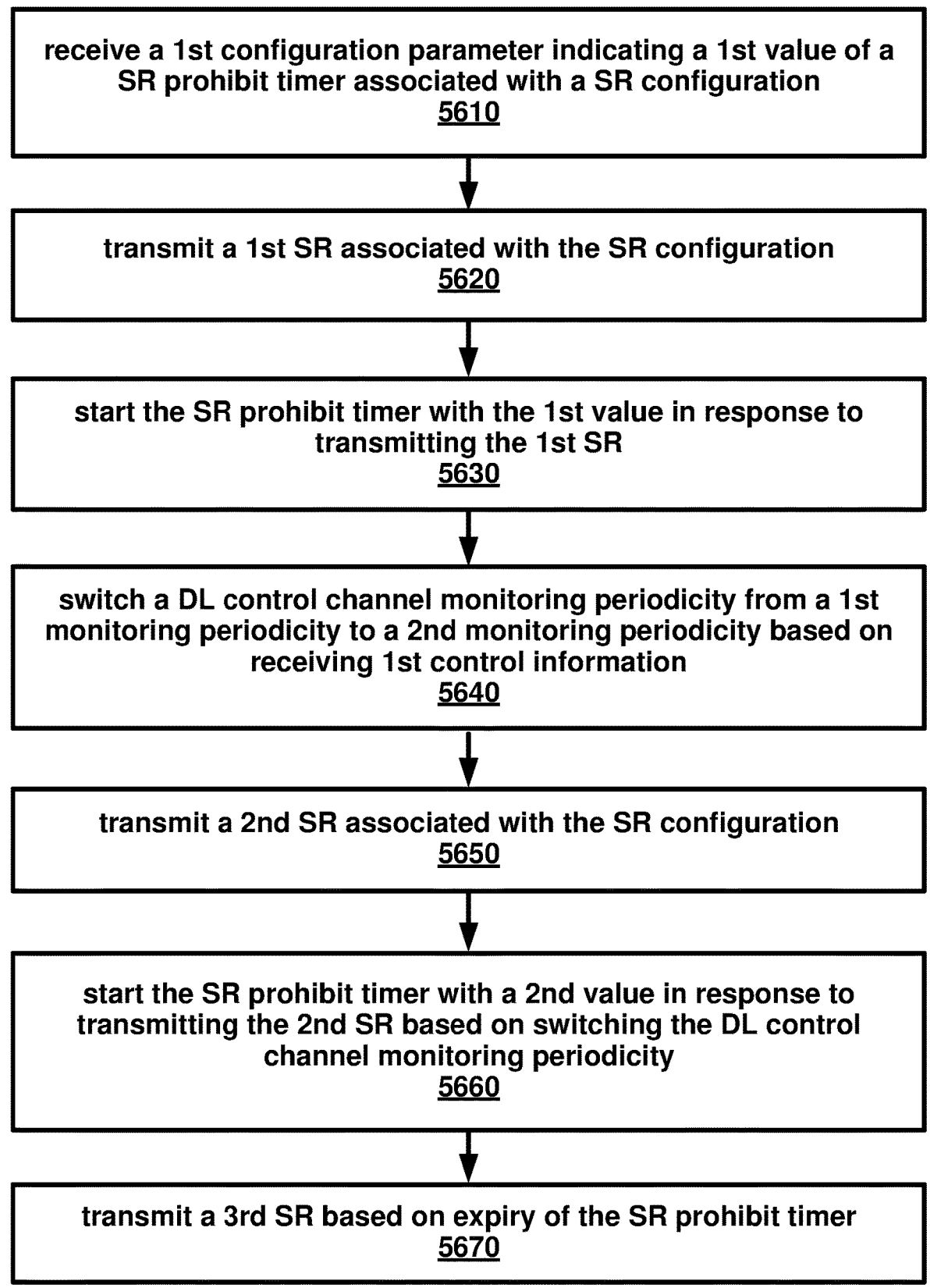
FIG. 56 shows an example flow diagram in accordance with several of various embodiments of the present disclosure.

FIG. 56 shows an example flow diagram in accordance with several of various embodiments of the present disclosure. At 5610, a wireless device may receive a first configuration parameter indicating a first value of a scheduling request prohibit timer associated with a scheduling request configuration. At 5620, the wireless device may transmit a first scheduling request associated with the scheduling request configuration. At 5630, the wireless device may start the scheduling request prohibit timer with the first value in response to transmitting the first scheduling request. A 5640, the wireless device may switch a downlink control channel monitoring periodicity from a first monitoring periodicity to a second monitoring periodicity based on receiving first control information. At 5650, the wireless device may transmit a second scheduling request associated with the scheduling request configuration. At 5660, the wireless device may start the scheduling request prohibit timer with a second value in response to transmitting the second scheduling request and based on the switching the downlink control channel monitoring periodicity. At 5670, the wireless may transmit a third scheduling request based on expiry of the scheduling request prohibit timer.

Figure 57:
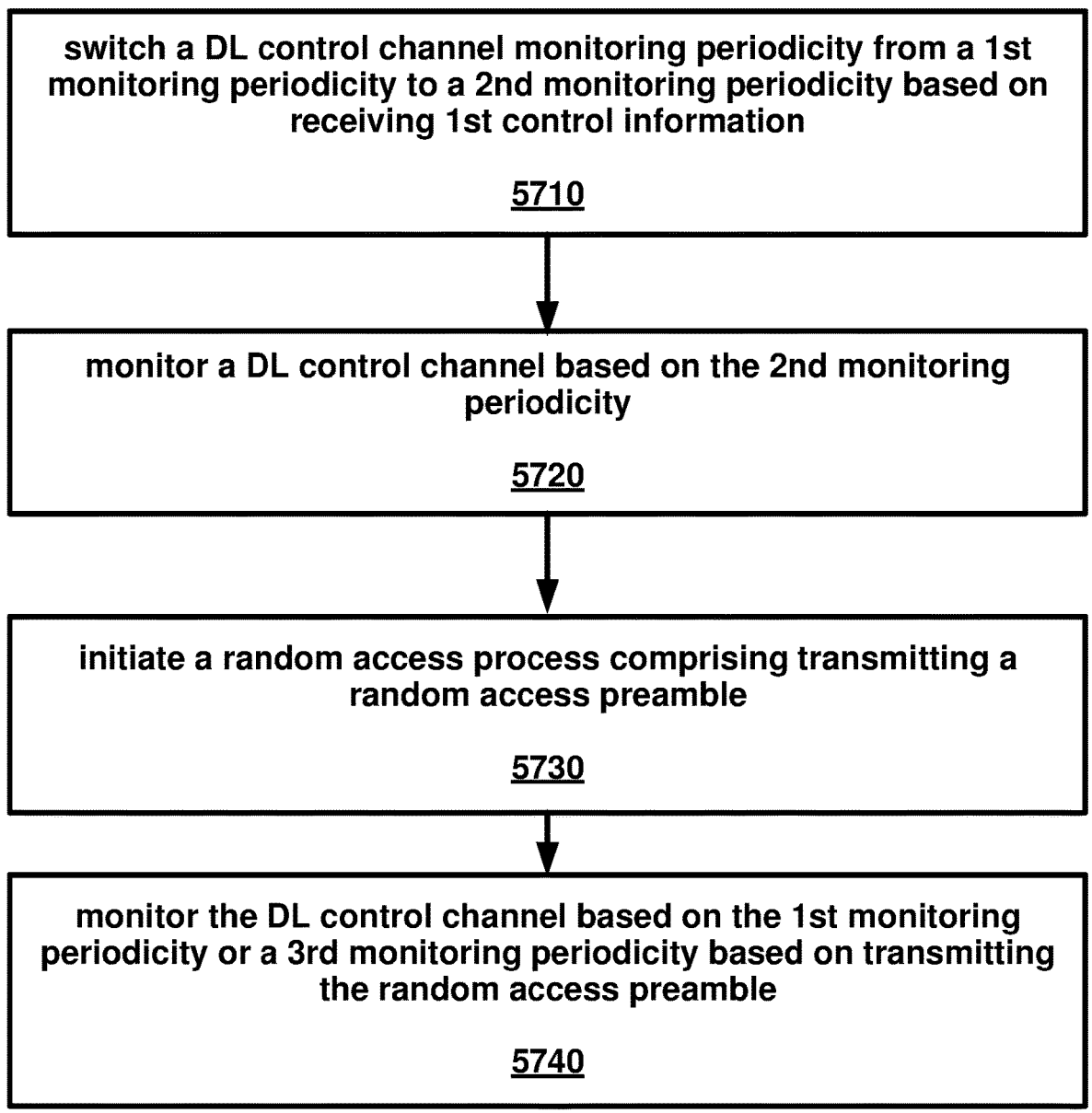
FIG. 57 shows an example flow diagram in accordance with several of various embodiments of the present disclosure.

FIG. 57 shows an example flow diagram in accordance with several of various embodiments of the present disclosure. At 5710, a wireless device may switch a downlink control channel monitoring periodicity from a first monitoring periodicity to a second monitoring periodicity based on receiving first control information. At 5720, the wireless device may monitor a downlink control channel based on the second monitoring periodicity. At 5730, the wireless device may initiate a random access process comprising transmitting a random access preamble. At 5740, the wireless device may monitor the downlink control channel based on the first monitoring periodicity or a third monitoring periodicity based on the transmitting the random access preamble.

Figure 58:
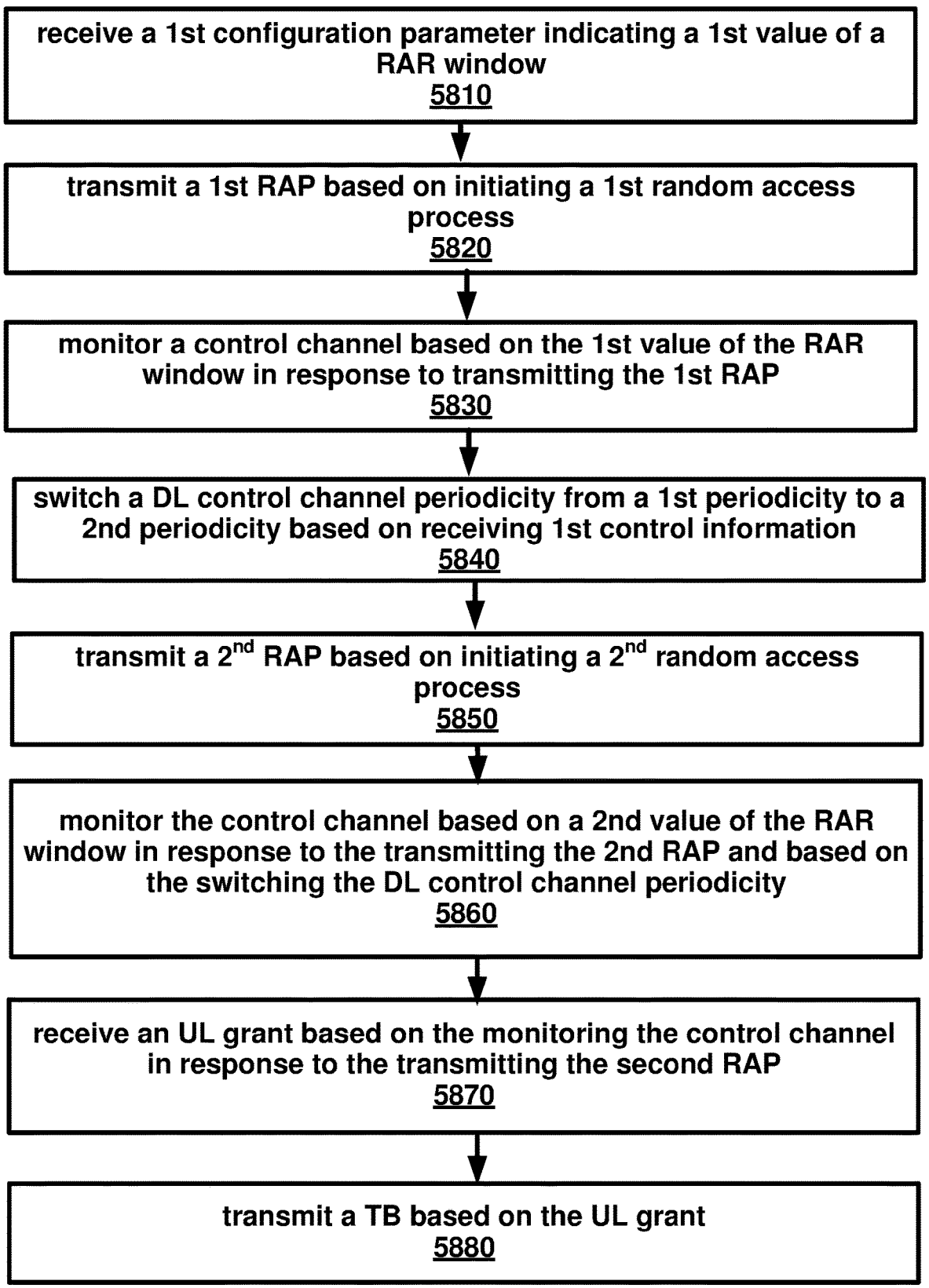
FIG. 58 shows an example flow diagram in accordance with several of various embodiments of the present disclosure.

FIG. 58 shows an example flow diagram in accordance with several of various embodiments of the present disclosure. At 5810, a wireless device may receive a first configuration parameter indicating a first value of a random access response window. At 5820, the wireless device may transmit a first random access preamble based on initiating a first random access process. At 5830, the wireless device may monitor a control channel based on the first value of the random access response window in response to the transmitting the first random access preamble. At 5840, the wireless device may switch a downlink control channel periodicity from a first monitoring periodicity to a second monitoring periodicity based on receiving first control information. At 5850, the wireless device may transmit a second random access preamble based on initiating a second random access process. At 5860, the wireless device may monitor the control channel based on a second value of the random access response window in response to the transmitting the second random access preamble and based on the switching the downlink control channel periodicity. At 5870, the wireless device may receive an uplink grant based on the monitoring the control channel in response to the transmitting the second random access preamble. At 5880, the wireless device may transmit a transport block based on the uplink grant.

Figure 59:
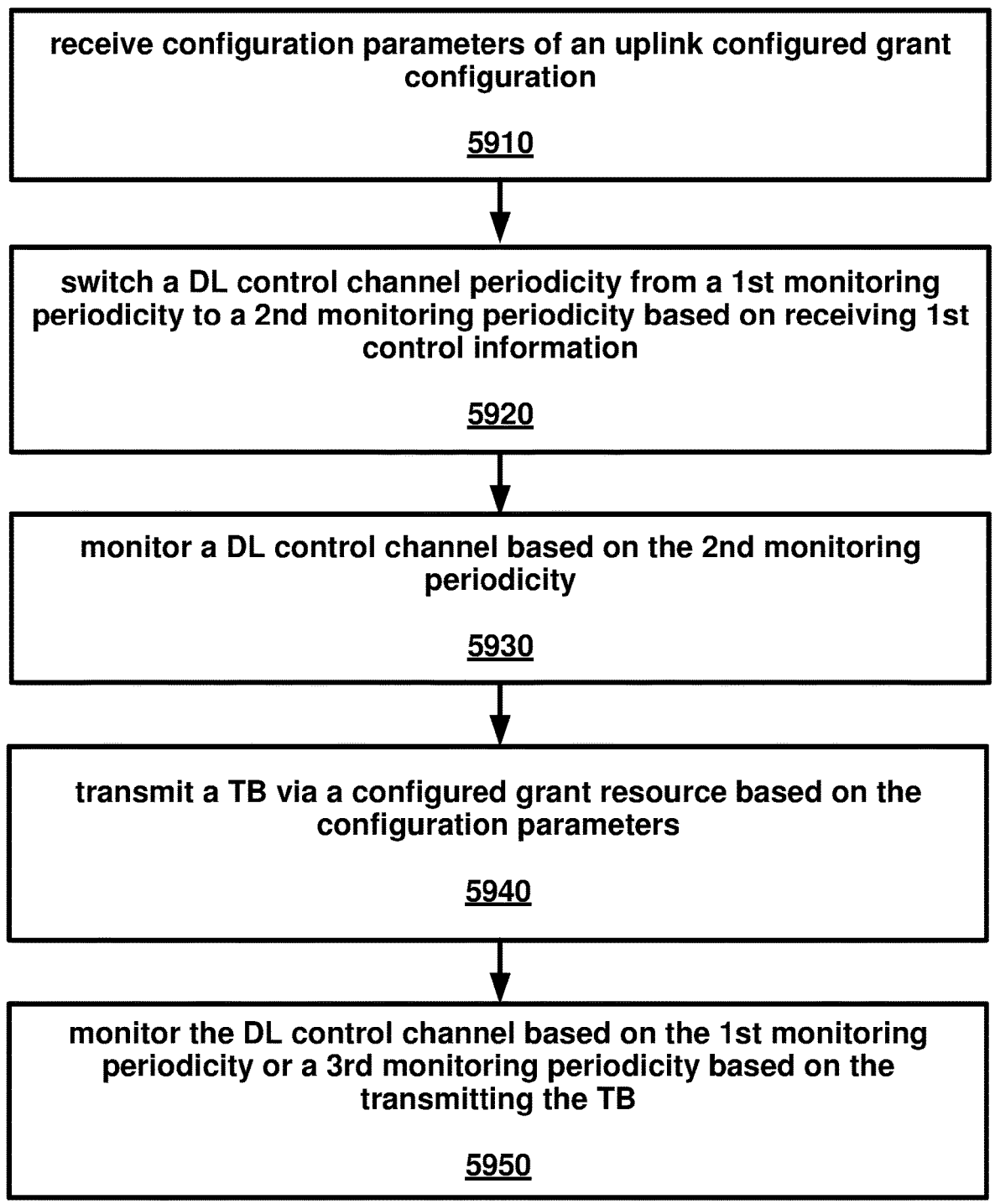
FIG. 59 shows an example flow diagram in accordance with several of various embodiments of the present disclosure.

FIG. 59 shows an example flow diagram in accordance with several of various embodiments of the present disclosure. At 5910, a wireless device may receive configuration parameters of an uplink configured grant configuration. At 5920, the wireless device may switch a downlink control channel periodicity from a first monitoring periodicity to a second monitoring periodicity based on receiving first control information. At 5930, the wireless device may monitor a downlink control channel based on the second monitoring periodicity. At 5940, the wireless device may transmit a transport block via a configured grant resource based on the configuration parameters. At 5950, the wireless device may monitor the downlink control channel based on the first monitoring periodicity or a third monitoring periodicity based on the transmitting the transport block.

Figure 60:
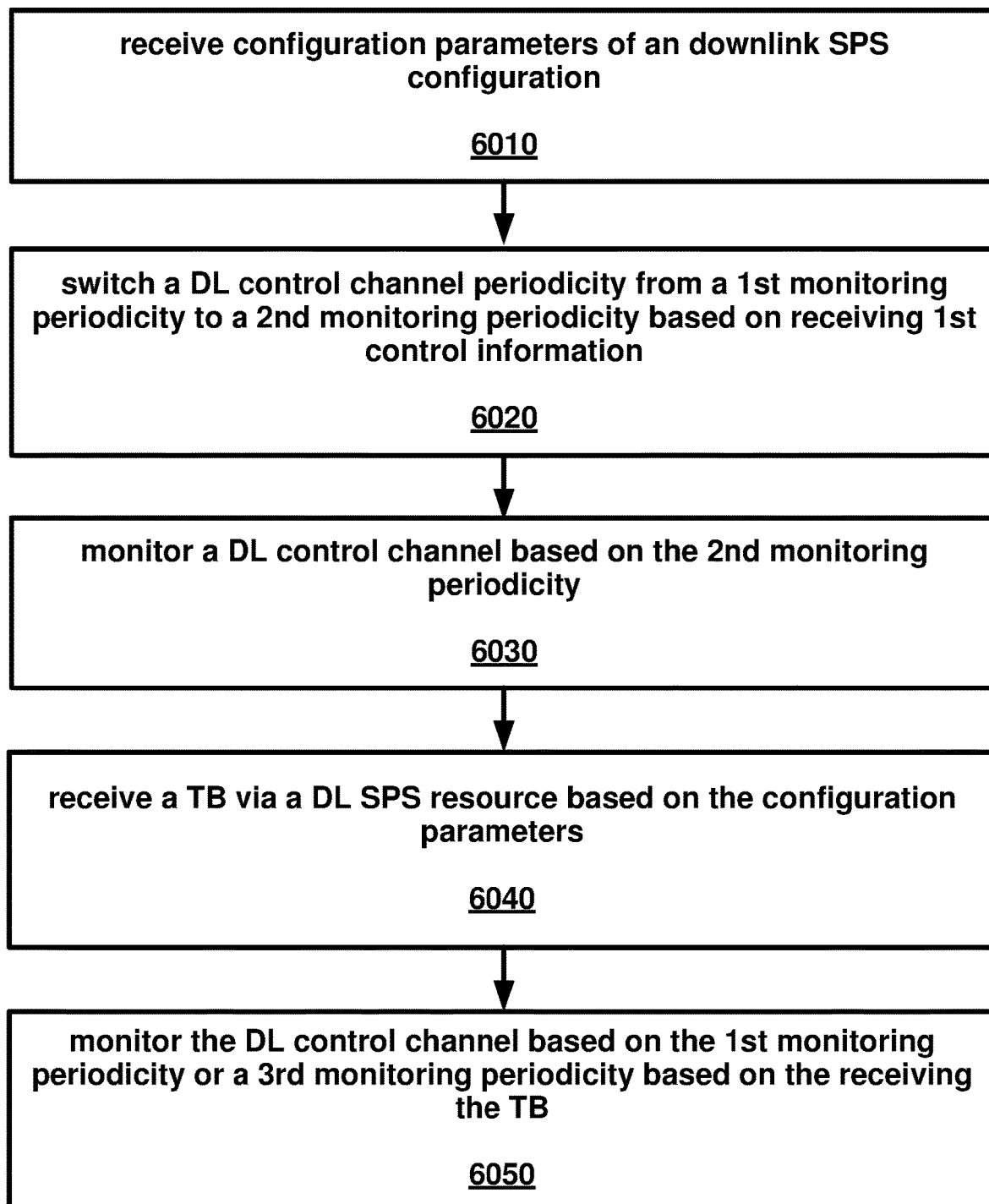
FIG. 60 shows an example flow diagram in accordance with several of various embodiments of the present disclosure.

FIG. 60 shows an example flow diagram in accordance with several of various embodiments of the present disclosure. At 6010, a wireless device may receive configuration parameters of a downlink semi-persistent (SPS) scheduling configuration. At 6020, the wireless device may switch a downlink control channel periodicity from a first monitoring periodicity to a second monitoring periodicity based on receiving first control information. At 6030, the wireless device may monitor a downlink control channel based on the second monitoring periodicity. At 6040, the wireless device may receive a transport block via a downlink SPS resource based on the configuration parameters. At 6050, the wireless device may monitor the downlink control channel based on the first monitoring periodicity or a third monitoring periodicity based on the receiving the transport block.

Figure 61:
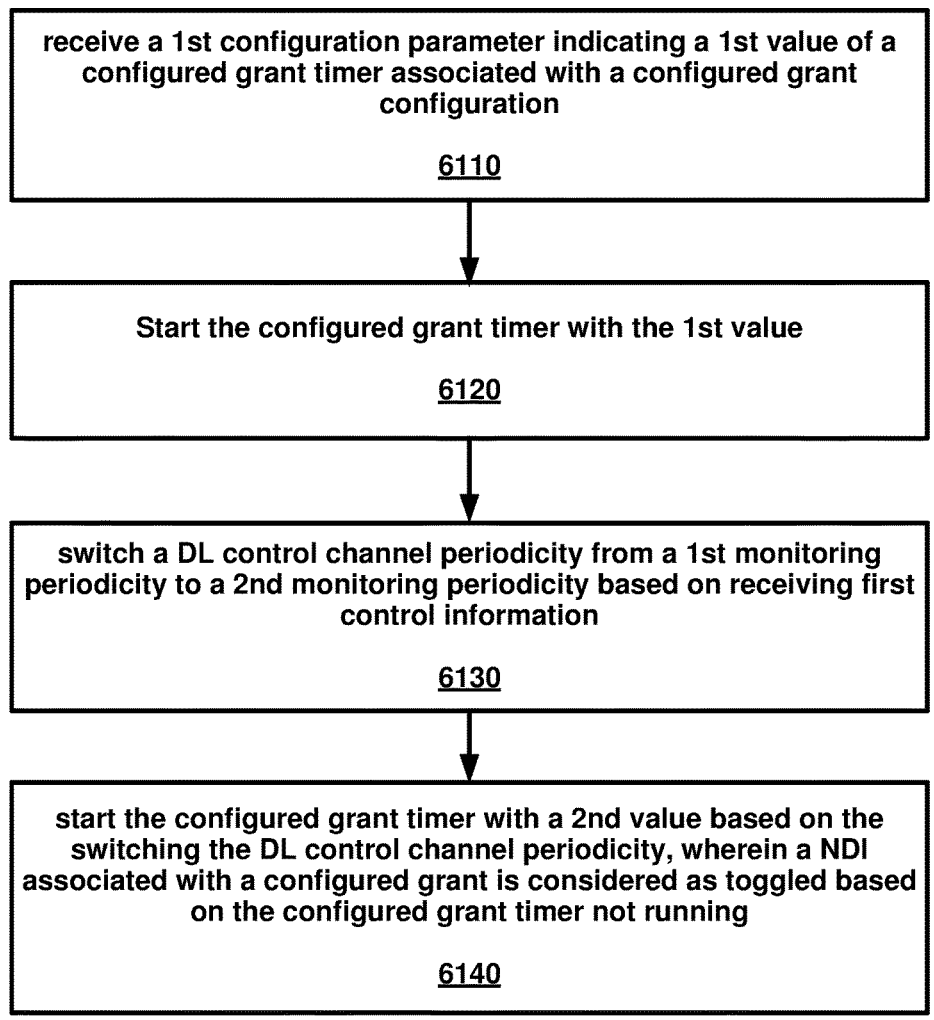
FIG. 61 shows an example flow diagram in accordance with several of various embodiments of the present disclosure.

FIG. 61 shows an example flow diagram in accordance with several of various embodiments of the present disclosure. At 6110, a wireless device may receive a first configuration parameter indicating a first value of a configured grant timer associated with a configured grant configuration. At 6120, the wireless device may start the configured grant timer with the first value. At 6130, the wireless device may switch a downlink control channel periodicity from a first monitoring periodicity to a second monitoring periodicity based on receiving first control information. At 6140, the wireless device may start the configured grant timer with a second value based on the switching the downlink control channel periodicity, wherein a new data indicator associated with a configured grant is considered as toggled based on the configured grant timer not running.

FIG. 62 shows an example flow diagram in accordance with several of various embodiments of the present disclosure. At 6210, a wireless device may receive: first configuration parameters, of one or more first search space sets, comprising a first parameter indicating a first value of a first monitoring periodicity; and second configuration parameters, of one or more second search space sets, comprising a second parameter indicating a second value of a second monitoring periodicity. At 6220, the wireless device may control information indicating switching a downlink control channel monitoring periodicity. At 6230, based on the receiving the control information: the wireless device may switch the first monitoring periodicity from the first value to a third value; and may keep the second value for the second monitoring periodicity.

FIG. 63 shows an example flow diagram in accordance with several of various embodiments of the present disclosure. At 6310, a wireless device may receive: first configuration parameters of a bandwidth part of a cell; and a second configuration parameter indicating a first value of a monitoring periodicity for monitoring a control channel on a search space of the bandwidth part. At 6320, the wireless device may receive control information indicating switching a downlink control channel monitoring periodicity. At 6330, in response to the receiving the control information, the wireless device may switch or may not switch the first value of the monitoring periodicity based on the bandwidth part, wherein the bandwidth part is an active bandwidth part of the cell.

Figure 64:
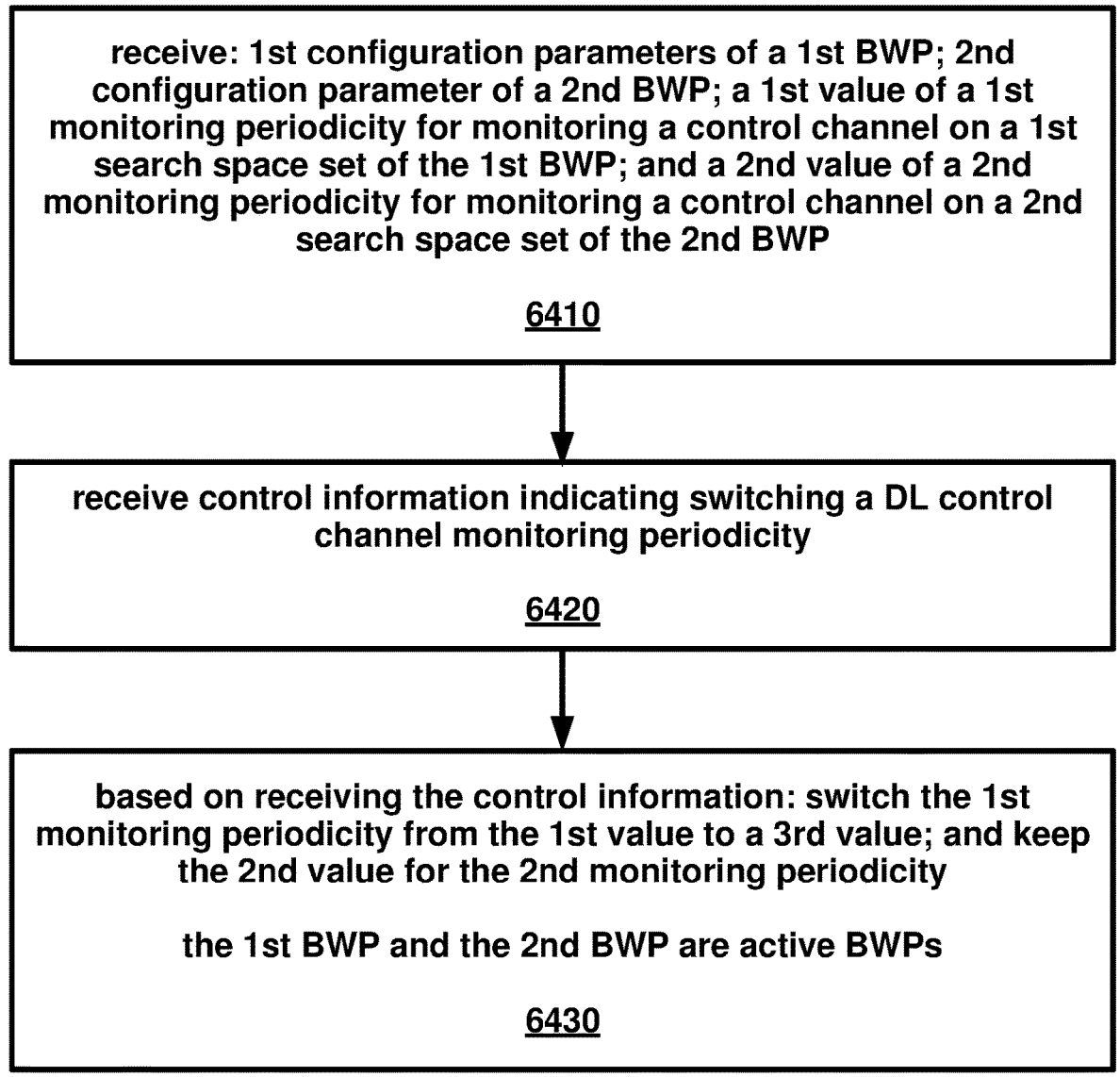
FIG. 64 shows an example flow diagram in accordance with several of various embodiments of the present disclosure.

FIG. 64 shows an example flow diagram in accordance with several of various embodiments of the present disclosure. At 6410, a wireless device may receive configuration parameters comprising: first configuration parameters of a first bandwidth part; second configuration parameters of a second bandwidth part; a first value of a first monitoring periodicity for monitoring a control channel on a first search space set of the first bandwidth part; and a second value of a second monitoring periodicity for monitoring a control channel on a second search space set of the second bandwidth part. At 6420, the wireless device may receive control information indicating switching a downlink control channel monitoring periodicity. At 6430, based on receiving the control information: the wireless device may switch the first monitoring periodicity from the first value to a third value; and may keep the second value for the second monitoring periodicity. The first bandwidth part and the second bandwidth part may be active bandwidth parts.

Figure 65:
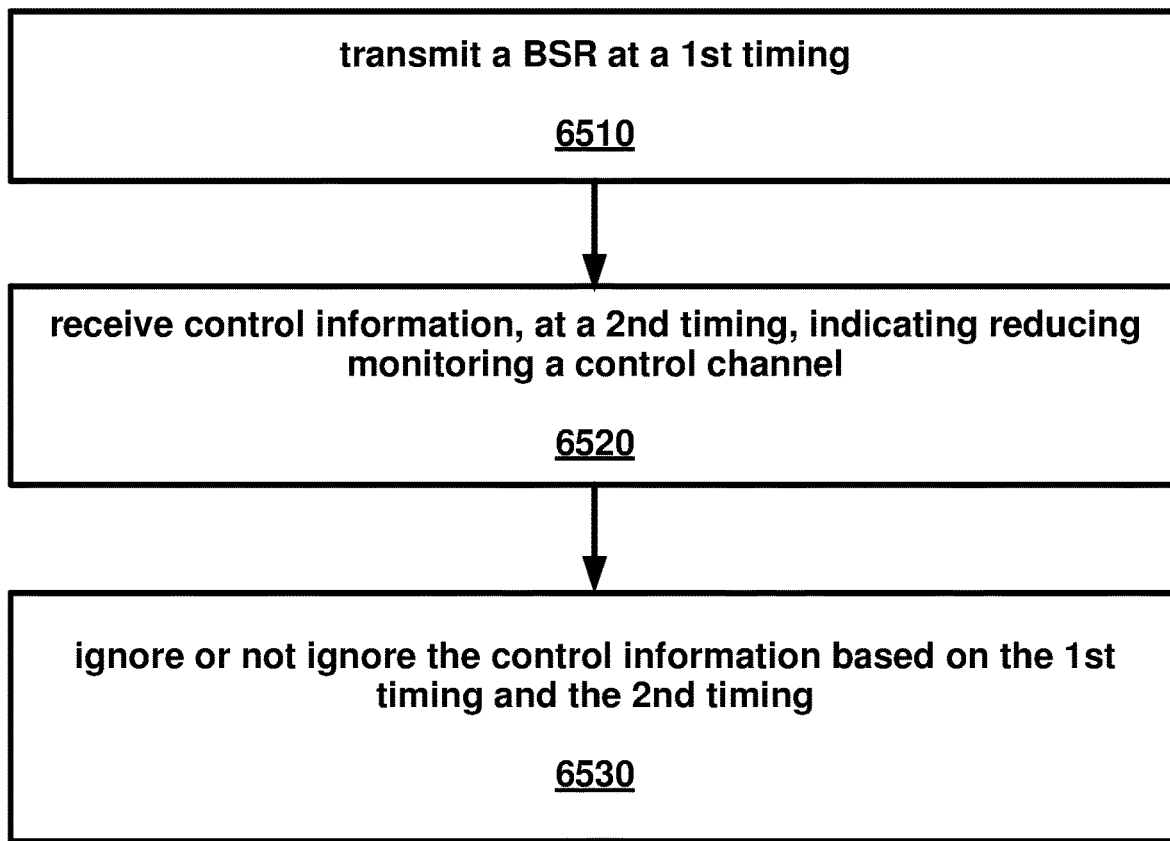
FIG. 65 shows an example flow diagram in accordance with several of various embodiments of the present disclosure.

FIG. 65 shows an example flow diagram in accordance with several of various embodiments of the present disclosure. At 6510, a wireless device may transmit, at a first timing, a buffer status report. At 6520, the wireless device may receive control information, at a second timing, indicating reducing monitoring a control channel. At 6530, the wireless device may ignore or may not ignore the control information based on the first timing and the second timing.

In an example embodiment, the ignoring or not ignoring the control information, at 6530, may be based on a difference between the first timing and the second timing. In an example embodiment, the ignoring or not ignoring the control information, at 6530, may be based on the difference being smaller or larger than a buffer status report processing time. In an example embodiment, the ignoring or not ignoring the control information may be based on the difference being smaller or larger than a configurable or pre-configured duration.

In an example embodiment, the control information, received at 6520, may indicate skipping monitoring the control channel. In an example embodiment, the control information, received at 6520, may indicate skipping monitoring the control channel for a duration.

In an example embodiment, the control information may indicate switching from a first downlink control channel monitoring periodicity to a second downlink control channel monitoring periodicity.

Figure 66:
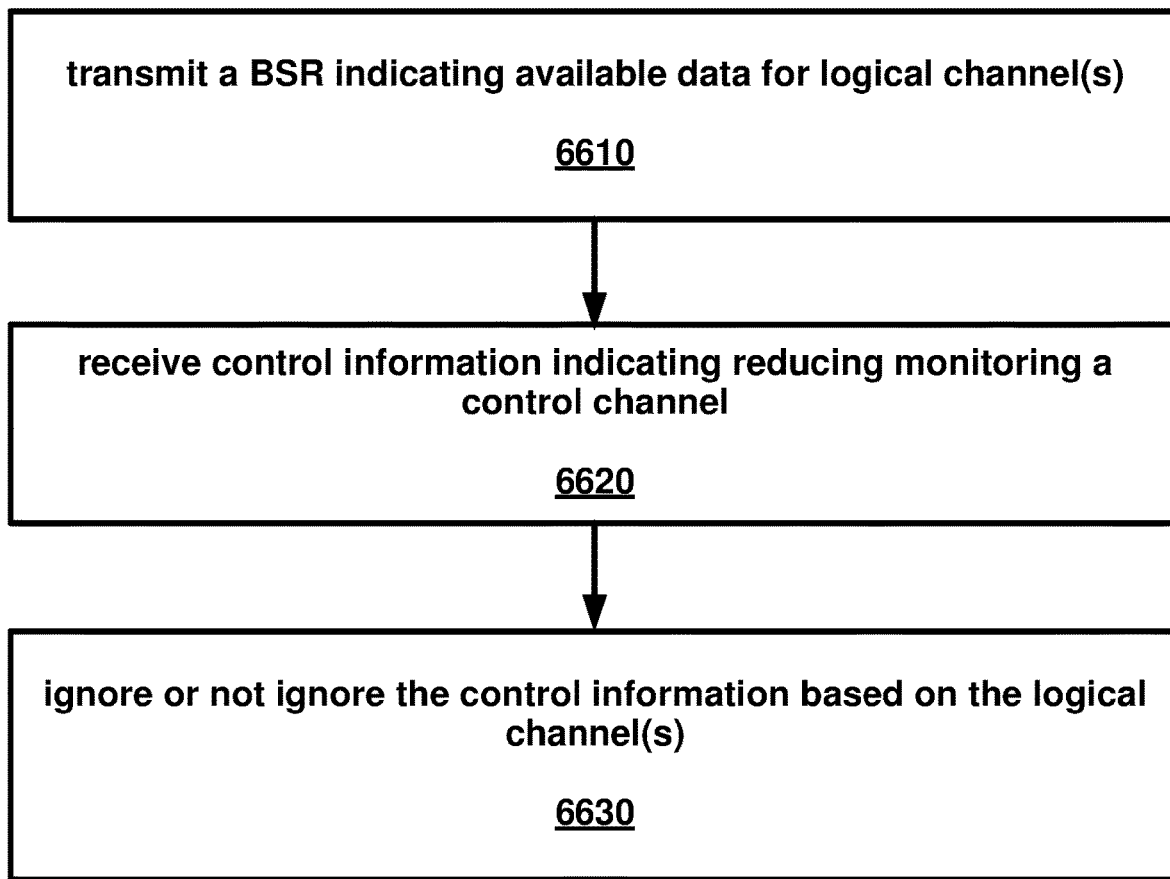
FIG. 66 shows an example flow diagram in accordance with several of various embodiments of the present disclosure.

FIG. 66 shows an example flow diagram in accordance with several of various embodiments of the present disclosure. At 6610, a wireless device may transmit a buffer status report indicating available data for one or more logical channels. At 6620, the wireless device may receive control information indicating reducing monitoring a control channel. At 6630, the wireless device may ignore or may not ignore the control information based on the one or more logical channels.

In an example embodiment, the ignoring or not ignoring the control information, at 6630, may be based on priorities associated with the one or more logical channels. In an example embodiment, the wireless device may receive configuration parameters indicating the priorities associated with the one or more logical channels.

In an example embodiment, the control information, received at 6620, may indicate skipping monitoring the control channel. In an example embodiment, the control information, received at 6620, may indicate skipping monitoring the control channel for a duration.

In an example embodiment, the control information, received at 5520, may indicate switching from a first downlink control channel monitoring periodicity to a second downlink control channel monitoring periodicity.

Figure 67:
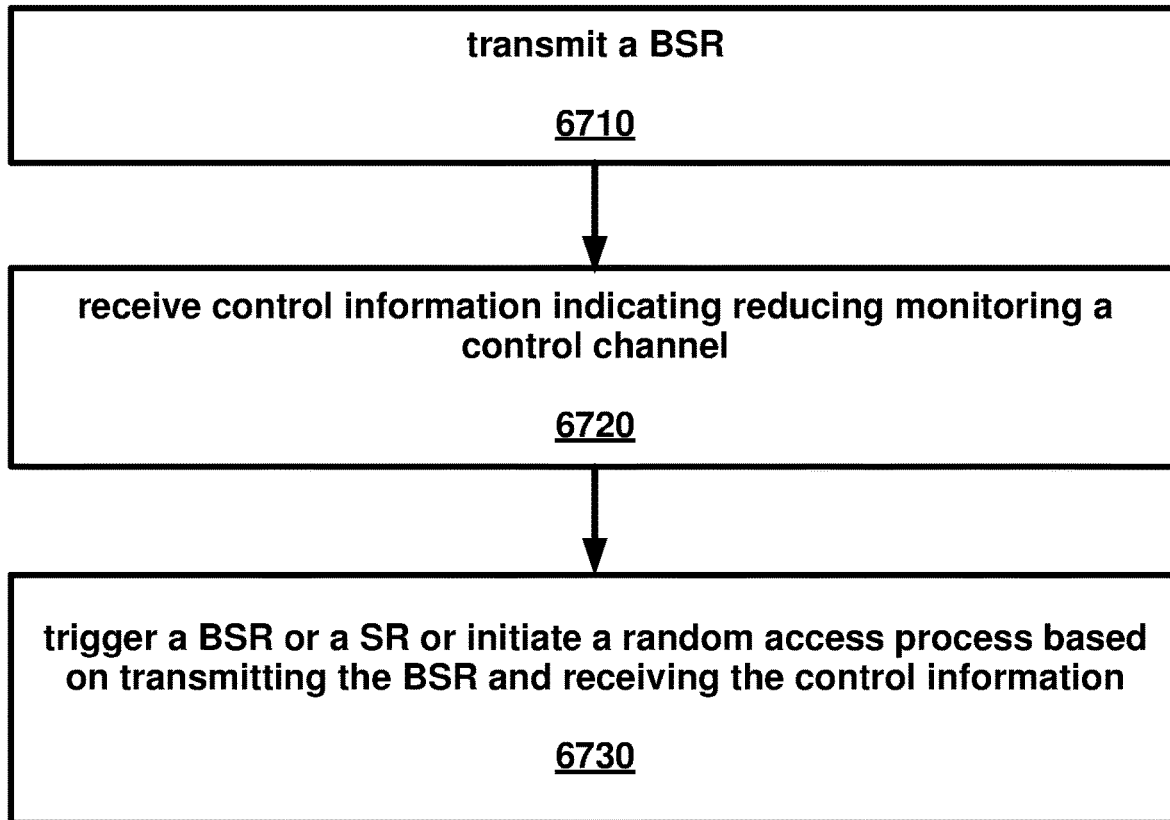
FIG. 67 shows an example flow diagram in accordance with several of various embodiments of the present disclosure.
Figure 68:
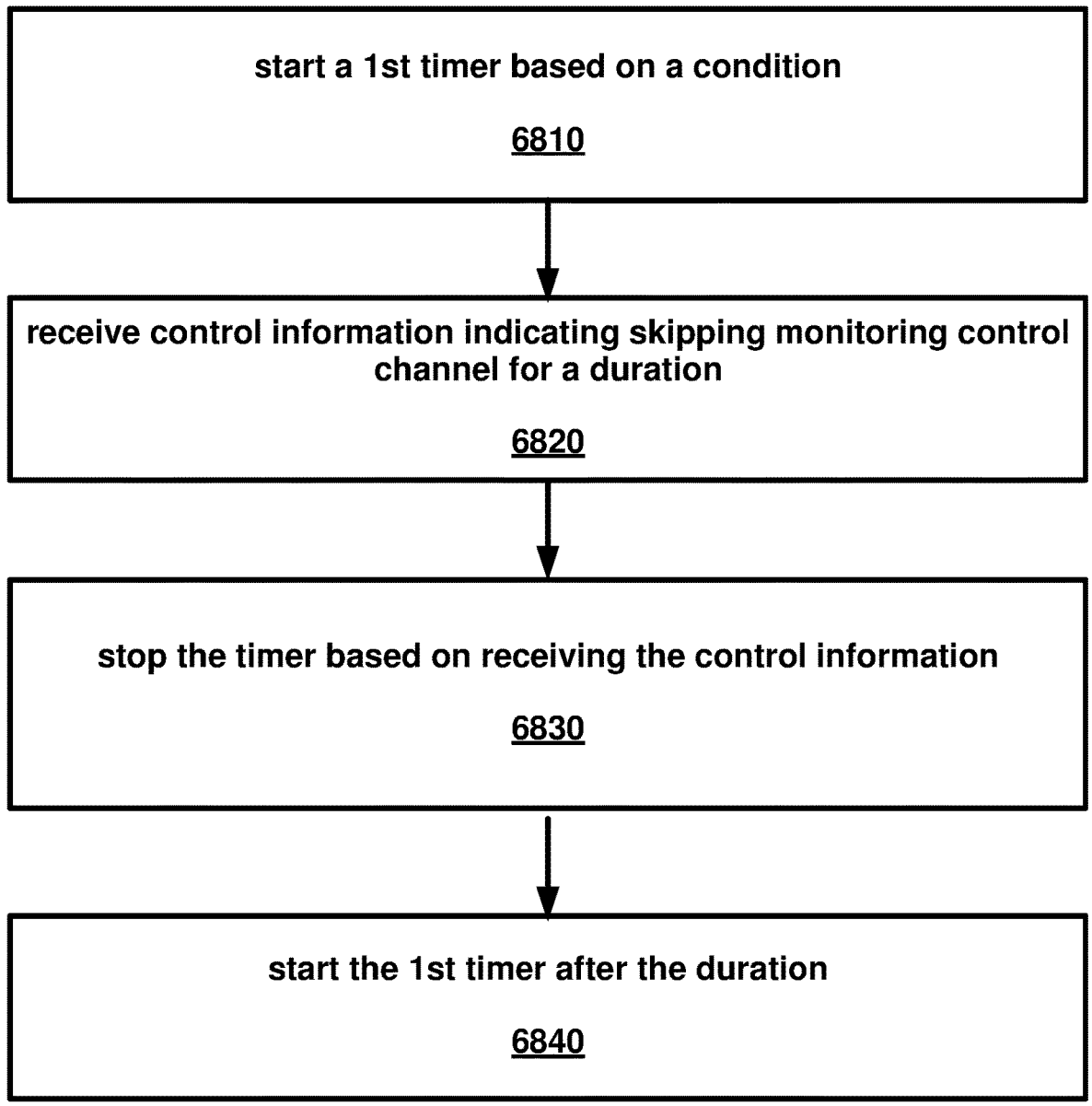
FIG. 68 shows an example flow diagram in accordance with several of various embodiments of the present disclosure.

FIG. 67 shows an example flow diagram in accordance with several of various embodiments of the present disclosure. At 6710, a wireless device may transmit a buffer status report. At 6720, the wireless device may receive control information indicating reducing monitoring a control channel. At 6730, the wireless device may trigger a buffer status report or a scheduling request or may initiate a random access process based on transmitting the buffer status report and receiving the control information FIG. 68 shows an example flow diagram in accordance with several of various embodiments of the present disclosure. At 6810, a wireless device may start a time based on a condition. At 6820, the wireless device may receive control information indicating skipping monitoring a control channel for a duration. At 6830, the wireless device may stop the timer based on the receiving the control information. At 6840, the wireless device may start the timer after the duration.

In an example embodiment, the first timer, started at 6810, may be a buffer status report timer. In an example embodiment, the first timer, started at 6810, may be a retransmission buffer status report timer. In an example embodiment, the condition, based on which the first timer is started at 6810, may comprise transmitting the buffer status report. In an example, the condition, based on which the first timer is started at 6810, may comprise reception of a grant for transmission of new data on any uplink shared channel. In an example embodiment, the first timer, started at 6810, may be a periodic buffer status report timer. In an example, the condition, based on which the first timer is started at 6810, may comprise transmitting a buffer status report.

In an example embodiment, the first timer may be a logical channel scheduling request delay timer. In an example embodiment, the condition, based on which the first timer is started at 6810, may comprise a buffer status report being triggered for a logical channel for which a logical channel scheduling request delay timer applied information element with value true is configured.

Figure 69:
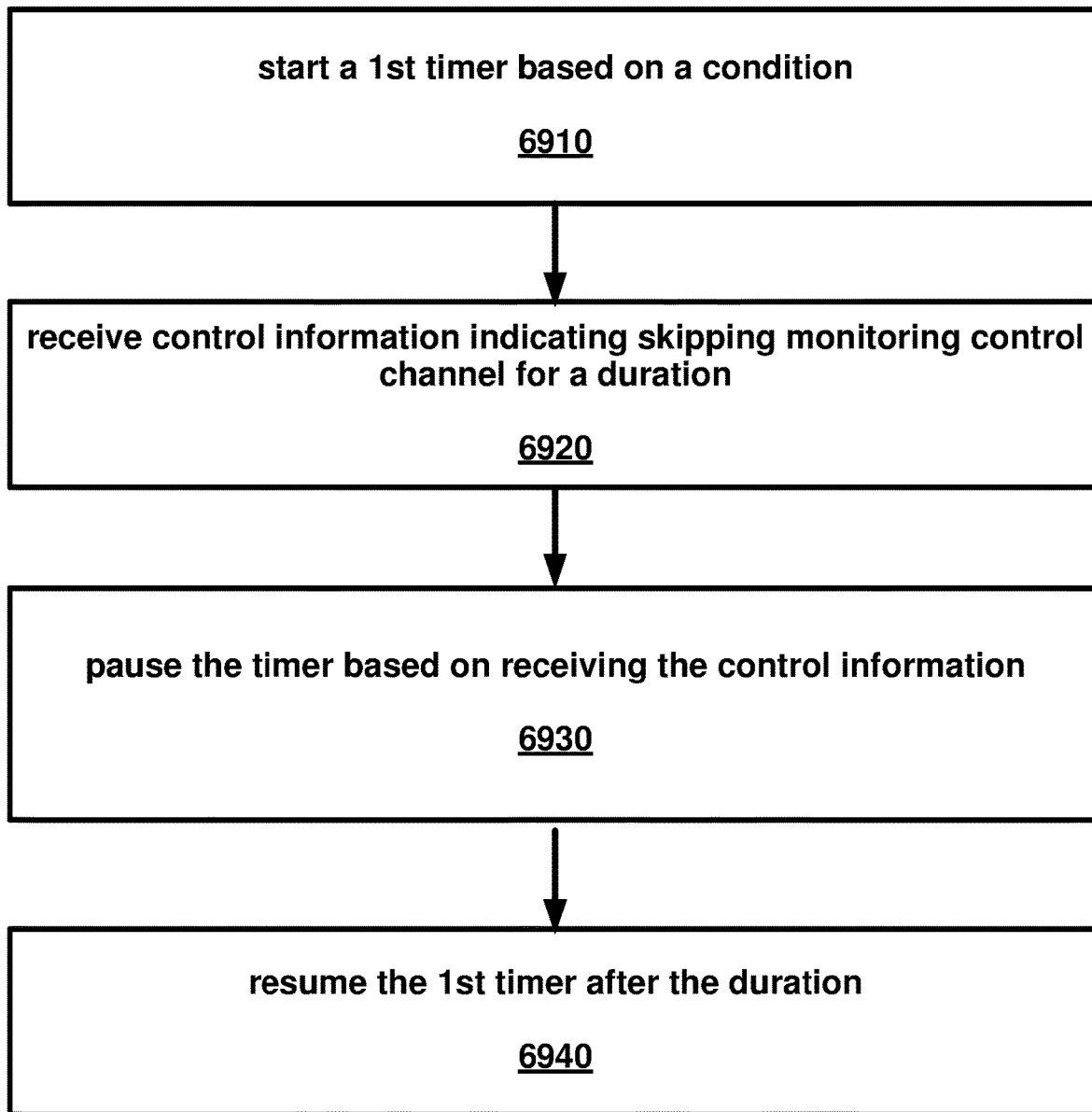
FIG. 69 shows an example flow diagram in accordance with several of various embodiments of the present disclosure.

FIG. 69 shows an example flow diagram in accordance with several of various embodiments of the present disclosure. At 6910, a wireless device may start a time based on a condition. At 6920, the wireless device may receive control information indicating skipping monitoring a control channel for a duration. At 6930, the wireless device may pause the timer based on the receiving the control information. At 6940, the wireless device may resume the timer after the duration.

In an example embodiment, the first timer, started at 6910, may be a buffer status report timer. In an example embodiment, the first timer, started at 6910, may be a retransmission buffer status report timer. In an example embodiment, the condition, based on which the first timer is started at 6910, may comprise transmitting the buffer status report. In an example, the condition, based on which the first timer is started at 6910, may comprise reception of a grant for transmission of new data on any uplink shared channel. In an example embodiment, the first timer, started at 6910, may be a periodic buffer status report timer. In an example, the condition, based on which the first timer is started at 6910, may comprise transmitting a buffer status report.

In an example embodiment, the first timer may be a logical channel scheduling request delay timer. In an example embodiment, the condition, based on which the first timer is started at 6810, may comprise a buffer status report being triggered for a logical channel for which a logical channel scheduling request delay timer applied information element with value true is configured.

Figure 70:
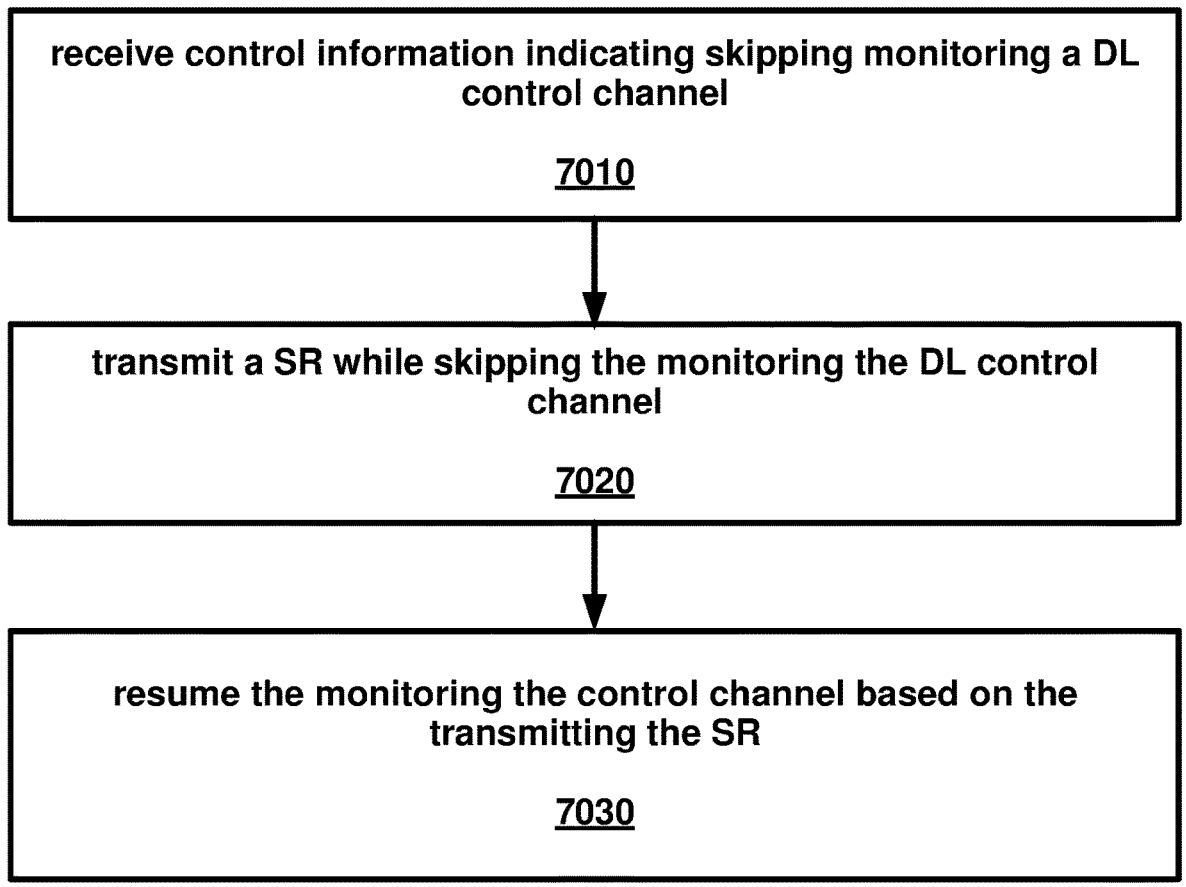
FIG. 70 shows an example flow diagram in accordance with several of various embodiments of the present disclosure.

FIG. 70 shows an example flow diagram in accordance with several of various embodiments of the present disclosure. At 7010, a wireless device may receive control information indicating skipping monitoring a downlink control channel. At 7020, the wireless device may transmit a scheduling request while skipping the monitoring the downlink control channel. At 7030, the wireless device may resume the monitoring the control channel based on the transmitting the scheduling request.

In an example embodiment, the resuming the monitoring the control channel, at 7030, may be after a first duration from the transmitting the scheduling request.

Figure 71:
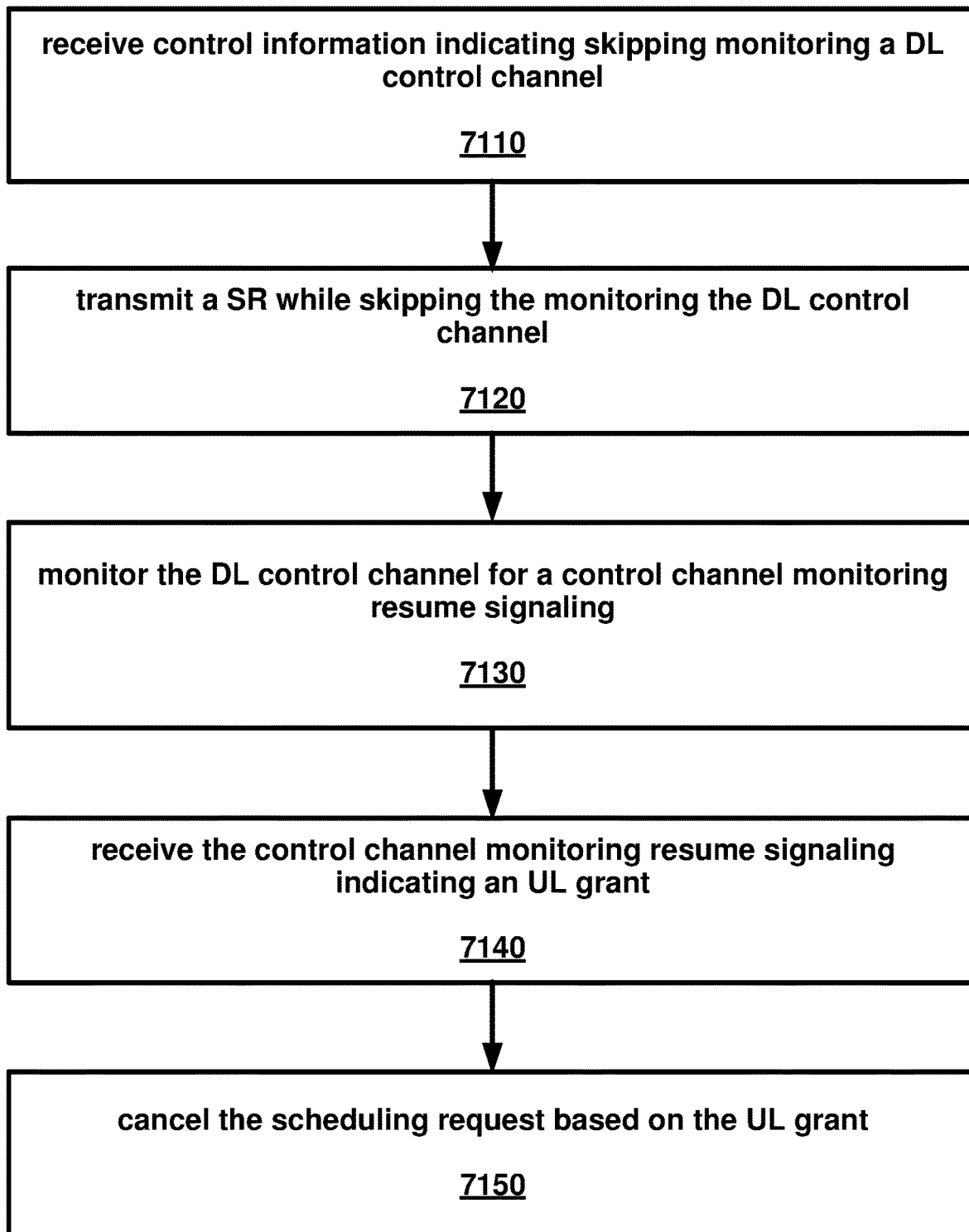
FIG. 71 shows an example flow diagram in accordance with several of various embodiments of the present disclosure.

FIG. 71 shows an example flow diagram in accordance with several of various embodiments of the present disclosure. At 7110, a wireless device may receive control information indicating skipping monitoring a downlink control channel. At 7120, the wireless device may transmit a scheduling request while skipping the monitoring the downlink control channel. At 7130, the wireless device may monitor the downlink control channel for a control channel monitoring resume signaling. At 7140, the wireless device may receive the control channel monitoring resume signaling indicating an uplink grant. At 7150, the wireless device may cancel the scheduling request based on the uplink grant.

Figure 72:
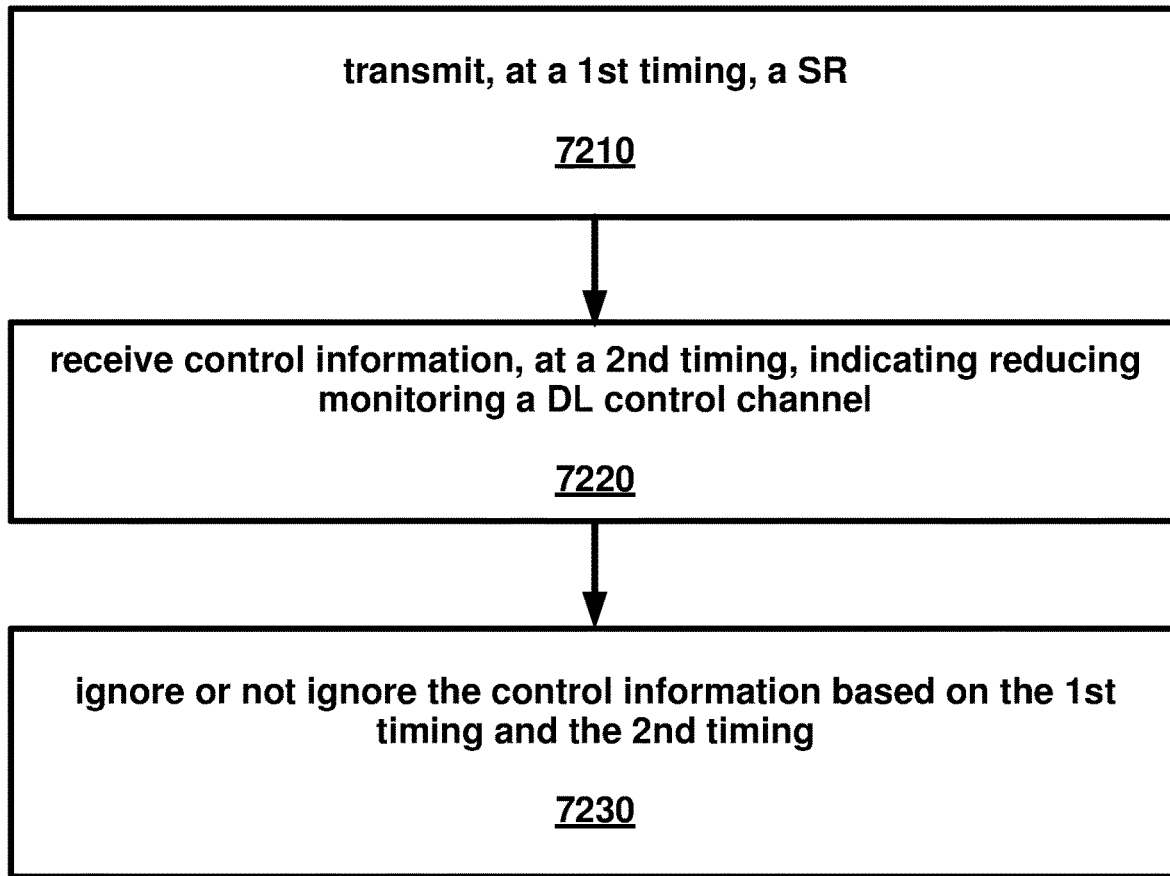
FIG. 72 shows an example flow diagram in accordance with several of various embodiments of the present disclosure.

FIG. 72 shows an example flow diagram in accordance with several of various embodiments of the present disclosure. At 7210, a wireless device may transmit, at a first timing, a scheduling request. At 7220, the wireless device may receive control information, at a second timing, indicating reducing monitoring a downlink control channel. At 7230, the wireless device may ignore or may not ignore the control information based on the first timing and the second timing.

In an example embodiment, the ignoring or not ignoring the control information, at 7230, may be based on a difference between the first timing and the second timing. In an example embodiment, the ignoring or not ignoring the control information, at 7230, may be based on the difference being smaller or larger than a scheduling request processing time.

In an example embodiment, the ignoring or not ignoring the control information, at 7230, may be based on a difference being smaller or larger than a configurable or pre-configured duration.

In an example embodiment, the control information may indicate skipping the monitoring the control channel.

In an example embodiment, the control information, received at 7220, may indicate switching from a first downlink control channel monitoring periodicity to a second downlink control channel monitoring periodicity.

Figure 73:
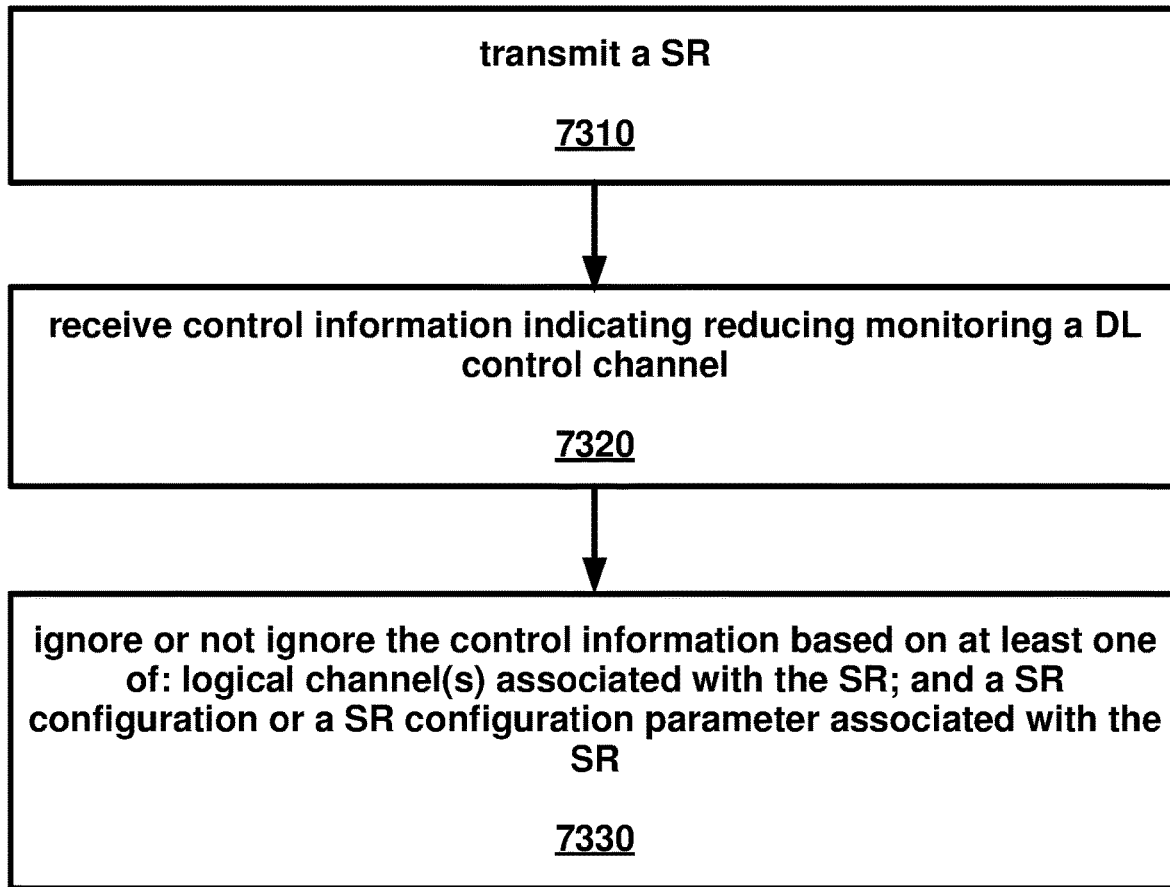
FIG. 73 shows an example flow diagram in accordance with several of various embodiments of the present disclosure.

FIG. 73 shows an example flow diagram in accordance with several of various embodiments of the present disclosure. At 7310, a wireless device may transmit a scheduling request. At 7320, the wireless device may receive control information indicating skipping monitoring control channel until a first timing. At 7330, the wireless device may ignore or may not ignore the control information based on at least one of: one or more logical channels associated with the scheduling request; and a scheduling request configuration associated with the scheduling request or a configuration parameter associated with the scheduling request.

Figure 74:
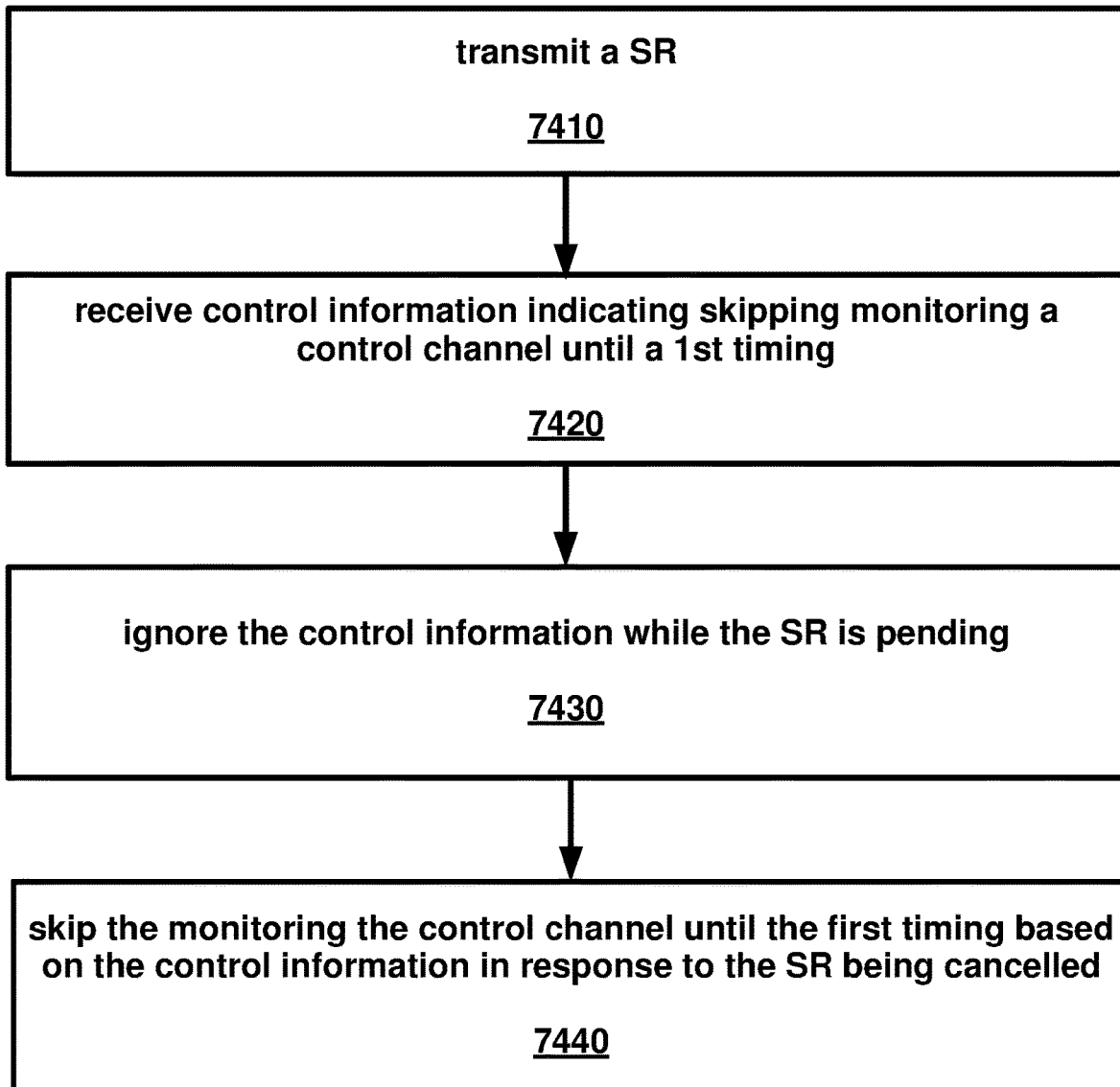
FIG. 74 shows an example flow diagram in accordance with several of various embodiments of the present disclosure.

FIG. 74 shows an example flow diagram in accordance with several of various embodiments of the present disclosure. At 7410, a wireless device may transmit a scheduling request. At 7420, the wireless device may receive control information indicating skipping monitoring control channel until a first timing. At 7430, the wireless device may ignore the control information while the scheduling request is pending. At 7440, the wireless device may skip the monitoring the control channel until the first timing based on the control information in response to the scheduling request being cancelled.

Figure 75:
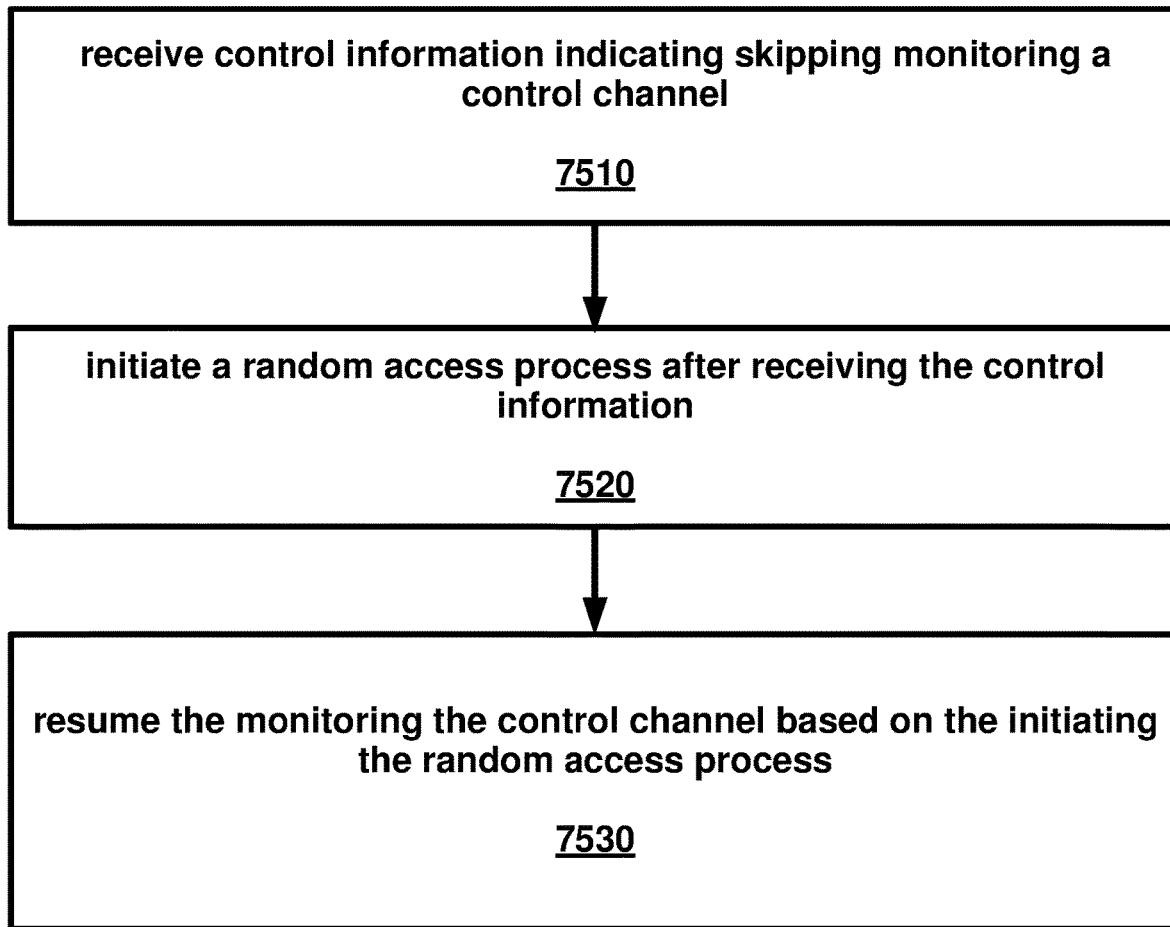
FIG. 75 shows an example flow diagram in accordance with several of various embodiments of the present disclosure.

FIG. 75 shows an example flow diagram in accordance with several of various embodiments of the present disclosure. At 7510, a wireless device may receive control information indicating skipping monitoring control channel. At 7520, the wireless device may initiate a random access process after receiving the control information. At 7530, the wireless device may resume the monitoring the control channel based on the initiating the random access process.

Figure 76:
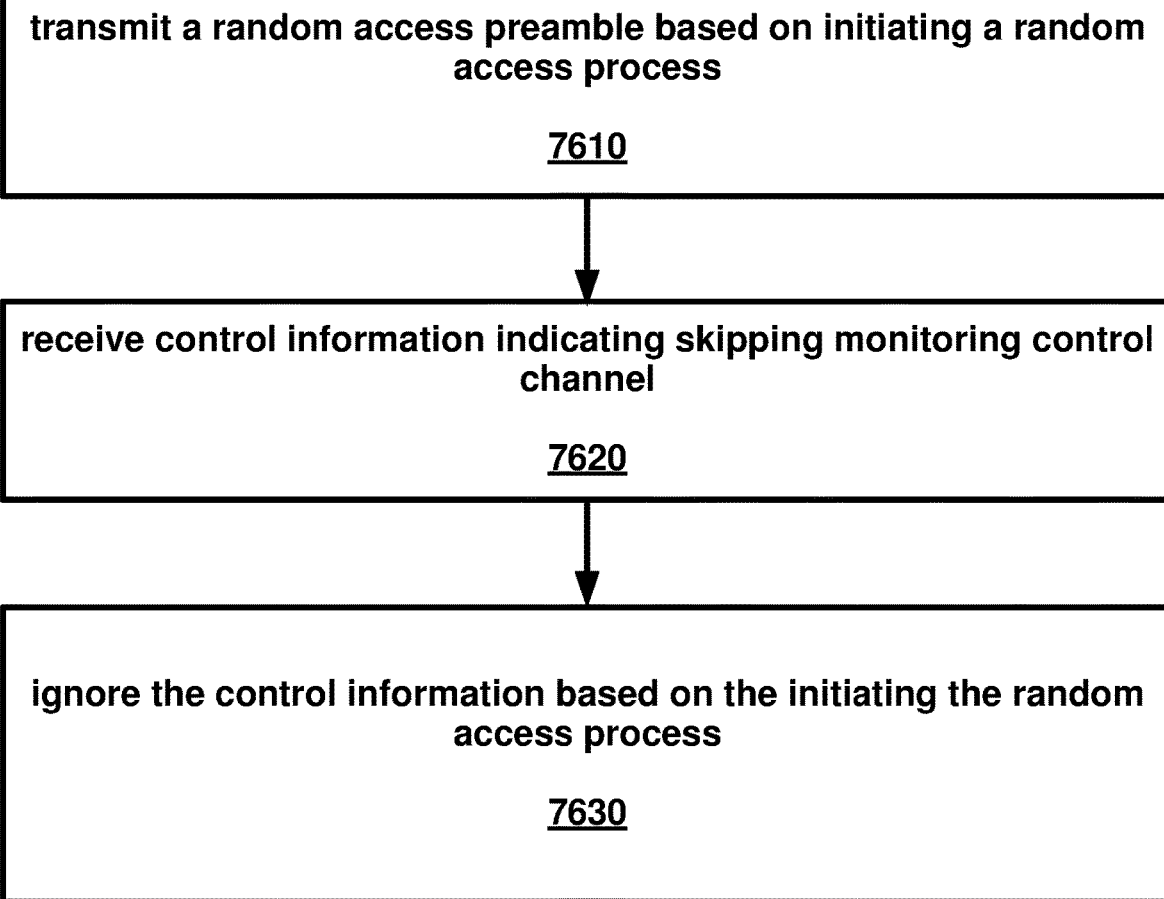
FIG. 76 shows an example flow diagram in accordance with several of various embodiments of the present disclosure.

FIG. 76 shows an example flow diagram in accordance with several of various embodiments of the present disclosure. At 7610, a wireless device may transmit a random access preamble based on initiating a random access process. At 7620, the wireless device may receive control information indicating skipping monitoring control channel. At 7630, the wireless device may ignore the control information based on the initiating the random access process.

Figure 77:
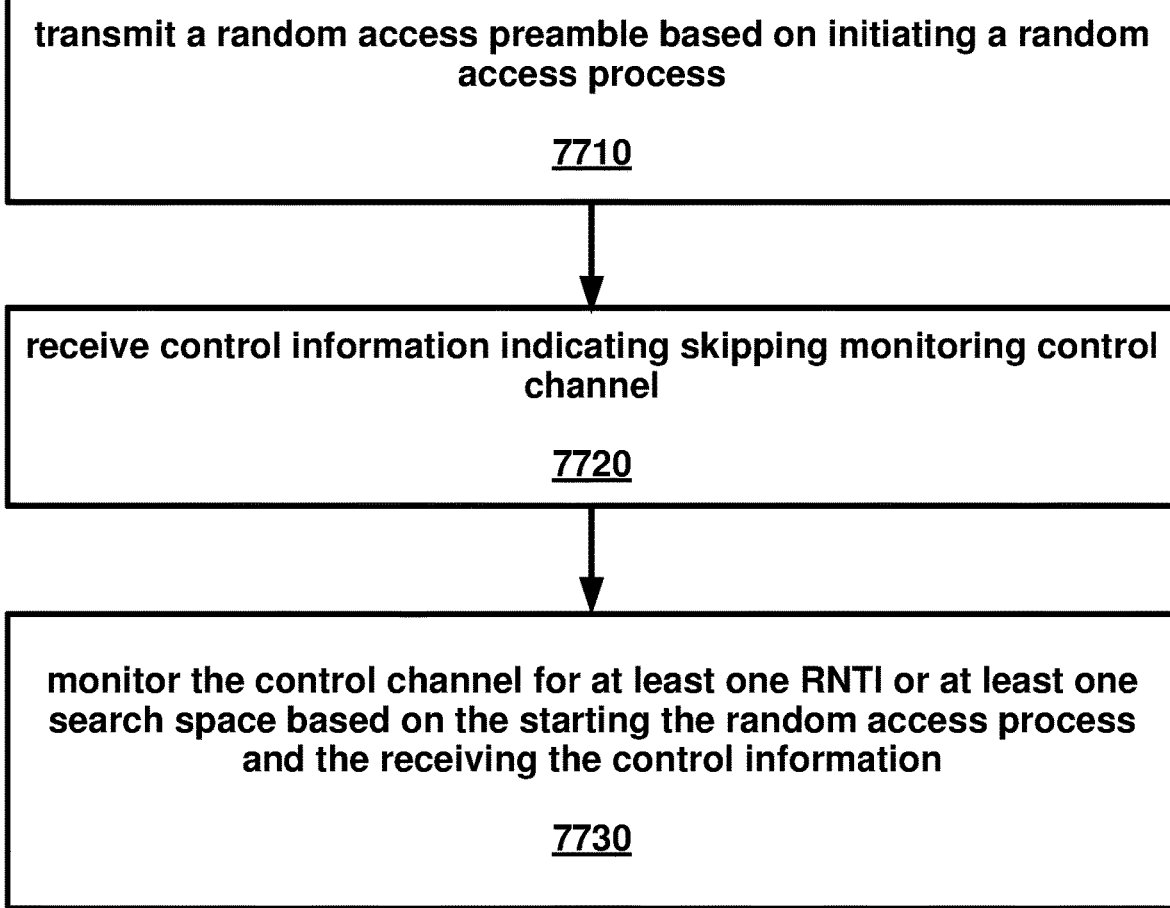
FIG. 77 shows an example flow diagram in accordance with several of various embodiments of the present disclosure.

FIG. 77 shows an example flow diagram in accordance with several of various embodiments of the present disclosure. At 7710, a wireless device may transmit a random access preamble based on initiating a random access process. At 7720, the wireless device may receive control information indicating skipping monitoring control channel. At 7730, the wireless device may monitor the control channel for at least one radio network temporary identifier or at least one search space based on the starting the random access process and the receiving the control information Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
  receiving, by a wireless device, configuration parameters indicating a plurality of physical downlink control channel (PDCCH) skipping durations comprising a first PDCCH skipping duration;
  receiving a first downlink control information (DCI):
    comprising a field with a first value indicating the first PDCCH skipping duration in the plurality of PDCCH skipping durations; and
    indicating skipping PDCCH monitoring for the first PDCCH skipping duration;
  transmitting a scheduling request in response to a triggering condition; and
  ignoring PDCCH skipping in response to the transmitting the scheduling request.

2. The method of claim 1, wherein the first PDCCH skipping duration is in a first number of slots.

3. The method of claim 1, wherein the first value provides an index to the first PDCCH skipping duration in the plurality of PDCCH skipping durations.

4. The method of claim 1, wherein the first DCI, indicating the first PDCCH skipping duration in the plurality of PDCCH skipping durations, is a scheduling DCI and further indicates an uplink grant or a downlink assignment.

5. The method of claim 1, further comprising:
  monitoring a downlink control channel based on the ignoring; and
  receiving a second DCI in response to the monitoring, wherein the second DCI indicates an uplink grant.

6. The method of claim 1, wherein the first triggering condition:
  is one of one or more scheduling request triggering conditions; and
  is based on a buffer status report being triggered and no uplink resources being available.

7. The method of claim 1, further comprising receiving a second DCI indicating no skipping in PDCCH monitoring.

8. A wireless device comprising:
one or more processors; and
memory storing instructions that, when executed by the one or more processors, cause the wireless device to:
  receive configuration parameters indicating a plurality of physical downlink control channel (PDCCH) skipping durations comprising a first PDCCH skipping duration;
  receive a first downlink control information (DCI):
    comprising a field with a first value indicating the first PDCCH skipping duration in the plurality of PDCCH skipping durations; and
    indicating skipping PDCCH monitoring for the first PDCCH skipping duration;
  transmit a scheduling request in response to a triggering condition; and
  ignore PDCCH skipping in response to the transmitting the scheduling request.

9. The wireless device of claim 8, wherein the first PDCCH skipping duration is in a first number of slots.

10. The wireless device of claim 8, wherein the first value provides an index to the first PDCCH skipping duration in the plurality of PDCCH skipping durations.

11. The wireless device of claim 8, wherein the first DCI, indicating the first PDCCH skipping duration in the plurality of PDCCH skipping durations, is a scheduling DCI and further indicates an uplink grant or a downlink assignment.

12. The wireless device of claim 8, wherein the instructions, when executed by the one or more processors, further cause the wireless device to:
  monitor a downlink control channel based on the ignoring; and
  receive a second DCI in response to the monitoring, wherein the second DCI indicates an uplink grant.

13. The wireless device of claim 8, wherein the first triggering condition:
  is one of one or more scheduling request triggering conditions; and
  is based on a buffer status report being triggered and no uplink resources being available.

14. The wireless device of claim 8, wherein the instructions, when executed by the one or more processors, further cause the wireless device to receive a second DCI indicating no skipping in PDCCH monitoring.

15. A system comprising:
a base station; and
a wireless device comprising: one or more processors; and memory storing instructions that, when executed by the one or more processors, cause the wireless device to: receive, from the base station, configuration parameters indicating a plurality of physical downlink control channel (PDCCH) skipping durations comprising a first PDCCH skipping duration; receive a first downlink control information (DCI): comprising a field with a first value indicating the first PDCCH skipping duration in the plurality of PDCCH skipping durations; and indicating skipping PDCCH monitoring for the first PDCCH skipping duration; transmit a scheduling request in response to a triggering condition; and ignore PDCCH skipping in response to the transmitting the scheduling request.

16. The system of claim 15, wherein the first PDCCH skipping duration is in a first number of slots.

17. The system of claim 15, wherein the first value provides an index to the first PDCCH skipping duration in the plurality of PDCCH skipping durations.

18. The system of claim 15, wherein the first DCI, indicating the first PDCCH skipping duration in the plurality of PDCCH skipping durations, is a scheduling DCI and further indicates an uplink grant or a downlink assignment.

19. The system of claim 15, wherein the instructions, when executed by the one or more processors, further cause the wireless device to:
  monitor a downlink control channel based on the ignoring; and
  receive a second DCI in response to the monitoring, wherein the second DCI indicates an uplink grant.

20. The system of claim 15, wherein the instructions, when executed by the one or more processors, further cause the wireless device to receive a second DCI indicating no skipping in PDCCH monitoring.

* * * * *